US011232517B1

(12) United States Patent
Medina et al.

(10) Patent No.: US 11,232,517 B1
(45) Date of Patent: *Jan. 25, 2022

(54) APPARATUSES, METHODS, AND SYSTEMS FOR REMOTE DEPOSIT CAPTURE WITH ENHANCED IMAGE DETECTION

(71) Applicant: UNITED SERVICES AUTOMOBILE ASSOCIATION (USAA), San Antonio, TX (US)

(72) Inventors: Reynaldo Medina, San Antonio, TX (US); Bharat Prasad, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/707,683

(22) Filed: Dec. 9, 2019

Related U.S. Application Data

(63) Continuation of application No. 15/695,770, filed on Sep. 5, 2017, now Pat. No. 10,621,660, which is a (Continued)

(51) Int. Cl.
*G06Q 40/02* (2012.01)
*G06Q 20/10* (2012.01)
(Continued)

(52) U.S. Cl.
CPC ........... *G06Q 40/02* (2013.01); *G06K 9/4642* (2013.01); *G06Q 20/042* (2013.01);
(Continued)

(58) Field of Classification Search
CPC .. G06Q 40/02; G06Q 20/042; G06Q 20/0425; G06Q 20/1085;
(Continued)

(56) References Cited

U.S. PATENT DOCUMENTS

| | | | |
|---|---|---|---|
| 1,748,489 | A | 2/1930 | McCarthy et al. |
| 2,292,825 | A | 8/1942 | Dilks et al. |

(Continued)

FOREIGN PATENT DOCUMENTS

| | | | |
|---|---|---|---|
| CN | 1897644 | A | 1/2007 |
| EP | 0984410 | | 3/2000 |

(Continued)

OTHER PUBLICATIONS

Jung et al., "Rectangle Detection based on a Windowed Hough Transform", IEEE Xplore, Nov. 8, 2004. (Year: 2004).*

(Continued)

*Primary Examiner* — Eric T Wong
(74) *Attorney, Agent, or Firm* — Crowell & Moring LLP

(57) ABSTRACT

The present application is directed to apparatuses, methods, and systems for remote deposit capture with enhanced image detection. In one form, a system includes a processor configured to extract an instrument image from an image that is associated with an account, where the instrument image is extracted by determining at least one corner of a plurality of corners of an instrument in the image, and to transmit the instrument image to a financial institution server to transfer funds between financial institution accounts.

20 Claims, 81 Drawing Sheets

Related U.S. Application Data continuation of application No. 14/846,586, filed on Sep. 4, 2015, now Pat. No. 9,779,452, which is a continuation of application No. 12/982,494, filed on Dec. 30, 2010, now Pat. No. 9,129,340.

(60) Provisional application No. 61/352,772, filed on Jun. 8, 2010, provisional application No. 61/352,775, filed on Jun. 8, 2010, provisional application No. 61/352,762, filed on Jun. 8, 2010.

(51) Int. Cl.
*G06T 5/40* (2006.01)
*G06Q 20/04* (2012.01)
*G06T 7/12* (2017.01)
*G06K 9/46* (2006.01)

(52) U.S. Cl.
CPC ..... *G06Q 20/0425* (2013.01); *G06Q 20/1085* (2013.01); *G06T 5/40* (2013.01); *G06T 7/12* (2017.01); *G06T 2207/20132* (2013.01)

(58) Field of Classification Search
CPC ....... G06T 7/11–194; G06T 7/12; G06T 5/40; G06T 2207/20132; G06K 9/4642
See application file for complete search history.

(56) References Cited

U.S. PATENT DOCUMENTS 3,005,282 A 10/1961 Christiansen
3,341,820 A 9/1967 Grillmeier, Jr. et al.
3,576,972 A 5/1971 Wood
3,593,913 A 7/1971 Bremer
3,620,553 A 11/1971 Donovan
3,648,242 A 3/1972 Grosbard
3,800,124 A 3/1974 Walsh
3,816,943 A 6/1974 Henry
4,002,356 A 1/1977 Weidmann
4,027,142 A 5/1977 Paup et al.
4,060,711 A 11/1977 Buros
4,070,649 A 1/1978 Wright, Jr. et al.
4,128,202 A 12/1978 Buros
4,136,471 A 1/1979 Austin
4,205,780 A 6/1980 Burns
4,264,808 A 4/1981 Owens
4,305,216 A 12/1981 Skelton
4,321,672 A 3/1982 Braun
4,346,442 A 8/1982 Musmanno
4,417,136 A 11/1983 Rushby et al.
4,433,436 A 2/1984 Carnes
4,454,610 A 6/1984 Sziklai
RE31,692 E 10/1984 Tyburski et al.
4,523,330 A 6/1985 Rd
4,636,099 A 1/1987 Goldston
4,640,413 A 2/1987 Kaplan
4,644,144 A 2/1987 Chandek
4,722,444 A 2/1988 Murphy et al.
4,722,544 A 2/1988 Weber
4,727,435 A 2/1988 Otani
4,737,911 A 4/1988 Freeman
4,739,411 A 4/1988 Bolton
4,774,574 A 9/1988 Daly et al.
4,774,663 A 9/1988 Musmanno
4,790,475 A 12/1988 Griffin
4,806,780 A 2/1989 Yamamoto
4,837,693 A 6/1989 Schotz
4,890,228 A 12/1989 Longfield
4,896,363 A 1/1990 Taylor et al.
4,927,071 A 5/1990 Wood
4,934,587 A 6/1990 McNabb
4,960,981 A 10/1990 Benton
4,975,735 A 12/1990 Bright
5,022,683 A 6/1991 Barbour
5,077,805 A 12/1991 Tan
5,091,968 A 2/1992 Higgins et al.
5,122,950 A 6/1992 Benton et al.
5,134,564 A 7/1992 Dunn et al.
5,146,606 A 9/1992 Grondalski
5,157,620 A 10/1992 Shaar
5,159,548 A 10/1992 Caslavka
5,164,833 A 11/1992 Aoki
5,175,682 A 12/1992 Higashiyama et al.
5,187,750 A 2/1993 Behera
5,191,525 A 3/1993 LeBrun
5,193,121 A 3/1993 Elischer et al.
5,220,501 A 6/1993 Lawlor
5,227,863 A 7/1993 Bilbrey et al.
5,229,589 A 7/1993 Schneider
5,233,547 A 8/1993 Kapp et al.
5,237,158 A 8/1993 Kern et al.
5,237,159 A 8/1993 Stephens
5,237,620 A 8/1993 Deaton et al.
5,257,320 A 10/1993 Etherington et al.
5,265,008 A 11/1993 Benton
5,268,968 A 12/1993 Yoshida
5,321,816 A 6/1994 Rogan
5,345,090 A 9/1994 Hludzinski
5,347,302 A 9/1994 Simonoff
5,350,906 A 9/1994 Brody
5,373,550 A 12/1994 Campbell
5,383,113 A 1/1995 Kight et al.
5,419,588 A 5/1995 Wood
5,422,467 A 6/1995 Graef
5,444,616 A 8/1995 Nair et al.
5,444,794 A 8/1995 Uhland, Sr.
5,455,875 A 10/1995 Chevion et al.
5,475,403 A 12/1995 Havlovick et al.
5,504,538 A 4/1996 Tsujihara
5,504,677 A 4/1996 Pollin
5,528,387 A 6/1996 Kelly et al.
5,530,773 A 6/1996 Thompson
5,577,179 A 11/1996 Blank
5,583,759 A 12/1996 Geer
5,590,196 A 12/1996 Moreau
5,594,225 A 1/1997 Botvin
5,598,969 A 2/1997 Ong
5,602,936 A 2/1997 Green
5,610,726 A 3/1997 Nonoshita
5,611,028 A 3/1997 Shibasaki
5,630,073 A 5/1997 Nolan
5,631,984 A 5/1997 Graf et al.
5,668,897 A 9/1997 Stolfo
5,673,320 A 9/1997 Ray et al.
5,677,955 A 10/1997 Doggett
5,678,046 A 10/1997 Cahill et al.
5,679,938 A 10/1997 Templeton
5,680,611 A 10/1997 Rail
5,691,524 A 11/1997 Josephson
5,699,452 A 12/1997 Vaidyanathan
5,734,747 A 3/1998 Vaidyanathan
5,737,440 A 4/1998 Kunkier
5,748,780 A 5/1998 Stolfo
5,751,842 A 5/1998 Riach
5,761,686 A 6/1998 Bloomberg
5,784,503 A 7/1998 Bleecker, III et al.
5,830,609 A 11/1998 Warner
5,832,463 A 11/1998 Funk
5,838,814 A 11/1998 Moore
5,848,185 A 12/1998 Koga et al.
5,859,935 A 1/1999 Johnson et al.
5,863,075 A 1/1999 Rich
5,870,456 A 2/1999 Rogers
5,870,724 A 2/1999 Lawlor
5,870,725 A 2/1999 Bellinger et al.
5,878,337 A 3/1999 Joao
5,889,884 A 3/1999 Hashimoto et al.
5,893,101 A 4/1999 Balogh et al.
5,897,625 A 4/1999 Gustin
5,898,157 A 4/1999 Mangili et al.
5,901,253 A 5/1999 Tretter
5,903,878 A 5/1999 Talati
5,903,881 A 5/1999 Schrader
5,910,988 A 6/1999 Ballard

(56) References Cited

U.S. PATENT DOCUMENTS

| | | | |
|---|---|---|---|
| 5,917,931 | A | 6/1999 | Kunkier |
| 5,924,737 | A | 7/1999 | Schrupp |
| 5,926,548 | A | 7/1999 | Okamoto |
| 5,930,501 | A | 7/1999 | Neil |
| 5,930,778 | A | 7/1999 | Geer |
| 5,937,396 | A | 8/1999 | Konya |
| 5,940,844 | A | 8/1999 | Cahill |
| 5,982,918 | A | 11/1999 | Mennie |
| 5,987,439 | A | 11/1999 | Gustin et al. |
| 6,005,623 | A | 12/1999 | Takahashi |
| 6,012,048 | A | 1/2000 | Gustin et al. |
| 6,014,454 | A | 1/2000 | Kunkier |
| 6,021,202 | A | 2/2000 | Anderson |
| 6,021,397 | A | 2/2000 | Jones |
| 6,023,705 | A | 2/2000 | Bellinger et al. |
| 6,029,887 | A | 2/2000 | Furuhashi |
| 6,030,000 | A | 2/2000 | Diamond |
| 6,032,137 | A | 2/2000 | Ballard |
| 6,038,553 | A | 3/2000 | Hyde |
| 6,053,405 | A | 4/2000 | Irwin, Jr. et al. |
| 6,059,185 | A | 5/2000 | Funk et al. |
| 6,064,753 | A | 5/2000 | Bolle et al. |
| 6,064,762 | A | 5/2000 | Haenel |
| 6,072,941 | A | 6/2000 | Suzuki et al. |
| 6,073,119 | A | 6/2000 | Borenmisza-wahr |
| 6,073,121 | A | 6/2000 | Ramzy |
| 6,085,168 | A | 7/2000 | Mori |
| 6,086,708 | A | 7/2000 | Colgate |
| 6,089,450 | A | 7/2000 | Koeple |
| 6,089,610 | A | 7/2000 | Greene |
| 6,092,047 | A | 7/2000 | Hyman et al. |
| 6,097,834 | A | 8/2000 | Krouse |
| 6,097,845 | A | 8/2000 | Ng et al. |
| 6,097,885 | A | 8/2000 | Rayner |
| 6,105,865 | A | 8/2000 | Hardesty |
| 6,128,603 | A | 10/2000 | Dent et al. |
| 6,141,339 | A | 10/2000 | Kaplan et al. |
| 6,145,738 | A | 11/2000 | Stinson et al. |
| 6,148,102 | A | 11/2000 | Stolin |
| 6,149,056 | A | 11/2000 | Stinson et al. |
| 6,151,409 | A | 11/2000 | Chen et al. |
| 6,151,423 | A | 11/2000 | Melen |
| 6,151,426 | A | 11/2000 | Lee |
| 6,159,585 | A | 12/2000 | Rittenhouse |
| 6,170,744 | B1 | 1/2001 | Lee |
| 6,178,270 | B1 | 1/2001 | Taylor et al. |
| 6,178,409 | B1 | 1/2001 | Weber et al. |
| 6,181,837 | B1 | 1/2001 | Cahill et al. |
| 6,188,506 | B1 | 2/2001 | Kaiserman |
| 6,189,785 | B1 | 2/2001 | Lowery |
| 6,192,165 | B1 | 2/2001 | Irons |
| 6,195,452 | B1 | 2/2001 | Royer |
| 6,195,694 | B1 | 2/2001 | Chen et al. |
| 6,199,055 | B1 | 3/2001 | Kara |
| 6,236,009 | B1 | 5/2001 | Emigh et al. |
| 6,243,689 | B1 | 6/2001 | Norton |
| 6,278,983 | B1 | 8/2001 | Ball |
| 6,282,523 | B1 | 8/2001 | Tedesco et al. |
| 6,282,826 | B1 | 9/2001 | Richards |
| 6,293,469 | B1 | 9/2001 | Masson et al. |
| 6,310,647 | B1 | 10/2001 | Parulski et al. |
| 6,314,452 | B1 | 11/2001 | Dekel |
| 6,315,195 | B1 | 11/2001 | Ramachandrun |
| 6,317,727 | B1 | 11/2001 | May |
| 6,328,207 | B1 | 12/2001 | Gregoire et al. |
| 6,330,546 | B1 | 12/2001 | Gopinathan et al. |
| 6,339,658 | B1 | 1/2002 | Moccagatta |
| 6,339,766 | B1 | 1/2002 | Gephart |
| 6,351,553 | B1 | 2/2002 | Hayosh |
| 6,351,735 | B1 | 2/2002 | Deaton et al. |
| 6,354,490 | B1 | 3/2002 | Weiss et al. |
| 6,363,162 | B1 | 3/2002 | Moed et al. |
| 6,363,164 | B1 | 3/2002 | Jones et al. |
| 6,390,362 | B1 | 5/2002 | Martin |
| 6,397,196 | B1 | 5/2002 | Kravetz |
| 6,408,084 | B1 | 6/2002 | Foley |
| 6,411,725 | B1 | 6/2002 | Rhoads |
| 6,411,737 | B2 | 6/2002 | Wesolkowski et al. |
| 6,411,938 | B1 | 6/2002 | Gates et al. |
| 6,413,305 | B1 | 7/2002 | Mehta |
| 6,417,869 | B1 | 7/2002 | Do |
| 6,425,017 | B1 | 7/2002 | Dievendorff |
| 6,429,952 | B1 | 8/2002 | Olbricht |
| 6,439,454 | B1 | 8/2002 | Masson et al. |
| 6,449,397 | B1 | 9/2002 | Che-chu |
| 6,450,403 | B1 | 9/2002 | Martens et al. |
| 6,463,220 | B1 | 10/2002 | Dance et al. |
| 6,464,134 | B1 | 10/2002 | Page |
| 6,469,745 | B1 | 10/2002 | Yamada et al. |
| 6,470,325 | B1 | 10/2002 | Leemhuis |
| 6,473,519 | B1 | 10/2002 | Pidhirny et al. |
| 6,502,747 | B1 | 1/2003 | Stoutenburg et al. |
| 6,505,178 | B1 | 1/2003 | Flenley |
| 6,546,119 | B2 | 4/2003 | Ciolli et al. |
| 6,574,377 | B1 | 6/2003 | Cahill et al. |
| 6,574,609 | B1 | 6/2003 | Downs |
| 6,578,760 | B1 | 6/2003 | Otto |
| 6,587,837 | B1 | 7/2003 | Spagna |
| 6,606,117 | B1 | 8/2003 | Windle |
| 6,609,200 | B2 | 8/2003 | Anderson |
| 6,611,598 | B1 | 8/2003 | Hayosh |
| 6,614,930 | B1 | 9/2003 | Agnihotri et al. |
| 6,643,416 | B1 | 11/2003 | Daniels |
| 6,647,136 | B2 | 11/2003 | Jones et al. |
| 6,654,487 | B1 | 11/2003 | Downs, Jr. |
| 6,661,910 | B2 | 12/2003 | Jones et al. |
| 6,669,086 | B2 | 12/2003 | Abdi et al. |
| 6,672,452 | B1 | 1/2004 | Alves |
| 6,682,452 | B2 | 1/2004 | Quintus |
| 6,695,204 | B1 | 2/2004 | Stinson |
| 6,711,474 | B1 | 3/2004 | Treyz et al. |
| 6,726,097 | B2 | 4/2004 | Graef |
| 6,728,397 | B2 | 4/2004 | McNeal |
| 6,738,496 | B1 | 5/2004 | Van Hall |
| 6,742,128 | B1 | 5/2004 | Joiner |
| 6,745,186 | B1 | 6/2004 | Testa et al. |
| 6,754,640 | B2 | 6/2004 | Bozeman |
| 6,755,340 | B1 | 6/2004 | Voss et al. |
| 6,760,414 | B1 | 7/2004 | Schurko et al. |
| 6,760,470 | B1 | 7/2004 | Bogosian et al. |
| 6,763,226 | B1 | 7/2004 | McZeal |
| 6,781,962 | B1 | 8/2004 | Williams |
| 6,786,398 | B1 | 9/2004 | Stinson et al. |
| 6,789,054 | B1 | 9/2004 | Makhlouf |
| 6,796,489 | B2 | 9/2004 | Slater et al. |
| 6,796,491 | B2 | 9/2004 | Nakajima |
| 6,806,903 | B1 | 10/2004 | Okisu et al. |
| 6,807,294 | B2 | 10/2004 | Yamazaki |
| 6,813,733 | B1 | 11/2004 | Li |
| 6,829,704 | B2 | 12/2004 | Zhang |
| 6,844,885 | B2 | 1/2005 | Anderson |
| 6,856,965 | B1 | 2/2005 | Stinson |
| 6,863,214 | B2 | 3/2005 | Garner et al. |
| 6,870,947 | B2 | 3/2005 | Kelland |
| 6,873,728 | B2 | 3/2005 | Bernstein et al. |
| 6,883,140 | B1 | 4/2005 | Acker |
| 6,898,314 | B2 | 5/2005 | Kung et al. |
| 6,902,105 | B2 | 6/2005 | Koakutsu |
| 6,910,023 | B1 | 6/2005 | Schibi |
| 6,913,188 | B2 | 7/2005 | Wong |
| 6,922,487 | B2 | 7/2005 | Dance et al. |
| 6,931,255 | B2 | 8/2005 | Mekuria |
| 6,931,591 | B1 | 8/2005 | Brown |
| 6,934,719 | B2 | 8/2005 | Nally |
| 6,947,610 | B2 | 9/2005 | Sun |
| 6,957,770 | B1 | 10/2005 | Robinson |
| 6,961,689 | B1 | 11/2005 | Greenberg |
| 6,970,843 | B1 | 11/2005 | Forte |
| 6,973,589 | B2 | 12/2005 | Wright |
| 6,983,886 | B2 | 1/2006 | Natsukari et al. |
| 6,993,507 | B2 | 1/2006 | Meyer |
| 6,996,263 | B2 | 2/2006 | Jones et al. |
| 6,999,943 | B1 | 2/2006 | Johnson |
| 7,003,040 | B2 | 2/2006 | Yi |

(56) References Cited

U.S. PATENT DOCUMENTS

| | | | |
|---|---|---|---|
| 7,004,382 | B2 | 2/2006 | Sandru |
| 7,010,155 | B2 | 3/2006 | Koakutsu et al. |
| 7,010,507 | B1 | 3/2006 | Anderson |
| 7,016,704 | B2 | 3/2006 | Pallakoff |
| 7,027,171 | B1 | 4/2006 | Watanabe |
| 7,028,886 | B1 | 4/2006 | Maloney |
| 7,039,048 | B1 | 5/2006 | Monta |
| 7,046,991 | B2 | 5/2006 | Little |
| 7,051,001 | B1 | 5/2006 | Slater |
| 7,058,036 | B1 | 6/2006 | Yu |
| 7,062,099 | B2 | 6/2006 | Li et al. |
| 7,062,456 | B1 | 6/2006 | Riehl et al. |
| 7,062,768 | B2 | 6/2006 | Kubo |
| 7,072,862 | B1 | 7/2006 | Wilson |
| 7,076,458 | B2 | 7/2006 | Lawlor et al. |
| 7,086,003 | B2 | 8/2006 | Demsky |
| 7,092,561 | B2 | 8/2006 | Downs, Jr. |
| 7,104,443 | B1 | 9/2006 | Paul et al. |
| 7,113,925 | B2 | 9/2006 | Waserstein |
| 7,114,649 | B2 | 10/2006 | Nelson |
| 7,116,446 | B2 | 10/2006 | Maurer |
| 7,117,171 | B1 | 10/2006 | Pollin |
| 7,120,461 | B2 | 10/2006 | Cho |
| 7,131,571 | B2 | 11/2006 | Swift et al. |
| 7,139,594 | B2 | 11/2006 | Nagatomo |
| 7,140,539 | B1 | 11/2006 | Crews |
| 7,163,347 | B2 | 1/2007 | Lugg |
| 7,178,721 | B2 | 2/2007 | Maloney |
| 7,181,430 | B1 | 2/2007 | Buchanan et al. |
| 7,184,980 | B2 | 2/2007 | Allen-Rouman et al. |
| 7,185,805 | B1 | 3/2007 | McShirley |
| 7,197,173 | B2 | 3/2007 | Jones et al. |
| 7,200,255 | B2 | 4/2007 | Jones |
| 7,204,412 | B2 | 4/2007 | Foss, Jr. |
| 7,207,478 | B1 | 4/2007 | Blackson et al. |
| 7,216,106 | B1 | 5/2007 | Buchanan |
| 7,219,082 | B2 | 5/2007 | Forte |
| 7,219,831 | B2 | 5/2007 | Murata |
| 7,240,336 | B1 | 7/2007 | Baker |
| 7,245,765 | B2 | 7/2007 | Myers et al. |
| 7,249,076 | B1 | 7/2007 | Pendleton |
| 7,252,224 | B2 | 8/2007 | Verma |
| 7,257,246 | B1 | 8/2007 | Brodie et al. |
| 7,266,230 | B2 | 9/2007 | Doran |
| 7,277,191 | B2 | 10/2007 | Metcalfe et al. |
| 7,290,034 | B2 | 10/2007 | Budd |
| 7,299,970 | B1 | 11/2007 | Ching |
| 7,299,979 | B2 | 11/2007 | Phillips |
| 7,313,543 | B1 | 12/2007 | Crane |
| 7,314,163 | B1 | 1/2008 | Crews et al. |
| 7,321,874 | B2 | 1/2008 | Dilip |
| 7,321,875 | B2 | 1/2008 | Dilip |
| 7,325,725 | B2 | 2/2008 | Foss, Jr. |
| 7,328,190 | B2 | 2/2008 | Smith et al. |
| 7,330,604 | B2 | 2/2008 | Wu et al. |
| 7,331,523 | B2 | 2/2008 | Meier et al. |
| 7,336,813 | B2 | 2/2008 | Prakash et al. |
| 7,343,320 | B1 | 3/2008 | Treyz |
| 7,349,566 | B2 | 3/2008 | Jones et al. |
| 7,349,585 | B2 | 3/2008 | Li |
| 7,350,697 | B2 | 4/2008 | Swift et al. |
| 7,356,505 | B2 | 4/2008 | March |
| 7,369,713 | B2 | 5/2008 | Suino |
| 7,377,425 | B1 | 5/2008 | Ma |
| 7,379,978 | B2 | 5/2008 | Anderson |
| 7,383,227 | B2 | 6/2008 | Weinflash et al. |
| 7,385,631 | B2 | 6/2008 | Maeno |
| 7,386,511 | B2 | 6/2008 | Buchanan |
| 7,388,683 | B2 | 6/2008 | Rodriguez et al. |
| 7,391,897 | B2 | 6/2008 | Jones et al. |
| 7,391,934 | B2 | 6/2008 | Goodall et al. |
| 7,392,935 | B2 | 7/2008 | Byrne |
| 7,401,048 | B2 | 7/2008 | Rosedale |
| 7,403,917 | B1 | 7/2008 | Larsen |
| 7,406,198 | B2 | 7/2008 | Aoki et al. |
| 7,419,093 | B1 | 9/2008 | Blackson et al. |
| 7,421,107 | B2 | 9/2008 | Lugg |
| 7,421,410 | B1 | 9/2008 | Schechtman et al. |
| 7,427,016 | B2 | 9/2008 | Chimento |
| 7,433,098 | B2 | 10/2008 | Klein et al. |
| 7,437,327 | B2 | 10/2008 | Lam |
| 7,440,924 | B2 | 10/2008 | Buchanan |
| 7,447,347 | B2 | 11/2008 | Weber |
| 7,455,220 | B2 | 11/2008 | Phillips |
| 7,455,221 | B2 | 11/2008 | Sheaffer |
| 7,460,108 | B2 | 12/2008 | Tamura |
| 7,460,700 | B2 | 12/2008 | Tsunachima et al. |
| 7,461,779 | B2 | 12/2008 | Ramachandran |
| 7,461,780 | B2 | 12/2008 | Potts |
| 7,464,859 | B1 | 12/2008 | Hawkins |
| 7,471,818 | B1 | 12/2008 | Price |
| 7,475,040 | B2 | 1/2009 | Buchanan |
| 7,477,923 | B2 | 1/2009 | Wallmark |
| 7,480,382 | B2 | 1/2009 | Dunbar |
| 7,480,422 | B2 | 1/2009 | Ackley et al. |
| 7,489,953 | B2 | 2/2009 | Griffin |
| 7,490,242 | B2 | 2/2009 | Torres |
| 7,497,429 | B2 | 3/2009 | Reynders |
| 7,503,486 | B2 | 3/2009 | Ahles |
| 7,505,759 | B1 | 3/2009 | Rahman |
| 7,506,261 | B2 | 3/2009 | Statou |
| 7,509,287 | B2 | 3/2009 | Nutahara |
| 7,512,564 | B1 | 3/2009 | Geer |
| 7,519,560 | B2 | 4/2009 | Lam |
| 7,520,420 | B2 | 4/2009 | Phillips |
| 7,520,422 | B1 | 4/2009 | Robinson et al. |
| 7,536,354 | B1 | 5/2009 | deGroeve et al. |
| 7,536,440 | B2 | 5/2009 | Budd |
| 7,539,646 | B2 | 5/2009 | Gilder |
| 7,540,408 | B2 | 6/2009 | Levine |
| 7,542,598 | B2 | 6/2009 | Jones |
| 7,545,529 | B2 | 6/2009 | Borrey et al. |
| 7,548,641 | B2 | 6/2009 | Gilson et al. |
| 7,566,002 | B2 | 7/2009 | Love et al. |
| 7,571,848 | B2 | 8/2009 | Cohen |
| 7,577,614 | B1 | 8/2009 | Warren et al. |
| 7,587,066 | B2 | 9/2009 | Cordery et al. |
| 7,587,363 | B2 | 9/2009 | Cataline |
| 7,590,275 | B2 | 9/2009 | Clarke et al. |
| 7,599,543 | B2 | 10/2009 | Jones |
| 7,599,888 | B2 | 10/2009 | Manfre |
| 7,602,956 | B2 | 10/2009 | Jones |
| 7,606,762 | B1 | 10/2009 | Heit |
| 7,609,873 | B2 | 10/2009 | Foth et al. |
| 7,609,889 | B2 | 10/2009 | Guo et al. |
| 7,619,721 | B2 | 11/2009 | Jones |
| 7,620,231 | B2 | 11/2009 | Jones |
| 7,620,604 | B1 | 11/2009 | Bueche, Jr. |
| 7,630,518 | B2 | 12/2009 | Frew et al. |
| 7,644,037 | B1 | 1/2010 | Ostrovsky |
| 7,644,043 | B2 | 1/2010 | Minowa |
| 7,647,275 | B2 | 1/2010 | Jones |
| 7,668,363 | B2 | 2/2010 | Price |
| 7,672,022 | B1 | 3/2010 | Fan |
| 7,672,940 | B2 | 3/2010 | Viola |
| 7,676,409 | B1 | 3/2010 | Ahmad |
| 7,680,732 | B1 | 3/2010 | Davies et al. |
| 7,680,735 | B1 | 3/2010 | Loy |
| 7,689,482 | B2 | 3/2010 | Lam |
| 7,697,776 | B2 | 4/2010 | Wu et al. |
| 7,698,222 | B1 | 4/2010 | Bueche, Jr. |
| 7,702,588 | B2 | 4/2010 | Gilder et al. |
| 7,714,778 | B2 | 5/2010 | Dupray |
| 7,720,735 | B2 | 5/2010 | Anderson et al. |
| 7,734,545 | B1 | 6/2010 | Fogliano |
| 7,743,979 | B2 | 6/2010 | Fredman |
| 7,753,268 | B1 | 7/2010 | Robinson et al. |
| 7,761,358 | B2 | 7/2010 | Craig et al. |
| 7,766,244 | B1 | 8/2010 | Field |
| 7,769,650 | B2 | 8/2010 | Bleunven |
| 7,778,457 | B2 | 8/2010 | Nepomniachtchi et al. |
| 7,792,752 | B1 | 9/2010 | Kay |
| 7,792,753 | B1 | 9/2010 | Slater et al. |
| 7,810,714 | B2 | 10/2010 | Murata |

(56) References Cited

U.S. PATENT DOCUMENTS

| | | | |
|---|---|---|---|
| 7,812,986 | B2 | 10/2010 | Graham et al. |
| 7,818,245 | B2 | 10/2010 | Prakash et al. |
| 7,831,458 | B2 | 11/2010 | Neumann |
| 7,856,402 | B1 | 12/2010 | Kay |
| 7,865,384 | B2 | 1/2011 | Anderson et al. |
| 7,873,200 | B1 | 1/2011 | Oakes, III et al. |
| 7,876,949 | B1 | 1/2011 | Oakes, III et al. |
| 7,885,451 | B1 | 2/2011 | Walls et al. |
| 7,885,880 | B1 | 2/2011 | Prasad et al. |
| 7,894,094 | B2 | 2/2011 | Nacman et al. |
| 7,895,054 | B2 | 2/2011 | Slen et al. |
| 7,896,232 | B1 | 3/2011 | Prasad et al. |
| 7,900,822 | B1 | 3/2011 | Prasad et al. |
| 7,903,863 | B2 | 3/2011 | Jones et al. |
| 7,904,386 | B2 | 3/2011 | Kalra et al. |
| 7,912,785 | B1 | 3/2011 | Kay |
| 7,935,441 | B2 | 5/2011 | Tononishi |
| 7,949,587 | B1 | 5/2011 | Morris et al. |
| 7,950,698 | B2 | 5/2011 | Popadic et al. |
| 7,953,441 | B2 | 5/2011 | Lors |
| 7,958,053 | B2 | 6/2011 | Stone |
| 7,962,411 | B1 | 6/2011 | Prasad et al. |
| 7,970,677 | B1 | 6/2011 | Oakes, III et al. |
| 7,974,899 | B1 | 7/2011 | Prasad et al. |
| 7,978,900 | B2 | 7/2011 | Nepomniachtchi et al. |
| 7,979,326 | B2 | 7/2011 | Kurushima |
| 7,987,231 | B2 | 7/2011 | Karkanias |
| 7,996,312 | B1 | 8/2011 | Beck et al. |
| 7,996,314 | B1 | 8/2011 | Smith et al. |
| 7,996,315 | B1 | 8/2011 | Smith et al. |
| 7,996,316 | B1 | 8/2011 | Smith et al. |
| 8,000,514 | B2 | 8/2011 | Nepomniachtchi et al. |
| 8,001,051 | B1 | 8/2011 | Smith et al. |
| 8,045,784 | B2 | 10/2011 | Price et al. |
| 8,046,301 | B1 | 10/2011 | Smith et al. |
| 8,060,442 | B1 | 11/2011 | Hecht et al. |
| 8,065,307 | B2 | 11/2011 | Haslam et al. |
| 8,091,778 | B1 | 1/2012 | Block et al. |
| 8,116,533 | B2 | 2/2012 | Kiplinger et al. |
| 8,159,520 | B1 | 4/2012 | Dhanoa |
| 8,203,640 | B2 | 6/2012 | Kim et al. |
| 8,204,293 | B2 | 6/2012 | Csulits et al. |
| 8,235,284 | B1 | 8/2012 | Prasad et al. |
| 8,266,076 | B2 | 9/2012 | Lopez et al. |
| 8,271,385 | B2 | 9/2012 | Emerson et al. |
| 8,290,237 | B1 | 10/2012 | Burks et al. |
| 8,313,020 | B2 | 11/2012 | Ramachandran |
| 8,320,657 | B1 | 11/2012 | Burks et al. |
| 8,332,329 | B1 | 12/2012 | Thiele |
| 8,351,677 | B1 | 1/2013 | Oakes, III et al. |
| 8,351,678 | B1 | 1/2013 | Medina, III |
| 8,358,826 | B1 | 1/2013 | Medina et al. |
| 8,364,563 | B2 | 1/2013 | Choiniere, Sr. |
| 8,369,650 | B2 | 2/2013 | Zanfir et al. |
| 8,374,963 | B1 | 2/2013 | Billman |
| 8,391,599 | B1 | 3/2013 | Medina, III |
| 8,392,332 | B1 | 3/2013 | Oakes, III et al. |
| 8,401,962 | B1 | 3/2013 | Bent et al. |
| 8,422,758 | B1 | 4/2013 | Bueche, Jr. |
| 8,433,127 | B1 | 4/2013 | Harpel et al. |
| 8,433,647 | B1 | 4/2013 | Yarbrough |
| 8,452,689 | B1 | 5/2013 | Medina, III |
| 8,464,933 | B1 | 6/2013 | Prasad et al. |
| 8,538,124 | B1 | 9/2013 | Harpel et al. |
| 8,542,921 | B1 | 9/2013 | Medina |
| 8,548,267 | B1 | 10/2013 | Yacoub et al. |
| 8,559,766 | B2 | 10/2013 | Tilt et al. |
| 8,582,862 | B2 | 11/2013 | Nepomniachtchi et al. |
| 8,611,635 | B1 | 12/2013 | Medina, III |
| 8,660,952 | B1 | 2/2014 | Viera et al. |
| 8,699,779 | B1 | 4/2014 | Prasad et al. |
| 8,708,227 | B1 | 4/2014 | Oakes, III et al. |
| 8,731,321 | B2 | 5/2014 | Fujiwara et al. |
| 8,732,081 | B1 | 5/2014 | Oakes, III et al. |
| 8,751,345 | B1 | 6/2014 | Borzych et al. |
| 8,751,356 | B1 | 6/2014 | Garcia |
| 8,751,379 | B1 | 6/2014 | Bueche, Jr. |
| 8,768,038 | B1 | 7/2014 | Sherman et al. |
| 8,799,147 | B1 | 8/2014 | Walls et al. |
| 8,818,033 | B1 | 8/2014 | Liu |
| 8,837,806 | B1 | 9/2014 | Ethington et al. |
| 8,843,405 | B1 | 9/2014 | Hartman et al. |
| 8,959,033 | B1 | 2/2015 | Oakes, III et al. |
| 8,977,571 | B1 | 3/2015 | Bueche, Jr. et al. |
| 8,990,862 | B1 | 3/2015 | Smith |
| 9,009,071 | B1 | 4/2015 | Watson et al. |
| 9,036,040 | B1 | 5/2015 | Danko |
| 9,058,512 | B1 | 6/2015 | Medina, III |
| 9,064,284 | B1 | 6/2015 | Janiszeski et al. |
| 9,129,340 | B1 | 8/2015 | Medina, III et al. |
| 9,159,101 | B1 | 10/2015 | Pollack et al. |
| 9,177,197 | B1 | 11/2015 | Prasad et al. |
| 9,177,198 | B1 | 11/2015 | Prasad et al. |
| 9,224,136 | B1 | 12/2015 | Oakes, III et al. |
| 9,286,514 | B1 | 3/2016 | Newman |
| 9,311,634 | B1 | 4/2016 | Hildebrand |
| 9,336,517 | B1 | 5/2016 | Prasad et al. |
| 9,390,339 | B1 | 7/2016 | Danko |
| 9,401,011 | B2 | 7/2016 | Medina, III et al. |
| 9,424,569 | B1 | 8/2016 | Sherman et al. |
| 9,569,756 | B1 | 2/2017 | Bueche, Jr. et al. |
| 9,619,872 | B1 | 4/2017 | Medina, III et al. |
| 9,626,183 | B1 | 4/2017 | Smith et al. |
| 9,626,662 | B1 | 4/2017 | Prasad et al. |
| 9,779,392 | B1 | 10/2017 | Prasad et al. |
| 9,779,452 | B1 | 10/2017 | Medina et al. |
| 9,785,929 | B1 | 10/2017 | Watson et al. |
| 9,792,654 | B1 | 10/2017 | Limas et al. |
| 9,818,090 | B1 | 11/2017 | Bueche, Jr. et al. |
| 9,886,642 | B1 | 2/2018 | Danko |
| 9,892,454 | B1 | 2/2018 | Pollack et al. |
| 9,898,778 | B1 | 2/2018 | Pollack et al. |
| 9,898,808 | B1 | 2/2018 | Medina, III et al. |
| 9,904,848 | B1 | 2/2018 | Newman |
| 9,946,923 | B1 | 4/2018 | Medina |
| 10,013,605 | B1 | 7/2018 | Oakes, III et al. |
| 10,013,681 | B1 | 7/2018 | Oakes, III et al. |
| 10,181,087 | B1 | 1/2019 | Danko |
| 10,235,660 | B1 | 3/2019 | Bueche, Jr. et al. |
| 10,360,448 | B1 | 7/2019 | Newman |
| 10,373,136 | B1 | 8/2019 | Pollack et al. |
| 10,380,559 | B1 | 8/2019 | Oakes, III et al. |
| 10,380,562 | B1 | 8/2019 | Prasad et al. |
| 10,380,565 | B1 | 8/2019 | Prasad |
| 10,380,683 | B1 | 8/2019 | Voutour et al. |
| 10,380,993 | B1 | 8/2019 | Clauer Salyers |
| 10,402,638 | B1 | 9/2019 | Oaks, III et al. |
| 10,402,790 | B1 | 9/2019 | Clark et al. |
| 10,574,879 | B1 | 2/2020 | Prasad et al. |
| 10,621,559 | B1 | 4/2020 | Oakes, III et al. |
| 10,621,660 | B1 | 4/2020 | Medina et al. |
| 10,706,466 | B1 | 7/2020 | Ethington et al. |
| 10,956,879 | B1 | 3/2021 | Eidson |
| 11,030,752 | B1 | 6/2021 | Backlund |
| 11,042,940 | B1 | 6/2021 | Limas |
| 11,042,941 | B1 | 6/2021 | Limas |
| 11,062,130 | B1 | 7/2021 | Medina, III |
| 11,062,131 | B1 | 7/2021 | Medina, III |
| 11,062,283 | B1 | 7/2021 | Prasad |
| 11,064,111 | B1 | 7/2021 | Prasad |
| 11,068,976 | B1 | 7/2021 | Voutour |
| 11,070,868 | B1 | 7/2021 | Mortensen |
| 2001/0004235 | A1 | 6/2001 | Maloney |
| 2001/0014881 | A1 | 8/2001 | Drummond |
| 2001/0016084 | A1 | 8/2001 | Pollard et al. |
| 2001/0018739 | A1 | 8/2001 | Anderson |
| 2001/0027994 | A1 | 10/2001 | Hayashida |
| 2001/0030695 | A1 | 10/2001 | Prabhu et al. |
| 2001/0037299 | A1 | 11/2001 | Nichols et al. |
| 2001/0042171 | A1 | 11/2001 | Vermeulen |
| 2001/0042785 | A1 | 11/2001 | Walker |
| 2001/0043748 | A1 | 11/2001 | Wesolkowski et al. |
| 2001/0047330 | A1 | 11/2001 | Gephart |
| 2001/0051965 | A1 | 12/2001 | Guillevic |

(56) References Cited

U.S. PATENT DOCUMENTS

2001/0054020 A1 12/2001 Barth et al.
2002/0001393 A1 1/2002 Jones
2002/0013767 A1 1/2002 Katz
2002/0016763 A1 2/2002 March
2002/0016769 A1 2/2002 Barbara et al.
2002/0023055 A1 2/2002 Antognini et al.
2002/0025085 A1 2/2002 Gustafson et al.
2002/0026418 A1 2/2002 Koppel et al.
2002/0032656 A1 3/2002 Chen
2002/0038289 A1 3/2002 Lawlor et al.
2002/0040340 A1 4/2002 Yoshida
2002/0052841 A1 5/2002 Guthrie
2002/0052853 A1 5/2002 Munoz
2002/0065786 A1 5/2002 Martens et al.
2002/0072974 A1 6/2002 Pugliese
2002/0075524 A1 6/2002 Blair
2002/0084321 A1 7/2002 Martens
2002/0087467 A1 7/2002 Mascavage, III et al.
2002/0107767 A1 8/2002 McClair et al.
2002/0107809 A1 8/2002 Biddle et al.
2002/0116329 A1 8/2002 Serbetcioglu
2002/0116335 A1 8/2002 Star
2002/0118891 A1 8/2002 Rudd
2002/0120562 A1 8/2002 Opiela
2002/0120582 A1 8/2002 Elston et al.
2002/0120846 A1 8/2002 Stewart et al.
2002/0129249 A1 9/2002 Maillard et al.
2002/0130868 A1 9/2002 Smith
2002/0133409 A1 9/2002 Sawano et al.
2002/0138445 A1 9/2002 Laage et al.
2002/0138522 A1 9/2002 Muralidhar
2002/0145035 A1 10/2002 Jones
2002/0147798 A1 10/2002 Huang
2002/0150279 A1 10/2002 Scott
2002/0150311 A1 10/2002 Lynn
2002/0152160 A1 10/2002 Allen-Rouman et al.
2002/0152161 A1 10/2002 Aoike
2002/0152164 A1 10/2002 Dutta
2002/0152165 A1 10/2002 Dutta et al.
2002/0152169 A1 10/2002 Dutta et al.
2002/0152170 A1 10/2002 Dutta
2002/0153414 A1 10/2002 Stoutenburg et al.
2002/0154127 A1 10/2002 Vienneau et al.
2002/0154815 A1 10/2002 Mizutani
2002/0159648 A1 10/2002 Alderson et al.
2002/0169715 A1 11/2002 Ruth et al.
2002/0171820 A1 11/2002 Okamura
2002/0172516 A1 11/2002 Aoyama
2002/0178112 A1 11/2002 Goeller
2002/0186881 A1 12/2002 Li
2002/0188564 A1 12/2002 Star
2002/0195485 A1 12/2002 Pomerleau et al.
2003/0005326 A1 1/2003 Flemming
2003/0009420 A1 1/2003 Jones
2003/0015583 A1 1/2003 Abdi et al.
2003/0018897 A1 1/2003 Bellis, Jr. et al.
2003/0023557 A1 1/2003 Moore
2003/0026609 A1 2/2003 Parulski
2003/0038227 A1 2/2003 Sesek
2003/0050889 A1 3/2003 Burke
2003/0053692 A1 3/2003 Hong et al.
2003/0055756 A1 3/2003 Allan
2003/0055776 A1 3/2003 Samuelson
2003/0072568 A1 4/2003 Lin et al.
2003/0074315 A1 4/2003 Lam
2003/0075596 A1 4/2003 Koakutsu
2003/0075916 A1 4/2003 Gorski
2003/0078883 A1 4/2003 Stewart et al.
2003/0081824 A1 5/2003 Mennie
2003/0086615 A1 5/2003 Dance et al.
2003/0093367 A1 5/2003 Allen-Rouman et al.
2003/0093369 A1 5/2003 Ijichi et al.
2003/0102714 A1 6/2003 Rhodes et al.
2003/0105688 A1 6/2003 Brown et al.
2003/0105714 A1 6/2003 Alarcon-Luther et al.
2003/0126078 A1 7/2003 Vihinen
2003/0126082 A1 7/2003 Omura et al.
2003/0130940 A1 7/2003 Hansen et al.
2003/0130958 A1 7/2003 Narayanan et al.
2003/0132384 A1 7/2003 Sugiyama et al.
2003/0133608 A1 7/2003 Bernstein et al.
2003/0133610 A1 7/2003 Nagarajan et al.
2003/0135457 A1 7/2003 Stewart et al.
2003/0139999 A1 7/2003 Rowe
2003/0159046 A1 8/2003 Choi et al.
2003/0167225 A1 9/2003 Adams
2003/0177448 A1 9/2003 Levine et al.
2003/0187790 A1 10/2003 Swift et al.
2003/0191615 A1 10/2003 Bailey
2003/0191869 A1 10/2003 Williams
2003/0200107 A1 10/2003 Allen et al.
2003/0200174 A1 10/2003 Star
2003/0202690 A1 10/2003 Jones et al.
2003/0212904 A1 11/2003 Randle et al.
2003/0217005 A1 11/2003 Drummond et al.
2003/0218061 A1 11/2003 Filatov
2003/0225705 A1 12/2003 Park et al.
2003/0231285 A1 12/2003 Ferguson
2003/0233278 A1 12/2003 Marshall
2003/0233318 A1 12/2003 King et al.
2004/0010466 A1 1/2004 Anderson
2004/0010803 A1 1/2004 Berstis
2004/0012496 A1 1/2004 De Souza
2004/0013284 A1 1/2004 Yu
2004/0017482 A1 1/2004 Weitman
2004/0024626 A1 2/2004 Bruijning
2004/0024708 A1 2/2004 Masuda
2004/0029591 A1 2/2004 Chapman et al.
2004/0030741 A1 2/2004 Wolton et al.
2004/0044606 A1 3/2004 Buttridge et al.
2004/0057697 A1 3/2004 Renzi
2004/0058705 A1 3/2004 Morgan
2004/0061913 A1 4/2004 Takiguchi
2004/0066031 A1 4/2004 Wong
2004/0066419 A1 4/2004 Pyhalammi
2004/0069841 A1 4/2004 Wong
2004/0071333 A1 4/2004 Douglas et al.
2004/0075754 A1 4/2004 Nakajima et al.
2004/0076320 A1 4/2004 Downs, Jr.
2004/0078299 A1 4/2004 Down-Logan
2004/0080795 A1 4/2004 Bean et al.
2004/0089711 A1 5/2004 Sandru
2004/0093303 A1 5/2004 Picciallo
2004/0093305 A1 5/2004 Kight
2004/0103057 A1 5/2004 Melbert et al.
2004/0103296 A1 5/2004 Harp
2004/0109596 A1 6/2004 Doran
2004/0110975 A1 6/2004 Osinski et al.
2004/0111371 A1 6/2004 Friedman
2004/0117302 A1 6/2004 Weichert
2004/0122754 A1 6/2004 Stevens
2004/0133511 A1 7/2004 Smith et al.
2004/0133516 A1 7/2004 Buchanan et al.
2004/0138974 A1 7/2004 Shimamura
2004/0148235 A1 7/2004 Craig et al.
2004/0158549 A1 8/2004 Matena
2004/0165096 A1 8/2004 Maeno
2004/0170259 A1 9/2004 Park
2004/0171371 A1 9/2004 Paul
2004/0184766 A1 9/2004 Kim et al.
2004/0201695 A1 10/2004 Inasaka
2004/0201741 A1 10/2004 Ban
2004/0210515 A1 10/2004 Hughes
2004/0210523 A1 10/2004 Gains et al.
2004/0217170 A1 11/2004 Takiguchi et al.
2004/0225604 A1 11/2004 Foss, Jr. et al.
2004/0228277 A1 11/2004 Williams
2004/0236647 A1 11/2004 Acharya
2004/0236688 A1 11/2004 Bozeman
2004/0238619 A1 12/2004 Nagasaka et al.
2004/0240722 A1 12/2004 Tsuji et al.
2004/0245324 A1 12/2004 Chen
2004/0247199 A1 12/2004 Murai et al.
2004/0248600 A1 12/2004 Kim

(56) References Cited

U.S. PATENT DOCUMENTS

2004/0252679 A1 12/2004 Williams
2004/0260636 A1 12/2004 Marceau
2004/0267665 A1 12/2004 Nam et al.
2004/0267666 A1 12/2004 Minami
2005/0001421 A1 1/2005 Luth et al.
2005/0010108 A1 1/2005 Rahn et al.
2005/0015332 A1 1/2005 Chen
2005/0015342 A1 1/2005 Murata et al.
2005/0021466 A1 1/2005 Buchanan et al.
2005/0030388 A1 2/2005 Stavely et al.
2005/0033645 A1 2/2005 Duphily
2005/0033685 A1 2/2005 Reyes
2005/0033690 A1 2/2005 Antognini et al.
2005/0033695 A1 2/2005 Minowa
2005/0034046 A1 2/2005 Berkmann
2005/0035193 A1 2/2005 Gustin et al.
2005/0038746 A1 2/2005 Latimer et al.
2005/0038754 A1 2/2005 Geist
2005/0044042 A1 2/2005 Mendiola
2005/0044577 A1 2/2005 Jerding
2005/0049950 A1 3/2005 Johnson
2005/0071283 A1 3/2005 Randle et al.
2005/0075969 A1 4/2005 Nielson et al.
2005/0075974 A1 4/2005 Turgeon
2005/0077351 A1 4/2005 De Jong
2005/0078336 A1 4/2005 Ferlitsch
2005/0080725 A1 4/2005 Pick
2005/0082364 A1 4/2005 Alvarez et al.
2005/0086140 A1 4/2005 Ireland
2005/0086168 A1 4/2005 Alvarez
2005/0089209 A1 4/2005 Stefanuk
2005/0091161 A1 4/2005 Gustin
2005/0096992 A1 5/2005 Geisel
2005/0097019 A1 5/2005 Jacobs
2005/0097046 A1 5/2005 Singfield
2005/0097050 A1 5/2005 Orcutt
2005/0108164 A1 5/2005 Salafia
2005/0108168 A1 5/2005 Halpin
2005/0115110 A1 6/2005 Dinkins
2005/0125338 A1 6/2005 Tidwell et al.
2005/0125360 A1 6/2005 Tidwell et al.
2005/0127160 A1 6/2005 Fujikawa
2005/0131820 A1 6/2005 Rodriguez
2005/0143136 A1 6/2005 Lev et al.
2005/0144131 A1 6/2005 Aziz
2005/0149436 A1 7/2005 Elterich
2005/0157174 A1 7/2005 Kitamura et al.
2005/0017751 A1 8/2005 Hilt et al.
2005/0168566 A1 8/2005 Tada
2005/0171899 A1 8/2005 Dunn
2005/0171907 A1 8/2005 Lewis
2005/0177494 A1 8/2005 Kelly et al.
2005/0177499 A1 8/2005 Thomas
2005/0177518 A1 8/2005 Brown
2005/0182710 A1 8/2005 Anderson
2005/0188306 A1 8/2005 Mackenzie
2005/0203430 A1 9/2005 Williams et al.
2005/0205660 A1 9/2005 Munte
2005/0205661 A1 9/2005 Taylor
2005/0209961 A1 9/2005 Michelsen
2005/0213805 A1 9/2005 Blake et al.
2005/0216410 A1 9/2005 Davis et al.
2005/0218209 A1 10/2005 Heilper et al.
2005/0220324 A1 10/2005 Klein et al.
2005/0228733 A1 10/2005 Bent et al.
2005/0238257 A1 10/2005 Kaneda et al.
2005/0244035 A1 11/2005 Klein et al.
2005/0252955 A1 11/2005 Sugai
2005/0267843 A1 12/2005 Acharya et al.
2005/0268107 A1 12/2005 Harris et al.
2005/0269412 A1 12/2005 Chiu
2005/0273368 A1 12/2005 Hutten et al.
2005/0278250 A1 12/2005 Zair
2005/0281448 A1 12/2005 Lugg
2005/0281471 A1 12/2005 LeConte
2005/0281474 A1 12/2005 Huang
2005/0289030 A1 12/2005 Smith
2005/0289059 A1 12/2005 Brewington et al.
2005/0289182 A1 12/2005 Pandian et al.
2006/0002426 A1 1/2006 Madour
2006/0004660 A1 1/2006 Pranger
2006/0015450 A1 1/2006 Guck et al.
2006/0015733 A1 1/2006 O'Malley et al.
2006/0017752 A1 1/2006 Kurzweil et al.
2006/0025697 A1 2/2006 Kurzweil
2006/0039628 A1 2/2006 Li et al.
2006/0039629 A1 2/2006 Li et al.
2006/0041506 A1 2/2006 Mason et al.
2006/0045374 A1 3/2006 Kim et al.
2006/0045379 A1 3/2006 Heaney, Jr. et al.
2006/0047593 A1 3/2006 Naratil
2006/0049242 A1 3/2006 Mejias et al.
2006/0053056 A1 3/2006 Alspach-Goss
2006/0059085 A1 3/2006 Tucker
2006/0064368 A1 3/2006 Forte
2006/0077941 A1 4/2006 Alagappan et al.
2006/0080245 A1 4/2006 Bahl
2006/0085357 A1 4/2006 Pizarro
2006/0085516 A1 4/2006 Farr et al.
2006/0102704 A1 5/2006 Reynders
2006/0103893 A1 5/2006 Azimi et al.
2006/0106691 A1 5/2006 Sheaffer
2006/0106717 A1 5/2006 Randle
2006/0108168 A1 5/2006 Fischer et al.
2006/0110063 A1 5/2006 Weiss
2006/0112013 A1 5/2006 Maloney
2006/0115110 A1 6/2006 Rodriguez
2006/0115141 A1 6/2006 Koakutsu et al.
2006/0118613 A1 6/2006 McMann
2006/0124730 A1 6/2006 Maloney
2006/0144924 A1 7/2006 Stover
2006/0144937 A1 7/2006 Heilper et al.
2006/0144950 A1 7/2006 Johnson
2006/0159367 A1 7/2006 Zeineh et al.
2006/0161499 A1 7/2006 Rich et al.
2006/0161501 A1 7/2006 Waserstein
2006/0164682 A1 7/2006 Lev
2006/0166178 A1 7/2006 Driedijk
2006/0167818 A1 7/2006 Wentker et al.
2006/0181614 A1 8/2006 Yen et al.
2006/0182331 A1 8/2006 Gilson et al.
2006/0182332 A1 8/2006 Weber
2006/0186194 A1 8/2006 Richardson et al.
2006/0202014 A1 9/2006 VanKirk et al.
2006/0206506 A1 9/2006 Fitzpatrick
2006/0208059 A1 9/2006 Cable et al.
2006/0210138 A1 9/2006 Hilton et al.
2006/0212391 A1 9/2006 Norman et al.
2006/0212393 A1 9/2006 Brown
2006/0214940 A1 9/2006 Kinoshita
2006/0215204 A1 9/2006 Miyamoto et al.
2006/0215230 A1 9/2006 Borrey et al.
2006/0222260 A1 10/2006 Sambongi et al.
2006/0229976 A1 10/2006 Jung
2006/0229986 A1 10/2006 Corder
2006/0229987 A1 10/2006 Leekley
2006/0238503 A1 10/2006 Smith
2006/0242062 A1 10/2006 Peterson
2006/0242063 A1 10/2006 Peterson
2006/0248009 A1 11/2006 Hicks et al.
2006/0249567 A1* 11/2006 Byrne .................. G06Q 20/042
235/379
2006/0255124 A1 11/2006 Hoch
2006/0273165 A1 12/2006 Swift et al.
2006/0274164 A1 12/2006 Kimura et al.
2006/0279628 A1 12/2006 Fleming
2006/0282383 A1 12/2006 Doran
2006/0289630 A1 12/2006 Updike et al.
2006/0291744 A1 12/2006 Ikeda et al.
2007/0002157 A1 1/2007 Shintani et al.
2007/0005467 A1 1/2007 Haigh et al.
2007/0013721 A1 1/2007 Vau et al.
2007/0016796 A1 1/2007 Singhal
2007/0019243 A1 1/2007 Sato

(56) References Cited

U.S. PATENT DOCUMENTS

| | | | |
|---|---|---|---|
| 2007/0027802 | A1 | 2/2007 | VanDeburg et al. |
| 2007/0030357 | A1 | 2/2007 | Levien et al. |
| 2007/0031022 | A1 | 2/2007 | Frew |
| 2007/0038561 | A1 | 2/2007 | Vancini et al. |
| 2007/0041629 | A1 | 2/2007 | Prakash et al. |
| 2007/0050292 | A1 | 3/2007 | Yarbrough |
| 2007/0053574 | A1 | 3/2007 | Verma et al. |
| 2007/0058851 | A1 | 3/2007 | Quine |
| 2007/0063016 | A1 | 3/2007 | Myatt |
| 2007/0064991 | A1 | 3/2007 | Douglas et al. |
| 2007/0065143 | A1 | 3/2007 | Didow et al. |
| 2007/0075772 | A1 | 4/2007 | Kokubo |
| 2007/0076940 | A1 | 4/2007 | Goodall et al. |
| 2007/0076941 | A1 | 4/2007 | Carreon et al. |
| 2007/0077921 | A1 | 4/2007 | Hayashi |
| 2007/0080207 | A1 | 4/2007 | Williams |
| 2007/0082700 | A1 | 4/2007 | Landschaft |
| 2007/0084911 | A1 | 4/2007 | Crowell |
| 2007/0086642 | A1 | 4/2007 | Foth |
| 2007/0086643 | A1 | 4/2007 | Spier |
| 2007/0094088 | A1 | 4/2007 | Mastie |
| 2007/0094140 | A1 | 4/2007 | Riney et al. |
| 2007/0100748 | A1 | 5/2007 | Dheer |
| 2007/0110277 | A1 | 5/2007 | Hayduchok et al. |
| 2007/0118472 | A1 | 5/2007 | Allen-Rouman et al. |
| 2007/0122024 | A1 | 5/2007 | Haas et al. |
| 2007/0124241 | A1 | 5/2007 | Newton |
| 2007/0127805 | A1 | 6/2007 | Foth et al. |
| 2007/0129955 | A1 | 6/2007 | Dalmia |
| 2007/0130063 | A1 | 6/2007 | Jindia |
| 2007/0131758 | A1 | 6/2007 | Mejias et al. |
| 2007/0136198 | A1 | 6/2007 | Foth et al. |
| 2007/0138255 | A1 | 6/2007 | Carreon et al. |
| 2007/0140545 | A1 | 6/2007 | Rossignoli |
| 2007/0140594 | A1 | 6/2007 | Franklin |
| 2007/0143208 | A1 | 6/2007 | Varga |
| 2007/0150337 | A1 | 6/2007 | Hawkins et al. |
| 2007/0154098 | A1 | 7/2007 | Geva et al. |
| 2007/0156438 | A1 | 7/2007 | Popadic et al. |
| 2007/0168265 | A1 | 7/2007 | Rosenberger |
| 2007/0168283 | A1 | 7/2007 | Alvarez et al. |
| 2007/0171288 | A1 | 7/2007 | Inoue |
| 2007/0172107 | A1 | 7/2007 | Jones et al. |
| 2007/0172148 | A1 | 7/2007 | Hawley |
| 2007/0175977 | A1 | 8/2007 | Bauer et al. |
| 2007/0179883 | A1 | 8/2007 | Questembert |
| 2007/0183000 | A1 | 8/2007 | Eisen et al. |
| 2007/0183652 | A1 | 8/2007 | Backstrom et al. |
| 2007/0183741 | A1 | 8/2007 | Lerman et al. |
| 2007/0194102 | A1 | 8/2007 | Cohen |
| 2007/0198432 | A1 | 8/2007 | Pitroda et al. |
| 2007/0203708 | A1 | 8/2007 | Polycn et al. |
| 2007/0206877 | A1 | 9/2007 | Wu et al. |
| 2007/0208816 | A1 | 9/2007 | Baldwin et al. |
| 2007/0214086 | A1 | 9/2007 | Homoki |
| 2007/0217669 | A1 | 9/2007 | Swift et al. |
| 2007/0233525 | A1 | 10/2007 | Boyle |
| 2007/0233585 | A1 | 10/2007 | Ben Simon et al. |
| 2007/0235518 | A1 | 10/2007 | Mueller et al. |
| 2007/0235520 | A1 | 10/2007 | Smith et al. |
| 2007/0241179 | A1 | 10/2007 | Davis |
| 2007/0244782 | A1 | 10/2007 | Chimento |
| 2007/0246525 | A1 | 10/2007 | Smith et al. |
| 2007/0251992 | A1 | 11/2007 | Sharma et al. |
| 2007/0255652 | A1 | 11/2007 | Tumminaro |
| 2007/0255653 | A1 | 11/2007 | Tumminaro |
| 2007/0255662 | A1 | 11/2007 | Tumminaro |
| 2007/0258634 | A1 | 11/2007 | Simonoff |
| 2007/0262137 | A1 | 11/2007 | Brown |
| 2007/0262148 | A1 | 11/2007 | Yoon |
| 2007/0268540 | A1 | 11/2007 | Gaspardo et al. |
| 2007/0271182 | A1 | 11/2007 | Prakash et al. |
| 2007/0278286 | A1 | 12/2007 | Crowell et al. |
| 2007/0288380 | A1 | 12/2007 | Starrs |
| 2007/0288382 | A1 | 12/2007 | Narayanan et al. |
| 2007/0295803 | A1 | 12/2007 | Levine et al. |
| 2007/0299928 | A1 | 12/2007 | Kohli et al. |
| 2008/0002911 | A1 | 1/2008 | Eisen |
| 2008/0010204 | A1 | 1/2008 | Rackley, III et al. |
| 2008/0021802 | A1 | 1/2008 | Pendelton |
| 2008/0040280 | A1 | 2/2008 | Davis et al. |
| 2008/0046362 | A1 | 2/2008 | Easterly |
| 2008/0052182 | A1 | 2/2008 | Marshall |
| 2008/0059376 | A1 | 3/2008 | Davis |
| 2008/0063253 | A1 | 3/2008 | Wood |
| 2008/0065524 | A1 | 3/2008 | Matthews et al. |
| 2008/0068674 | A1 | 3/2008 | McIntyre |
| 2008/0069427 | A1 | 3/2008 | Liu |
| 2008/0071679 | A1 | 3/2008 | Foley |
| 2008/0071721 | A1 | 3/2008 | Wang |
| 2008/0073423 | A1 | 3/2008 | Heit et al. |
| 2008/0080760 | A1 | 4/2008 | Ronca |
| 2008/0086421 | A1 | 4/2008 | Gilder |
| 2008/0086770 | A1 | 4/2008 | Kulkarni et al. |
| 2008/0091599 | A1 | 4/2008 | Foss, Jr. |
| 2008/0097899 | A1 | 4/2008 | Jackson et al. |
| 2008/0097907 | A1 | 4/2008 | Till et al. |
| 2008/0103790 | A1 | 5/2008 | Abernethy |
| 2008/0103967 | A1 | 5/2008 | Ackert et al. |
| 2008/0113674 | A1 | 5/2008 | Baig |
| 2008/0114739 | A1 | 5/2008 | Hayes |
| 2008/0115066 | A1 | 5/2008 | Pavley et al. |
| 2008/0116257 | A1 | 5/2008 | Fickling |
| 2008/0117991 | A1 | 5/2008 | Peddireddy |
| 2008/0119178 | A1 | 5/2008 | Peddireddy |
| 2008/0133411 | A1 | 6/2008 | Jones et al. |
| 2008/0140552 | A1 | 6/2008 | Blaikie |
| 2008/0147549 | A1 | 6/2008 | Ruthbun |
| 2008/0155672 | A1 | 6/2008 | Sharma |
| 2008/0156438 | A1 | 7/2008 | Stumphauzer et al. |
| 2008/0162319 | A1 | 7/2008 | Breeden et al. |
| 2008/0162320 | A1 | 7/2008 | Mueller et al. |
| 2008/0162350 | A1 | 7/2008 | Allen-Rouman et al. |
| 2008/0162371 | A1 | 7/2008 | Rampell et al. |
| 2008/0177659 | A1 | 7/2008 | Lacey et al. |
| 2008/0180750 | A1 | 7/2008 | Feldman |
| 2008/0205751 | A1 | 8/2008 | Mischler |
| 2008/0208727 | A1 | 8/2008 | McLaughlin et al. |
| 2008/0214180 | A1 | 9/2008 | Cunningham et al. |
| 2008/0219543 | A1 | 9/2008 | Csulits |
| 2008/0245869 | A1 | 10/2008 | Berkun et al. |
| 2008/0247629 | A1 | 10/2008 | Gilder |
| 2008/0247655 | A1 | 10/2008 | Yano |
| 2008/0249931 | A1 | 10/2008 | Gilder et al. |
| 2008/0249951 | A1 | 10/2008 | Gilder et al. |
| 2008/0262950 | A1 | 10/2008 | Christensen et al. |
| 2008/0262953 | A1 | 10/2008 | Anderson |
| 2008/0275821 | A1 | 11/2008 | Bishop et al. |
| 2008/0301441 | A1* | 12/2008 | Caiman .................. G06F 21/56 713/168 |
| 2008/0304769 | A1 | 12/2008 | Hollander et al. |
| 2008/0316542 | A1 | 12/2008 | Mindrum et al. |
| 2009/0024520 | A1 | 1/2009 | Drory et al. |
| 2009/0046938 | A1 | 2/2009 | Yoder |
| 2009/0060396 | A1 | 3/2009 | Blessan et al. |
| 2009/0066987 | A1 | 3/2009 | Inokuchi |
| 2009/0076921 | A1 | 3/2009 | Nelson et al. |
| 2009/0092309 | A1 | 4/2009 | Calman et al. |
| 2009/0094148 | A1 | 4/2009 | Gilder et al. |
| 2009/0108080 | A1 | 4/2009 | Meyer |
| 2009/0110281 | A1 | 4/2009 | Hirabayashi |
| 2009/0114716 | A1 | 5/2009 | Ramachandran |
| 2009/0132813 | A1 | 5/2009 | Schibuk |
| 2009/0141962 | A1 | 6/2009 | Borgia et al. |
| 2009/0164350 | A1 | 6/2009 | Sorbe et al. |
| 2009/0164370 | A1 | 6/2009 | Sorbe et al. |
| 2009/0166406 | A1 | 7/2009 | Pigg et al. |
| 2009/0167870 | A1 | 7/2009 | Caleca et al. |
| 2009/0171795 | A1 | 7/2009 | Clouthier et al. |
| 2009/0171819 | A1 | 7/2009 | Emde et al. |
| 2009/0171825 | A1 | 7/2009 | Roman |
| 2009/0173781 | A1 | 7/2009 | Ramachadran |
| 2009/0185241 | A1 | 7/2009 | Nepomniachtchi |

(56) References Cited

U.S. PATENT DOCUMENTS

| | | | | |
|---|---|---|---|---|
| 2009/0185737 | A1* | 7/2009 | Nepomniachtchi | G06K 9/36 382/139 |
| 2009/0185738 | A1 | 7/2009 | Nepomniachtchi | |
| 2009/0190823 | A1 | 7/2009 | Walters | |
| 2009/0192938 | A1 | 7/2009 | Amos | |
| 2009/0212929 | A1 | 8/2009 | Drory et al. | |
| 2009/0236413 | A1 | 9/2009 | Mueller et al. | |
| 2009/0240620 | A1 | 9/2009 | Kendrick et al. | |
| 2009/0252437 | A1 | 10/2009 | Li | |
| 2009/0254447 | A1 | 10/2009 | Blades | |
| 2009/0257641 | A1 | 10/2009 | Liu et al. | |
| 2009/0263019 | A1 | 10/2009 | Tzadok et al. | |
| 2009/0271287 | A1 | 10/2009 | Halpern | |
| 2009/0281904 | A1 | 11/2009 | Pharris | |
| 2009/0284637 | A1 | 11/2009 | Parulski et al. | |
| 2009/0290751 | A1 | 11/2009 | Ferman et al. | |
| 2009/0292628 | A1 | 11/2009 | Dryer et al. | |
| 2009/0313167 | A1* | 12/2009 | Dujari | G06Q 20/108 705/43 |
| 2009/0319425 | A1 | 12/2009 | Tumminaro et al. | |
| 2009/0327129 | A1 | 12/2009 | Collas et al. | |
| 2010/0007899 | A1 | 1/2010 | Lay | |
| 2010/0008579 | A1 | 1/2010 | Smirnov | |
| 2010/0027679 | A1 | 2/2010 | Sunahara et al. | |
| 2010/0030687 | A1 | 2/2010 | Panthaki et al. | |
| 2010/0047000 | A1 | 2/2010 | Park et al. | |
| 2010/0057578 | A1 | 3/2010 | Blair et al. | |
| 2010/0061446 | A1 | 3/2010 | Hands et al. | |
| 2010/0078471 | A1 | 4/2010 | Lin et al. | |
| 2010/0078472 | A1 | 4/2010 | Lin et al. | |
| 2010/0082468 | A1 | 4/2010 | Low et al. | |
| 2010/0082470 | A1* | 4/2010 | Walach | G06Q 20/0425 705/35 |
| 2010/0128131 | A1 | 5/2010 | Tenchio et al. | |
| 2010/0165015 | A1 | 7/2010 | Barkley et al. | |
| 2010/0198733 | A1 | 8/2010 | Gantman et al. | |
| 2010/0225773 | A1 | 9/2010 | Lee | |
| 2010/0226559 | A1 | 9/2010 | Najari et al. | |
| 2010/0260408 | A1 | 10/2010 | Prakash et al. | |
| 2010/0262522 | A1 | 10/2010 | Anderson et al. | |
| 2010/0274693 | A1 | 10/2010 | Bause et al. | |
| 2010/0312705 | A1 | 12/2010 | Caruso et al. | |
| 2011/0016084 | A1 | 1/2011 | Mundy et al. | |
| 2011/0069180 | A1* | 3/2011 | Nijemcevic | H04N 1/00307 348/207.1 |
| 2011/0106675 | A1 | 5/2011 | Perlman | |
| 2011/0112967 | A1 | 5/2011 | Anderson et al. | |
| 2011/0170740 | A1 | 7/2011 | Coleman | |
| 2011/0191161 | A1 | 8/2011 | Dai | |
| 2011/0251956 | A1 | 10/2011 | Cantley et al. | |
| 2011/0276483 | A1 | 11/2011 | Saegert et al. | |
| 2011/0280450 | A1* | 11/2011 | Nepomniachtchi | G06K 9/036 382/112 |
| 2011/0285873 | A1* | 11/2011 | Showering | G06K 9/3275 348/231.99 |
| 2011/0285874 | A1* | 11/2011 | Showering | H04N 1/00718 348/231.99 |
| 2011/0310442 | A1 | 12/2011 | Popadic et al. | |
| 2012/0045112 | A1 | 2/2012 | Lundblad et al. | |
| 2012/0047070 | A1 | 2/2012 | Pharris | |
| 2012/0062732 | A1 | 3/2012 | Marman et al. | |
| 2012/0089514 | A1 | 4/2012 | Kraemling et al. | |
| 2012/0099792 | A1 | 4/2012 | Chevion et al. | |
| 2012/0185383 | A1 | 7/2012 | Atsmon | |
| 2012/0185388 | A1 | 7/2012 | Pranger | |
| 2012/0229872 | A1 | 9/2012 | Dolev | |
| 2013/0021651 | A9 | 1/2013 | Popadic et al. | |
| 2013/0120595 | A1 | 5/2013 | Roach et al. | |
| 2013/0155474 | A1 | 6/2013 | Roach et al. | |
| 2013/0198071 | A1 | 8/2013 | Jurss | |
| 2013/0201534 | A1 | 8/2013 | Carlen | |
| 2013/0223721 | A1 | 8/2013 | Nepomniachtchi et al. | |
| 2013/0297353 | A1 | 11/2013 | Strange | |
| 2014/0032406 | A1 | 1/2014 | Roach et al. | |
| 2014/0067661 | A1 | 3/2014 | Elischer | |
| 2014/0236820 | A1 | 8/2014 | Carlton et al. | |
| 2014/0258169 | A1 | 9/2014 | Wong et al. | |
| 2014/0279453 | A1 | 9/2014 | Belchee et al. | |
| 2015/0039528 | A1 | 2/2015 | Minogue et al. | |
| 2015/0090782 | A1 | 4/2015 | Dent | |

FOREIGN PATENT DOCUMENTS

| | | | |
|---|---|---|---|
| EP | 1 855 459 A2 | 5/2007 |
| JP | 2004-23158 A | 1/2004 |
| JP | 2006-174105 A | 6/2006 |
| KR | 20040076131 A | 8/2004 |
| WO | WO 98/37655 A1 | 8/1998 |
| WO | WO 01/61436 | 8/2001 |
| WO | WO 01/61436 A2 | 8/2001 |
| WO | WO 2004/008350 A1 | 1/2004 |
| WO | WO 2005/043857 | 5/2005 |
| WO | WO 2006/075967 A1 | 7/2006 |
| WO | WO 2006/086768 A2 | 8/2006 |
| WO | WO 2006/136958 A2 | 12/2006 |

OTHER PUBLICATIONS

12 CRF § 229.51 and Appendix D to Part 229 (Jan. 1, 2005 edition), 3 pgs.

149 Cong. Rec. H9289, Oct. 8, 2003, 6 pgs.

"Accept "Customer Not Present" Checks," Accept Check Online, http://checksoftware.com, U.S. Pat. No. 7,900,822, as dated 2007 (1 pg).

*Apple Announces the New iPhone 3GS—The Fastest, Most Powerful iPhone Yet*, Jun. 8, 2009, located on the Internet at: http://www.apple.com.rensroom/2009/06/08Apple-Annpounces-the-New-iPhone-3GS-The Fastest-Most-Powerful-iPhone-Yet, 4 pgs.

Apple Reinvents the Phone with iPhone, Jan. 2007, located on the Internet at: https://www.apple.com/newsroom/2007/01/09Apple-Reinvents-the-Phone-with-iPhone/, 4 pgs.

Askey, *Canon EOS 40D Review* (*pts. 1,4,10*), Digital Photography Review, located on the Internet at: : https://www.dpreview.com/reviews/canoneos40d, 24 pgs.

Askey, *Leica Digilux 2 Review* (*pts. 1,3,7*), Digital Photography Review, May 20, 2004, located on the Internet at: : https://www.dpreview.com/reviews/leicadigilux2, 20 pgs.

Askey, Nikon D300 In-depth Review (*pts. 1,3,9*), Digital Photography Review, Mar. 12, 2008, located on the Internet at: : https://www.preview.com/reviews/nikond300, 24 pgs.

Askey, *Panasonic Lumix DMC-L1 Review* (*pts. 1,3,7*), Digital Photography Review, Apr. 11, 2007, located on the Internet at: https://www.dpreview.com/reviews/panasonicdmc11, 24 pgs.

Askey, *Sony Cyber-shot DSC-R1 Review* (*pts, 1,3,7*), Digital Photography Review, Dec. 6, 2005, located on the Internet at: http://www.dpreview.com.reviews/sonydscr1, 24 pgs.

*Automated Clearing Houses* (ACHs), Federal Reserve Bank of New York (May 2000) available at: https://www.newyorkfed.org/aboutthefed/fedpoint/fed31.html, (attached as Exhibit 12 from the Defendant Wells Fargo Bank, N.A.'s Answer dated Aug. 14, 2018), 4 pgs.

"Adjusting Brightness and Contrast", www.eaglesoftware.com/adjustin.htm, retrieved on May 4, 2009 (4 pgs).

Berman, *How Hitchcock Turned a Small Budget Into a Great Triumph*, Time.com, Apr. 29, 2015, located on the Internet at: http://time.com/3823112/alfred-hitchcock-shadow-of-a-doubt, 1 pg.

"Best practices for producing quality digital image files," Digital Images Guidelines, http://deepblue.lib.umich.edu/bitstream/2027.42/40247/1/Images-Best_Practice.pdf, downloaded 2007 (2 pgs).

*Big Red Book*, Adobe Systems Incorporated, copyright 2000, (attached as Exhibit 27 from the Defendant Wells Fargo Bank, N.A.'s Answer dated Aug. 14, 2018), 45 pgs.

Canon EOS 40D Digital Camera Instruction Manual, located on the Internet at: http://gdlp01.c-wss.com/gds/6/0900008236/01/EOS40D_HG_EN.pdf (attached as Exhibit 6 from the Defendant Wells Fargo Bank, N.A.'s Answer dated Aug. 14, 2018), 38 pgs.

"Chapter 7 Payroll Programs," Uniform Staff Payroll System, http://www2.oecn.k12.oh.us/www/ssdt/usps/usps_user_guide_005.html, U.S. Pat. No. 7,900,822, as dated 2007 (9 pgs).

(56) References Cited

OTHER PUBLICATIONS

"Check 21—The check is not in the post", RedTitan Technology 2004 http://www.redtitan.com/check21/htm (3 pgs).
"Check 21 Solutions," Columbia Financial International, Inc. http://www.columbiafinancial.us/check21/solutions.htm, U.S. Pat. No. 7,900,822, as dated 2007 (8 pgs).
Check Clearing for the 21st Century Act Foundation for Check 21 Compliance Training, Federal Financial Institutions Examination Council, (Oct. 16, 2004), available on the Internet at: https://web.archive.org/web/20041016100648/https://www.ffiec.gov/exam/check21/check21foundationdoc.htm, (excerpts attached as Exhibit 20 from the Defendant Wells Fargo Bank, N.A.'s Answer dated Aug. 14, 2018), 11 pgs.
"Check Fraud: A Guide to Avoiding Losses", All Net, http://all.net/books/audit/checkfraud/security.htm, U.S. Pat. No. 7,900,822, as dated 2007 (1 pg).
Chen, Brian et al., *iPhone 3GS Trounces Predecessors, Rivals in Web Browser Speed Test*, Wired, Jun. 24, 2009, located on the Internet at: www.wired.com/2009.3gs-speed/, 10 pgs.
"Clearing House Electronic Check Clearing System (CHECCS) Operating Rules," An ip.com Prior Art Database Technical Disclosure, Jul. 29, 2015 (35 pgs).
"Compliance with Regulation CC", http./www/federalreserve.gov/Pubs/regcc/regcc.htm, Jan. 24, 2006 (6 pgs).
"Customer Personalized Bank Checks and Address Labels" Checks Your Way Inc., http://www.checksyourway.com/htm/web_pages/faq.htm, U.S. Pat. No. 7,900,822, as dated 2007 (6 pgs).
Defendant Wells Fargo Bank, N.A.'s Answer, Affirmative Defenses, and Counterclaims to Plaintiff's Complaint, dated Aug. 14, 2018, 64 pgs.
Declaration of Peter Alexander, Ph.D., CBM2019-0004, Nov. 8, 2018, 180 pgs.
"Deposit Now: Quick Start User Guide," BankServ, 2007, 29 pages.
"Direct Deposit Application for Payroll", Purdue University, Business Office Form 0003, http://purdue.edu/payroll/pdf/directdepositapplication.pdf, Jul. 2007 (2 pgs).
"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, U.S. Pat. No. 7,900,822, as dated 2007 (3 pgs).
"Electronic Billing Problem: The E-check is in the mail" American Banker—vol. 168, No. 95, May 19, 2003 (4 pgs).
Excerpts from American National Standard for Financial Services, ANS, X9.100-140-2004-Specifications for an Image Replacement Document—IRD, Oct. 1, 2004, 16 pgs.
"First Wireless Handheld Check and Credit Card Processing Solution Launched by Commericant®, MobileScape® 5000 Eliminates Bounced Checks, Enables Payments Everywhere," Business Wire, Mar. 13, 2016, 3 pages.
"Frequently Asked Questions" Bank of America, http://www/bankofamerica.com/deposits/checksave/index.cfm?template-lc_faq_bymail, U.S. Pat. No. 7,900,822, as dated 2007 (2 pgs).
"Full Service Direct Deposit", www.nonprofitstaffing.com/images/upload/dirdepform.pdf. U.S. Pat. No. 7,900,822, as dated 2001, (2 pgs).
Gates, *A History of Wireless Standards, Wi-Fi Back to Basics*, Aerohive Blog, Jul. 2015, located on the Internet at: http://blog.aerohive.com/a-history-of-wireless-standards, 5 pgs.
*Guidelines for Evaluation of Radio Transmission Technologies for IMT-2000*, dated 1997, ITU-R-M.1225, located on the Internet at: https://www.itu.int/dms-pubrec/itu-r/rec/m/R-REC-M,1225-0-199702-I!!PDF-E.pdf, 60 pgs.
Helio Ocean User Manual, located on the Internet at: https://standupwireless.com/wp-content/uploads/2017/04/Manual_PANTECH_OCEAN.pdf (excerpts attached as Exhibit 10 from the Defendant Wells Fargo Bank, N.A.'s Answer dated Aug. 14, 2018), 76 pgs.
"How to Digitally Deposit a Check Image", Smart Money Daily, Copyright 2008 (5 pgs).
HTC Touch Diamond Manual, copyright 2008, (attached as Exhibit 11 from the Defendant Wells Fargo Bank, N.A.'s Answer dated Aug. 14, 2018), 257 pgs.
Humphrey, David B. and Hunt, Robert, "*Getting Rid of Paper: Savings From Check 21*", Working Paper No. 12-12, Research Department, Federal Reserve Bank of Philadelphia, (May 2012), available on the Internet at: https://philadelphiafed.org/-/media/research-and-data/publications/working-papers/2012/wp12-12.pdf, (attached as Exhibit 14 from the Defendant Wells Fargo Bank, N.A.'s Answer dated Aug. 14, 2018), 29 pgs.
"ImageNet Mobile Deposit Provides Convenient Check Deposit and Bill Pay to Mobile Consumers," Miteksystems, 2008 (2 pgs).
*iPhone Store Downloads Top 10 Million in First Weekend*, Jul. 14, 2008, located on the Internet at: iPhone Store Downloads Top 10 Million in First Weekend, Jul. 14, 2008, located on the Internet at: https://www.apple.com/newsroom/2008/07/14iPhone-App-Store-Downloads-Top-10-Million-in-First-Weekend, 4pgs.
"It's the easiest way to Switch banks", LNB, http://www.inbky.com/pdf/LNBswitch-kit10-07.pdf U.S. Pat. No. 7,996,316, as dated 2007 (7 pgs).
Joinson et al., *Olympus E-30 Review* (*pts. 1,4,8*), Digital Photography Review, Mar. 24, 2009, located on the Internet at: www.dpreview.com/reviews/olympus30, 6 pgs.
Knerr et al., *The A2iA Intercheque System: Courtesy Amount and Legal Amount Recognition for French Checks in Automated Bankcheck Processing 43-86*, Impedove et al. eds., 1997, 50 pgs.
Lacker, Jeffrey M., "*Payment System Disruptions and the Federal Reserve Following Sep. 11, 2001*", The Federal Reserve Bank of Richmond, (Dec. 23, 2003) (attached as Exhibit 19 from the Defendant Wells Fargo Bank, N.A.'s Answer dated Aug. 14, 2018), 55 pgs.
Leica Digilux 2 Instructions located on the Internet: http://www.overgaard.dk/pdf/d2_manual.pdf (attached as Exhibit 2 from the Defendant Wells Fargo Bank N.A.'s Answer dated Aug. 14, 2018), 95 pgs.
"Lesson 38—More Bank Transactions", Turtle Soft, http://www.turtlesoft.com/goldenseal-software-manual.lesson38.htm, U.S. Pat. No. 7,900,822, as dated 2007 (8 pgs).
"Machine Accepts Bank Deposits", *New York Times*, Apr. 12, 1961, 1 pg.
MacKenzie, E., *Photography Made Easy*, copyright 1845, 80 pgs.
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.com/cgi-bin/stories/pl?ACCT=104&STORY=/www/story/10-01- . . . , Nov. 25, 2008 (2 pgs).
Motorola RAZR MAXX V6 User Manual, located on the Internet at: https://www.phonearena.com/phones/Motorola-RAZR-MAXX-V6_id1680, (attached as Exhibit 7 from the Defendant Wells Fargo Bank, N.A.'s Answer dated Aug. 14, 2018), 36 pgs.
Motomanual for MOTORAZR, located on the Internet at: https://www.cellphones.ca/downloads/phones/manuals/motorola-razr-v3xx-manual.pdf (excerpts attached as Exhibit 8 from the Defendant Wells Fargo Bank, N.A.'s Answer dated Aug. 14, 2018), 34 pgs.
Nikon Digital Camera D300 User's Manual, located on the Internet at: http://download.nikonimglib.com/archive2/iBuJv00Aj97i01y8BrK49XX0Ts69/D300,EU(En)04.pdf (attached as Exhibit 5 from the Defendant Wells Fargo Bank, N.A.'s Answer dated Aug. 14, 2018), 195 pgs.
Nokia N95 8GB User Guide, copyright 2009, located on the Internet at: https://www.nokia.com/en_int/phones/sites/default/files/user-guides/Nokia_N95_8GB_Extended_UG_en.pdf (excerpts attached as Exhibit 9 from the Defendant Wells Fargo Bank, N.A.'s Answer dated Aug. 14, 2018), 77 pgs.
"Nova Enhances Electronic Check Service to Benefit Multi-Lane Retailers," Business Wire, Nov. 28, 2006, 2 pages.
Panasonic Operating Instructions for Digital Camera/Lens Kit Model No. DMC-L1K, https://www.panasonic.com/content/dam/Panasonic/support_manual/Digital_Still_Camera/English_01-vqt0-vqt2/vqt0w95_L1_oi.pdf (attached as Exhibit 4 from the Defendant Wells Fargo Back N.A.'s Answer dated Aug. 14, 2018), 129 pgs.

(56) References Cited

OTHER PUBLICATIONS

"Personal Finance", PNC, http://www.pnc.com/webapp/unsec/productsandservice.do?sitearea=/PNC/home/personal/account+services/quick+switch/quick+switch+faqs, U.S. Pat. No. 7,900,822, as dated 2007 (12 pgs).
POP, ARC and BOC—A Comparison, Federal Reserve Banks, at 1(Jan. 7, 2009), available on the Internet at: https://web.archive.org/web/20090107101808/https://www.frbservices.org/files/eventseducation/ pdf/pop_arc_boc_comparison.pdf (attached as Exhibit 13 from the Defendant Wells Fargo Bank, N.A.'s Answer dated Aug. 14, 2018), 3 pgs.
Quinn and Roberds, *The Evolution of the Check as a Means of Payment: A Historical Survey*, Federal Reserve Bank of Atlanta, Economic Review, 2008, 30 pgs.
Petition filed by Wells Fargo Bank, N.A. for Covered Business Method Review of Claims 1-20 of U.S. Pat. No. 9,818,090, dated Nov. 8, 2018, 90 pgs.
Petition filed by Wells Fargo Bank, N.A. for Covered Business Method Review of Claims 1-20 of U.S. Pat. No. 9,336,517, dated Nov. 8, 2018, 98 pgs.
Petition filed by Wells Fargo Bank, N.A. for Covered Business Method Review of Claims 1-20 of U.S. Pat. No. 8,977,571, dated Nov. 8, 2018, 95 pgs.
Petition filed by Wells Fargo Bank, N.A. for Covered Business Method Review of Claims 1-23 of U.S. Pat. No. 8,699,779, dated Nov. 8, 2018, 101 pgs.
"Refractive index" Wikipedia, the free encyclopedia; http://en.wikipedia.org./wiki/refractiveindex.com Oct. 16, 2007 (4 pgs).
"Remote check deposit is the answer to a company's banking problem," Daily Breeze, Torrance, CA, Nov. 17, 2006, 2 pgs.
"Remote Deposit Capture", Plante & Moran, http://plantemoran.com/industries/fincial/institutions/bank/resources/community+bank+advisor/2007+summer+issue/remote+deposit+capture.htm, U.S. Pat. No. 7,900,822, as dated 2007 (3 pages).
"Remote Deposit" National City, http://www.nationalcity.com/smallbusiness/cashmanagement/remotedeposit/default.asp; U.S. Pat. No. 7,900,822, as dated 2007 (1 pg).
Rockwell, *The Megapixel Myth*, KenRickwell.com, 2008, located on the Internet at: http://kewrockwell.com.tech/mpmyth.htm, 6 pgs.
"Save on ATM Fees", RedEye Edition, Chicago Tribune, Chicago, IL Jun. 30, 2007 (2 pgs).
Shah, *Moore's Law*, Continuous Everywhere But Differentiable Nowhere, Feb. 12, 2009, located on the Internet at: http://samjshah.com/2009/02/24/morres-law/, 5 pgs.
"SNB Check Capture: SmartClient User's Guide," Nov. 2006, 21 pgs.
Sony Digital Camera User's Guide/ Trouble Shooting Operating Instructions, copyright 2005, located on the Internet at: https://www.sony.co.uk/electronics/support/res/manuals/2654/26544941M.pdf (attached as Exhibit 3 from the Defendant Wells Fargo Bank N.A.'s Answer dated Aug. 14, 2018), 136 pgs.
Sumit, *Major Mobile Milestones—The Last 15 Years, and the Next Five*, Cisco Blogs, Feb. 3, 2016, located on the Internet at: https://blogs.cisco.com/sp/mobile-vni-major-mobile-milesrones-the-last15-years-and-the-next-five, 12 pgs.
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_yourbusiness/businessbits/d908484987.brc, U.S. Pat. No. 7,900,822, as dated 2007 (3pgs).
"WallStreetGrapevine.com" Stocks on the Rise: JADG, BKYI, MITK; Mar. 3, 2008 (4 pgs).
Wausau Financial Systems, *Understanding Image Quality & Usability Within a New Environment*, 2006, 22 pgs.
"What is check Fraud", National Check Fraud Center, http://www.ckfraud.org/ckfraud.html , U.S. Pat. No. 7,900,822, as dated 2007 (12 pgs).
"Exchangeable image file format for digital still cameras: Exif Version 2.2," Standard of Electronics and Information Technology Industries Associate, JEITA CP-3451, Technical Standardization Committee on AV & IT Storage Systems and Equipment, Japan Electronics and Information Technology Industries Association, Apr. 2002 (154 pgs.) (retrieved from: http://www.exif.org/Exif2-2.PDF).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distrubuted Applications"; First Latin American Conference on Pattern Languages of Programming; Oct. 2001; pp. 132-142; Rio de Janeiro, Brazil (11 pgs).
Amber Avalona-Butler / Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).
Aradhye, Hrishikesh B., "A Generic Method for Determining Up/Down Orientation of Text in Roman and Non-Roman Scripts," Pattern Recognition Society, Dec. 13, 2014, 18 pages.
Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, U.S. Pat. No. 7,900,822, as dated Jul. 2007, Bundesverbankd deutscher banken ev, (42 pgs).
Automated Merchant Systems, Inc., "Electronic Check Conversion," http://www.automatedmerchant.com/electronic_check_conversion.cfm, 2006, downloaded Oct. 18, 2006 (3 pgs).
Bank Systems & Technology, Untitled Article, May 1, 2006, http://www.banktech.com/showarticle.jhtml? articleID=187003126, "Are you Winning in the Payment World?" (4 pgs).
Bankserv, "DepositNow: What's the difference?" U.S. Pat. No. 7,970,677, as dated 2006, (4 pgs).
BankServ, Product Overview, http://www.bankserv.com/products/remotedeposit.htm, U.S. Pat. No. 7,970,677, as dated 2006, (3 pgs).
Bills, Steve, "Automated Amount Scanning is Trend in Remote-Deposit," American Banker, New York, NY, Aug. 30, 2005, (3 pgs).
Blafore, Bonnie "Lower Commissions, Fewer Amenities", Better Investing, Madison Heights: Feb. 2003, vol. 52, Iss 6, (4 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Blue Mountain Consulting, from URL: www.bluemontainconsulting.com, U.S. Pat. No. 7,900,822, as dated Apr. 26, 2006 (3 pgs).
Board of Governors of the federal reserve system, "Report to the Congress on the Check Clearing for the $21^{st}$ Century Act of 2003" Apr. 2007, Submitted to Congress pursuant to section 16 of the Check Clearing for the $21^{st}$ Century Act of 2003, (59 pgs).
Braun, Tim, "Camdesk—Towards Portable and Easy Document Capture," Image Understanding and Pattern Recognition Research Group, Department of Computer Science, University of Kaiserslautern, Technical Report, Mar. 29, 2005 (64 pgs). Retrieved from https://pdfs.semanticscholar.org/93b2/ea0d12f24c91f3c46fa1c0d58a76bb132bd2.pdf).
Bruene, Jim; "Check Free to Enable In-Home Remote Check Deposit for Consumers and Small Business", NetBanker. Com, Financial Insite, Inc., http://www. netbanker.com/2008/02/checkfree_to_enableinhome_rem.html, Feb. 5, 2008 (3 pgs).
Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).
Bruno, M., "Instant Messaging," Bank Technology News, Dec. 2002 (3 pgs).

(56) References Cited

OTHER PUBLICATIONS

Burnett, J. "Depository Bank Endorsement Requirements," BankersOnline.com, http://www.bankersonline.com/cgi-bin/printview/printview.pl, Jan. 6, 2003 (3 pgs).
Canon, ImageFormula CR-25/CR-55, "Improve Your Bottom Line with Front-Line Efficiencies", 0117W117, 1207-55/25-1 OM-BSP, U.S. Pat. No. 7,949,587 as dated 2007. (4 pgs).
Carrubba, P . et al., "Remote Deposit Capture: A White Paper Addressing Regulatory, Operational and Risk Issues," NetDeposit Inc., 2006 (11 pgs).
Century Remote Deposit High-Speed Scanner User's Manual Release 2006, (Century Manual), Century Bank, 2006, (32 pgs).
Chiang, Chuck, The Bulletin, "Remote banking offered", http://bendbulletin.com/apps/pbcs.dll/article?AID=/20060201/BIZ0102/602010327&templ . . . , May 23, 2008 (2 pgs).
CNN.com/technology, "Scan, deposit checks from home", www.cnn.com/2008ITECH/biztech/02/07/check.scanning.ap/index.html, Feb. 7, 2008 (3 pgs).
Constanzo, Chris, "Remote Check Deposit: Wells Captures A New Checking Twist", Bank Technology News Article—May 2005, www.americanbanker.com/btn_article.html?id=20050502YQ50FSYG (2 pgs).
Craig, Ben, "Resisting Electronic Payment Systems: Burning Down the House?", Federal Reserve Bank of Cleveland, Jul. 1999 (4 pgs).
Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).
Credit Union Journal, "The Ramifications of Remote Deposit Capture Success", www.cuiournal.com/orintthis.html?id=20080411EODZT57G, Apr. 14, 2008 (1 pg).
Credit Union Journal, "AFCU Averaging 80 DepositHome Transactions Per Day", Credit Union Journal, Aug. 15, 2005 (1 pg).
Credit Union Management, "When You wish Upon an Imaging System . . . the Right Selection Process can be the Shining Star," Credit Union Management, Aug. 1993, printed from the internet at <http://search.proquest.com/docview/227756409/14138420743684F7722/15?accountid=14 . . . >, on Oct. 19, 2013 (11 pgs).
DCU Member's Monthly—Jan. 2008, "PC Deposit—Deposit Checks from Home!", http://www.mycreditunionnewsletter.com/dcu/0108/page1. html, Copyright 2008 Digital Federal Credit Union (2 pgs).
De Jesus, A. et al., "Distributed Check Processing in a Check 21 Environment An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
Debello, James et al., "RDM and Mitek Systems to Provide Mobile Check Deposit," Mitek Systems, Inc., San Diego, California and Waterloo, Ontario, (Feb. 25, 2009), 2 pgs.
DeYoung, Robert; "The Financial Performance of Pure Play Internet Banks" Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Digital Transactions News, "An ACH-Image Proposal For Check Roils Banks and Networks" May 26, 2006 (3 pgs).
Dinan, R.F. et al., "Image Plus High Performance Transaction System", IBM Systems Journal, 1990 vol. 29, No. 3 (14 pgs).
Doermann, David et al., "Progress in Camera-Based Document Image Analysis," Proceedings of the Seventh International Conference on Document Analysis and Recognition (ICDAR 2003) 0-7695-1960-1/03, 2003, IEEE Computer Society, 11 pages.
Duvall, Mel, "Remote Deposit Capture," Baseline, vol. 1, Issue 70, Mar. 2007, 2 pgs.
ECU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentproviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, U.S. Pat. No. 7,873,200, as dated Dec. 2005 (20 pgs).
Federal Reserve Board, "Check Clearing for the 21st Century Act", FRB, http://www.federalreserve.gov/paymentsystems/truncation/, Mar. 1, 2006 (1 pg).
Federal Reserve System, "12 CFR, Part 229 [Regulation CC; Docket No. R-0926]: Availability of Funds and Collection of Checks," Federal Registrar, Apr. 28, 1997, pp. 1-50.
Federal Reserve System, "Part IV, 12 CFR Part 229 [Regulation CC; Docket No. R-1176]: Availability of Funds and Collection of Checks; Final Rule," Federal Registrar, vol. 69, No. 149, Aug. 4, 2004, pp. 47290-47328.
Fest, Glen., "Patently Unaware" Bank Technology News, Apr. 2006, Retrieved from the internet at URL:http://banktechnews.com/article.html?id=2006403T7612618 (5 pgs).
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Furst, Karen et al., "Internet Banking: Developments and Prospects", Economic and Policy Analysis Working Paper 2000-9, Sep. 2000 (60 pgs).
Garry, M., "Checking Options: Retailers face an evolving landscape for electronic check processing that will require them to choose among several scenarios," Supermarket News, vol. 53, No. 49, 2005 (3 pgs).
German Shegalov, Diplom-Informatiker, "Integrated Data, Message, and Process Recovery for Failure Masking in Web Services", Dissertation Jul. 2005 (146 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).
Hartly, Thomas, "Banks Check Out New Image", Business First, Buffalo: Jul. 19, 2004, vol. 20, Issue 43, (3 pgs).
Heckenberg, D. "Using Mac Os X for Real-Time Image Processing" Oct. 8, 2003 (15 pgs).
Herley, Cormac, "Efficient Inscribing of Noisy Rectangular Objects in Scanned Images," 2004 International Conference on Image Processing, 4 pages.
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).
Iida, Jeanne, "The Back Office: Systems—Image Processing Rolls on as Banks ReapBenefits," American Banker, Jul. 19, 1993, printed from the internet at <http://search.proquest.com/docview/292903245/14138420743684F7722/14?accountid=14 . . . >, on Oct. 19, 2013 (3 pgs).
Image Master, "Photo Restoration: We specialize in digital photo restoration and photograph repair of family pictures", http://www.imphotorepair.com, U.S. Pat. No. 7,900,822, as downloaded Apr. 2007 (1 pg).

(56) References Cited

OTHER PUBLICATIONS

Investment Systems Company, "Portfolio Accounting System," 2000, 34, pgs.
JBC, "What is a MICR Line?," eHow.com, retrieved from http://www.ehow.com/about_4684793_what-micr-line.html on May 4, 2009 (2 pgs).
Johnson, Jennifer J., Secretary of the Board; Federal Reserve System, 12 CFR Part 229, Regulation CC; Docket No. R 1176, "Availability of Funds and Collection of Checks". U.S. Pat. No. 7,900,822, as dated 2009, (89 pgs).
Kendrick, Kevin B., "Check Kiting, Float for Purposes of Profit," Bank Security & Fraud Prevention, vol. 1, No. 2, 1994 (3 pgs).
Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).
Knestout, Brian P. et al., "Banking Made Easy" Kiplinger's Personal Finance Washington, Jul. 2003, vol. 57, Iss 7 (5 pgs).
Kornai Andras et al., "Recognition of Cursive Writing on Personal Checks", Proceedings of International Workshop on the Frontiers in Handwriting Recognition, U.S. Pat. No. 7,900,822, as dated Sep. 1996, (6 pgs).
Lampert, Christoph et al., "Oblivious Document Capture and Real-Time Retrieval," International Workshop on Camera Based Document Analysis and Recognition (CBDAR), 2005 (8 pgs). (Retrieved from: http://www-cs.ccny.cuny.edu/~wolberg/capstone/bookwarp/LampertCBDAR05.pdf).
Levitin, Adam J., Remote Deposit Capture: A Legal and Transactional Overview, Banking Law Journal, p. 115, 2009 (RDC), 8 pgd.
Liang, Jian et al., Camera-Based Analysis of Text and Documents: A Survey, International Journal on Document Analysis and Recognition, Jun. 21, 2005, 21 pages.
Luo, Xi-Peng et al., "Design and Implementation of a Card Reader Based on Build-In Camera," Proceedings of the 17th International Conference on Pattern Recognition, 2004, 4 pages.
Masonson, L., "CheckTruncation and ACH Trends—Automated Clearing Houses", healthcare financial management associate, http://www.findarticles.com/p/articles/mLm3276/is_n7_v47/ai_114466034/print, 1993 (2 pgs).
Matthews, Deborah, "Advanced Technology Makes Remote Deposit Capture Less Risky," Indiana Bankers Association, Apr. 2008 (2 pgs).
Metro 1 Credit Union, "Remote Banking Services," hltp://ww\\i.metro1cu.org/metro1cu/remote.html, downloaded Apr. 17, 2007 (4 pgs).
Mitek systems, "Imagenet Mobile Deposit", San Diego, CA, downloaded 2009 (2 pgs).
Mitek Systems: Mitek Systems Launches First Mobile Check Deposit and Bill Pay Application, San Diego, CA, Jan. 22, 2008 (3 pgs).
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," Connotech Experts-conseils, Inc., Apr. 1995 (31 pgs).
Nelson, B et al., "Remote deposit capture changes the retail landscape," Northwestern Financial Review, http://findarticles.com/p/articles/mi qa3799/is200607/ai_n16537250, 2006 (3 pgs).
Netbank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htm, U.S. Pat. No. 7,900,822, as dated 2006 (3 pgs).
Oxley, Michael G., from committee on Financial Services; "Check Clearing for The 21st Century Act", 108th Congress, 1st Session House of Representatives Yeport 108-132, Jun. 2003 (20 pgs).
Oxley, Michael G., from the committee of conference; "Check Clearing for the 21st Century Act" 108th Congress, 1st Session Senate report 108-291, Oct. 1, 2003 (27 pgs).
Palacios, Rafael et al., "Automatic Processing of Brazilian Bank Checks". U.S. Pat. No. 7,900,822, as dated 2002 (28 pgs).
Patterson, Scott "USAA Deposit@Home—Another WOW moment for Net Banking", NextCU.com, Jan. 26, 2007 (5 pgs).
Public Law 108-100, 108 Congress; "An Act Check Clearing for the 21st Century Act", Oct. 28, 2003, 117 STAT. 1177 (18 pgs).
Rao, Bharat; "The Internet and The Revolution in Distribution: A Cross-Industry Examination"; Technology in Society; 1999; pp. 287-306; vol. 21, No. 3 (20 pgs).
Remotedepositcapture, URL:www.remotedepositcapture.com, U.S. Pat. No. 7,900,822, as dated 2006 (5 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
RemoteDepositCapture.com, Remote Deposit Capture News Articles from Jul. 6, 2006, "BankServ Announces New Remote Deposit Product Integrated with QuickBooks" (3 pgs).
Remotedepsitcapture.com, LLC, "Remote Deposit Capture Overview," ROC Overview, http://remotedepositcapture.com/overview/RDC_overview.htm, U.S. Pat. No. 7,900,822, as dated Mar. 12, 2007 (4 pgs).
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).
Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).
Rose, Sarah et al., "Best of the We: The Top 50 Financial Websites", Money, New York, Dec. 1999, vol. 28, Iss. 12 (8 pgs).
Shelby, Hon. Richard C. (Committee on Banking, Housing and Urban Affairs); "Check Truncation Act of 2003", calendar No. 168, 108th Congress, 1st Session Senate report 108-79, Jun. 2003 (27 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html, © 1999-2007 (2 pgs).
The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, U.S. Pat. No. 7,900,822, as dated Dec. 2005 (3 pgs).
The Green Sheet 2.0: Newswire, "CO-OP adds home deposit capabilities to suite ofcheck imaging products", www.greensheet.com/newswire.php?newswire_id=8799, Mar. 5, 2008 (2 pgs).
Tygar, J.D., Atomicity in Electronic Commerce, In ACM Networker, 2:2, Apr./May 1998 (12 pgs).
Valentine, Lisa, "Remote Deposit Capture Hot Just Got Hotter," ABA Banking Journal, Mar. 2006, p. 1-9.
Vaream, Craig, "Image Deposit Solutions: Emerging Solutions for More Efficient Check Processing," JP Morgan Chase, Nov. 2005 (16 pgs).
Wade, Will, "Early Debate on Remote-Capture Risk," American Banker, New York, NY, May 26, 2004 (3 pgs).
Wade, Will, "Early Notes: Updating Consumers on Check 21" American Banker Aug. 10, 2004 (3 pgs).

(56) References Cited

OTHER PUBLICATIONS

Wallison, Peter J., "Wal-Mart Case Exposes Flaws in Banking-Commerce Split", American Banker, vol. 167. No. 8, Jan. 11, 2002 (3 pgs).
Wells Fargo 2005 News Releases, "The New Wells Fargo Electronic Deposit Services Break Through Banking Boundaries in The Age of Check 21", San Francisco Mar. 28, 2005, www.wellsfargo.com/press/3282005_check21Year=2005 (1 pg).
Wells Fargo Commercial, "Remote Deposit", www.wellsfargo.com/com/treasury mgmtlreceivables/electronic/remote deposit, Copyright 2008 (1 pg).
White, J.M. et al., "Image Thresholding for Optical Character Recognition and Other Applications Requiring Character Image Extraction", IBM J. Res. Development, Jul. 1983, vol. 27, No. 4 (12 pgs).
Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).
Wikipedia ®, "Remote Deposit," http://en.wikipedia.org/wiki/Remote_deposit, 2007 (3 pgs).
Windowsfordevices.Com, "Software lets camera phone users deposit checks, pay bills", www.windowsfordevices.com/news/NS3934956670.html, Jan. 29, 2008 (3 pgs).
Wolfe, Daniel, "Check Image Group Outlines Agenda," American Banker, New York, N.Y.: Feb. 13, 2009, vol. 174, Iss. 30, p. 12. (2 pgs).
Woody Baird Associated Press, "Pastor's Wife got Scammed—She Apparently Fell for Overseas Money Scheme," The Commercial Appeal, Jul. 1, 2006, p. A. 1.
Zandifar, A., "A Video-Based Framework for the Analysis of Presentations/Posters," International Journal on Document Analysis and Recognition, Feb. 2, 2005, 10 pages.
Zhang, C.Y., "Robust Estimation and Image Combining" Astronomical Data Analysis Software and Systems IV, ASP Conference Series, 1995 (5 pgs).
Zions Bancorporation, "Moneytech, the technology of money in our world: Remote Deposit," http://www.bankjunior.com/pground/moneytech/remote_deposit.jsp, 2007 (2 pgs).
"Quicken Bill Pay", Retrieved from the Internet on Nov. 27, 2007 at <URL:http://quicken intuit.com/quicken-bill-pay-jhtml>, 2 pgs.
"Start to Simplify with Check Imaging a Smarter Way to Bank", Retrieved from the Internet on Nov. 27, 2007, at: <URL:http://www.midnatbank.com/lnternet%20Banking/internet_Banking.html>, 3 pgs.
Motomanual, MOTOROKR-E6-GSM-English for wireless phone, copyright 2006, 144 pgs.
Patent Disclaimer for U.S. Pat. No. 8,699,779, filed on Mar. 4, 2019, 2 pgs.
Patent Disclaimer for U.S. Pat. No. 8,977,571, filed on Feb. 20, 2019, 2 pgs.
Patent Disclaimer for U.S. Pat. No. 9,336,517, filed on Mar. 4, 2019, 2 pgs.
Patent Disclaimer for U.S. Pat. No. 9,818,090, filed on Feb. 20, 2019, 2 pgs.
CBM2019-00002 U.S. Pat. No. 9,818,090, United Services Automobile Association (USAA)'s Patent Owner Preliminary Response, dated Feb. 20, 2019, 75 pgs.
CBM2019-00002 U.S. Pat. No. 9,818,090, Declaration of Tim Crews in Support of Patent Owner Preliminary Response, dated Feb. 20, 2019, 8 pgs.
CBM2019-00002 U.S. Pat. No. 9,818,090, Declaration of Matthew Caiman in Support of Patent Owner Preliminary Response, dated Feb. 20, 2019, 14 pgs.
CBM2019-00002 U.S. Pat. No. 9,818,090, Katie Knight Videotape Deposition Transcript, dated Feb. 8, 2019, 27 pgs.
CBM2019-00002 U.S. Pat. No. 9,818,090, Peter Alexander, Ph.D., Oral and Videotaped Deposition, dated Jan. 23, 2019, 27 pgs.
CBM2019-00002 U.S. Pat. No. 9,818,090, United Services Automobile Association (USAA)'s Updated Exhibit List, dated Mar. 19, 2019,pgs.
CBM2019-00003 U.S. Pat. No. 9,336,517, United Services Automobile Association (USAA)'s Patent Owner Preliminary Response, dated Mar. 4, 2019, 91 pgs.
CBM2019-00003 U.S. Pat. No. 8,699,779, Declaration of Matthew Caiman in Support of Patent Owner Preliminary Response, dated Mar. 4, 2019, 15 pgs.
CBM2019-00003 U.S. Pat. No. 9,336,517, Katie Knight Videotape Deposition Transcript, dated Feb. 8, 2019, 27 pgs.
CBM2019-00003 U.S. Pat. No. 9,336,517, Peter Alexander, Ph.D., Oral and Videotaped Deposition, dated Jan. 23, 2019, 27 pgs.
CBM2019-00003 U.S. Pat. No. 9,336,517, United Services Automobile Association (USAA)'s Updated Exhibit List Pursuant to 37 CFR 42.63(e), dated Mar. 19, 2019, 8 pgs.
CBM2019-00003 U.S. Pat. No. 9,336,517, Petitioner's Reply Brief to Patent Owner Preliminary Response Pursuant to Authorization Provided in Paper No. 14, dated Apr. 10, 2019, 10 pgs.
CBM2019-00004 U.S. Pat. No. 8,977,571, Declaration of Tim Crews in Support of Patent Owner Preliminary Response, dated Feb. 20, 2019, 8 pgs.
CBM2019-00004 U.S. Pat. No. 8,977,571, United Services Automobile Association (USAA)'s Patent Owner Preliminary Response, dated Feb. 20, 2019, 99 pgs.
CBM2019-00004 U.S. Pat. No. 8,977,571, Declaration of Matthew Calman in Support of Patent Owner Preliminary Response, dated Feb. 20, 2019, 14 pgs.
CBM2019-00004 U.S. Pat. No. 8,977,571, United Services Automobile Association (USAA)'s Updated Exhibit List Pursuant to 37 CFR 43.63(e), dated Mar. 19, 2019, 8 pgs.
CBM2019-00005 U.S. Pat. No. 8,699,779, United Services Automobile Association's (USAA)'s Patent Owner Preliminary Response, dated Mar. 4, 2019, 103 pgs.
CBM2019-00005 U.S. Pat. No. 8,699,779, Katie Knight Videotape Deposition Transcript, dated Feb. 8, 2019, 27 pgs.
CBM2019-00005 U.S. Pat. No. 8,699,779 Matthew A. Calman Declaration, dated Mar. 4, 2019, 15 pgs.
CBM2019-00005 U.S. Pat. No. 8,699,779 Peter Alexander, Ph.D., Oral and Videotaped Deposition, dated Jan. 23, 2019, 27 pgs.
CBM2019-00027 U.S. Pat. No. 9,224,136 Declaration of Peter Alexander, Ph.D., dated Mar. 28, 2019, 147 pgs.
CBM2019-00027 U.S. Pat. No. 9,224,136 Petition for Covered Business Method Review of Claims 1-3, 5-9, 11-16 and 18 of U.S. Pat. No. 9,224,136, dated Mar. 28, 2019, 93 pgs.
CBM2019-00027 U.S. Pat. No. 9,224,136 Notice of Filing Date Accorded to Petition and Time for Filing Patent Owner Preliminary Response, dated Apr. 8, 2019, 3 pgs.
CBM2019-00028 U.S. Pat. No. 10,013,681, Plaintiff United Services Automobile Association (USAA) Preliminary Claim Constructions And Extrinsic Evidence, dated Mar. 15, 2019, 74 pgs.
CBM2019-00028 U.S. Pat. No. 10,013,681, Declaration of Peter Alexander, Ph.D., dated Mar. 28, 2019, 94 pgs.
CBM2019-00028 U.S. Pat. No. 10,013,681, Petition For Covered Business Method Review of Claims 1-30 of U.S. Pat. No. 10,013,681, dated Mar. 28, 2019, 99 pgs.
CBM2019-00028 U.S. Pat. No. 10,013,681, Petitioner's Updated Exhibit List (as of Apr. 1, 2019) for U.S. Pat. No. 10,013,681, dated Apr. 1, 2019, 5 pgs.
CBM2019-00028 U.S. Pat. No. 10,013,681, Notice of Filing Date Accorded To Petition and Time For Filing Patent owner Preliminary Response for U.S. Pat. No. 10,013,681, dated Apr. 8, 2019, 3 pgs.
CBM2019-00029 U.S. Pat. No. 10,013,605, Declaration of Peter Alexander, Ph.D., dated Mar. 28, 2019, 76 pgs.
CBM2019-00029 U.S. Pat. No. 10,013,605, Petition for Covered Business Method Review of Claims 1-3, 5-14, 16-29 of U.S. Pat. No. 10,013,605, dated Mar. 28, 2019, 88 pgs.
CBM2019-00029 U.S. Pat. No. 10,013,605, Plaintiff United Services Automobile Association (USAA) Preliminary Claim Constructions and Extrinsic Evidence, dated Mar. 15, 2019, 74 pgs.
IPR2019-00815 U.S. Pat. No. 9,818,090, Petition for Inter Partes Review of Claims 109 of U.S. Pat. No. 9,818,090, dated Mar. 20, 2019, 56 pgs.
IPR2019-00815 U.S. Pat. No. 9,818,090, Declaration of Peter Alexander, PhD. as filed in the IPR on Mar. 20, 2019, 99 pgs.

(56) References Cited

OTHER PUBLICATIONS

IPR2019-00815 U.S. Pat. No. 9,818,090, Notice of Filing Date Accorded to Petition and Time for Filing Patent Owner Preliminary Response, dated Mar. 27, 2019, 5 pgs.
IPR2019-00815 Patent No. 9,818,090, Exhibit B Proposed Claim Constructions for the '571, '090, '779 and '517 Patents, filed on Feb. 28, 2019, 10 pgs.
ABA Routing System Transit Number Wikipedia, dated Sep. 27, 2006, 3pgs.
Accredited Standards Committee Technical Report TR 33-2006, dated Aug. 28, 2006, 75 pgs.
ANS X9.100-140-2004, "Specification for an Image Replacement document—IRD", American Standard for Financial Services, Oct. 1, 2004, 15 pgs.
ANSI News, Check 21 Goes Into Effect Oct. 28, 2004, dated Oct. 25, 2004, 1 pg.
ANSI, "Return Reasons for Check Image Exchange of IRDS", dated May 6, 2016, 23 pgs.
ANSI, "Specifications For Electronic Exchange of Check and Image Data", dated Jul. 11, 2006, 230 pgs.
ANSI X9.Jul. 1999(R2007), Bank Check Background and Convenience Amount Field Specification, dated Jul. 11, 2007, 86 pgs.
ASCX9, "Specification for Electronic Exchange of Check and Image Data", date Mar. 31, 2003. 156 pgs.
Bankers' Hotline, "Training Page: Learning the Bank Numbering System", Copyright 2004, 2 pgs.
BrainJar Validation Algorithms, archived on Mar. 16, 2016 from BrainJar.com, 2 pgs.
Canon White Paper, "Two Words Every Business Should Know: Remote Deposit", dated 2005, 7 pgs.
CBR online, "Diebold launches ATM depository technology", Oct. 4, 2007, 5 pgs.
Cheq Information Technology White Paper, "Teller Scanner Performance and Scanner Design: Camera Position Relative to the Feeder", dated 2005, 7 pgs.
De Jesus, Angie et al., "Distributed Check Processing in a Check 21 Environment", dated Nov. 2004, 22 pgs.
Federal Reserve Adoption of DSTU X9.37-2003, Image Cash Letter Customer Documentation Version 1.8, dated Oct. 1, 2008, 48 pgs.
Fielding, R. et al., "RFC-2616—Hypertext Transfer Protocol", Network Working Group, The Internet Society copyright 1999, 177 pgs.
Hill, Simon, "From J-Phone to Lumina 1020: A Complete History of the Camera Phone", dated Aug. 11, 2013, 19 pgs.
Instrument—Definition from the Merriam-Webster Online Dictionary, dated Mar. 2, 2019, 1 pg.
Instrument—Definition of instrument from the Oxford Dictionaries (British & World English), dated Jul. 2, 2017, 44 pgs.
IPhone Application Programming Guide Device Support, dated Apr. 26, 2009, 7 pgs.
IPhone Announces the New iPhone 3gs—The Fastest, Most Powerful iPhone Yet, Press Release dated Jun. 8, 2009, 4 pgs.
Klein, Robert, Financial Services Technology, "Image Quality and Usability Assurance: Phase 1 Project", dated Jul. 23, 2004, 68 pgs.
Lange, Bill, "Combining Remote Capture and IRD Printing, A Check 21 Strategy for Community and Regional Banks", dated 2005, 25 pgs.
Lee, Jeanne, "Mobile Check Deposits: Pro Tips to Ensure They Go Smoothly", dated Feb. 19, 2016, 6 pgs.
Meara, Bob, "State of Remote Deposit Capture 2015: Mobile is the New Scanner", Dated May 26, 2015, obtained from the Internet at https://www.celent.com/insights/57842967, 3 pgs.
Meara, Bob, "State of Remote Deposit Capture 2015 Mobile is the New Scanner", dated May 2015, 56 pgs.
Meara, Bob,"USAA's Mobile Remote Deposit Capture", Dated Jun. 26, 2009, 2 pgs.
Mitek's Mobile Deposit Processes More Than Two Billion Checks, $1.5 Trillion in Cumulative Check Value, dated Mar. 18, 2018, 2 pgs.
Mitek, "Video Release—Mitek MiSnap™ Mobile Auto Capture Improves Mobile Deposit® User Experience at Ten Financial Institutions", dated Jul. 15, 2014, 2 pgs.
NCR, Mobile Remote Deposit Capture (RDC), copyright 2011, 8 pgs.
Nokia N90 Review Digital Trends, dated Feb. 11, 2019, obtained from the Internet at: https://www.digitaltrends.com/cell-phone-reviews/nokia-n90-review/, 11 pgs.
Nokia N95 8GB User Guide, copyright 2009, (from the Wells Fargo Bank, N.A. IPR2019-00815, filed on Mar. 20, 2019), Part 1 of 3, 67 pgs.
Nokia N95 8GB User Guide, copyright 2009, (from the Wells Fargo Bank, N.A. IPR2019-00815, filed on Mar. 20, 2019), Part 2 of 3, 60gs.
Nokia N95 8GB User Guide, copyright 2009, (from the Wells Fargo Bank, N.A. IPR2019-00815, filed on Mar. 20, 2019), Part 3 of 3, 67 pgs.
Patel, Kunur, Ad Age, "How Mobile Technology is Changing Banking's Future", dated Sep. 21, 2009, 3 pgs.
Remote Deposit Capture Basic Requirements, dated Aug. 22, 2009, 1 pg.
Remote Deposit Capture.com Scanner Matrix, dated Oct. 21, 2011, 3 pgs.
Rowles, Tony, *USAA* v. *Wells Fargo*, No. 2:16-cv-245-JRG: e-mail correspondence dated Jan. 24, 2019, 2 pgs.
Sechrest, Stuart et al., "Windows XP Performance", Microsoft, dated Jun. 1, 2001, 20 pgs.
Spenser, Harvey, "White Paper Check 21 Controlling Image Quality at The Point of Capture", dated 2004, 7 pgs.
Timothy R. Crews list of Patents, printed from the United States Patent and Trademark Office on Feb. 13, 2019, 7 pgs.
Van Dyke, Jim, "2017 Mitek Mobile Deposit Benchmark Report", copyright 2017, 50 pgs.
Wausau, "Understanding Image Quality & Usability Within a New Environment", copyright 2019, 1 pg.
Whitney, Steve et al., "A Framework for Exchanging Image Returns", dated Jul. 2001, 129 pgs.
CBM2019-00005 U.S. Pat. No. 8,699,779, Patent Owner's Sur-Reply Brief to Petitioner's Reply Brief to Patent Owner Preliminary Response Pursuant to Authorization Provided in Paper No. 15, dated May 1, 2019, 7 pgs.
CBM2019-00004 U.S. Pat. No. 8,977,571, Defendant's Claim Construction Brief, *United Services Automobile Association* v. *Wells Fargo Bank, N.A.*, Civil Action No. 2:18-cv-245, dated Apr. 25, 2019, 36 pgs.
CBM2019-00004 U.S. Pat. No. 8,977,571, Patent Owner's Sur-Reply Brief to Petitioner's Reply Brief to Patent Owner Preliminary Response Pursuant to Authorization Provided in Paper 14, dated Apr. 30, 2019, 7 pgs.
USAA's Reply to Claim Construction Brief, *United Services Automobile Association* v. *Wells Fargo Bank, N.A.*, Civil Action No. 2:18-cv-245, dated May 2, 2019, 15 pgs.
Plaintiff and Counterclaim Defendant's Answer to Defendant and Counterclaims Plaintiffs Amended Answer, Affirmative Defenses, & Counterclaims, *United Services Automobile Association* v. *Wells Fargo Bank, N.A.*, Civil Action No. 2:18-cv-366, dated Apr. 26, 2019, 18 pgs.
USAA's Reply Claim Construction Brief, *United Services Automobile Association* v. *Wells Fargo Bank, N.A.*, Civil Action No. 2:18-cv-245, dated May 2, 2019, 227 pgs.
Parties' P.R. 4-5(D) Joint Claim Construction Chart, *United Services Automobile Association* v. *Wells Fargo Bank, N.A.*, Civil Action No. 2:18-cv-245, dated May 9, 2019, 25 pgs.
CBM2019-00002 U.S. Pat. No. 9,818,090, Decision Denying Institution of Covered Business Method Patent Review 37 C.F.R. § 42.208, dated Apr. 26, 2019, 5 pgs.
CBM2019-00003 U.S. Pat. No. 9,336,517, Decision Denying Institution of Covered Business Method Patent Review 37 C.F.R. § 42.208, dated Jun. 3, 2019, 28 pgs.
CBM2019-00004 U.S. Pat. No. 8,977,571, Decision Denying Institution of Covered Business Method Patent Review 37 C.F.R. § 42.208, dated May 15, 2019, 33 pgs.

(56) References Cited

OTHER PUBLICATIONS

CBM2019-00005 U.S. Pat. No. 8,699,779, Decision Denying Institution of Covered Business Method Patent Review 37 C.F.R. § 42.208, dated Jun. 3, 2019, 27 pgs.
USAA's Opening Claim Construction Brief, filed in Civil Action No. 2:18-CV-366, dated May 17, 2019, 32 pgs.
Defendant's Claim Construction Brief, filed in Civil Action No. 2:18-CV-366, dated May 31, 2019, 111 pgs.
Plaintiffs Notice of Filing Claim Construction Presentation, filed in Civil Action No. 2:18-CV-245, dated May 23, 2019, 106 pgs.
IPR2019-01081 U.S. Pat. No. 9,336,517, Petition for Inter Partes Review of Claims 1,5-10, 12-14, 17-20 of U.S. Pat. No. 9,336,517, dated Jun. 5, 2019, 78 pgs.
IPR2019-01082 U.S. Pat. No. 8,977,571, Petition for Inter Partes Review of Claims 1-13 U.S. Pat. No. 8,977,571, dated Jun. 5, 2019, 75 pgs.
IPR2019-01083 U.S. Pat. No. 8,699,779, Petition for Inter Partes Review of Claims 1-18 U.S. Pat. No. 8,699,779, dated Jun. 5, 2019, 74 pgs.
Plaintiffs Notice of Decisions Denying Institution of Covered Business Method Patent Review, filed in Civil Action No. 2:18-CV-245, dated Jun. 6, 2019, 61 pgs.
Claim Construction Memorandum Opinion and Order, filed in Civil Action No. 2:18-CV-245, dated Jun. 13, 2019, 48 pgs.
Parties' P.R.4-5(D) Joint Claim Construction Chart, filed in Civil Action No. 2:18-CV-245, dated Jun. 14, 2019, 28 pgs.
Defendant's Claim Construction Brief, filed in Civil Action No. 2:18-CV-366, dated May 31, 2019, 28 pgs.
USAA's Reply Claim Construction Brief, filed in Civil Action No. 2:18-CV-366, dated Jun. 7, 2019, 14 pgs.
Wells Fargo's Objections to Magistrate Judge Payne's Claim Construction Memorandum Opinion and Order, filed in Civil Action No. 2:18-CV-245, dated Jun. 27, 2019, 7 pgs.
USAA's Objections to Magistrate Judge Payne's Claim Construction Memorandum Opinion and Order, filed in Civil Action No. 2:18-CV-245, dated Jun. 27, 2019, 6 pgs.
Parties' P.R. 4-5(D) Joint Claim Construction Chart, filed in Civil Action No. 2:18-CV-366, dated Jun. 18, 2019, 27 pgs.
IPR2019-00815, Invalidity Chart, uploaded on Jun. 27, 2019, 94 pgs.
IPR2019-00815, United Services Automobile Association ("USAA")'s Patent Owner Preliminary Response, dated Jun. 27, 2019, 66 pgs.
IPR2019-00815, Supplemental Invalidity Chart, dated on Jun. 27, 2019, 16 pgs.
IPR2019-00815, Declaration of Matthew A. Calman in Support of Patent Owner Preliminary Response, dated Jun. 27, 2019, 25 pgs.
CBM 2019-00027, Declaration of Bharat Prasad, dated Jul. 8, 2019, 32 pgs.
CBM 2019-00027, Patent Owner Preliminary Response and Exhibits 2001-1042, dated Jul. 8, 2019, 91 pgs.
CBM 2019-00028, United Services Automobile Association ("USAA")'s Patent Owner Preliminary Response, dated Jul. 8, 2019, 73 pgs.
CBM2019-00028, Declaration of Matthew A. Calman in Support of Patent Owner Preliminary Response, dated Jul. 8, 28 pgs.
CBM2019-00028, Malykhina, Elena "Get Smart", Copyright 2006 by ProQuest Information and Learning Company, 6 pgs.
CBM2019-00028, PalmTreo 700W Smartphone manual, Copyright 2005 by Palm, Inc., 96 pgs.
CBM2019-00028, 00000 C720w User Manual for Windows Mobile Smart Phone, Copyright 2006, 352 pgs.
CBM2019-00028, "Smarter Than Your Average Phone", Copyright 2006 by Factiva, 4 pgs.
CBM2019-00028, "64 Million Smart Phones Shipped Worldwide in 2006", Canalys Newsroom, 2006, 3 pgs.
CBM2019-00028, Nokia 9500 Communicator user Guide, Copyright 2006 by Nokia Corporation, 112 pgs.
CBM2019-00028, Robinson, Daniel, "Client Week—Handsets advance at 3GSM", Copyright 2004 by VNU Business Publications Ltd., 2 pgs.
CBM2019-00028, Burney, Brett "MacBook Pro with Intel processor is fast, innovative", Copyright 2006 by Plain Dealer Publishing Co., 2 pgs.
CBM2019-00028, 17-inch MacBook Pro User's Guide, Copyright 2006 by Apple Computer, Inc., 144 pgs.
CBM2019-00028, Wong, May "HP unveils new mobile computers", Copyright 2006 by The Buffalo News, 2 pgs.
CBM2019-00028, Jewell, Mark "Cell Phone Shipments Reach Record 208M", Copyright 2005 by Associated Press, 1 pg.
CBM 2019-00028, Lawler, Ryan "Apple shows Intel-based Macs, surge in revenue", Copyright 2006 by The Yomiuri Shimbun, 2 pgs.
CBM 2019-00028, Aspire 9800 Series User Guide, Copyright 2006 by Acer International, 122 pgs.
CBM 2019-00028, Dell XPS M1210 Owner's Manual, Copyright 2006 by Dell Inc., 192 pgs.
CBM 2019-00028, Estridge, Bonnie "Is your phone smart enough?: The series that cuts through the technobabble to bring you the best advice on the latest gadgets", Copyright 2006 by XPRESS—A1 Nsr Media, 3 pgs.
CBM 2019-00028, "Motorola, Palm collaborate on smart phone", Copyright 2000 by Crain Communications, Inc., 1 pg.
CBM 2019-00028, Nasaw, Daniel "Viruses Pose threat to 'Smart' Cellphones—Computer Programs Could Cripple Devices and Shut Down Wireless Networks", Copyright 2004 by Factiva, 2 pgs.
CBM 2019-00028, Seitz, Patrick "Multifunction Trend Shaking Up The Handheld Device industry; Solid Sales Expected in 2004; PDA, handset, camera—one single, small product can fill a variety of roles", Copyright 2004 Investor's Business Daily, Inc., 3 pgs.
Microsoft Mobile Devices Buyer's Guide, 2002, 4 pgs.
Microsoft Mobile Devices Smartphone, 2003, 2 pgs.
Plaintiffs Notice of Decision Denying Institution of Covered Business Method Patent Review, filed in Civil Action No. 2:18-CV-245, dated May 15, 2019, 36 pgs.
Defendant's Claim Construction Brief, filed in Civil Action No. 2:18-CV-366, dated Jun. 24, 2019, 28 pgs.
CBM2019-00029, United Services Automobile Association (USAA)'s Patent Owner Preliminary Response, dated Jul. 17, 2019, 76 pgs.
CBM2019-00029, Declaration of Matthew A. Calman in Support of Patent Owner Preliminary Response, dated Jul. 17, 2019, 29 pgs.
CBM2019-00029, Defendant's Claim Construction Brief, filed in Civil Action No. 2:18-CV-366, dated May 31, 2019, 28 pgs.
CBM2019-00029, Palenchar, Joseph, "PDA Phone Adds WiFi VoIP, Turn-By-Turn GPS Navigation", Copyright 2006 by Reed Business Information, 2 pgs.
CBM2019-00029, HP User Guide, Additional Product Information, Copyright 2006 by Hewlett-Packard Development Company, L.P., 204 pgs.
CBM2019-00029, Pocket PC User Manual, Version 1, dated May 2006 by Microsoft, 225 pgs.
CBM2019-00029, "Dynamism.com: Take tomorrow's tech home today with Dynamism.com: Latest gadgets merge next generation technology with high style design", Copyright 2006 Normans Media Limited, 2 pgs.
IPR2019-00815, Federal Reserve Financial Services Retired: DSTU X9.37-2003, Specifications for Electronic Exchange ofCheck and Image Data, Copyright 2006 by Accredited Standards Committee X9, Inc., dated Mar. 31, 2003, 157 pgs.
IPR2019-01081, Declaration of Peter Alexander, Ph.D, dated Jun. 5, 2019, 135 pgs.
USAA's Opening Claim Construction Brief, *United Services Automobile Association* v. *Wells Fargo Bank, N.A.*, Civil Action No. 2:18-cv-245, dated Apr. 11, 2019, 32 pgs.
P.R. 4-3 Joint Claim Construction and Pre-Hearing Statement, *United Services Automobile Association* v. *Wells Fargo Bank, N.A.*, Civil Action No. 2:18-cv-366, dated Apr. 5, 2019, 190 pgs.
Defendant Wells Fargo Bank, N.A.'s Amended Answer, Affirmative Defenses, and Counterclaims to Plaintiff's Complaint, *United Services Automobile Association* v. *Wells Fargo Bank, N.A.*, Civil Action No. 2:18-cv-366, dated Apr. 12, 2019, 32 pgs.
Plaintiff and Counterclaim Defendant's Answer to Defendant and Counterclaims Plaintiffs Amended Answer, Affirmative Defenses, &

(56) References Cited

OTHER PUBLICATIONS

Counterclaims, *United Services Automobile Association* v. *Wells Fargo Bank, N.A.*, Civil Action No. 2:18-cv-245, dated Mar. 21, 2019, 36 pgs.
Defendant Wells Fargo Bank, N.A.'s Second Amended Answer, Affirmative Defenses, and Counterclaims to Plaintiff's Amended Complaint, *United Services Automobile Association* v. *Wells Fargo Bank, N.A.*, Civil Action No. 2:18-cv-245, dated Aug. 1, 2019, 72 pgs.
Claim Construction Memorandum Opinion and Order, *United Services Automobile Association* v. *Wells Fargo Bank, N.A.*, Civil Action No. 2:18-cv-366, dated Jul. 29, 2019, 36 pgs.
Wells Fargo's Objections to Magistrate Judge Payne's Claim Construction Memorandum Opinion and Order, *United Services Automobile Association* v. *Wells Fargo Bank, N.A.*, Civil Action No. 2:18-cv-366, dated Aug. 12, 2019, 7 pgs.
USAA's Objections to Magistrate Judge Payne's Claim Construction Memorandum Opinion and Order, *United Services Automobile Association* v. *Wells Fargo Bank, N.A.*, Civil Action No. 2:18-cv-366, dated Aug. 12, 2019, 10 pgs.
IPR2019-00815 U.S. Pat. No. 9,818,090, Petitioner's Reply Brief to Patent Owner Preliminary Response Pursuant to Authorization Provided in Paper No. 13, dated Aug. 1, 2019, 9 pgs.
IPR2019-00815 U.S. Pat. No. 9,818,090, Petitioner's Supplemental Exhibit List, dated Aug. 1, 2019, 5 pgs.
IPR2019-00815 U.S. Pat. No. 9,818,090, United Services Automobile Association (USAA)'s Sur-Reply in Support of Patent Owner Preliminary Response, dated Aug. 8, 2019, 8 pgs.
IPR2019-00815 U.S. Pat. No. 9,818,090, Decision Denying Institution of Inter Parties Review, dated Aug. 26, 2019, 28 pgs.
Mitek Video titled "Mobile Deposit Tour", Published on Jul. 2, 2009 by Mitek Systems, duration 2 minutes and 13 seconds, located on the Internet at https://www.youtube.com/watch?v=sGD49ybxS2Q, 25 pgs.
Provisional patent application filed by Wells Fargo Bank, dated Jan. 29, 2008, 134 pgs.
SCH0i910 Portable Dualmode Smartphone User Guide by Samsung, Copyright 2009 Samsung Electronics Canada, downloadable from www.manualslib.com, 168 pgs.
U.S. Appl. No. 61/022,279, dated Jan. 18, 2008, (IPR2020-00090, U.S. Pat. No. 9,177,197), 35 pgs.
Panini My Vision X Operator Manual, Panini, 2004, (IPR2020-00093, U.S. Pat. No. 9,892,454), 51 pgs.
Yeo, L.H et al., "Submission of transaction from mobile workstations in a cooperative multidatabase environment", *IEEE*, 1994, (IPR2020-00097, U.S. Pat. No. 7,885,880), 10 pgs.
Cormac Herley, "Recursive Method to Extract Rectangular Objects from Scans", 4 pages, Oct. 2003.
E. Tochip et al., "Camera Phone Color Appearance Utility—Finding a Way to Identify Camera Phone Picture Color", 25 pages, 2007.
Andrew S. Tanenbaum, Modern Operating Systems, Second Edition (2001).
Arnold et al., The Java Programming Language, Fourth Edition (2005).
Consumer Assistance & Information—Check 21 https://www.fdic.gov/consumers/assistance/protection/check21.html (FDIC).
Halonen et al., GSM, GPRS, and EDGE Performance: Evolution Towards 3G/UMTS, Second Edition (2003).
Heron, Advanced Encryption Standard (AES), 12 Network Security 8 (2009).
Immich et al., Performance Analylsis of Five Interprocess CommunicAtion Mechanisms Across UNIX Operating Systems, 68 J. Syss. & Software 27 (2003).
Leach, et al., A Universally Unique Identifier (UUID) URN Namespace, (Jul. 2005) retrieved from https://www.ietf.org/rfc/rfc4122.txt.
N. Ritter & M. Ruth, The Geo Tiff Data InterchAnge Standard for Raster Geographic Images, 18 Int. J. Remote Sensing 1637 (1997).
Pbmplus—image file format conversion package, retrieved from https://web.archive.org/web/20040202224728/https:/www.acme.com/software/pbmplus/.
Petition filed by PNC Bank N.A. for Inter Partes Review of Claims 1-23 of U.S. Pat. No. 10,482,432, dated Jul. 14, 2021, IPR2021-01071, 106 pages.
Petition filed by PNC Bank N.A. for Inter Partes Review of Claims 1-7, 10-21 and 23 of U.S. Pat. No. 10,482,432, dated Jul. 14, 2021, IPR2021-01074.
Petition filed by PNC Bank N.A. for Inter Partes Review of Claims 1-18 of U.S. Pat. No. 10,621,559, dated Jul. 21, 2021, IPR2021-01076, 111 pages.
Petition filed by PNC Bank N.A. for Inter Partes Review of Claims 1-18 of U.S. Pat. No. 10,621,559, filed Jul. 21, 2021, IPR2021-01077; 100 pages.
Petition filed by PNC Bank N.A. for Inter Partes Review of Claims 1-30 of U.S. Pat. No. 10,013,681, filed Aug. 27, 2021, IPR2021-01381, 127 pages.
Petition filed by PNC Bank N.A. for Inter Partes Review of U.S. Pat. No. 10,013,605, filed Aug. 27, 2021, IPR2021-01399, 113 pages.
Readdle, Why Scanner Pro is Way Better Than Your Camera? (Jun. 27, 2016) retrieved from https://readdle.com/blog/why-scanner-pro-is-way-better-than-your-camera.
Santomero, The Evolution of Payments in the U.S.: Paper vs. Electronic (2005) retrieved from https://web.archive.org/web/20051210185509/https://www.philadelphiafed.org/publicaffairs/speeches/2005 santomero9.html.
Schindler, Scanner Pro Review (Dec. 27, 2016) retrieved from https://www.pcmag.com/reviews/scAnner-pro.
Sing Li & Jonathan Knudsen, Beginning J2ME: From Novice to Professional, Third Edition (2005), ISBN (pbk): 1-59059-479-7, 468 pages.
Wang, Ching-Lin et al. "Chinese document image retrieval system based on proportion of black pixel area in a character image", the 6th International Conference on Advanced Communication Technology, 2004, vol. 1, IEEE, 2004.
Zaw, Kyi Pyar and Zin Mar Kyu, "Character Extraction and Recognition for Myanmar Script Signboard Images using Block based Pixel Count and Chain Codes" 2018 IEEE/ACIS 17th International Conference on Computer and Information Science (CS), IEEE, 2018.
Jung et al., "Rectangle Detection based on a Windowed Hough Transform", IEEE Xplore, 2004, 8 pgs.
Craig Vaream, "Image Deposit Solutions" Emerging Solutions for More Efficient Check Processing, Nov. 2005, 16 pages.
Certificate of Accuracy related to Article entitled, "Deposit checks by mobile" on webpage https://www.elmundo.es/navegante/2005/07/21/empresas/1121957427.html Signed by Christian Paul Scrogum (translator) on Sep. 9, 2021.

* cited by examiner

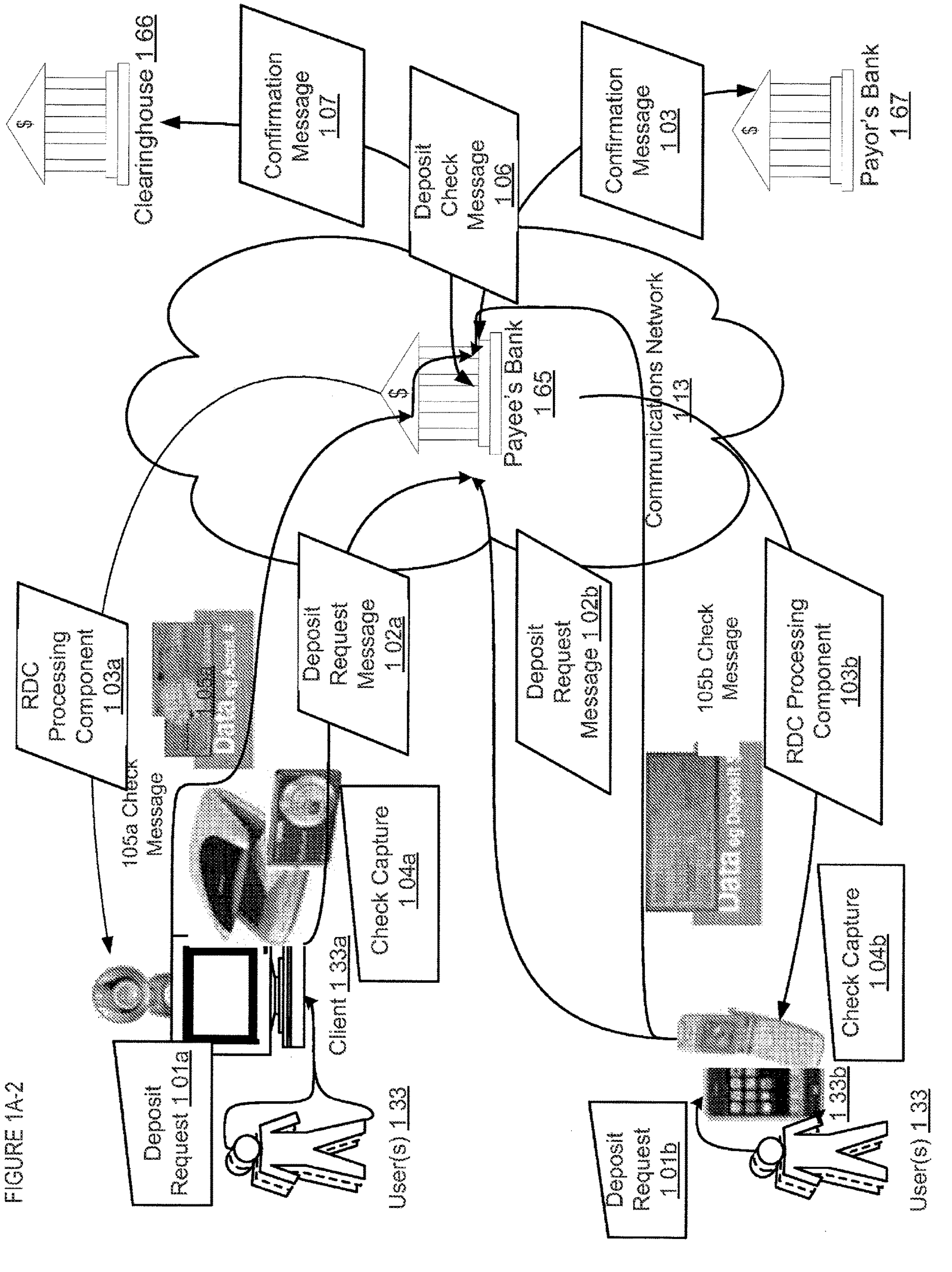
FIGURE 1A-2
Clearinghouse 1 66
Confirmation Message 1 07
Deposit Check Message 1 06
Confirmation Message 1 03
Payor's Bank 1 67
Payee's Bank 1 65
Communications Network 1 13
RDC Processing Component 1 03a
105a Check Message
Deposit Request Message 1 02a
Deposit Request Message 1 02b
105b Check Message
RDC Processing Component 103b
Check Capture 1 04a
Check Capture 1 04b
Client 1 33a
1 33b
Deposit Request 1 01a
Deposit Request 1 01b
User(s) 1 33
User(s) 1 33

FIGURE 6B-2
Grayscale Check Image Taken
6 105
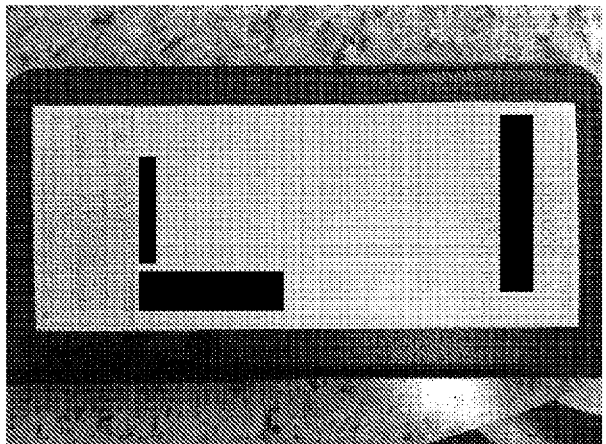
Black and White Virtual Image
6 108
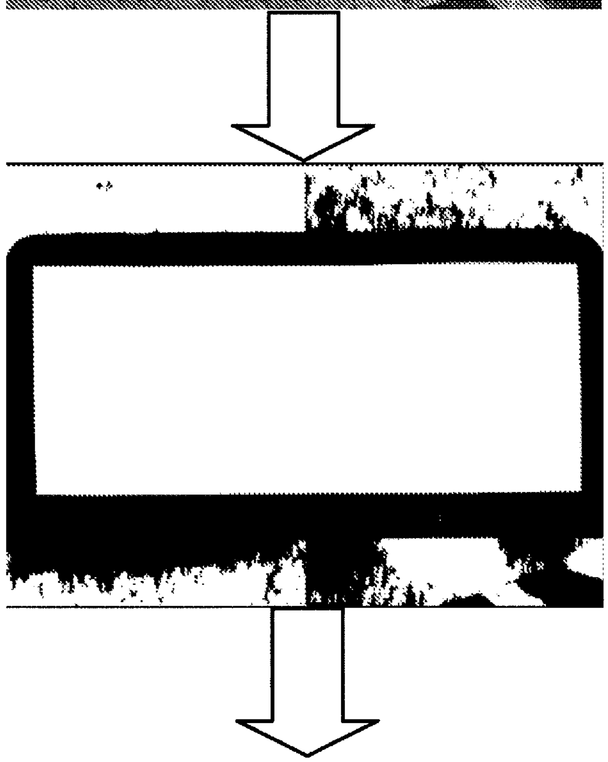
Cropped Image
6 110
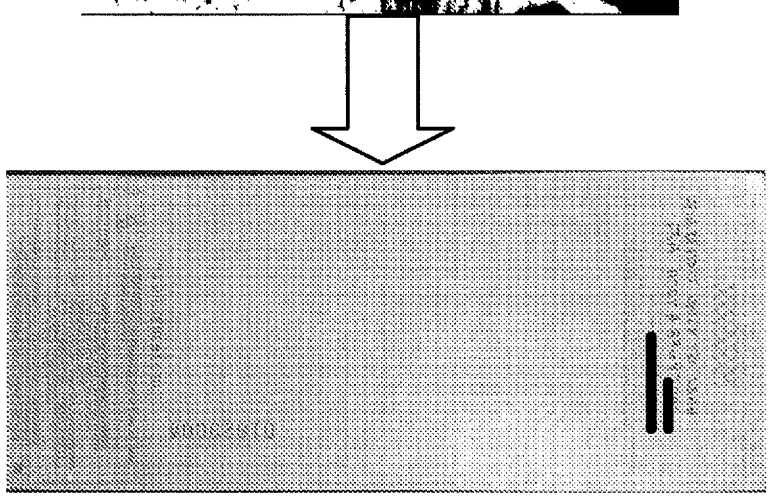

FIGURE 6E

Determine a Membership Function 6 60

Move the Membership Function Pixel by Pixel on X-axis of the Histogram over the Range of Gray Values 6 63

Calcualte a Measure of Fuzziness at Every Position of Membership Function Movement 6 65

Determine the Position with a Mimimum Value of Fuzziness Measure 6 68

Define the Threshold as the Gray Value Corresponding to the Min Fuzziness Position 6 70

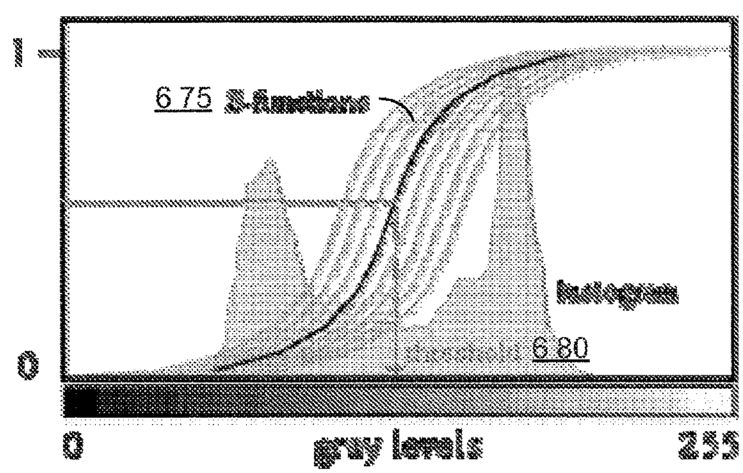

Determine Threshold Values by Minimization of Fuzziness 6 13

11 01

11 02

11 03

Continued at 11 05

1105

1107

1109

Continued at 1115

1115

1118

1120

Continued at 1122

11 22

11 23

11 24

Continued at 11 27

11 27

11 30

11 32

Continued at 11 34

1145

1148

1201

1202

1204

1205

1208

1210

1212

1215

1218

1220

1222

1225

1228

1230

1235

APPARATUSES, METHODS, AND SYSTEMS FOR REMOTE DEPOSIT CAPTURE WITH ENHANCED IMAGE DETECTION

RELATED APPLICATIONS

The present application is a continuation of U.S. application Ser. No. 15/695,770, filed Sep. 5, 2017 (still pending), which is a continuation of U.S. patent application Ser. No. 14/846,586, filed Sep. 4, 2015, now U.S. Pat. No. 9,779,452, issued Oct. 3, 2017, which is a continuation of U.S. patent Ser. No. 12/982,494, filed on Dec. 30, 2010, now U.S. Pat. No. 9,129,340, issued Sep. 8, 2015, which claims the benefit of U.S. provisional patent application Ser. Nos. 61/352,762, 61/352,772 and 61/352,775, all filed on Jun. 8, 2010 an entitled "Apparatuses, Methods and Systems For A Remote Deposit Capture Platform", the entire disclosures of each of which are incorporated by reference herein.

FIELD

The present invention is directed generally to apparatuses, methods, and systems of remote deposit of financial instruments, and more particularly, to APPARATUSES, METHODS AND SYSTEMS FOR REMOTE DEPOSIT CAPTURE WITH ENHANCED IMAGE DETECTION.

BACKGROUND

Negotiable instruments such as checks, money orders, banknotes etc., have been widely used to replace cash payments. For example, a payee may receive paychecks as salary payment from his or her employer. In order to obtain the payment amount, the payee may need to deposit the check in an account at the payee's bank, and have the bank process the check. In some cases, the payee may take the paper check to a branch of the payee's bank, and cash the check at the bank counter. Once the check is approved and all appropriate accounts involved have been credited, the check may be stamped with some kind of cancellation mark by a bank clerk, such as a "paid" stamp.

BRIEF DESCRIPTION OF THE DRAWINGS

The accompanying appendices and/or drawings illustrate various non-limiting, example, inventive aspects in accordance with the present disclosure:

FIGS. 6A-H provide logic flow diagrams and examples illustrating aspects of an enhanced corner/edge detection in one embodiment of the RDC-Detection;

Figures 1, 1A:
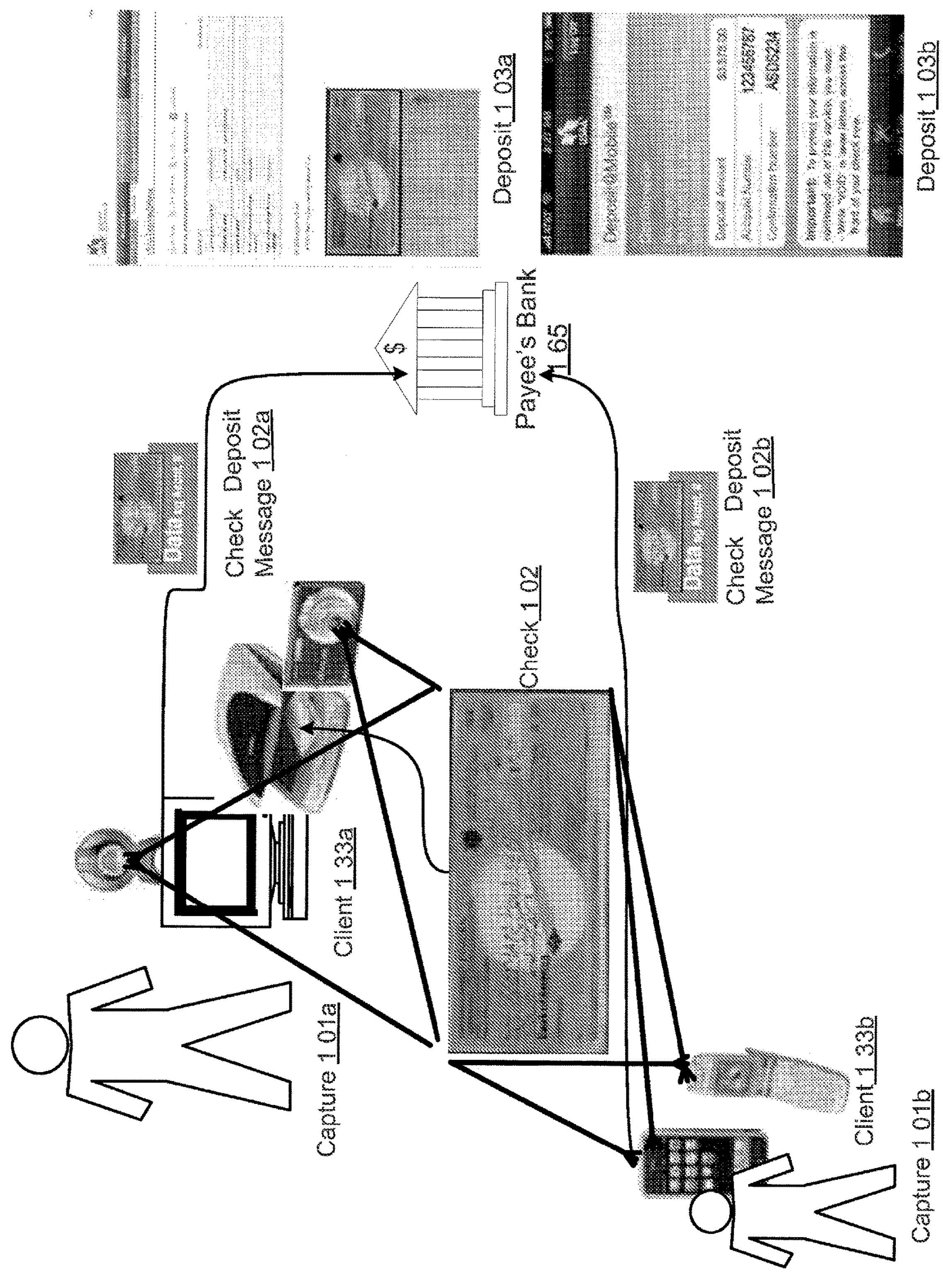
FIG. 1A-C are of block diagrams illustrating embodiments of overview data flows between an RDC-Detection system and affiliated entities in embodiments of the RDC-Detection.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights.

The entire disclosures of the following applications are herein expressly incorporated by reference: U.S. patent application Ser. No. 11/935,584, filed Nov. 6, 2007, entitled "SYSTEMS, METHODS, AND APPARATUS FOR RECEIVING IMAGES OF ONE OR MORE CHECKS," U.S. patent application Ser. No. 11/868,890, filed Oct. 8, 2007, entitled "SYSTEMS AND METHODS FOR PROCESSING REMOTE DEPOSIT OF CHECKS,", U.S. patent application Ser. No. 11/926,265, filed Oct. 29, 2007, entitled "Systems and Methods to Address the Multiple Presentment of a Check," U.S. patent application Ser. No. 11/927,814, filed Oct. 30, 2007, entitled "SYSTEMS AND METHODS TO MODIFY A NEGOTIABLE INSTRUMENT," U.S. patent application Ser. No. 11/928,297, filed Oct. 30, 2007, entitled "SYSTEMS AND METHODS TO DEPOSIT A NEGOTIABLE INSTRUMENT," U.S. patent application Ser. No. 11/931,670, filed Oct. 31, 2007, entitled "SYSTEMS AND METHODS TO USE A DIGITAL CAMERA TO REMOTELY DEPOSIT A NEGOTIABLE INSTRUMENT," U.S. patent application Ser. No. 11/930,537, filed Oct. 31, 2007, entitled "SYSTEMS AND METHODS TO MULTIPLE ACCOUNT ELECTRONIC DEPOSIT OF A NEGOTIABLE INSTRUMENT," U.S. patent application Ser. No. 12/062,143, filed Apr. 3, 2008, entitled "CASH DEPOSIT VIA MONEY ORDER," U.S. patent application Ser. No. 12/098,609, filed Apr. 7, 2008, entitled "VIDEO FINANCIAL DEPOSIT," U.S. patent application Ser. No.

12/137,051, filed Jun. 11, 2008, entitled "DUPLICATE CHECK DETECTION," U.S. patent application Ser. No. 12/244,830, filed Jun. 11, 2008, entitled "DUPLICATE CHECK DETECTION," U.S. patent application Ser. No. 12/195,723, filed Aug. 21, 2008, entitled "SYSTEMS AND METHODS FOR MOBILE DEPOSIT OF NEGOTIABLE INSTRUMENTS," U.S. patent application Ser. No. 12/202,781, filed Sep. 2, 2008, entitled "SYSTEMS AND METHODS OF CHECK RE-PRESENTMENT DETERRENT," U.S. patent application Ser. No. 12/254,185, filed Oct. 20, 2008, entitled "SYSTEMS AND METHODS FOR EMAILING A CHECK," U.S. patent application Ser. No. 12/205,996, filed Sep. 8, 2008, entitled "SYSTEMS AND METHODS FOR LIVE VIDEO FINANCIAL DEPOSIT," U.S. patent application Ser. No. 12/242,063, filed Sep. 30, 2008, entitled "ATOMIC DEPOSIT TRANSACTION,", U.S. patent application Ser. No. 12/257,471, filed Oct. 24, 2008, entitled "SYSTEMS AND METHODS FOR FINANCIAL DEPOSITS BY ELECTRONIC MESSAGE," U.S. patent application Ser. No. 12/253,278, filed Oct. 17, 2008, entitled "SYSTEMS AND METHODS FOR ADAPTIVE BINARIZATION OF AN IMAGE," U.S. patent application Ser. No. 12/388,005, filed Feb. 18, 2009, entitled "SYSTEMS AND METHODS OF CHECK DETECTION," U.S. patent application Ser. No. 12/397,671, filed Mar. 4, 2009, entitled "SYSTEMS AND METHODS OF CHECK IMAGE UPLOAD FOR DEPOSIT," U.S. patent application Ser. No. 12/397,930, filed Mar. 4, 2009, entitled "SYSTEMS AND METHODS OF CHECK PROCESSING WITH BACKGROUND REMOVAL," U.S. patent application Ser. No. 12/545,127, filed Aug. 21, 2009, entitled "SYSTEMS AND METHODS FOR IMAGE MONITORING OF CHECK DURING MOBILE DEPOSIT," U.S. patent application Ser. No. 12/509,613, filed Jul. 27, 2009, entitled "SYSTEMS AND METHODS FOR REMOTE DEPOSIT OF NEGOTIABLE INSTRUMENT USING BRIGHTNESS CORRECTION," U.S. patent application Ser. No. 12/509,680, filed Jul. 27, 2009, entitled "SYSTEMS AND METHODS FOR CHECK DATA PROCESSING FOR CHECK RECREATION," U.S. patent application Ser. No. 12/509,680, filed Jul. 27, 2009, entitled "SYSTEMS AND METHODS FOR CHECK DATA PROCESSING FOR CHECK RECREATION,", U.S. patent application Ser. No. 11/591,131, filed Oct. 31, 2006, entitled "REMOTE DEPOSIT OF CHECKS," U.S. patent application Ser. No. 11/321,027, filed Dec. 29, 2005, entitled "REMOTE DEPOSIT OF CHECKS," U.S. patent application Ser. No. 11/487,537, filed Jul. 13, 2006, entitled "METHODS AND SYSTEMS FOR IMPROVING NOTIFICATION OF AND ACCESS TO REMOTE DEPOSITS," U.S. patent application Ser. No. 11/591,008, filed Oct. 31, 2006, entitled "DEAD-CHECK REPOSITORY," U.S. patent application Ser. No. 11/591,014, filed Oct. 31, 2006, entitled "SYSTEMS AND METHODS FOR REMOTE DEPOSIT OF CHECKS," U.S. patent application Ser. No. 11/591,003, filed Oct. 31, 2006, entitled "SYSTEMS AND METHODS FOR REMOTE DEPOSIT OF CHECKS," U.S. patent application Ser. No. 11/591,273, filed Oct. 31, 2006, entitled "SYSTEMS AND METHODS FOR REMOTE DEPOSIT OF CHECKS," U.S. patent application Ser. No. 11/591,262, filed Oct. 31, 2006, entitled "SYSTEMS AND METHODS FOR CLEARING NEGOTIABLE INSTRUMENTS IN LIEU OF USING DIGITAL IMAGES," U.S. patent application Ser. No. 11/590,998, filed Oct. 31, 2006, entitled "SYSTEMS AND METHODS FOR DISPLAYING NEGOTIABLE INSTRUMENTS DERIVED FROM VARIOUS SOURCES," U.S. patent application Ser. No. 11/686,930, filed Mar. 15, 2007, entitled "SYSTEMS AND METHODS FOR VERIFICATION OF REMOTELY DEPOSITED CHECKS," U.S. patent application Ser. No. 11/686,928, filed Mar. 15, 2007, entitled "SYSTEMS AND METHODS FOR CHECK REPRESENTMENT PREVENTION," U.S. patent application Ser. No. 11/747,219, filed May 10, 2007, entitled "SYSTEMS AND METHODS FOR REAL-TIME VALIDATION OF CHECK IMAGE QUALITY," U.S. patent application Ser. No. 11/877,307, filed Oct. 23, 2007, entitled "SYSTEMS AND METHODS FOR OBTAINING AN IMAGE OF A CHECK TO BE DEPOSITED," U.S. patent application Ser. No. 11/876,889, filed Oct. 23, 2007, entitled "SYSTEMS, METHODS, AND APPARATUS FOR RECEIVING IMAGES OF ONE OR MORE CHECKS," and U.S. patent application Ser. No. 12/549,443, filed Aug. 28, 2009, entitled "SYSTEMS AND METHODS FOR ALIGNMENT OF CHECK DURING MOBILE DEPOSIT".

Introduction

The RDC-Detection provides a platform that allows a user to deposit a check by taking an image of the check and electronically transmitting the image to the user's bank. For example, in one embodiment, the user may operate a smart phone (e.g., an Apple iPhone, etc.) to initiate the remote deposit, wherein the smart phone may automatically download and instantiate a remote deposit software component, which controls the smart phone to capture via its built-in camera, process and send the image of the check. For another example, the user may perform remote deposit by downloading and instantiating the remote deposit software component on their home computer connected to a standard home-use or office-use scanner/photocopier/fax machine. In one embodiment, the user's bank may receive and process the image of the check to obtain deposit information (e.g., via optical character recognition, etc.), and complete the requested deposit based on the deposit information.

The various embodiments described herein may be electronically performed by different entities such as, but not limited to a bank server, a user device, a third party agent, and/or the like. Those embodiments may also be performed by other entities.

FIG. 1A-1 is a block diagram illustrating Remote Deposit Capture ("RDC"). In various embodiments, a user 101 can use various client devices 133 to capture an image of a check 102, send it to their bank 165 over a communications network, and cause the deposit of the check 103*a*, 103*b* remotely. For example, the user 101*a* may use a desktop computer with a scanner, webcam, camera, etc. 133*a* to scan, video, photograph, etc. a digital copy of the check 102. In another embodiment, the user 101*b* may use a mobile device equipped with a camera 133*b* to capture a copy of the check, such as a: cellphone, PDA, smartphone, tablet, etc. Once a copy of the check is captured, the user's client 133 sends a check deposit message 102*a*, 102*b* to the user's, i.e., the payee's, bank 165; the check deposit image may include an image of the check and accompanying client account information (e.g., account number, deposit amount, etc.). The bank's server(s) may then evaluate the check deposit message and deposit the check 103 (e.g., via the desktop client 133*a* and the web, via an application component on the mobile device 103*b*, etc.).

Figure 6A:
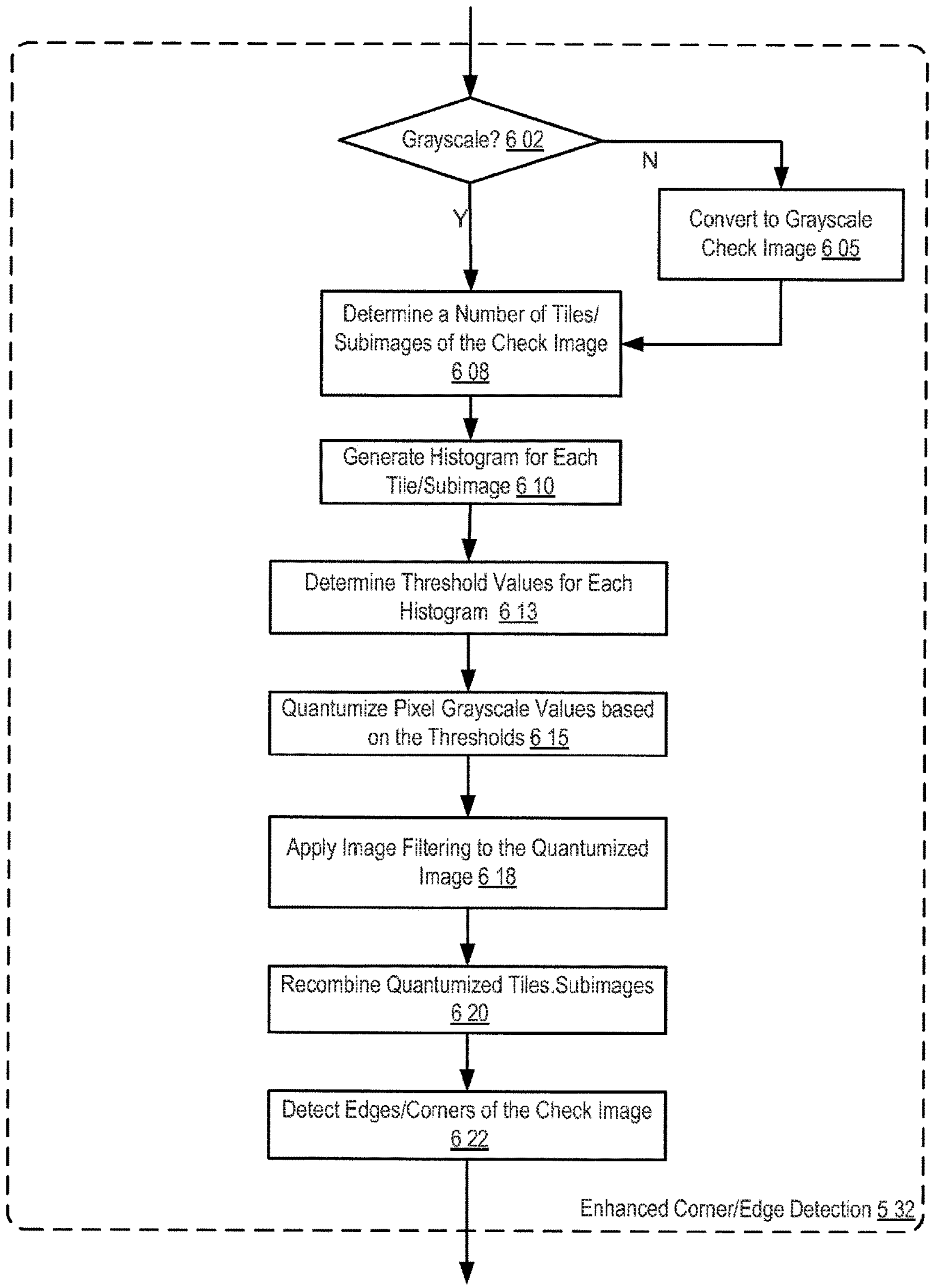
Figures 1, 6B:
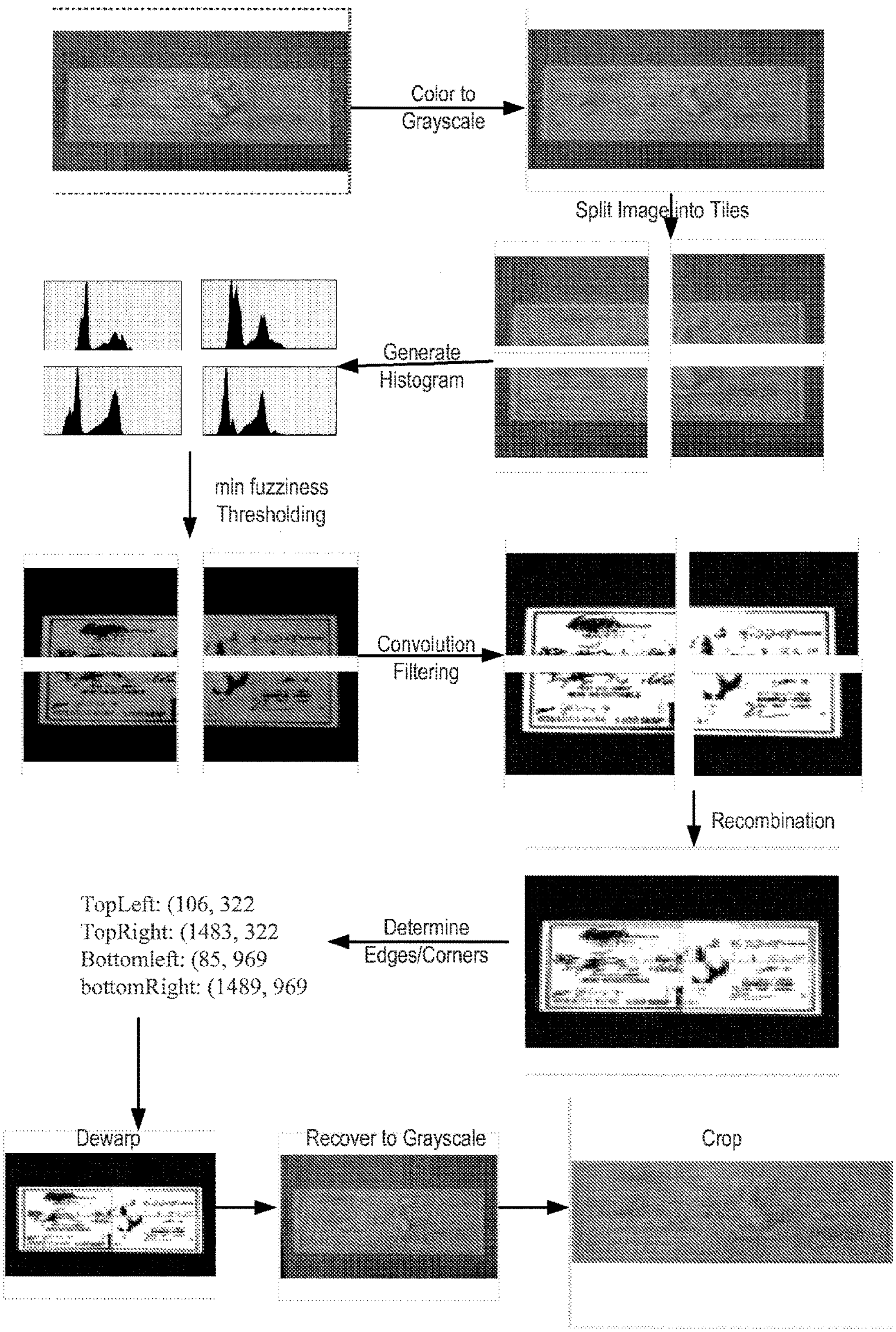
Figure 6C:
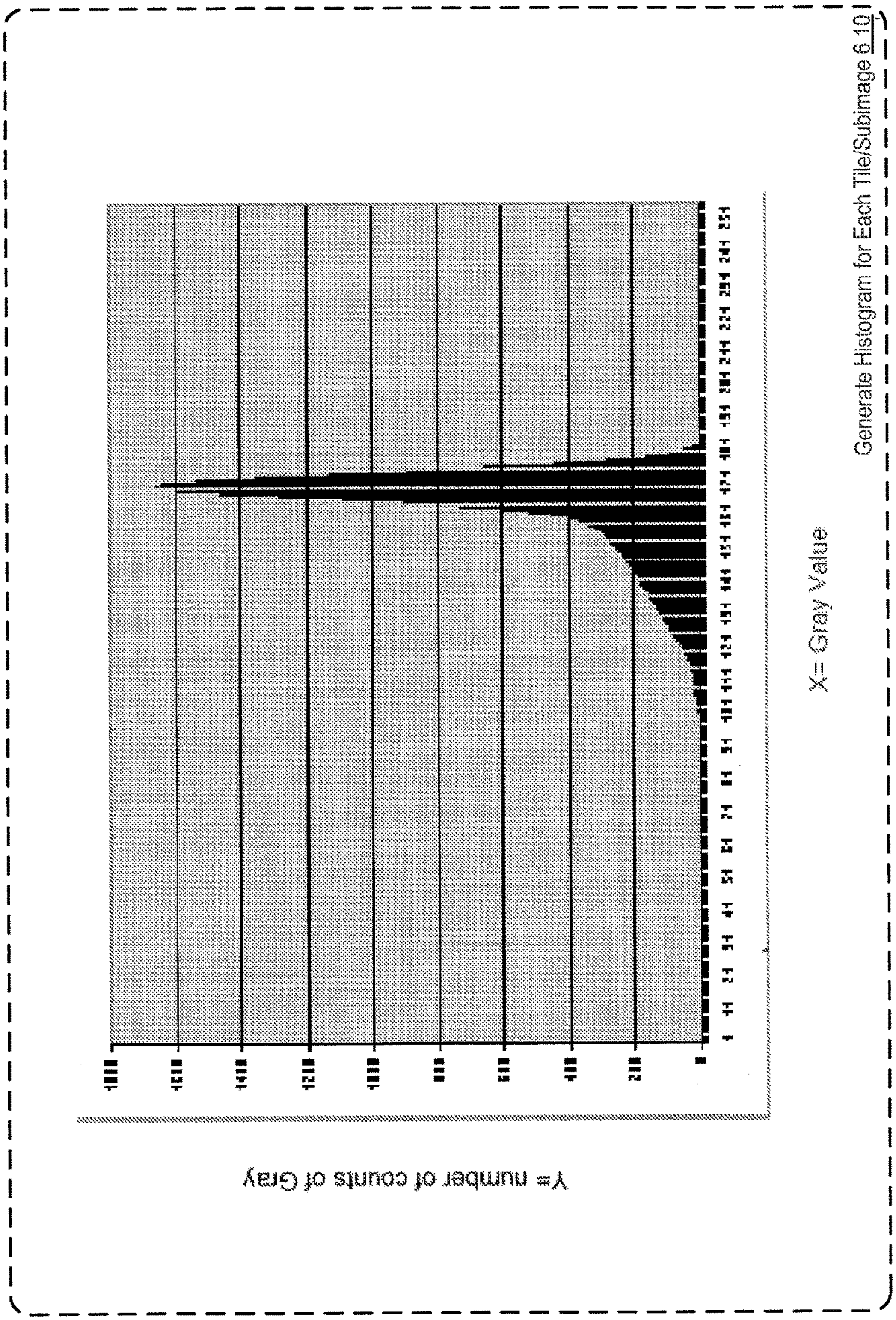
Figure 6D:
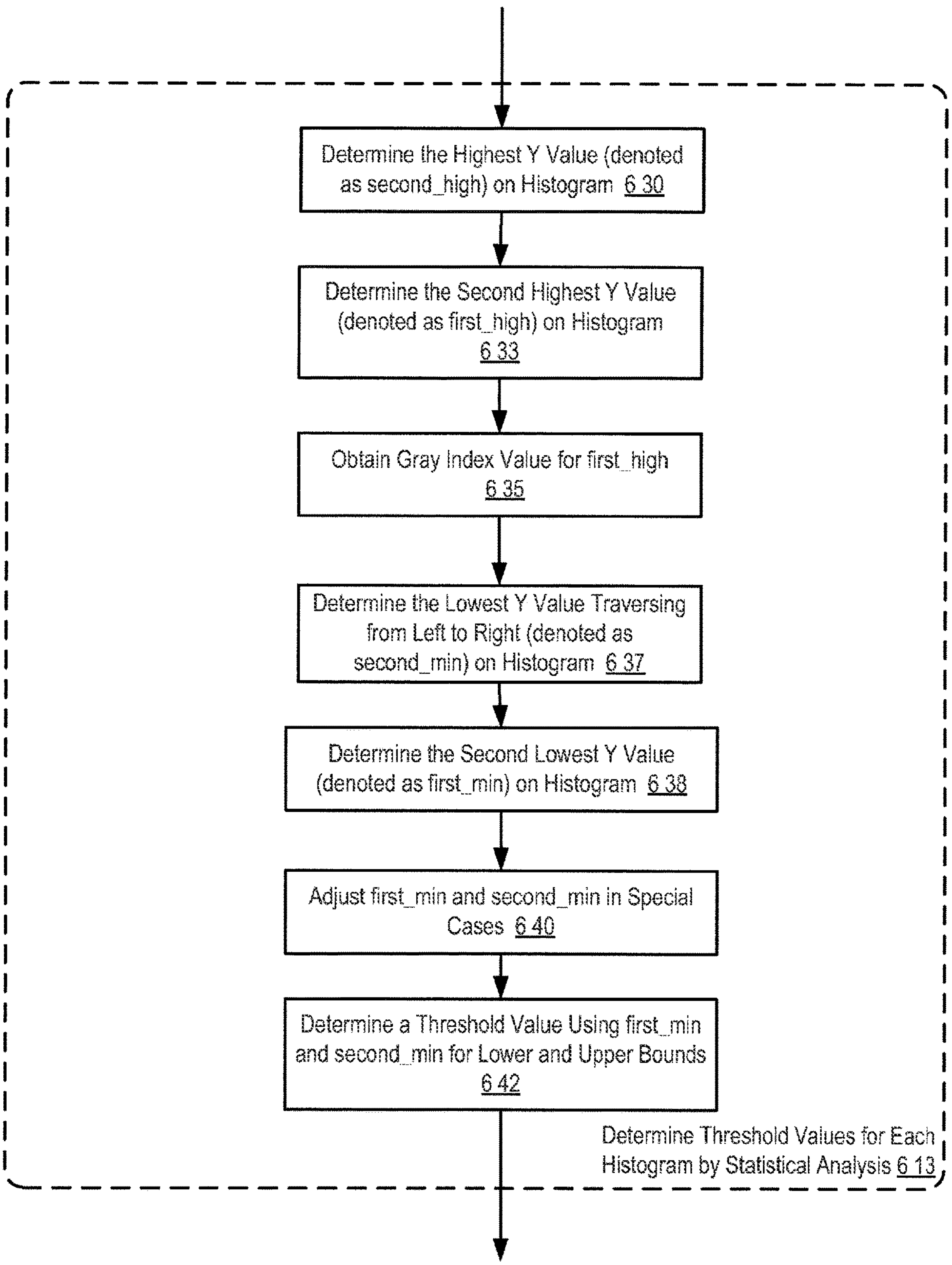
Figure 6F:
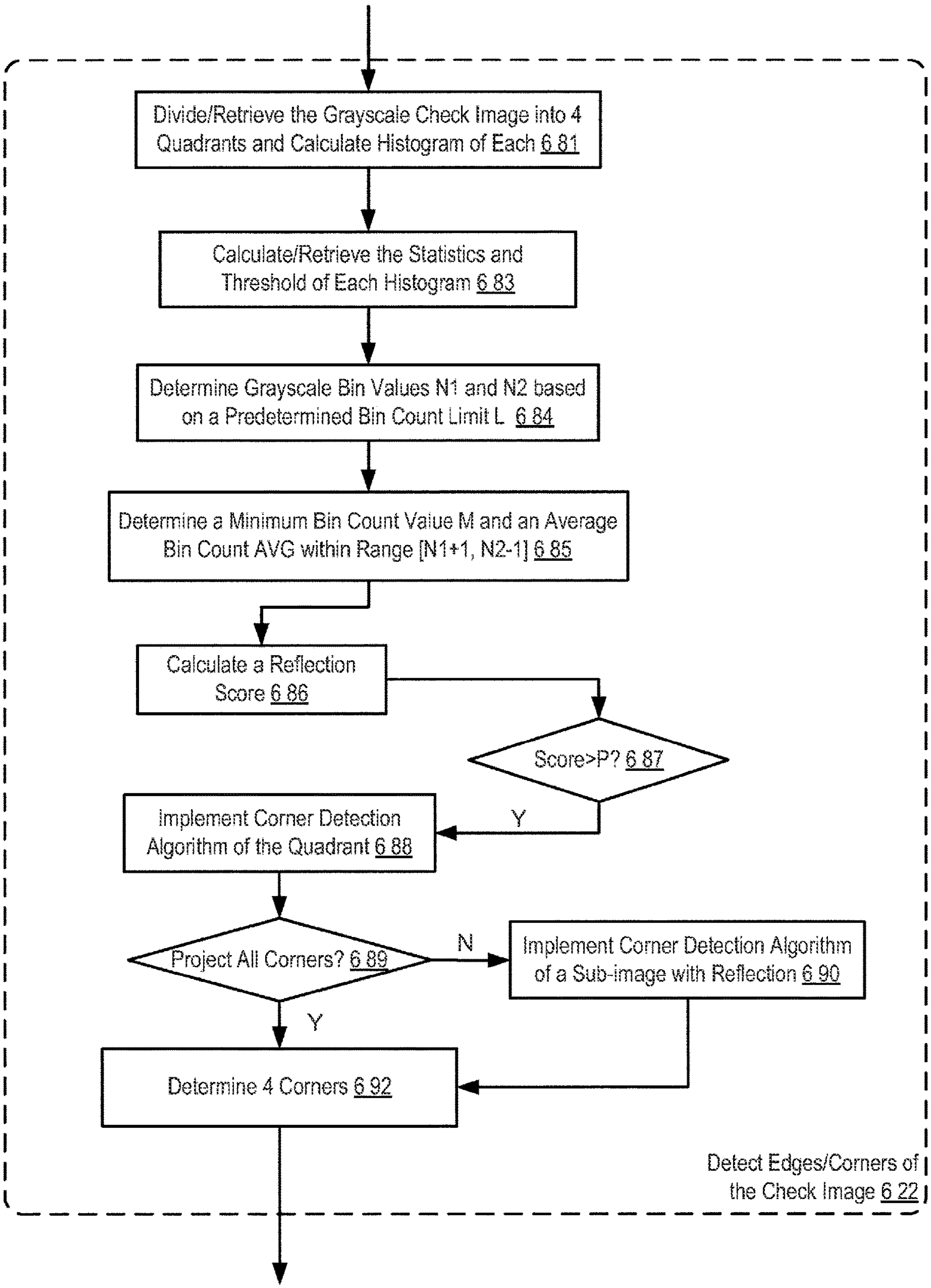
Figure 6G:
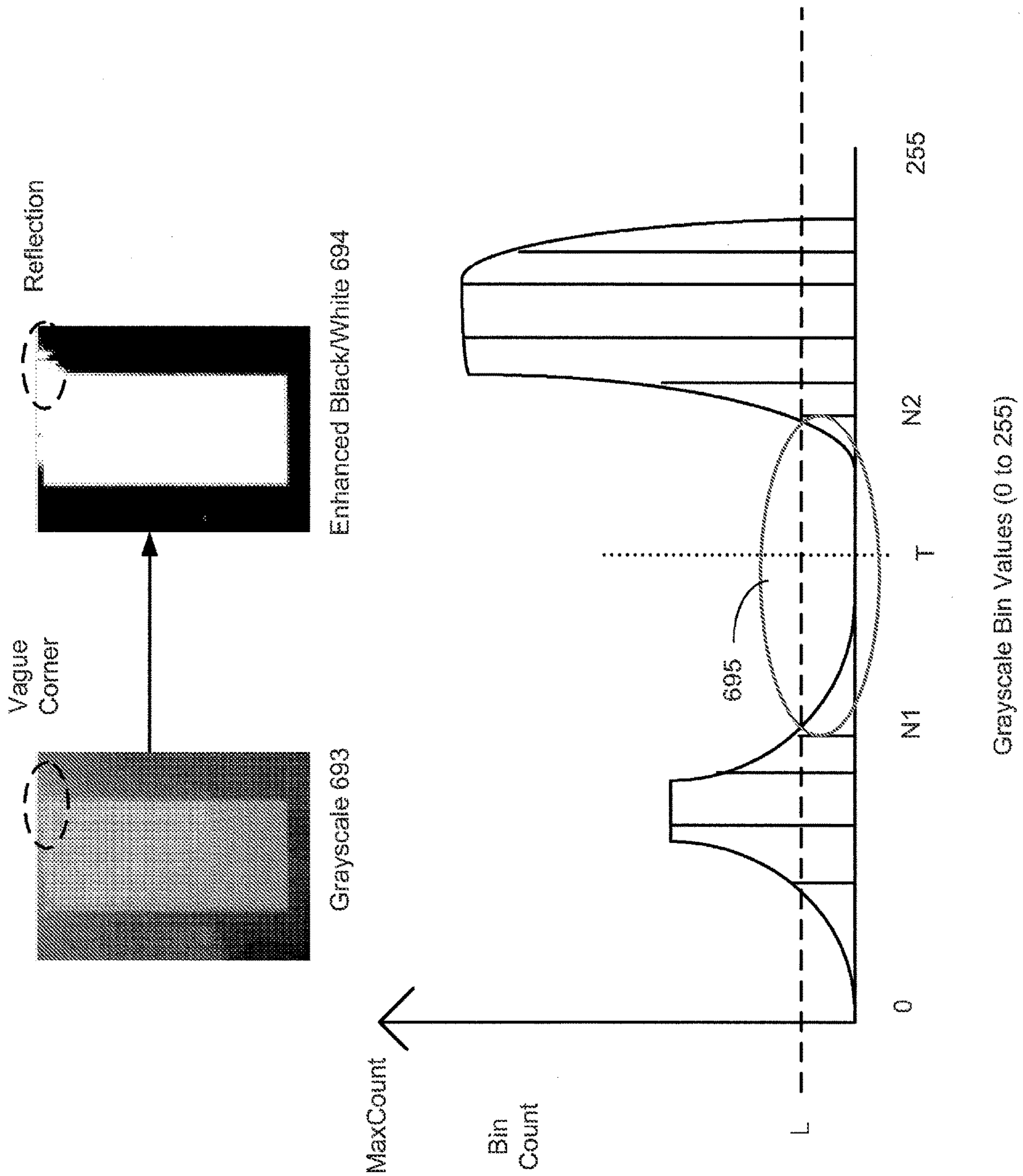
Figures 1, 6H:
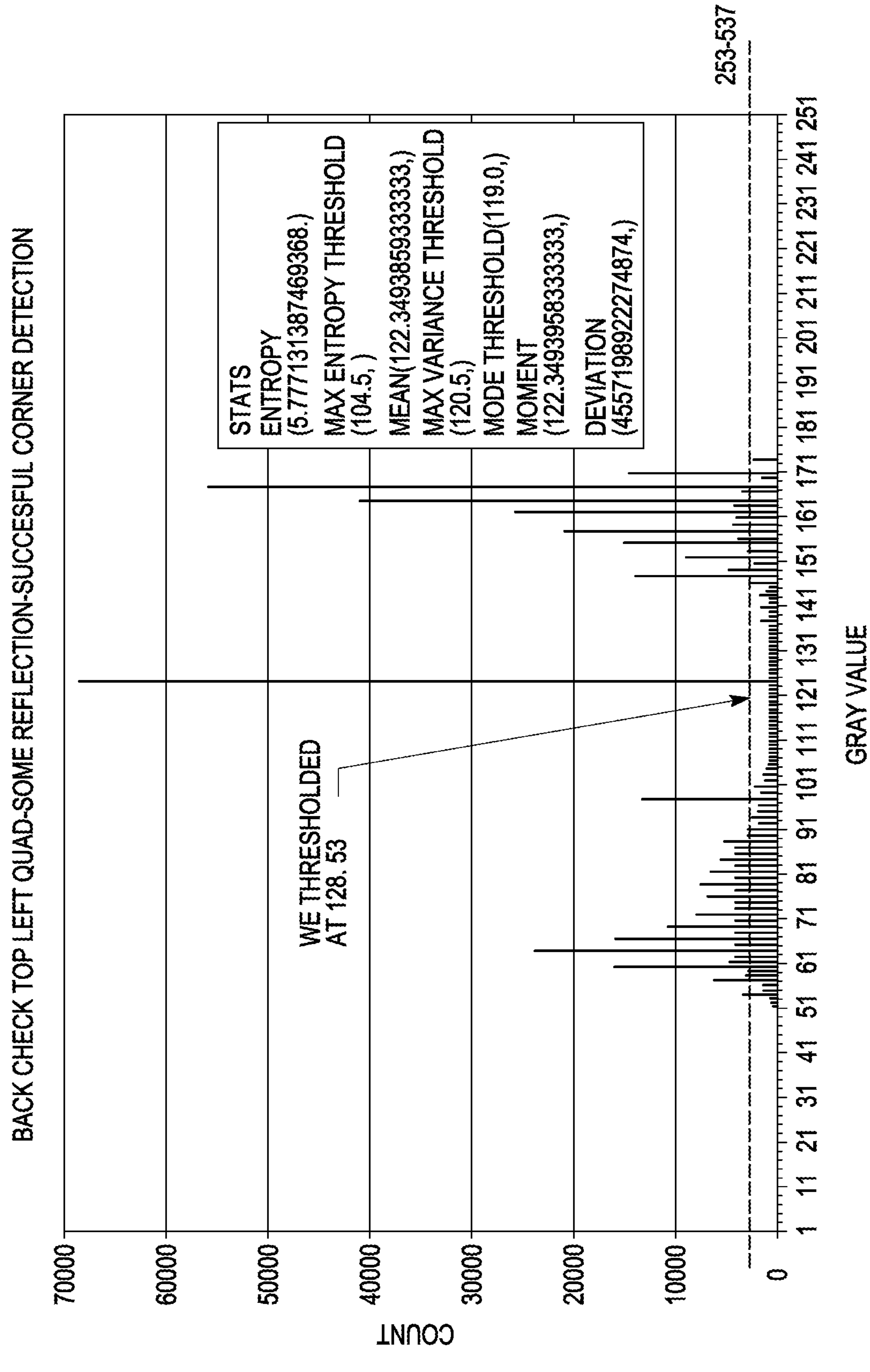
Figures 2, 6H:
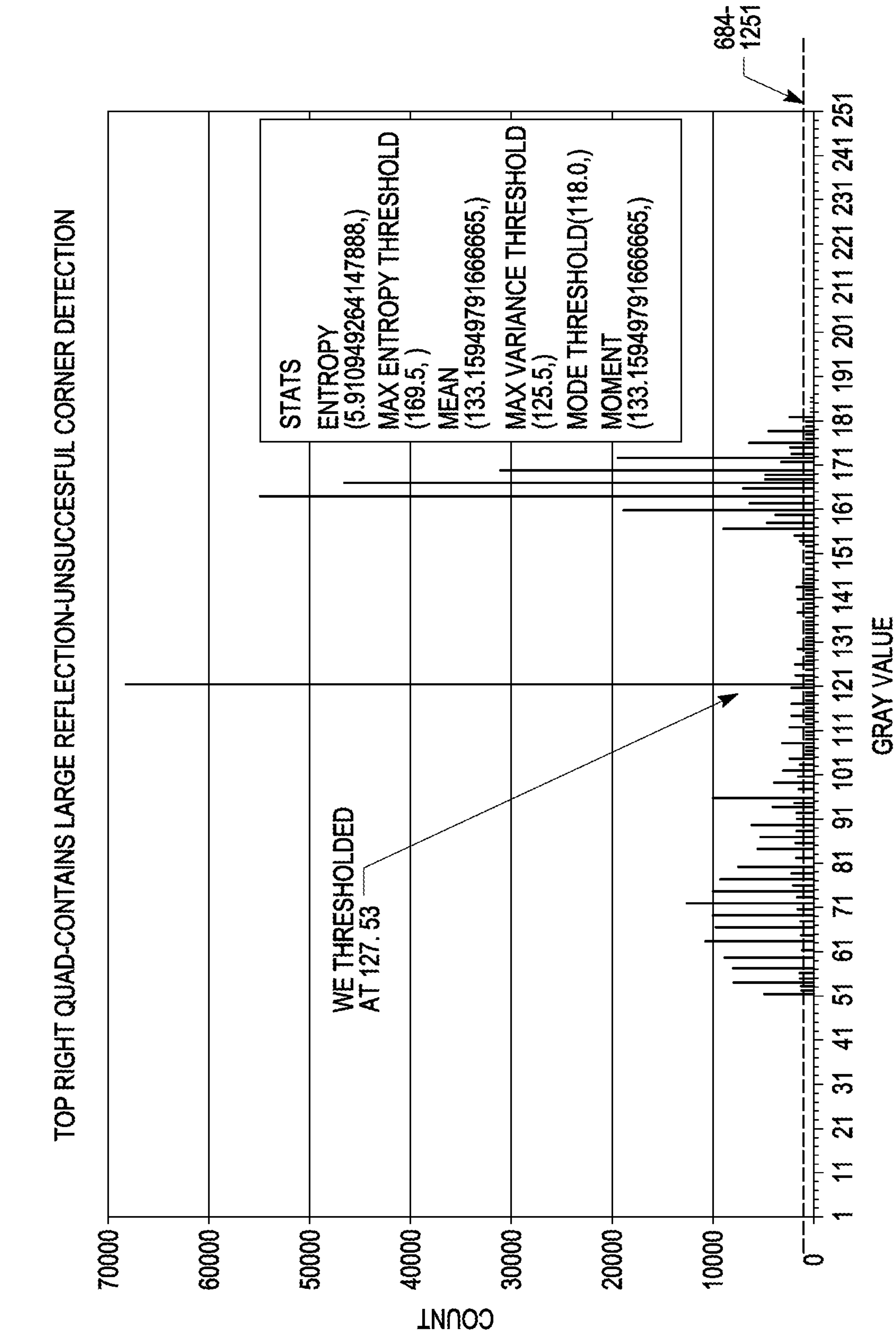
Figures 3, 6H:
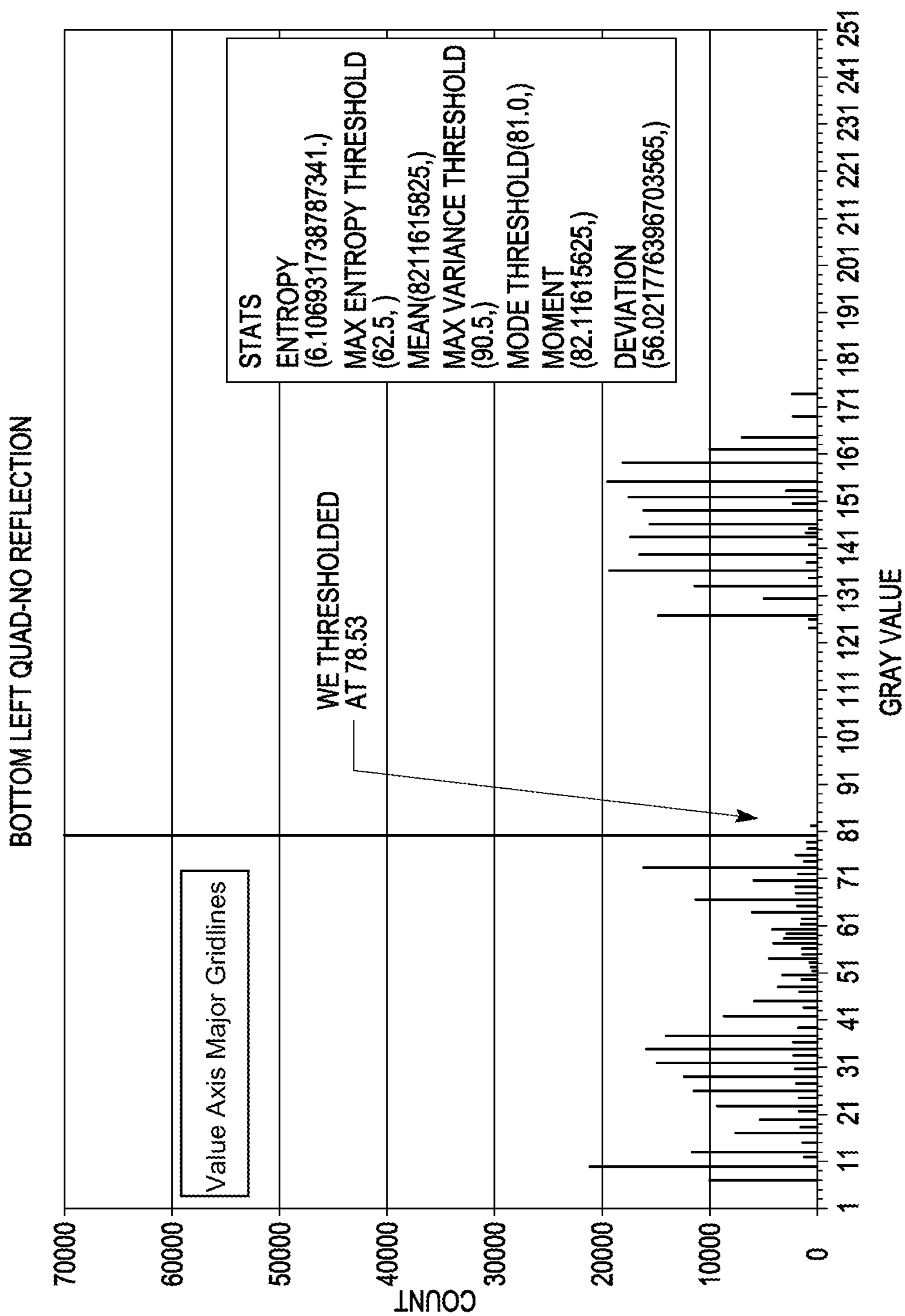
Figures 4, 6H:
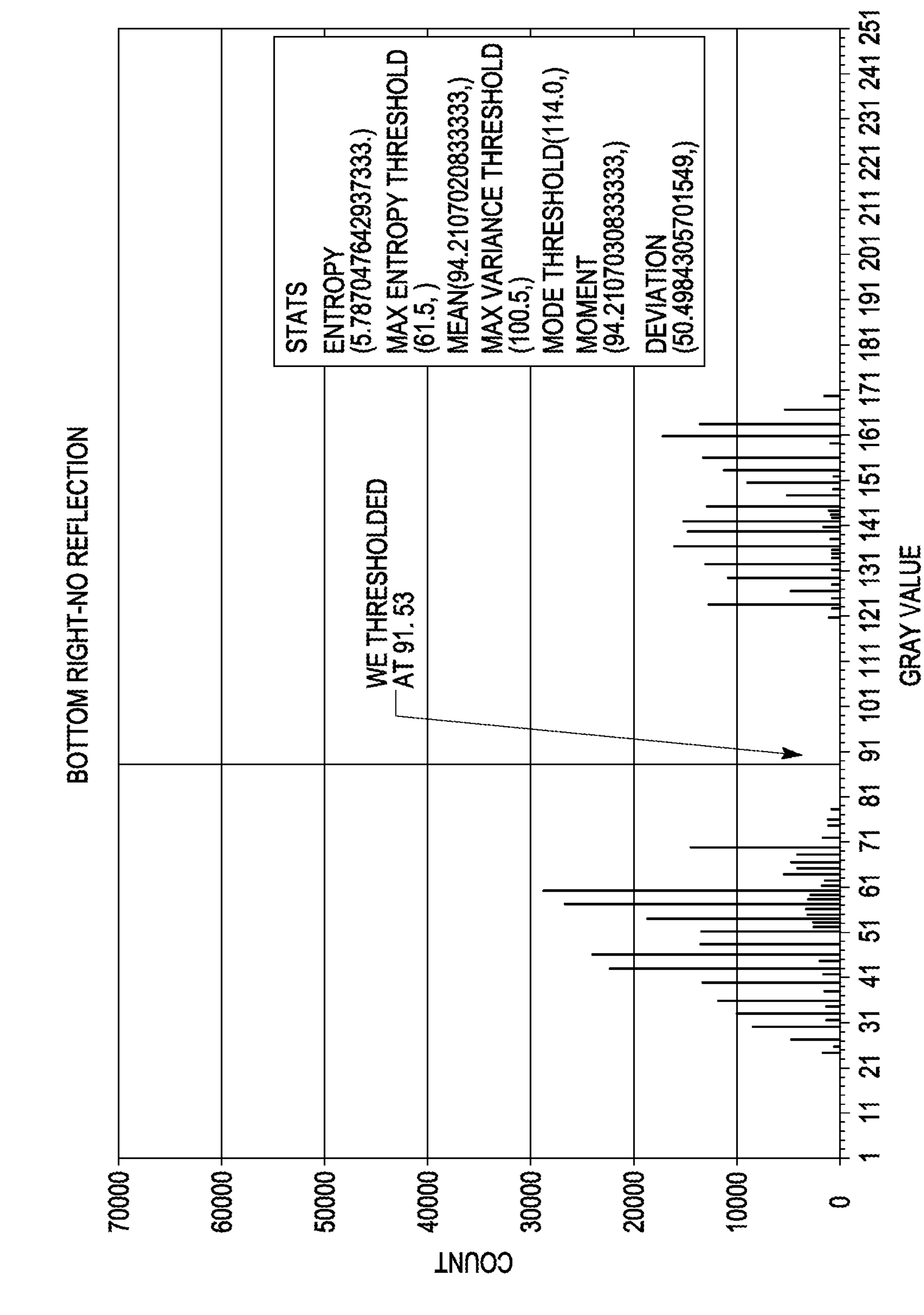

FIG. 1A-2 is a block diagram further illustrating data flows within entities of the RDC detection system. In various embodiments, a user 133 may initiate a deposit request 101*a*/101*b* on a client device, such as a personal computer 133*a* connected to a web camera, a digital camera, a scanner and/or the like, a mobile phone (e.g., an Apple iPhone) 133*b*, and/or the like. In one embodiment, a deposit request message 102*a*/102*b* may be sent from the client device 133*a*/133*b* to the payee's bank 165 via the communication network 113, and the bank server 165 may deliver a RDC processing component 103*a*/103*b* to the client device 133*a*/133*b*. For example, the RDC processing component may be Java applets downloaded from a remote deposit web site hosted by the RDC-Detection platform.

The client device 133*a*/133*b* may then generate a check capture image 104*a*/104*b* via camera, scanner, web camera, mobile phone, etc., under control of the RDC processing component 103*a*/103*b* running on the personal computer 133*a* and/or the mobile phone 133*b*, and generate a check deposit message 105*a*/105*b*. For example, the check deposit message 105*a*/105*b* may comprise the captured check image 104*a*/104*b*, and any check deposit metadata, such as user entered deposit amount, user account number, and/or the like.

In one implementation, the payee's bank 165 may process the received check message 105*a*/105*b* to generate a deposit check message 106 for the clearinghouse 166 and payor's bank 167. Upon clearing the check, the payee's bank 165 may receive deposit confirmation message 103 from the payor's bank for amount withdrawal confirmation from the payor's account, and a confirmation message 107 from the clearinghouse 166 for check clearance confirmation.

RDC-Detection

This disclosure details the implementation of apparatuses, methods and systems of remote deposit capture with enhanced check image detection (hereinafter, "RDC-Detection"). RDC-Detection systems may, in one embodiment, implement a remote deposit application on a secured network system, whereby the remote deposit application may obtain, process and store images of a negotiable instrument, and generate virtualized negotiable instruments for deposit.

For example, in one embodiment, a user (e.g., the payee) who wants to deposit a check, may capture an image of the check by a user image capture device, e.g., a scanner connected to a computer, a mobile device having a built-in camera, a digital camera, and/or the like. In another implementation, the user may take a video clip of the check and submit the video file. In one embodiment, the user may send the captured check image to a financial institution, e.g., a payee's bank with RDC-Detection service. The RDC-Detection platform receiving the check image may then process the check image and extract deposit data from the digital check image. For example, in one implementation, the RDC-Detection may perform a series of image analysis procedures to enhance the received check image and extract deposit information such as payee's name, payee's bank, account number, bank routing number, deposit amount, and/or the like. In one implementation, after initial verification of the extracted deposit data, the RDC-Detection may post the deposit through direct banking and save the check image and the associated check deposit information in a transaction depository. In one implementation, the RDC-Detection may generate a substitute check (e.g., an X9.37 cash letter file) based on the received check image and send it to a clearinghouse bank (e.g., a regional branch of the Federal Reserve) for check clearance. In one implementation, the RDC-Detection may confirm, or cancel the soft posting of deposit funds based on the result of check clearance.

In another example implementation, a user may deposit cash or a check at a third party agent which is located remotely from a bank. For example, the third party agent may include, but is not limited to a point of sale at a store participating in the RDC-Detection service, a RDC-Detection terminal located at a gas station, and/or the like. In another implementation, the third party agent may be an express mailing service representative carrying a portable check/cash reading device to provide RDC-Detection service, e.g., UPS®, Fedex®, etc. In one implementation, the user may walk in a RDC-Detection participating store and present a check or cash for deposit. The third party agent may process the remote deposit request by generating and sending an image of the check to a remote deposit server, or by calculating and verifying the presented cash for deposit.

It is to be understood that, depending on the particular needs and/or characteristics of a RDC-Detection application, associated IDE, associated operating system, user interface, object, administrator, server, hardware configuration, network framework, and/or the like, various embodiments of the RDC-Detection may be implemented that enable a great deal of flexibility and customization. The instant disclosure discusses embodiments of the RDC-Detection primarily within the context of remote deposit of "checks" from a payee to a bank hereinafter. However, it is to be understood that the system described herein may be readily adopted for deposits of other types of negotiable instruments, such as a money order, a bank note, and/or the like, and configured/customized for a wide range of other applications or implementations. It is to be understood that the RDC-Detection may be further adapted to other implementations or communications and/or data transmission applications, such as but not limited to a general entity-to-entity payment system.

For example, In some embodiments, the RDC-Detection may allow a payee to apply the deposit, or a portion thereof, to the payment of one or more bills, such as a credit card payment, insurance bill payment, car payment, etc.

For another example, in some embodiments, the RDC-Detection may allow users to apply the deposit (or portion thereof) to a non-US Dollar denominated account. For example, in one implementation, a user may wish to apply a deposit of a $100 (USD) check into a Euro-denominated account. In one implementation, if the user selects an "USD to Euro" deposit option, the RDC-Detection may determine and notify the user of the exchange rate that will be used for the transaction (i.e., how much, in Euros, will be deposited into the user's account). In some embodiments, the RDC-Detection may prompt the user to approve the conversion, while in other embodiments, the conversion and deposit will occur automatically.

RDC-Detection Block View

Figure 1B:
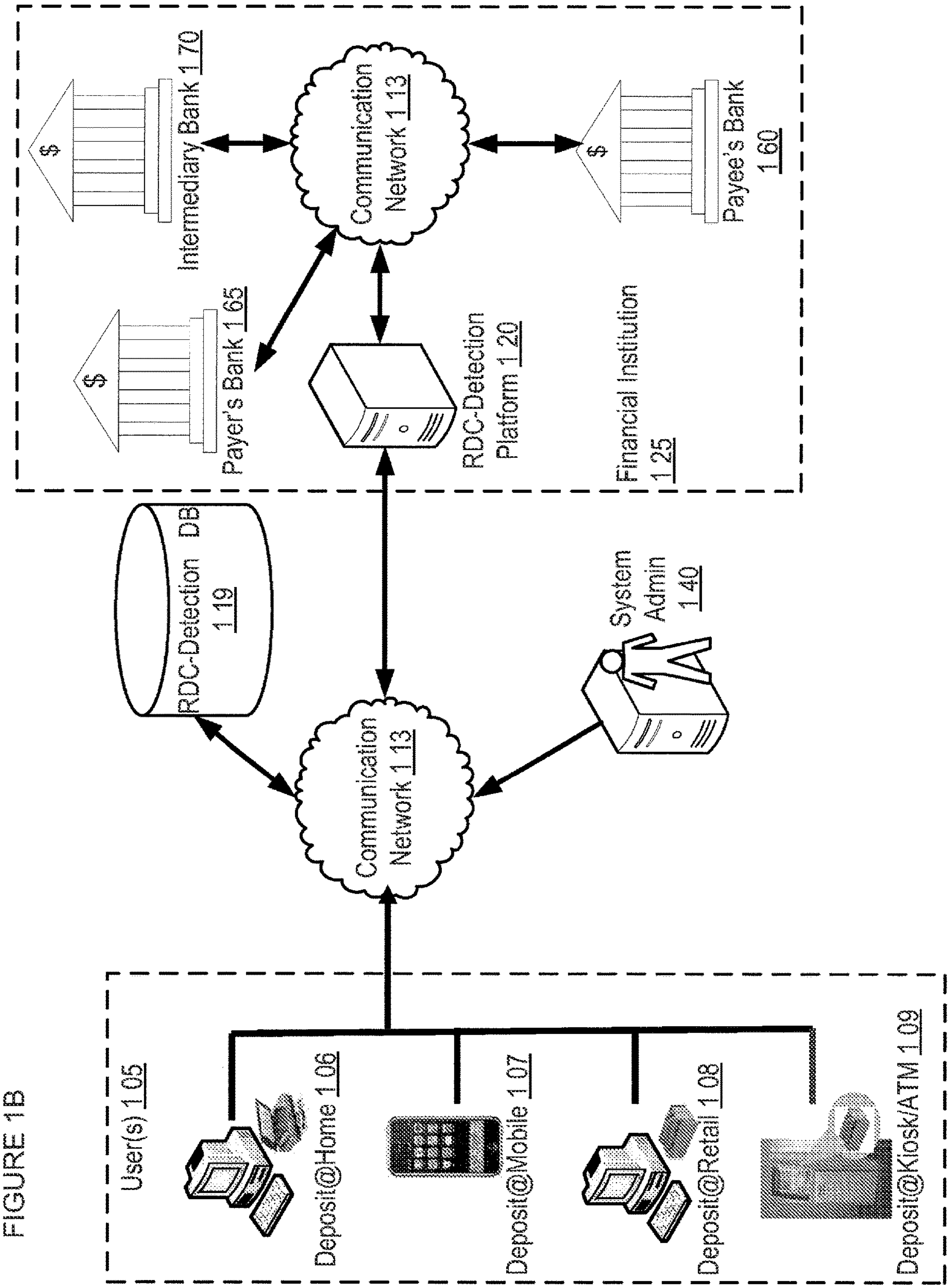

FIG. 1B is of a block diagram illustrating an overview of an implementation of data flows between a RDC-Detection system and affiliated entities in embodiments of the RDC-Detection. In FIG. 1, a user (or users) 105 operating different depositing devices 106-109, a RDC-Detection platform 120, a RDC-Detection database 119, a payer's bank 165, a payee's bank 160 and a system administrator 140 are shown to interact via a communication network 113.

In one embodiment, the user 105 may be a payee who may deposit a check into an account at the payee's bank 160 by converting the check into electronic data (e.g., digital check images, etc.) and sending the data to the bank via a communication network 113. In one implementation, secured transport protocol such as SSL, and/or the like may be employed for the communication between the user 105 and the RDC-Detection platform 120. In one embodiment, the user 105 may deposit the check on different occasions and through a variety of different devices and technologies of generating electronic check data. For example, in one implementation, the user 105 may deposit the check at home 106 by obtaining a check image via an image capture device (e.g., a camera, a scanner, etc.) controlled by a home computer. In another implementation, the user 105 may use a mobile device with a built-in camera (e.g., iPhone, BlackBerry, etc.) to take a picture of the check. In another implementation, the user 105 may deposit the check at a retail Point of Sale (POS) terminal 108, a kiosk or a Check 21 ATM 109, etc. by submitting the paper check to the deposit facility to generate images of the check for deposit. In a further implementation, the user 105 may take live video of the check via a device with built-in video camera (e.g., Apple iPhone, etc.) and send the video clip of the check to the RDC-Detection platform 120.

In one embodiment, the electronic data sent from the user 105 may include extracted data information from the check. For example, in one implementation, the user 105 may use a Magnetic Ink Character Recognition (MICR) device to scan and translate the MICR information (e.g., account number, routing number, check number, etc.) located on the check and transmit the data to the RDC-Detection platform 120 along with digital image files or video clip files of the check. In one implementation, the electronic data may include a user entered value indicating an amount to be deposited, and/or other user submitted information.

The RDC-Detection facilitates connections through the communication network 113 based on a broad range of protocols that include WiFi, Bluetooth, 3G cellular, Ethernet, ATM, and/or the like. In one embodiment, the communication network 113 may be the Internet, a Wide Area Network (WAN), a public switched telephone network (PSTN), a cellular network, a voice over internet protocol (VoIP) network, a Local Area Network (LAN), a Peer-to-Peer (P2P) connection, an ATM network and/or the like. In one implementation, the user 105 may communicate with financial institutions 125 by phone, email, instant messaging, facsimile, and/or the like.

In one embodiment, the financial institutions 125 may be any type of entity capable of processing a transaction involving a check deposit. For example, the financial institution 125 may be a retail bank, investment bank, investment company, regional branch of the Federal Reserve, clearinghouse bank, correspondent bank, and/or the like. In one embodiment, the financial institution 125 may include a RDC-Detection platform 120, the payee's bank 160 and the payer's bank 165. In one implementation, the RDC-Detection platform 120 may be housed within the payee's bank 160 as a built-in facility of the payee's bank for processing remote check deposits. In another implementation, the RDC-Detection platform 120 may be associated with an entity outside the payee's bank, as a remote deposit service provider.

In one embodiment, the RDC-Detection platform 120 may receive and process electronic data of deposit information from the user 105 via the communication network. For example, in one implementation, the RDC-Detection platform 120 may generate check image in compliance with deposit formats (e.g., a Check 21 compliant check image file, a X9.37 cash letter check image, and/or the like), based on the received electronic data from the user 105. In one implementation, the RDC-Detection platform may analyze metadata associated with the received check image/video files such as GPS information, time stamp of image capture, IP address, MAC address, system identifier (for retail POS/kiosk deposits) and/or the like.

In one implementation, upon receipt and approval of the electronic deposit data, the payee's bank 160 may credit the corresponding funds to the payee's account. In one implementation, the RDC-Detection platform 120 may clear the check by presenting the electronic check information to an intermediary bank 170, such as a regional branch of the Federal Reserve, a correspondent bank and/or a clearinghouse bank. In one embodiment, the payer's account at the payer's bank 165 may be debited the corresponding funds.

In one embodiment, the RDC-Detection entities such as the RDC-Detection platform 120, and/or the like, may also communicate with a RDC-Detection database 119. In some embodiments, distributed RDC-Detection databases may be integrated in-house with the RDC-Detection platform 120, and/or the payee's bank 160. In other embodiments, the RDC-Detection entities may access a remote RDC-Detection database 119 via the communication network 113. In one embodiment, the RDC-Detection entities may send data to the database 119 for storage, such as, but not limited to user account information, application data, transaction data, check image data, user device data, and/or the like.

In one embodiment, the RDC-Detection database 119 may be one or more online database connected to a variety of vendors and financial institutions, such as hardware vendors (e.g., Apple Inc., Nokia, Sony Ericsson, etc.), deposit banks (e.g., Bank of America, Wells Fargo, etc.), service vendors (e.g., clearinghouse banks, etc.) and/or the like, and obtain updated hardware driver information, software updates from such vendors. In one embodiment, the RDC-Detection platform 120 may constantly, intermittently, and/or periodically download updates, such as updated user profile, updated software programs, updated command instructions, and/or the like, from the RDC-Detection database 119 via a variety of connection protocols, such as Telnet FTP, HTTP transfer, P2P transmission and/or the like.

In one embodiment, a system administrator 140 may communicate with the RDC-Detection entities for regular maintenance, service failure, system updates, database renewal, security surveillance and/or the like via the communication network 113. For example, in one implementation, the system administrator 140 may be a system manager at the payee's bank, who may directly operate with the RDC-Detection platform 120 via a user interface to configure system settings, inspect system operations, and/or the like.

Figure 2A:
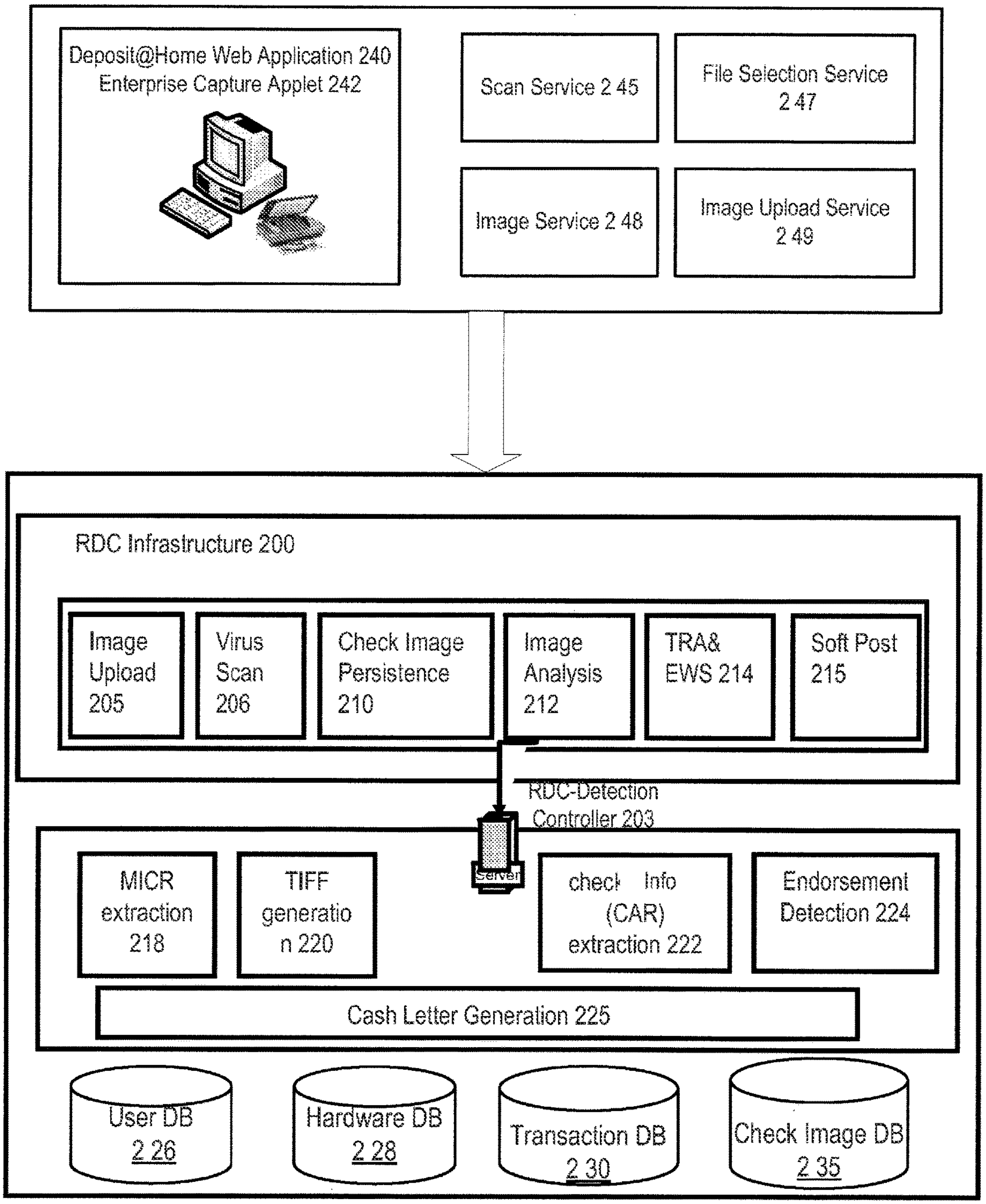
FIG. 2A-C provide diagrams of example infrastructures of the RDC-Detection system for home deposit, mobile deposit, kiosk/ATM/Retail deposit in one embodiment of the RDC-Detection.
Figure 2B:
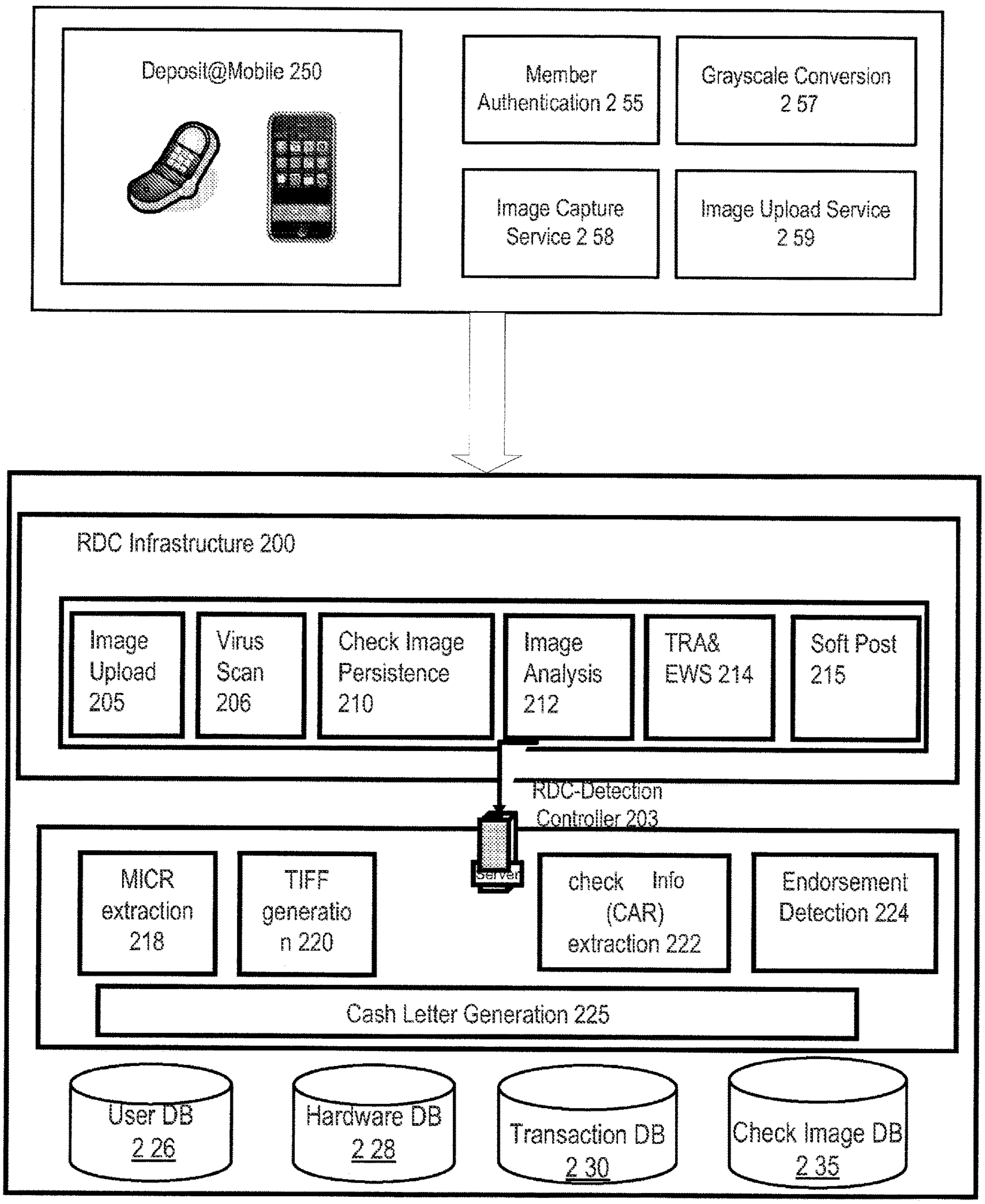
Figure 2C:
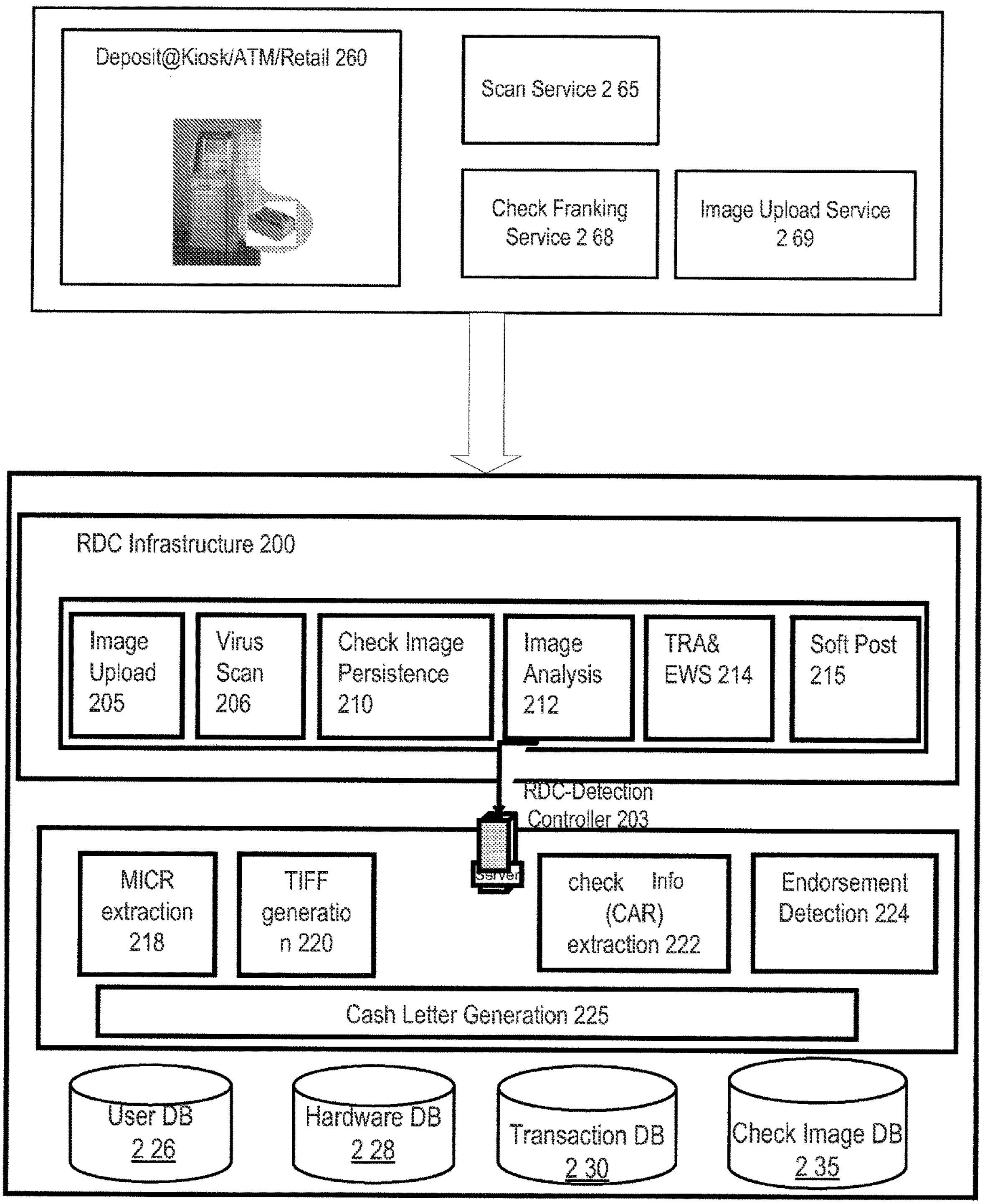

FIGS. 2A-C show diagrams of example infrastructures of the RDC-Detection system for home deposit, mobile deposit, kiosk/ATM/Retail deposit in one embodiment of the RDC-Detection. In some embodiments, as shown in FIGS. 2A-C, the RDC-Detection infrastructure 200 may contain a number of functional modules and/or data stores. A RDC-Detection controller 203 may serve a central role in some embodiments of RDC-Detection operation, serving to orchestrate the reception, generation, modification, and distribution of data and/or instructions, to, from, and between RDC-Detection modules and/or mediate communications with external entities and systems.

In one embodiment, the RDC-Detection controller 203 may be housed separately from other modules and/or databases within the RDC-Detection system, while in another embodiment, some or all of the other modules and/or databases may be housed within and/or configured as part of the RDC-Detection controller. Further detail regarding implementations of RDC-Detection controller operations, modules, and databases is provided below.

In the implementation illustrated in FIG. 2A, the RDC-Detection controller 203 may be configured to couple to external entities via a user interface and a network interface. The user interface may, for example, receive and configure user control commands sent to/from the RDC-Detection, secured user account information, user submitted configuration data, and/or the like. In one implementation, the user interface may include, but not limited to devices such as, keyboard(s), mouse, stylus(es), touch screen(s), digital display(s), and/or the like. In various implementations, the network interface may, for example, serve to configure data into application, transport, network, media access control, and/or physical layer formats in accordance with a network transmission protocol, such as, but is not limited to, FTP, TCP/IP, SMTP, Short Message Peer-to-Peer (SMPP) and/or the like. For example, the network interface 210 may be configured for receipt and/or transmission of data to an external and/or network database. The network interface may further be configurable to implement and/or translate Wireless Application Protocol (WAP), VoIP and/or the like data formats and/or protocols. The network interface may further house one or more ports, jacks, antennas, and/or the like to facilitate wired and/or wireless communications with and/or within the RDC-Detection system.

In one implementation, the RDC-Detection controller 203 may further be coupled to a plurality of modules configured to implement RDC-Detection functionality and/or services. The plurality of modules may, in one embodiment, be configurable to establish a secured communications channel with a remote image capture device and implement a remote deposit service application. In some embodiments, the remote deposit service application may obtain and analyze check images, and generate virtual checks (e.g., Check 21 X9.37 cash letter files, etc.) for deposit. In one embodiment, the daemon application may comprise modules such as, but not limited to a Image Upload module 205, a Virus Scan module 206, a Check Image Persistence module 210, an Image Analysis module 212, a TRA & EWS Service module 214, a Soft Post module 215, a MICR Extraction module 218, a TIFF Generation module 220, a Check Information Extraction module 222, an Endorsement Detection 224, a Cash Letter Generation module 225, and/or the like.

In one embodiment, the Image Upload module 205 may establish a secured communications channel with a user image capture device and receive submitted check images. In one embodiment, the Image Upload module 205 may initialize an image upload application which may remotely control the image capture device to obtain and upload check images via the secured communications channel as will be further illustrated in FIGS. 4A-C. In one embodiment, the Image Upload module 205 may also receive streamed video and/or video files of checks. In one embodiment, the Virus Scan module 206 may inspect the received digital files to prevent, detect, and remove malware, including computer viruses, worms, trojan horses and/or the like. For example, in one implementation, the RDC-Detection may employ antivirus software such as, but not limited to McAfee VirusScan, Symantec AntiVirus Scan, and/or the like.

In one embodiment, the Check Image Persistence module 210 may check the persistence of the received check image files. For example, in one implementation, the Check Image Persistence module 210 may check the image file format, file storage pattern, and/or the like. In one implementation, the Check Image Persistence module 210 may check the storage format of the metadata associated with the check image file.

In one embodiment, the Image Analysis module 212 may process the received check digital file, such as image usability and quality check, video frame image grab, and/or the like, as will be further illustrated in FIGS. 5 and 6A-H. In one embodiment, the TIFF Generation module 220 may convert a received color image to a grayscale image prior to image processing of module 212.

In one embodiment, the Magnetic Ink Character Recognition (MICR) Extraction module 218 may perform an optical character recognition (OCR) procedure on the processed check image and extract the MICR line on the check. Checks typically contain MICR information (e.g., routing number, account number and check number) on the bottom left-hand corner of the check. In one embodiment, the Check Information Extraction module 222 may perform an optical character recognition (OCR) procedure to extract information of the check, including the payee's name, the deposit amount, check number, and/or the like. In one embodiment, the Endorsement Detection module 224 may detect whether the check image contains a depositor's signature.

In another embodiment, the MICR information may consist of characters written in a magnetic ink. The MICR information may be read electronically by passing the check through the MICR device, which may translate the characters by magnetizing the ink. If a user converts the check into electronic data by scanning the check using a MICR device, the MICR module may directly parse the information contained in the MICR data submitted by the user.

In one embodiment, the Soft Post module 215 may provisionally credit the payee's account with the deposit amount after processing the received check image. In one embodiment, the Cash Letter Generation module 225 may generate and submit an X9.37 cash letter check image file to a clearinghouse bank (e.g., a regional branch of the Federal Reserve Bank, etc.) to clear the transaction and/or implement representment check after the soft post, as will be further illustrated in FIGS. 8A-C.

In one implementation, the RDC-Detection controller 203 may further be coupled to one or more databases configured to store and/or maintain RDC-Detection data. A user database 226 may contain information pertaining to account information, contact information, profile information, identities of hardware devices, Customer Premise Equipments (CPEs), and/or the like associated with users, device configurations, system settings, and/or the like. A hardware database 228 may contain information pertaining to hardware devices with which the RDC-Detection system may communicate, such as but not limited to Email servers, user telephony devices, CPEs, gateways, routers, user terminals, and/or the like. The hardware database 228 may specify transmission protocols, data formats, and/or the like suitable for communicating with hardware devices employed by any of a variety of RDC-Detection affiliated entities. A transaction database 230 may contain data pertaining to check deposit transactions. In one embodiment, the transaction database 230 may include fields such as, but not limited to: check deposit timestamp, payee's name, payee' bank name, account number, bank routing number, deposit amount, deposit method, deposit device, check image index, check clearance information, and/or the like. A check image database 235 may contain a repository of processed check images associated with a transaction.

The RDC-Detection database may be implemented using various standard data-structures, such as an array, hash, (linked) list, struct, structured text file (e.g., XML), table, and/or the like. For example, in one embodiment, the XML for a transaction in the transaction database 225 may take a form similar to the following example:

```
<Transaction>
  . . .
  <ID>MyTransaction1_0008</ID>
  <Receive Time>5/12/2009 11:30:00</Receive Time>
  <Device_ID>iPhone 6HS8D </Device_ID>
  <Payee_Name>
  Joe Dow
  </Payee_Name>
  <Payee_Bank> First Regional Bank </Payee_Bank>
Deposit_amount>1000.00<Deposit_amount>
  <Post_Time>5/12/2009 11:31:23</Post_Time>
<Image_ID> MyImage3214232</Image_ID>
  <Clearance_bank> Clearinghouse Bank
</Clearance_bank>
  <Deposit_status> confirmed </Deposit_status>
  . . .
</Transaction>
```

In FIG. 2A, in one implementation, a home scanner or other home image capture device connected to a computer may be utilized for home deposit. In one embodiment, the home deposit may be implemented via a web application 240 and/or an enterprise capture applet 242 (if the depositor is an enterprise entity) embedded in a deposit website. For example, in one implementation, a user may visit a RDC-Detection website to perform remote deposit. In one implementation, the deposit web service may include scan service 245 to control the scanner to obtain images of a check, image service 248 to allow a user to save and edit check image files, file selection service 247 and image upload service 249 to facilitate a user to select and upload a check image file and/or the like, as will be further illustrated in FIGS. 4A-C.

In another embodiment, for mobile deposit 250, as shown in FIG. 2B, a pre-installed RDC application on the mobile device, or the embedded RDC component of a website may control the mobile device to perform member authentication 255, image capturing 258, grayscale conversion 257 of the check image, and image upload 259. For example, in one implementation, the RDC-Detection may prompt the mobile device user to login at the RDC website with a username and password. For another example, the RDC-Detection may identify the user mobile device to authenticate the user as a member if the mobile device is registered for the RDC service.

In another embodiment, as shown in FIG. 2C, for kiosk/ATM/retail deposit 260, the facility may provide scan service 265, image upload service 269 and check franking service 268. For example, in one implementation, the deposit facility at the kiosk/ATM/retail may print "ELECTRONICALLY PRESENTED" across the front of the original check when the check is scanned to avoid representment of the check, and endorse the back of the check with deposit confirmation.

Figure 1C:
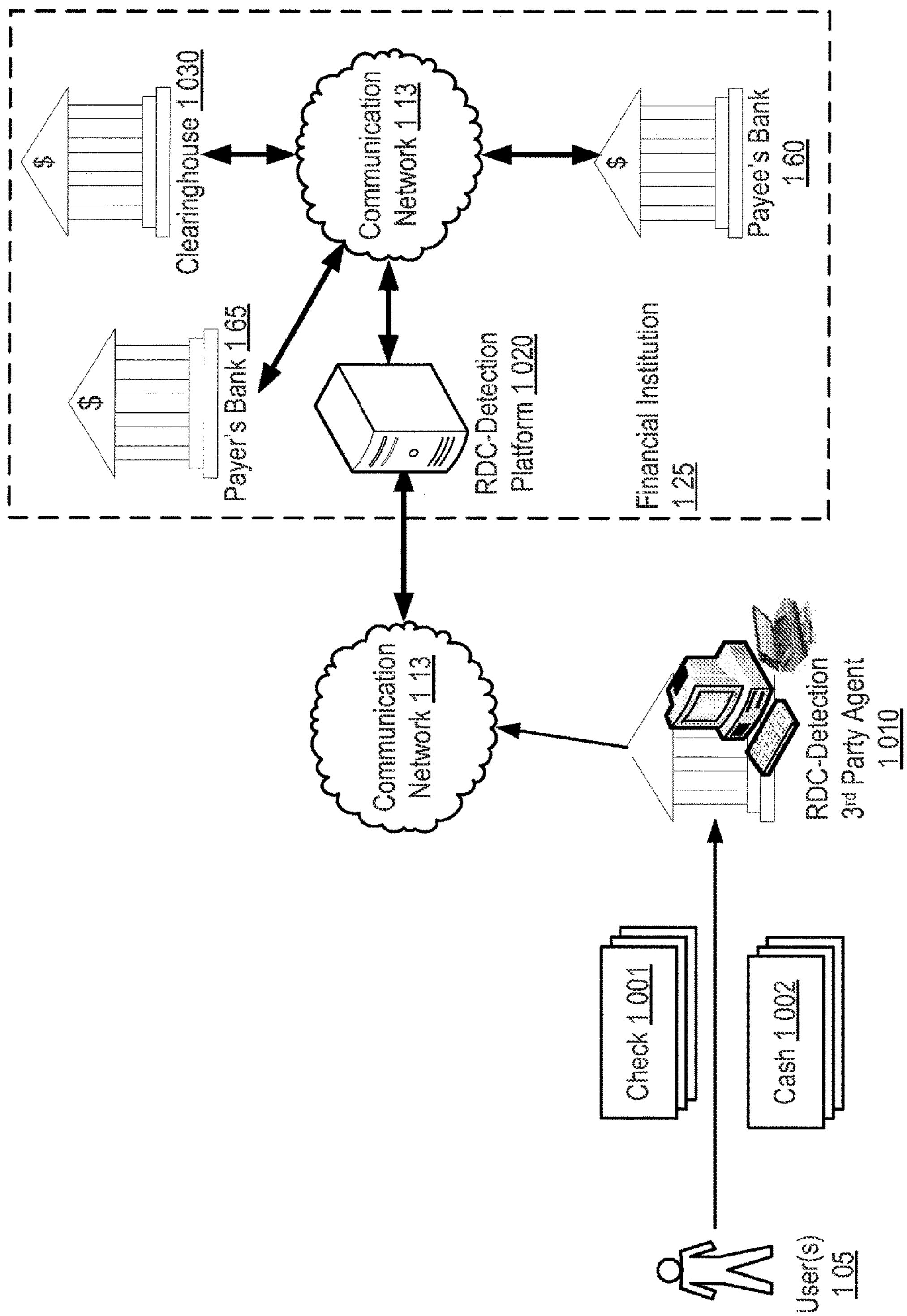

FIG. 1C is a block diagram illustrating RDC-Detection data flows in an alternative embodiment. In one embodiment, a user 105 may deposit a check 1001 or cash 1002 into his bank account at a third party agent 1010. For example, in one implementation, the user 105 may deposit at a RDC-Detection participating store, such as a convenience store, a book store, a grocery store, a gas station, and/or the like. In another example, the user 105 may present a check or cash to a mailing service agent for deposit, such as, but not limited to UPS®, Fedex® and/or the like. Also, the third party agent may be a remote deposit terminal such as an automatic teller machine, point of sale deposit service terminal, and/or the like.

In one implementation, the RDC-Detection third party agent 1010 may be equipped with a RDC-Detection facility, such as a card reader, check scanner, and/or the like, so that a user may swipe the check for scanning. In another implementation, the RDC-Detection third party agent may generate check images for deposit with a general purpose computer and image capture device, such as a flatbed scanner, a camera, a facsimile machine, a webcam, and/or the like.

In one embodiment, the RDC-Detection third party agent 1010 may send deposit requests and deposit information to the financial institution 125 via the communication network 113. An RDC-Detection platform 1020 may communicate with the RDC-Detection third party agent 1010 to process the deposit request. In one implementation, the RDC-Detection platform 1020 may be housed within the payee's bank 160. In an alternative implementation, the RDC-Detection platform 1020 may be associated with an intermediate deposit service institute that is independent of the payee's bank, payer's bank and the clearinghouse bank 1030.

RDC-Detection Third-Party Deposit

Figure 3A:
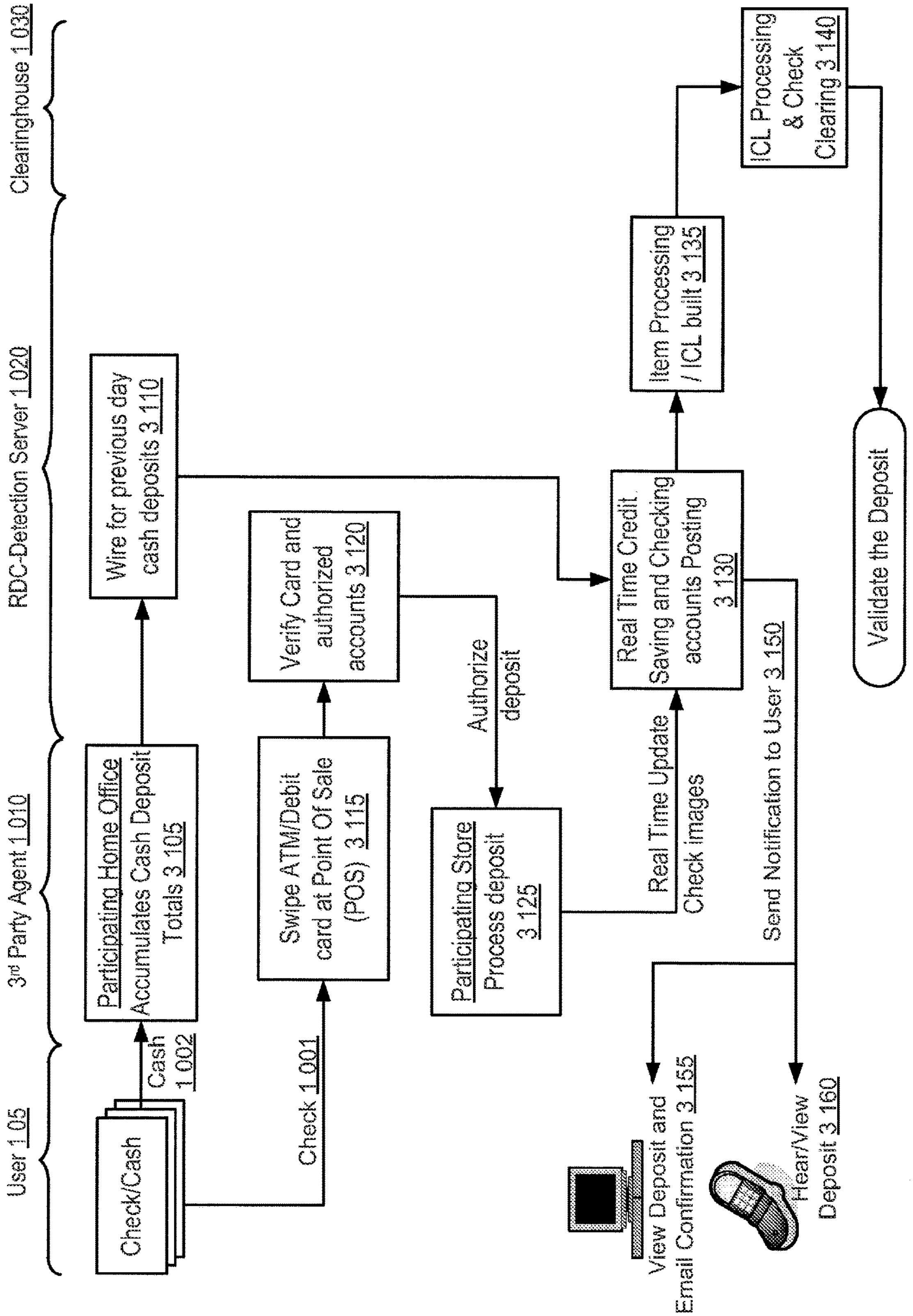
FIG. 3A-G provide diagrams illustrating aspects of remote deposit of checks in one embodiment of the RDC-Detection.

FIG. 3A is of a logic flow diagram illustrating an overview of RDC-Detection workflow in one embodiment of the RDC-Detection. In one embodiment, a RDC-Detection user may present a check 1001 or cash 1002 for deposit to a third party agent, such as an authorized RDC-Detection storefront deposit site, or a participating store or home/office equipped with RDC-Detection facility.

In one implementation, for cash deposit 1002, the third party agent may receive and calculate cash bills from the user and accumulate cash deposit totals 3105 associated with the user, and send deposit information to the RDC-Detection platform 1020. The RDC-Detection platform 1020 may wire the deposit amount to the user's bank account periodically. For example, in one implementation, the RDC-Detection platform 1020 may wire the received cash amount for deposit during the previous day 3110 to the payee's bank for posting 3130 on a daily basis, as further discussed in FIG. 4H.

In another implementation, for check deposit 1001, the user may provide a bank card as deposit authorization to the third party agent. For example, the user may have his ATM debit card swiped at a card reader equipped at a RDC-Detection participating store 3115 (e.g., a Point of Sale (POS) terminal), via which the third party agent may obtain and forward the user's bank account information to the RDC-Detection platform 1020.

In one implementation, deposit information may be sent to the RDC-Detection platform via a secure and dedicated communication channel established between the third party agent 1010 and the RDC-Detection platform 1020. For example, the RDC-Detection platform may remotely communicate with and control the deposit facility, e.g., the card reader, the check scanner, etc. installed at the POS terminal or a participating store, an ATM machine, and/or the like. In another implementation, the third party agent who operates a general purpose home/office device, such as a smart phone, a computer, and/or the like, may communicate with the RDC-Detection platform and submit deposit information in a similar manner as discussed in FIGS. 2A-B.

In one embodiment, the RDC-Detection platform 1020 may verify the user's card information and determine whether the user's bank account is eligible for RDC-Detection service 3120. Upon authorization, the third party agent 1010 may process the check deposit 3125, including generating one or more images of the check and sending the check images to the RDC-Detection platform 1020, as further illustrated in 4C In one implementation, the check images may be sent to and updated at the RDC-Detection platform 1020 in real time, and real time credit may be posted to the user's bank account 3130, as further FIGS. 4C-D.

In one embodiment, upon soft posting the deposit amount to the user's bank account, the RDC-Detection platform 1020 may clear the transaction. In one implementation, an Image Cash Letter (ICL) complying with the Check 21 Act, may be generated based on the received check images and deposit data 3135 at the RDC-Detection platform and sent to a clearinghouse bank 1030 for clearing 3140. For example, in one implementation, the check clearing 3135 and 3140 may take a similar procedure as further illustrated in FIGS. 8A-C.

In one implementation, upon soft posting of the deposit funds, the RDC-Detection server may send notification to the user 3150 to the user 105, so that the user may view the conformation message. For example, in one implementation, the user may receive a confirmation via email 3155. For another example, the user may receive a text message of confirmation via his cellular phone, or receive an automatic confirmation call 3160.

Figure 4A:
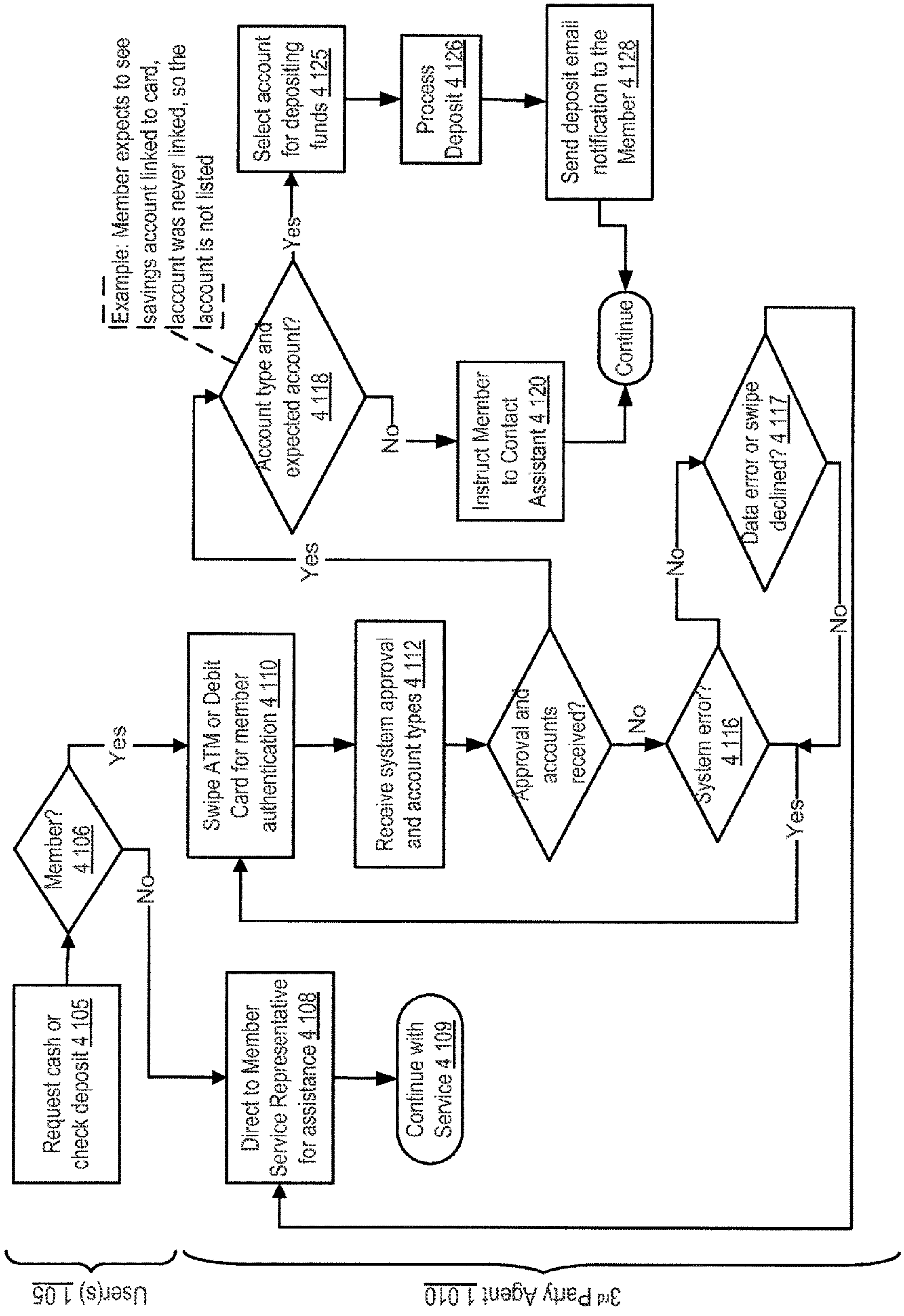
FIG. 4A-P provide diagrams illustrating aspects of instructing check image capturing and uploading in one embodiment of the RDC-Detection.

FIG. 4A provides a logic flow diagram illustrating work flows between a user and the RDC-Detection third party agent within embodiments of the RDC-Detection. As discussed in FIG. 3A, a user 105 may present cash or a check to the third party agent 1010 to request deposit 4105. The third party agent 1010 may verify whether the user is an East-Deposit service member 4106. For example, in one implementation, a RDC-Detection service representative may ask for membership information from the user. For another example, if the user possesses a membership card (e.g., a bank ATM/debit card authorized for RDC-Detection service, a RDC-Detection membership verification card, etc.), he may swipe the card at a card reader to provide membership authentication 4110.

If the user is not a member of RDC-Detection, or the card reader fails to recognize the user's bank card, the user may be directed to a RDC-Detection service representative (e.g., a store clerk, an express mailman, etc.) for further assistance 4108. The RDC-Detection service may be continued with the service representative 4109.

In one embodiment, upon sending member card information to a RDC-Detection platform, system approval may be received at the third party agent, and the user may be presented with a list of available accounts for deposit for selection 4112 vi a user interface, and determine whether an expected account 4118 is presented. For example, a user may have a number of accounts available for deposit, but a user preferred account may not be associated, or registered for RDC-Detection service, and thus such an account may not be presented to the user during RDC-Detection service. In such case, RDC-Detection may instruct the user to contact a service assistant 4120, e.g., by displaying instructions and contact information of RDC-Detection customer service via a user interface.

Figure 4B:
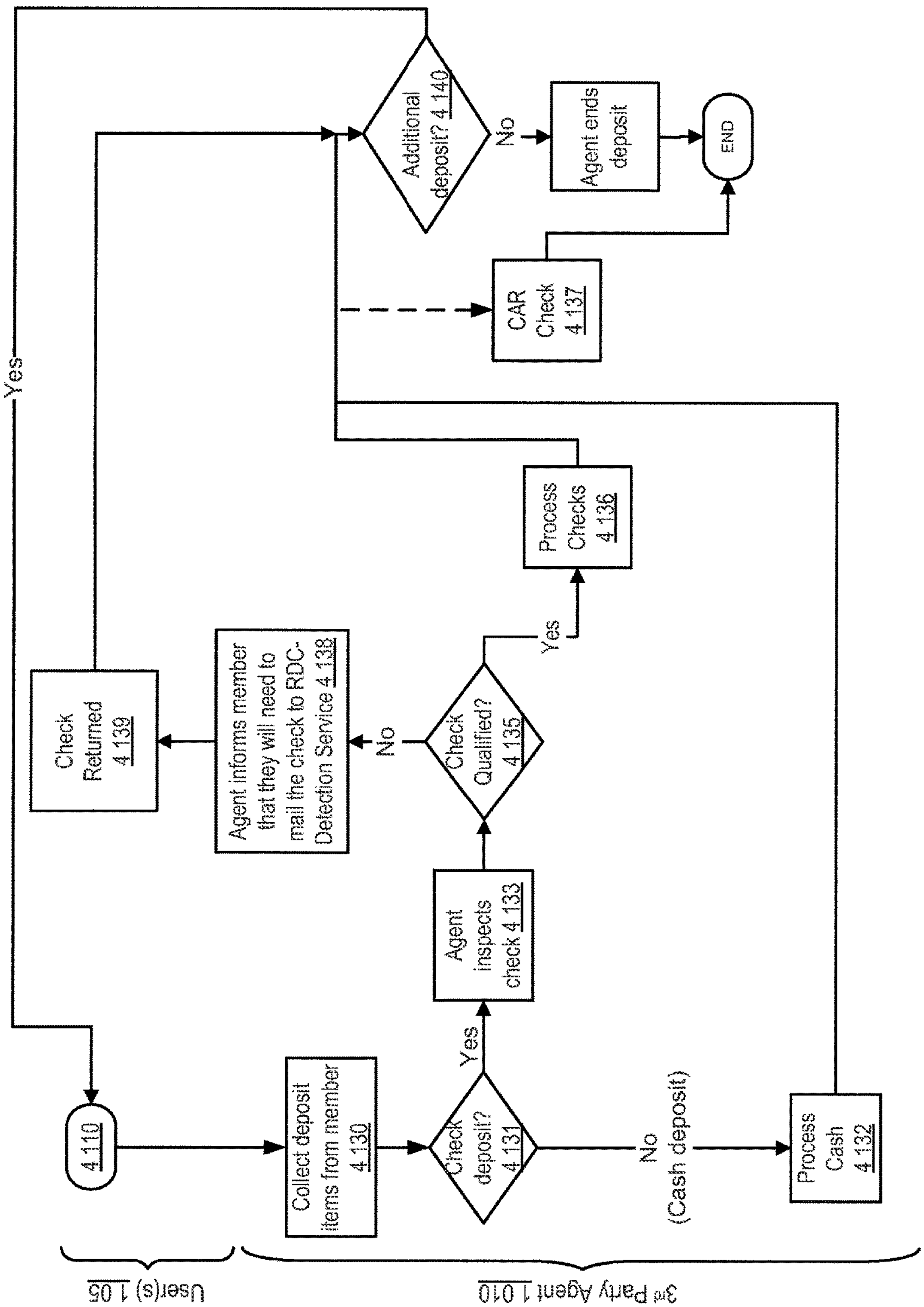
Figure 4C:
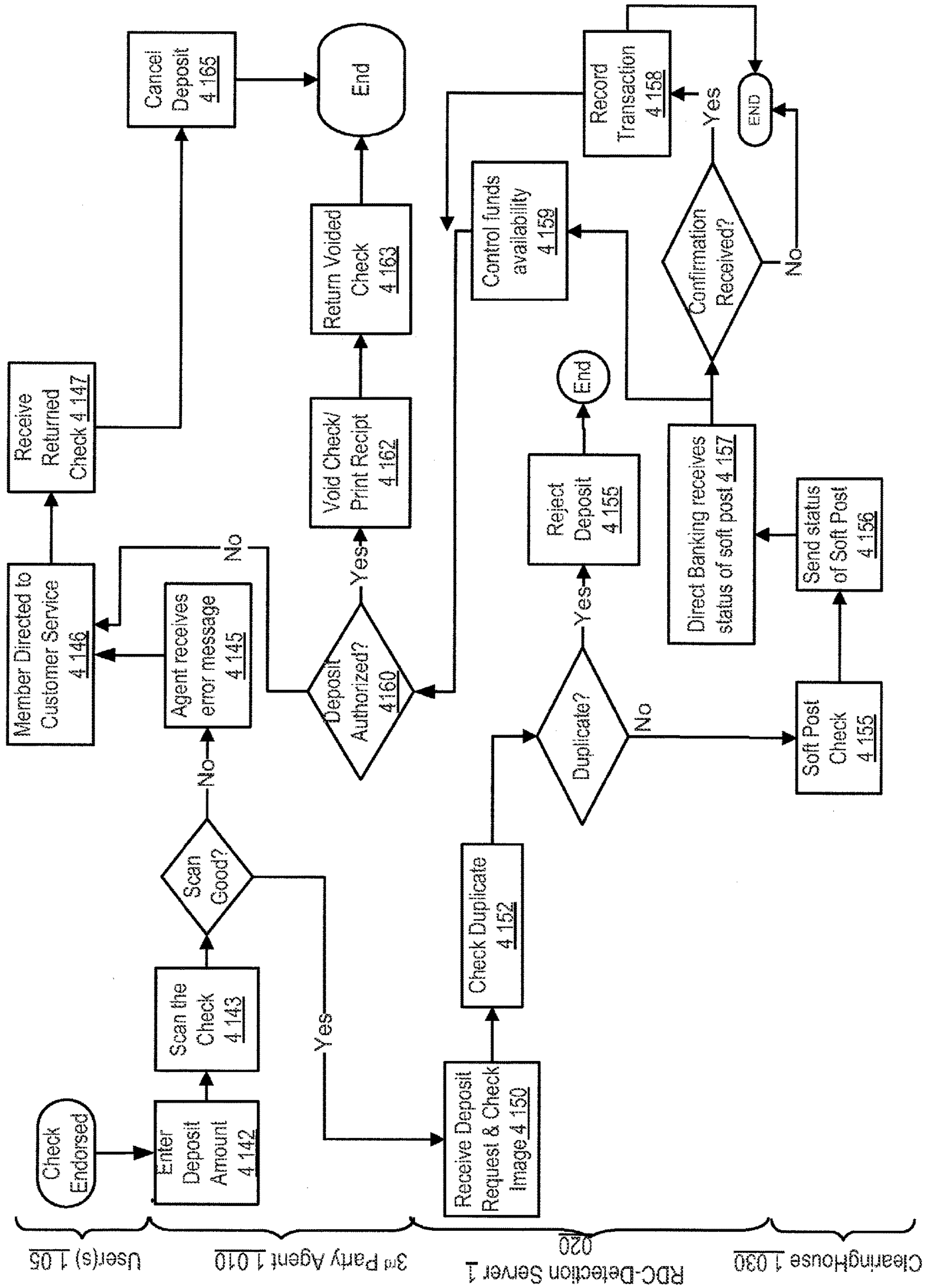

In another implementation, if the user selects an account from the presented list for depositing funds 4125, the third party agent may proceed to process the deposit request 4126, as further illustrated FIG. 4C. After receiving a notice of soft posting from the RDC-Detection platform, the third party agent may send a deposit notification to the user 4128, e.g. via emails, text messages, or displaying a deposit receipt on a user interface.

FIG. 4B provides a logic flow diagram illustrating work flows for cash deposit between a user and the RDC-Detection third party agent in an alternative embodiment of the RDC-Detection. In one embodiment, after user swiping membership card at the third party agent, the third party agent may collect deposit items from the user 4130. In one implementation, if a cash deposit request is received at 4130, the third party agent may proceed to process the received cash 4132, as further illustrated in FIG. 4D.

If it a check is presented for deposit 4131, the third party agent may inspect the check 4133 to verify the check is qualified 4135. For example, in one implementation, a service representative at the RDC-Detection participating store may manually inspect the presented paper check to see whether it is a proper check, and whether it has been endorsed. For another example, the user may insert and scan the check at the check deposit facility equipped at the RDC-Detection participating store, and the RDC-Detection may perform an initial optical character recognition (OCR) upon the captured check image to inspect check formalities. If the check is qualified for deposit 4135, the third party agent may proceed with process the check for deposit 4136. Otherwise, the third party agent may return the check to the user 4139, and inform the user of the ineligibility of the check and suggest the user mail the check to a RDC-Detection enabled bank branch for deposit 4138.

In one implementation, the check processing may include courtesy amount recognition (CAR) and/or legal amount recognition (LAR) 4137. For example, in one implementation, the third party agent may capture images of the paper check for OCR and extract deposit information from the check images. The RDC-Detection may compare the extract deposit amount from the check image and an amount entered by the user to confirm consistency, as further illustrated in FIG. 4E. In an alternative implementation, the RDC-Detection may perform intelligent character recognition (ICR) to recognize CAR/LAR amount to inspect the quality of the check image.

In one implementation, the third party agent may inquire the user for additional deposit requests 4140 until the agent ends the deposit service.

FIG. 4C provides a logic flow diagram illustrating work flows of processing check deposit between the user, the third party agent, the RDC-Detection platform and the clearinghouse within embodiments of the RDC-Detection. Within embodiments, upon the receipt of an endorsed check from the user, the third party agent may enter a deposit amount 4142 and generate an image of the check 4143. For example, in one implementation, a RDC-Detection representative or the user may be prompted to manually enter a deposit amount at a RDC-Detection terminal. The third party agent may also generate images of the check via an image capture device within similar embodiments discussed in FIGS. 2A-C.

In one implementation, the third party agent 1010 may determine whether the generated check images are eligible for further processing. In one implementation, a service representative may view the check image on screen to determine whether the image is disoriented, blurred or skewed. In another implementation, the third party agent may send the check images to the RDC-Detection platform where an initial OCR may be performed on the check image to inspect whether the check is readable. If the check image fails to pass the initial formality inspection, the third party agent may receive an error message 4145, and the user may be directed to customer service 4146 with returned check 4147 for further assistance in RDC-Detection service. In one implementation, the user may cancel the deposit 4165 and close the transaction.

When the third party agent determines the check image is eligible for deposit processing, a deposit request may be forwarded to the RDC-Detection platform 1020. For example, in one implementation, a data package including the captured check images and user entered check metadata, such as a deposit amount, a selected deposit account, and/or the like, may be send to the RDC-Detection platform. In one implementation, the RDC-Detection platform may conduct duplicate detection 4152, as discussed in similar embodiments in FIGS. 8A-C. If the check is a duplicate, the RDC-Detection platform may reject the deposit 4155 and end the transaction. Otherwise, if not, the RDC-Detection platform may provisionally post the deposit amount to the user's selected deposit account, and send the deposit information to the clearinghouse 1030 for soft post check 4155. For example, the soft post check may be performed within similar embodiments discussed in FIG. 8C.

In one implementation, upon receiving verification of the soft post status from the clearinghouse 4156, the RDC-Detection platform may forward the soft post status to direct banking 4157, e.g., the payee's bank. If the payee's bank confirms the deposit, the RDC-Detection platform may generate a data record of the transaction and store it in the RDC-Detection database 4158. For example, in one implementation, the RDC-Detection platform may keep a deposit record repository for duplicate check, as discussed in one implementation in FIGS. 9A-C.

In a further implementation, the RDC-Detection platform may communicate with the payee's bank to control funds availability 4159. For example, in one implementation, the RDC-Detection service may apply a deposit constraint to the deposit, allowing an available deposit amount to be deposited based on the existing amount in the user's bank account, as discussed in one implementation in FIG. 3E.

In one implementation, after the funds availability control, if there remains an unauthorized deposit amount 4160, the user may be directed to customer service 4146. If not, the third party agent may void the paper check 4162. For example, the paper check may be permanently modified by a "PAID" stamp printed thereon. For another example, the RDC-Detection facility at the third party agent may destroy the paper check by an electronic MICR spray to mark the check as deposited. The voided check may then be returned to the user 4163 and the deposit transaction is closed.

Figure 4D:
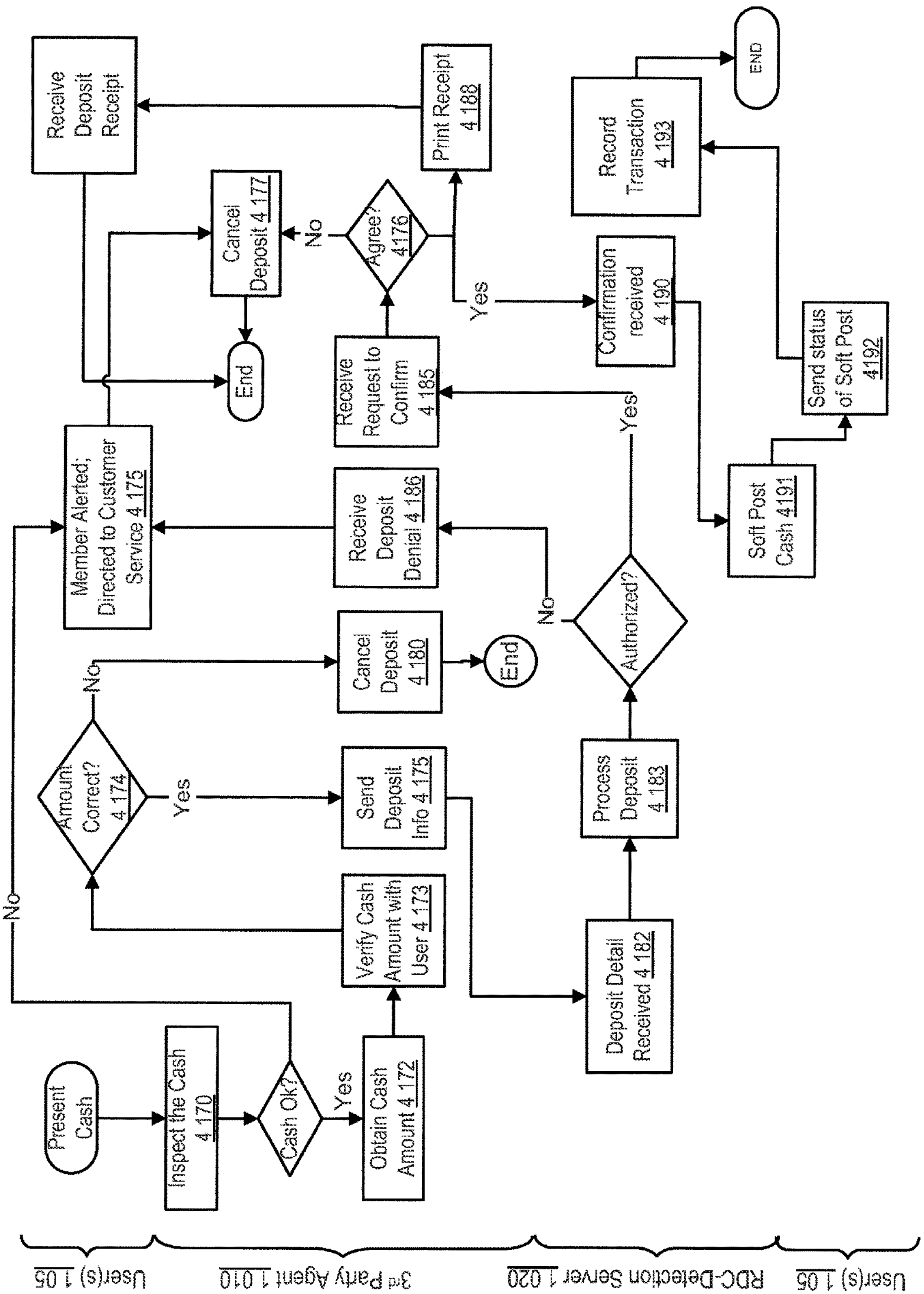

FIG. 4D provides a logic flow diagram illustrating work flows of processing cash deposit between the user, the third party agent and the RDC-Detection platform within embodiments of the RDC-Detection. In one embodiment, the user 105 may present cash at the third party agent 1010, wherein the third party agent may inspect the cash 4170. For example, in one implementation, the third party agent may be equipped with a bill/coin counter to calculate the cash amount 4172 and detect any counterfeit. If the presented cash does not pass the initial inspection, e.g., counterfeit detected, etc., the user may be alerted and directed to RDC-Detection customer service 4175. In one implementation, the user may choose to cancel the deposit 4176 and exit the transaction with the third party agent.

In one implementation, if the cash is qualified, the third party agent may verify the calculated cash amount with the user 4173 to confirm the consistency in deposit amount. If the user agrees the deposit amount is correct 4174, the third party agent may send deposit information 4175 to the RDC-Detection platform. For example, the deposit information may include, but not limited to the user's RDC-Detection membership information, deposit account information, deposit amount, and/or the like. In one implementation, the user may be prompted to select an available account for cash deposit in a similar way to that in check deposit as discussed in one implementation in FIG. 3G. In another implementation, if the calculated amount is inconsistent with the user specified amount, the third party agent may cancel the deposit 4180.

In one embodiment, upon receiving deposit details from the third party agent 4182, the RDC-Detection platform may process the deposit 4183. For example, in one implementation, the RDC-Detection may control the funds availability of the user selected account in a similar manner as discussed in one implementation in FIG. 3E. If the RDC-Detection platform authorizes the deposit into the user specified account, the third party agent may receive a request to confirm the deposit from the RDC-Detection platform, and prompt the user to accept the deposit status. If the user or the third party agent does not agree with the deposit status at 4176, e.g., the deposit amount may be capped by fund availability control, etc., the third party agent may cancel the deposit 4177 upon user approval.

In an alternative implementation, if the user agrees with the deposit at 4176, the third party agent may print a deposit receipt 4188 for the user to conclude the transaction. In one implementation, after receiving a deposit confirmation from the third party agent 4190, the cash deposit amount may be soft posted to the user's account 4191 and a notification of the soft post may be sent to the user. In a further implementation, the RDC-Detection platform may create a transaction record of the cash deposit 4193, which may include a time stamp of the transaction, the deposit amount, the deposit account, and/or the like.

Figure 4E:
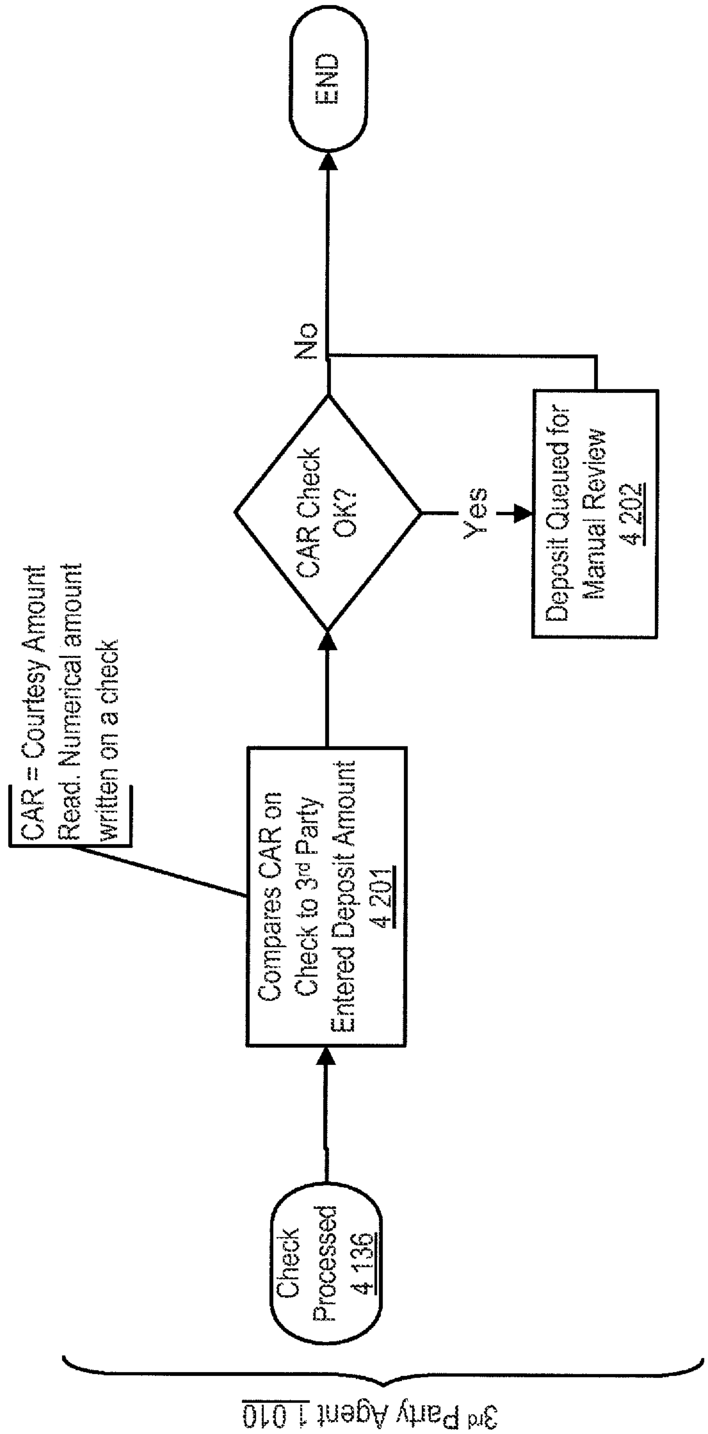

FIG. 4E provides a logic flow diagram illustrating check deposit processing at the third party agent within embodiments of the RDC-Detection. For example, in one implementation, after receiving deposit information and processing the check 4136, the third party may capture an image of the check, via which the courtesy amount written on the check may be extracted to compare with a user entered deposit amount 4201. If the extracted courtesy amount from the check matches the manually entered amount, the third party may proceed with the check deposit processing, e.g., the deposit may be queued for a manual review 4202, as further illustrated in one implementation in FIG. 4I. Otherwise, if inconsistency occurs, the third party agent may choose to close the transaction.

Figure 4F:
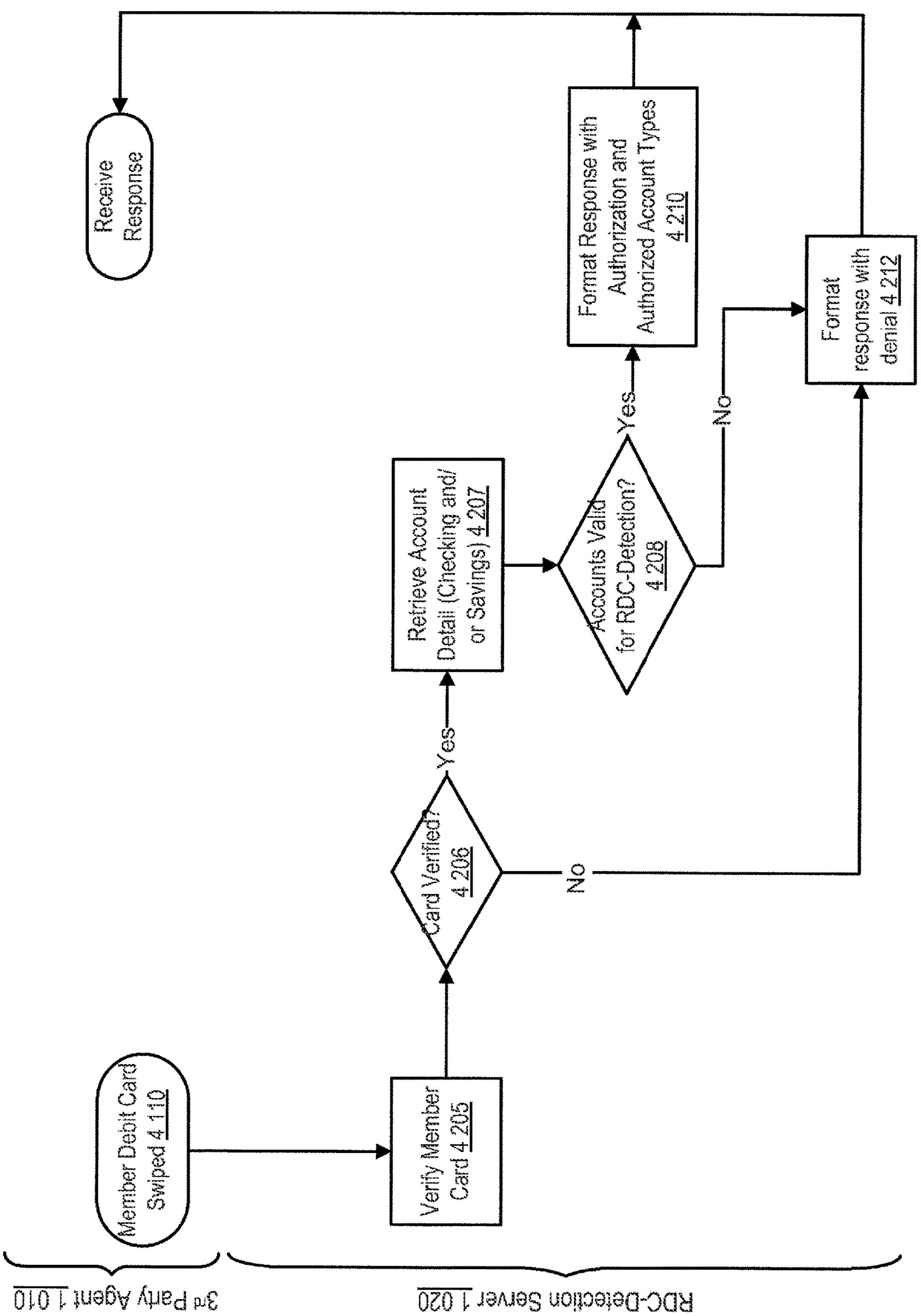

FIG. 4F provides a logic flow diagram illustrating membership verification between the third party agent and the RDC-Detection platform in one embodiment of the RDC-Detection. In one embodiment, the third party agent may receive membership information from the user when the user swipes his membership card at a card reader 4110. For example, the membership card may include, but not limited to an ATM debit card, a membership identification card, and/or the like. In one implementation, the card reader at the third party agent may forward the membership information, such as, but not limited to user name, user account, user's bank information to the RDC-Detection platform 1020, and the RDC-Detection platform may then verify the member information 4205. If the user has been verified to be an eligible RDC-Detection member 4206, the RDC-Detection platform may retrieve account details associated with the user 4207, and determine whether the retrieved bank accounts are a are available for RDC-Detection service 4208. If yes, a response may be formatted and sent to the third party agent via a user interface, presenting a list of authorized user bank accounts 4210. Otherwise, if the user is not a valid RDC-Detection member 4206, or if the user has not validated any of his bank accounts for RDC-Detection 4208, a denial may be sent to the third party agent 4212.

Figure 4G:
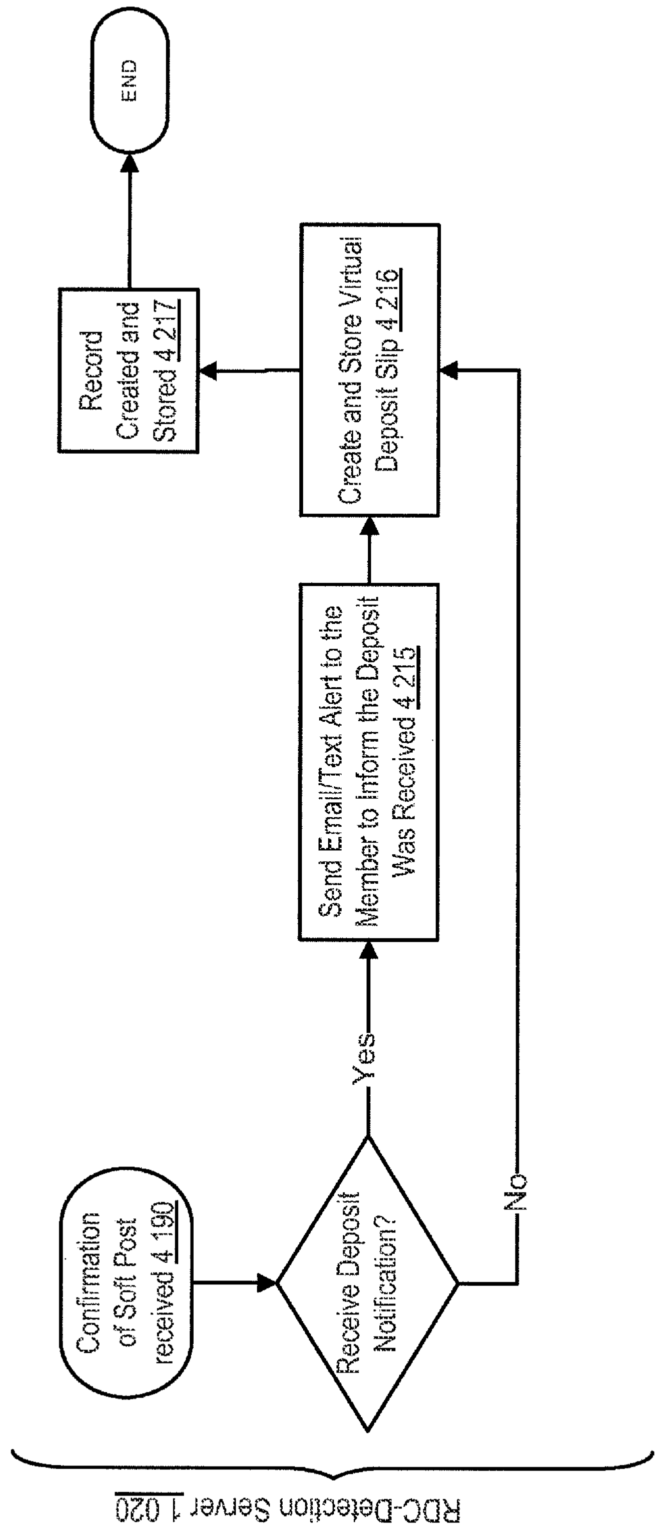

FIG. 4G provides a logic flow illustrating deposit notification at the RDC-Detection platform within embodiments of the RDC-Detection. In one embodiment, the after receiving a confirmation of soft post 4190 (e.g., from a payee's bank if the RDC-Detection platform is independent of the payee's bank, etc.), the RDC-Detection platform may determine whether the deposit is successful. If yes, the RDC-Detection platform may notify the user by sending an email or text message to inform the deposit is received 4215. In an alternative implementation, the RDC-Detection platform may send the deposit confirmation to a third party agent terminal. They RDC-Detection platform may then create a virtual deposit slip 4216, and store the record 4217. For example, the virtual deposit slip may include images of the check and check metadata, such as, but not limited to the time and place of the deposit, user account, user name, deposit amount, and/or the like. Other implementations of storing deposit record may be discussed in FIG. 9A.

In one implementation, if the deposit notification indicates the soft post is not completed, the RDC-Detection platform may also generate a deposit slip for the check as "presented but not deposited" and store it in the RDC-Detection database.

Figure 4H:
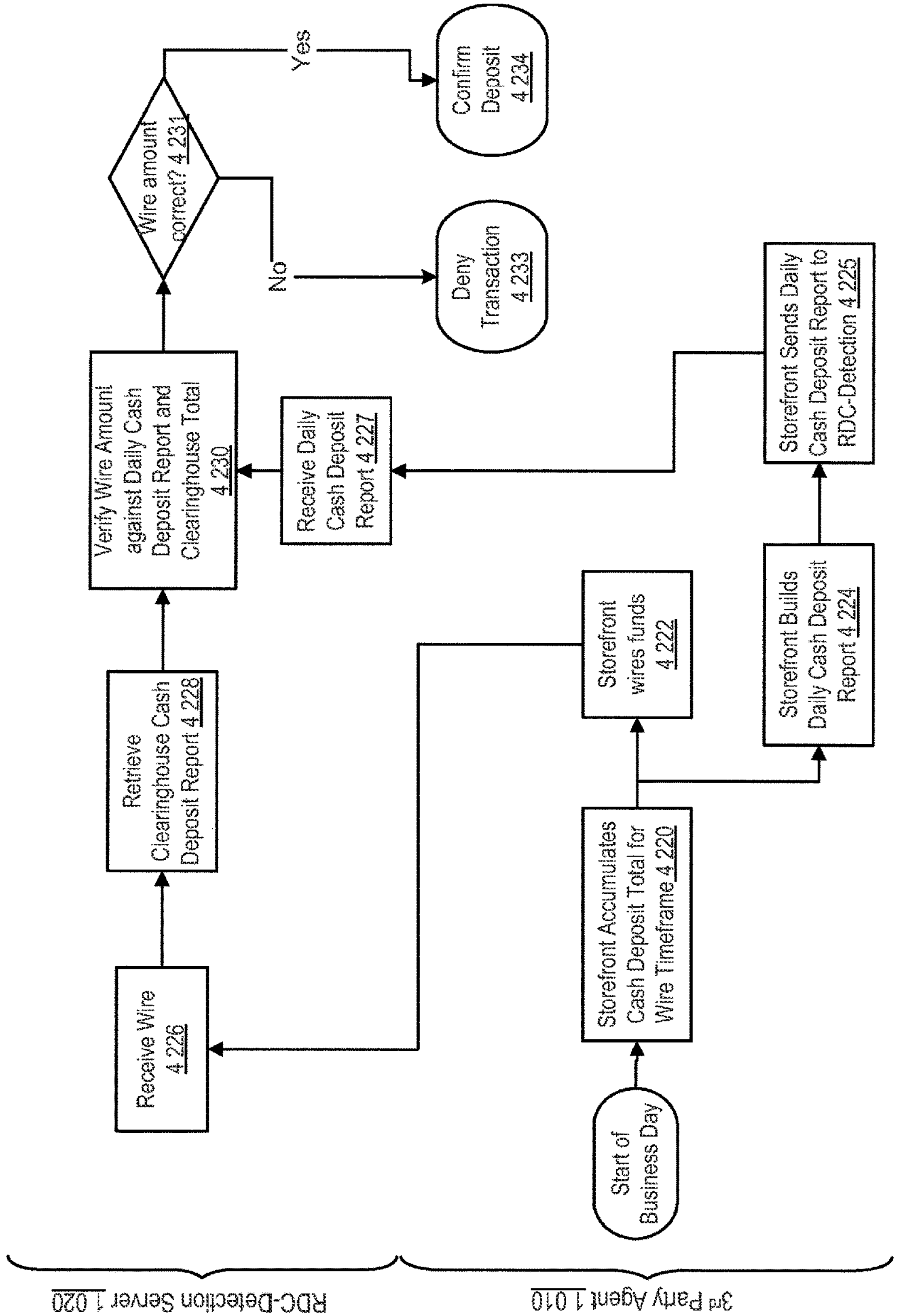

FIG. 4H provides a logic flow illustrating fund wiring from the third party agent to the RDC-Detection platform within embodiments of the RDC-Detection. In one embodiment, the third party agent may process the cash deposit in a batch. For example, in one implementation, at the start of a business day, the third party agent may accumulate cash deposit total from the wire timeframe 4220, e.g., the total cash deposit from the previous day. In one implementation, the third party agent may wire the accumulated funds 4222 to the RDC-Detection platform. In another implementation, the third party agent may build a daily cash deposit report 4224 and send the report to the RDC-Detection platform 4225.

At the RDC-Detection platform 1020, upon receipt of the wired funds 4226, the RDC-Detection platform may retrieve a clearinghouse cash deposit report 4228. In another implementation, the RDC-Detection platform may also receive the daily cash deposit report 4227 and compare it with the retrieved clearinghouse cash total to verify the wired amount 4230. If the received wired amount is correct 4231, the RDC-Detection may confirm the cash deposit 4234. Otherwise, the wire transaction may be denied 4233 and a denial notification may be sent back to the third party agent.

Figure 4I:
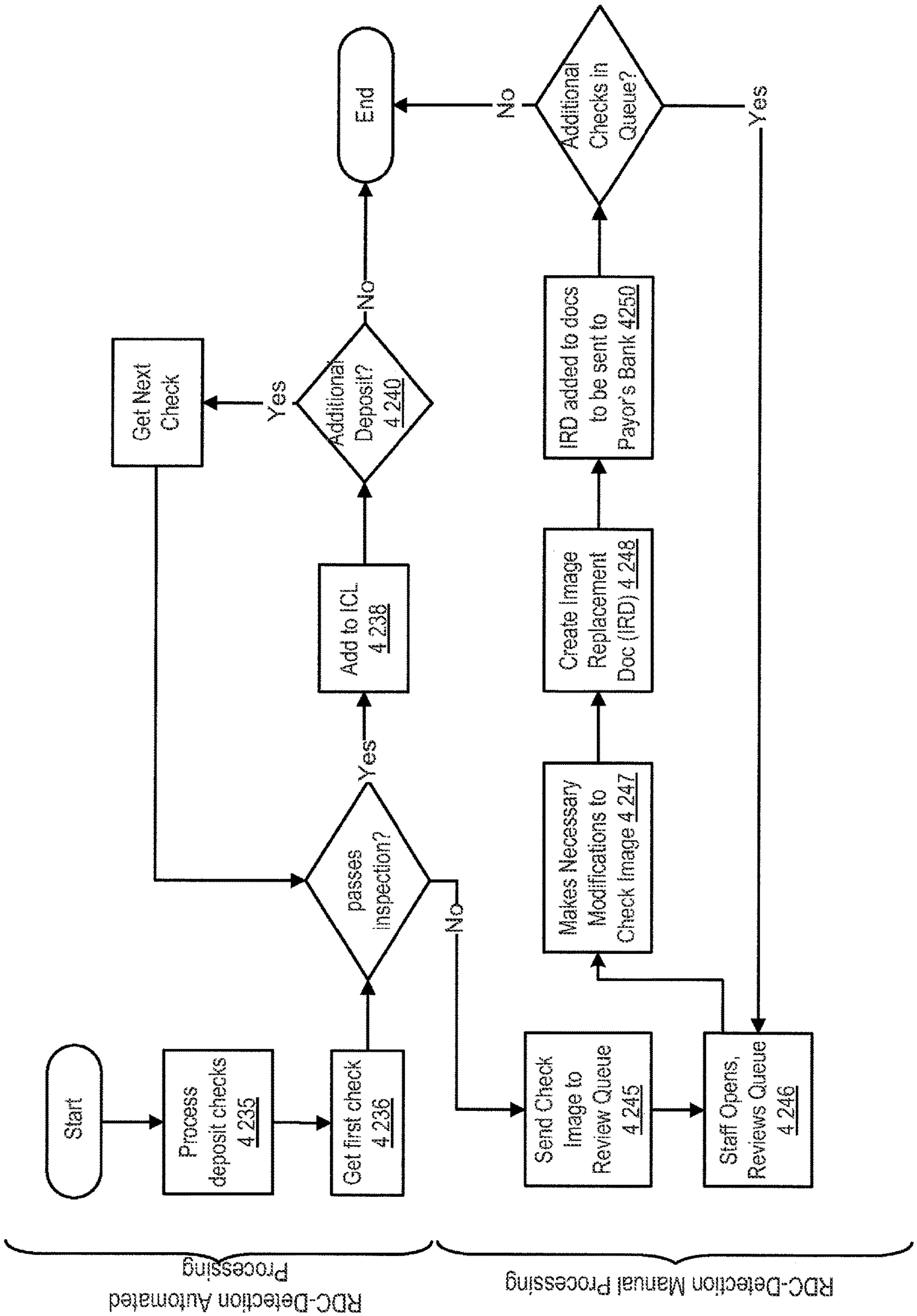

FIG. 4I provides a logic flow illustrating an alternative embodiment of check deposit within embodiments of the RDC-Detection. In one embodiment, the RDC-Detection may process a plurality of checks in a batch. For example, in one implementation, the RDC-Detection platform may start with processing a plurality of received images of checks 4235. For the first check image 4236, the RDC-Detection platform may inspect the quality of the check image. If the image is qualified, the RDC-Detection platform may add it to ICL 4238. The process may be repeated until there is no additional deposit 4240. Otherwise, if the first check image fails to pass the initial inspection, the RDC-Detection may direct the check image to RDC-Detection manual processing.

For example, in one implementation, the disqualified check image may be sent to a review queue for manual review 4245. In one implementation, the RDC-Detection may prompt RDC-Detection staff to open and review the queued check images via a user interface terminal. In one implementation, the RDC-Detection staff may make modify the check image. For example, the RDC-Detection staff may improve the check image by proper cropping, deskewing, dewarping and format changes. After enhancement, an image replacement document (IRD) may be generated 4248 based on the check image and added to the documents to be went to the payor's bank 4250. The RDC-Detection staff may continue reviewing the check images in the queue until the queue is completed.

RDC-Detection User-Server Flow Overview

Figure 3B:
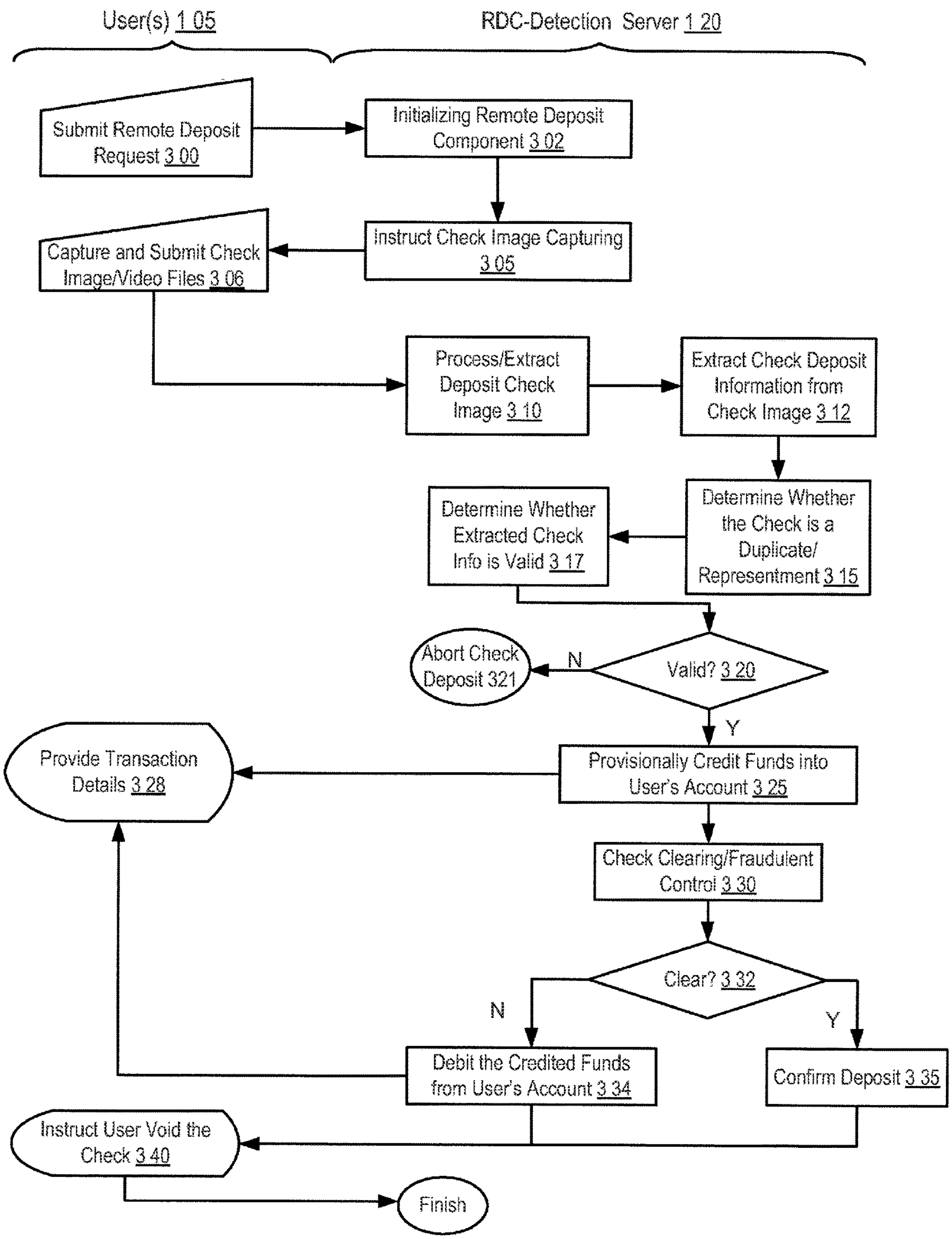

FIG. 3B is of a logic flow diagram illustrating aspects of remote deposit of checks in one embodiment of the RDC-Detection. In FIG. 3A, a user may submit a remote deposit request 300. For example, in one embodiment, the RDC-Detection may operate a web site which guides a user through the process of collecting images of a check to be deposited. In some implementations, the web site may facilitate a browser-executable component (e.g., applets, scripts, etc.), that drives the process of collecting images. In one implementation, a user may visit a website controlled by the RDC-Detection via a web browser on the user's home computer and submit a request for remote deposit via the user interface of the webpage.

In another embodiment, for kiosk/ATM/retail deposit, a user may be instructed from an ATM/kiosk screen to place or insert the check into a check deposit slip for scanning, and/or the like.

In another embodiment, for mobile deposit, a user operating a mobile device may access the RDC-Detection website via the mobile device, or may launch a RDC-Detection component pre-installed on the mobile device and connect to the RDC-Detection platform to submit deposit requests via the RDC-Detection component.

In one embodiment, in response to the user request, the RDC-Detection platform may initialize a remote deposit component 302. For example, in one implementation, the RDC-Detection may retrieve and load a user interface page for remote deposit. In one embodiment, the RDC-Detection may instruct the user to capture and submit an image or video streaming of the check 305-306, as will be further illustrated in FIGS. 4A-C and 5B-C. In one implementation, the initialized remote deposit component may authenticate the user by prompting the user to login a remote deposit system with a user name and password if the user is an existing member of the RDC-Detection. For example, in one implementation, a remote depositor may access a remote deposit service website, and submit a request by clicking on a "deposit" button on the webpage. The RDC-Detection may then lead to a login webpage, prompting the depositor to login to the remote deposit service with a user name and password.

For another example, for mobile deposit via a mobile device, the user may launch a "remote deposit" application on a menu of the mobile device to send a request for mobile deposit (e.g., via SMS, etc.), and the RDC-Detection may determine whether the mobile device has been registered based on its physical address (MAC address). In a further implementation, the RDC-Detection may instruct the user to submit biometrics information for authentication. For example, if the user is operating a video camera, video files and/or live video streaming of the user may be transmitted to the RDC-Detection to authenticate the user by face recognition procedures.

In one embodiment, the RDC-Detection may process the received check image or video file 310 (as will be further illustrated in FIGS. 6A-H). For example, in one implementation, the RDC-Detection may process the received check image or video file to generate an enhanced digital check image in order to extract deposit information, and convert the check image to an image file format in compliance of virtual check standard (e.g., X9.37 cash letter image files, etc.). In one embodiment, the RDC-Detection may extract check deposit information from the processed check image 312. For example, in one implementation, an Optical Character Recognition (OCR) procedure may be applied to the enhanced check image and extract information such as the amount of deposit, the account number, banking routing number, payee's name, deposit date, endorsement, the magnetic ink character recognition (MICR) line which contains information of the account number of bank routing number, and/or the like. In another implementation, the RDC-Detection may analyze any metadata and additional submitted information associated with the check image, such as GPS information if image is submitted by a GPS enabled mobile device, time stamp of image capture, IP address of the image capture device, MAC address, system identifier (for retail POS/kiosk deposits), manually entered deposit amount, user identification (such as account name and password) and/or the like.

In one implementation, the RDC-Detection may determine the check is a duplicate or representment 315, (as will be further illustrated in FIG. 8). In one implementation, the RDC-Detection may perform the representment inspection at a payee's bank prior to provisional deposit 325. In another implementation, the RDC-Detection may send deposit data to an external agency for representment service In one embodiment, the RDC-Detection may verify the check image based on the extracted information, e.g., determining whether the extracted check information is valid 317. For example, in one implementation, the extracted information from the check image may be compared with the user submitted deposit information, e.g., payee's name, deposit amount, etc. For another example, the RDC-Detection may check if a proper endorsement is contained on the back side of the check image.

In one embodiment, if the check is not valid 320, the bank may reject the check image and abort check deposit 321. In another embodiment, if the check is valid, the RDC-Detection may provisionally credit the indicated amount of funds into the user's amount 325. For example, in one implementation, the RDC-Detection may post the deposit to the payee's bank, and the payee's bank may provisionally credit the deposit amount to the payee's account.

Figure 8A:
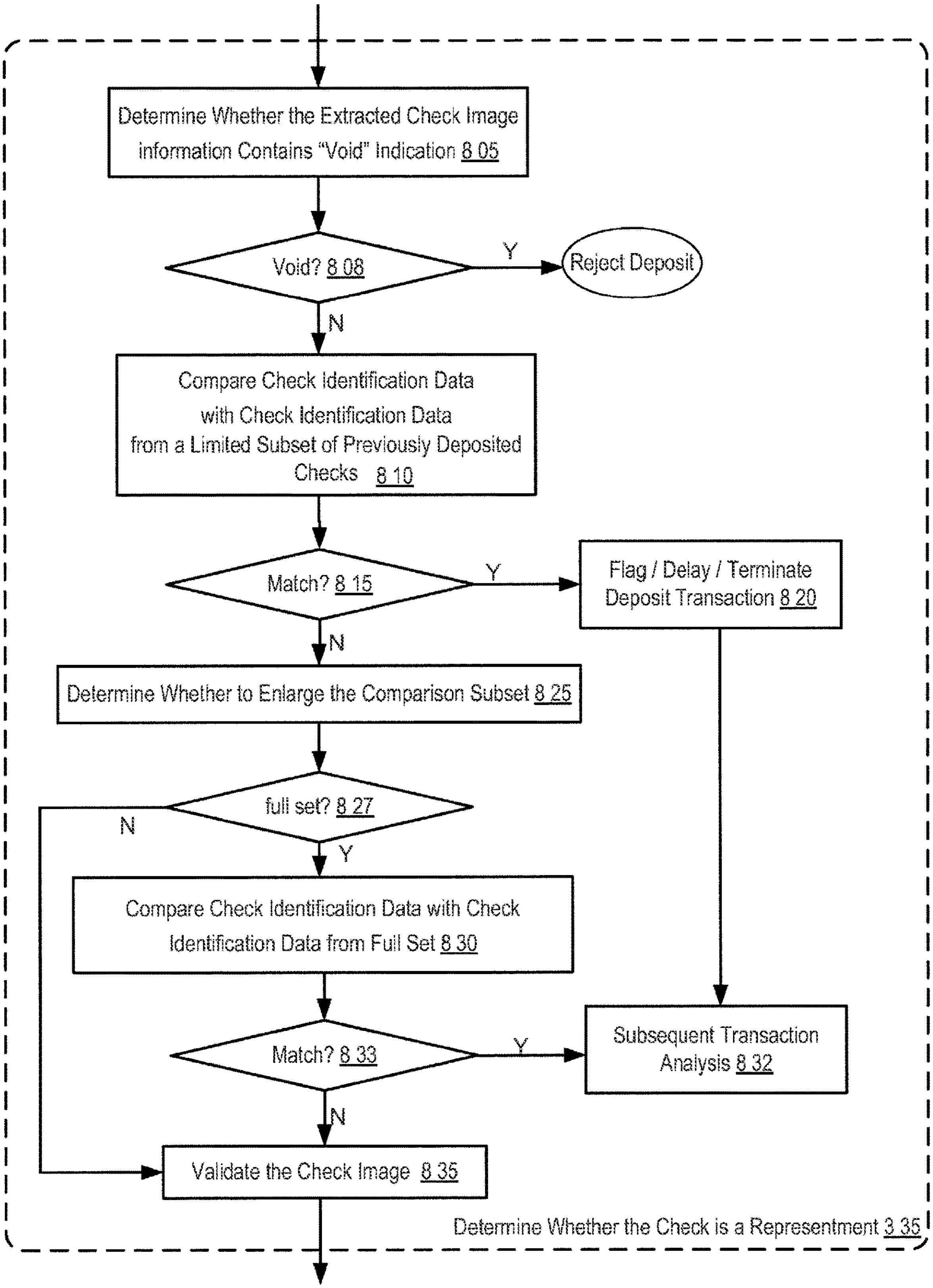
FIGS. 8A-C provide diagrams illustrating aspects of check representment detection and check clearance in one embodiment of the RDC-Detection.
Figure 8B:
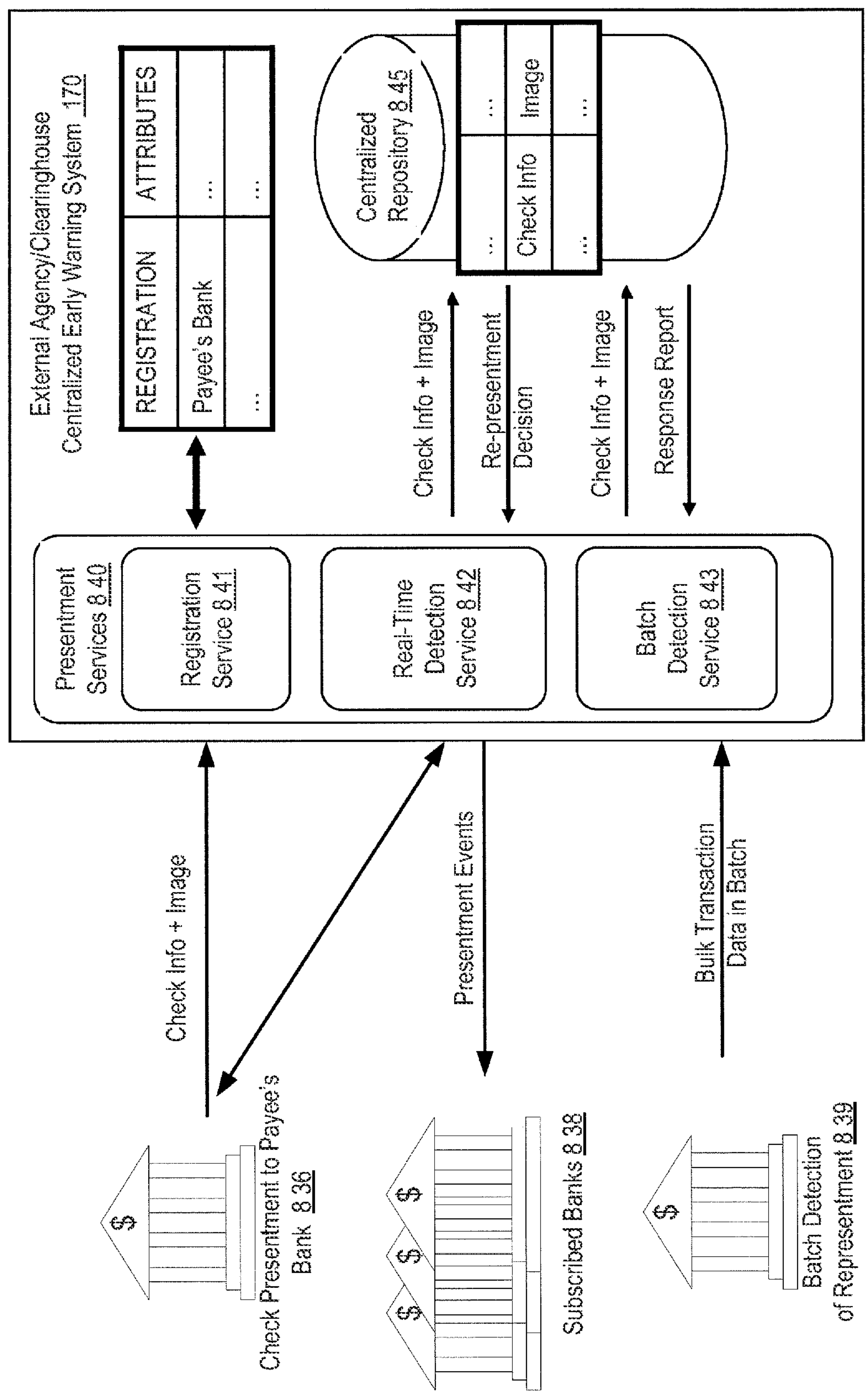

In one embodiment, the RDC-Detection may perform a check clearing procedure to control fraudulent items 330, as will be further illustrated in FIG. 8B. For example, the RDC-Detection may send x9-37 cash letter check images to a regional branch of the Federal Reserve, a correspondent bank, a clearinghouse bank and/or the like to clear the check. If the RDC-Detection receives a positive result of the check clearing 332, the deposited credit may be confirmed 335. Otherwise, the provisionally credited funds may be deducted from the payee's account 334, and the transaction details may be provided to the user 328.

In an alternative embodiment, the bank may process the ACH debit entry, substitute check, and/or electronic image. As noted above, the bank may present the ACH debit entry to an ACH service provider (e.g., EPN), which may be responsible for settling the transaction between the payee's bank and the payer's bank. The bank also may convert the digital image into a substitute check and present the substitute check to an intermediary bank (e.g., a regional branch of the Federal Reserve) to complete the check clearing process. In one implementation, the bank may debit the payee's account if the original check is not received and/or sent within a predetermined period of time. For example, the bank may require that the payee send the check and have it postmarked within five business days of sending the electronic data representative of the check. If the check is not postmarked within the predetermined period of time, the financial institution may void the provisional credit (e.g., withdraw funds from the account).

In one embodiment, upon completion of the deposit, the RDC-Detection may further instruct the user to void the physical check 340 to avoid representment. For example, in one embodiment, the RDC-Detection may instruct the user to place the physical check to certain equipment such that a stimulus may be applied to the physical check to permanently modify the check as "void". For another example, if the deposit takes place at a kiosk or ATM, the deposit facility may print "ELECTRONICALLY PRESENTED" across the front of the original check when the check is scanned by equipment designed to convert the check to an electronic image for further processing. For another example, the physical check may contain a radio frequency identification (RFID) tag. When the RFID tag receives a particular radio signal, the RFID tag may be modified as "void". For further examples, if the physical checks contain tags sensitive to heat, the check may be voided by the heat generated by the application of a bright light source, such as one that may be found in a scanner.

In another implementation, the RDC-Detection may void the physical check by MICR line destruction. For example, the RDC-Detection may punch holes on the MICR line printed on the paper check. In one implementation, the punch mechanism may comprise a roller placed with the image capture device, e.g., inside a scanner, etc., and may be positioned to coincide with the placement to the MICR characters on the check item inserted into the scanner. The roller may comprise a spindle with several sharp protrusions (e.g., conical) on its sides, wherein the height of the spindle may be equal to or around the height of the MICR characters. In one implementation, the remote processing component running on the depositor device, e.g., the depositor's computer, Apple iPhone, and/or the like, may control the roller to enable or disable it against the paper check inserted in the scanner, e.g., to punch holes on the check. In one implementation, when the roller is enabled by the remote processing component, the roller may rotate around its central axis to progressively punch holes along the MICR line of the paper check fed into the scanner, which may permanently distort or destroy the MICR characters. In a further implementation, the sharp protrusions on the side of the roller may be shaped to form a specific punch character, such as an "X" shape, a "#" shape, and/or the like. The design of the punch character may adopt standardized E13B fonts and/or other international MICR fonts so that it will be recognized by a financial institution as a MICR destruction symbol.

For another example, the RDC-Detection may utilize a magnetic ink spray to chemically destroy the MICR line, which may be printed using on the paper check in a magnetic ink or toner containing iron oxide. In one implementation, a magnetic ink sprayer may be placed in the scanner used to capture images of the check. For example, the sprayer may be included in a printer cartridge with a rectangular slit, wherein the slit has the length to at least cover the height of the MICR characters. When the sprayer is enabled, the magnetic ink sprays out of the slit which generates a magnetic rectangle of the height of MICR line characters. Thus when the paper check is fed into the scanner, the magnetic sprayer may generate a line of magnetic rectangles to cover the original MICR characters. In a further implementation, similar to the punch characters as previously discussed, the split of the sprayer may be designed to form a specific magnetic character, which may represent a 'MICR disabled character' instead of being a rectangle slit, and standardized E13B fonts and other international MICR fonts may be adopted.

In one embodiment, the RDC-Detection may allow the user to manually start the MICR destruction mechanism. For example, a user may press a button to initiate the roller puncher, or the magnetic sprayer, after confirming a soft post status notification is received to ensure the check deposit has been processed. For another example, the RDC-Detection may remotely control the image capture device (e.g., the scanner) via the remote processing component to automatically start the MICR destruction when the check deposit has been processed. In one implementation, once the MICR destruction is launched, instructions programmed and stored with the MICR destruction mechanism (e.g., stored in an EPROM memory of the scanner, etc.) may execute commands including, placing the coordinates of the starting punch or spray, performing the punching or spraying within the pre-programmed time frame, stopping the punching or spraying when the pre-programmed time frame is reached. In a further implementation, the length of the punching or spraying time frame may be programmable, and configurable by a user via the remote processing component.

In an alternative implementation, the RDC-Detection may instruct the user to physically destroy the check and submit digital evidence of check detriment. For example, the user may tear the check, capture an image of the torn check pieces, and submit the captured image to the RDC-Detection for verification, as shown in FIG. 11H. For another example, if the user operates a video camera, the user may submit live video streaming, and/or a video file, showing the deposited paper check being destroyed.

In one embodiment, the RDC-Detection may create a record of the deposited check and store the deposited check record in a repository to prevent check re-presentment. For example, in one implementation, the RDC-Detection may store an image of the check associated with extracted information, such as payee's name, deposit date, bank name, MICR information including the bank routing number and account number, and/or the like. In another implementation, the RDC-Detection may create a record of the check based on a portion of the check image which may be unique to represent the check. For example, in one implementation, the created check record may only include an image of the front side of a check.

Alternative Embodiments of RDC-Detection User-Server Flow Overview

Figure 3C:
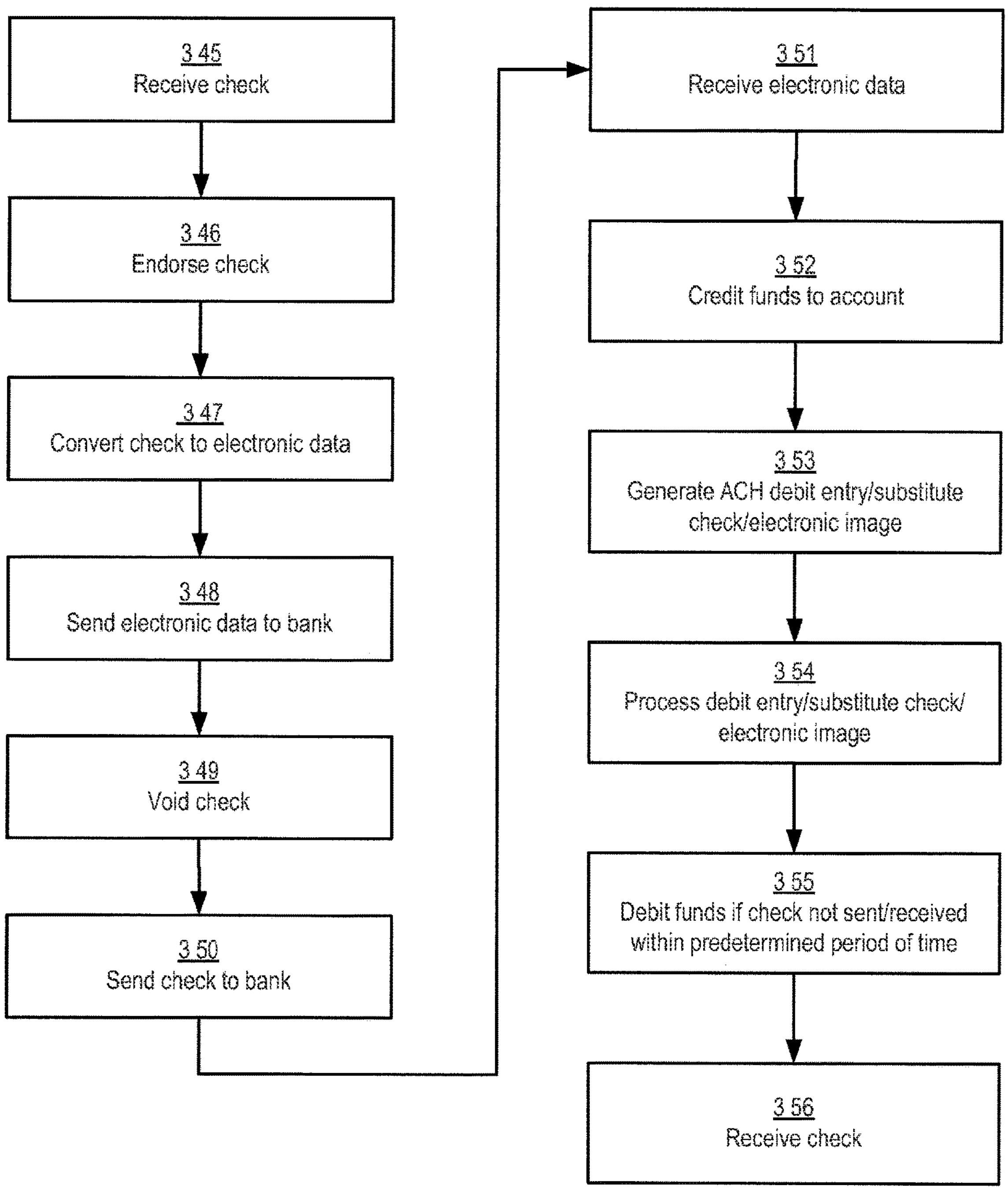
Figure 3D:
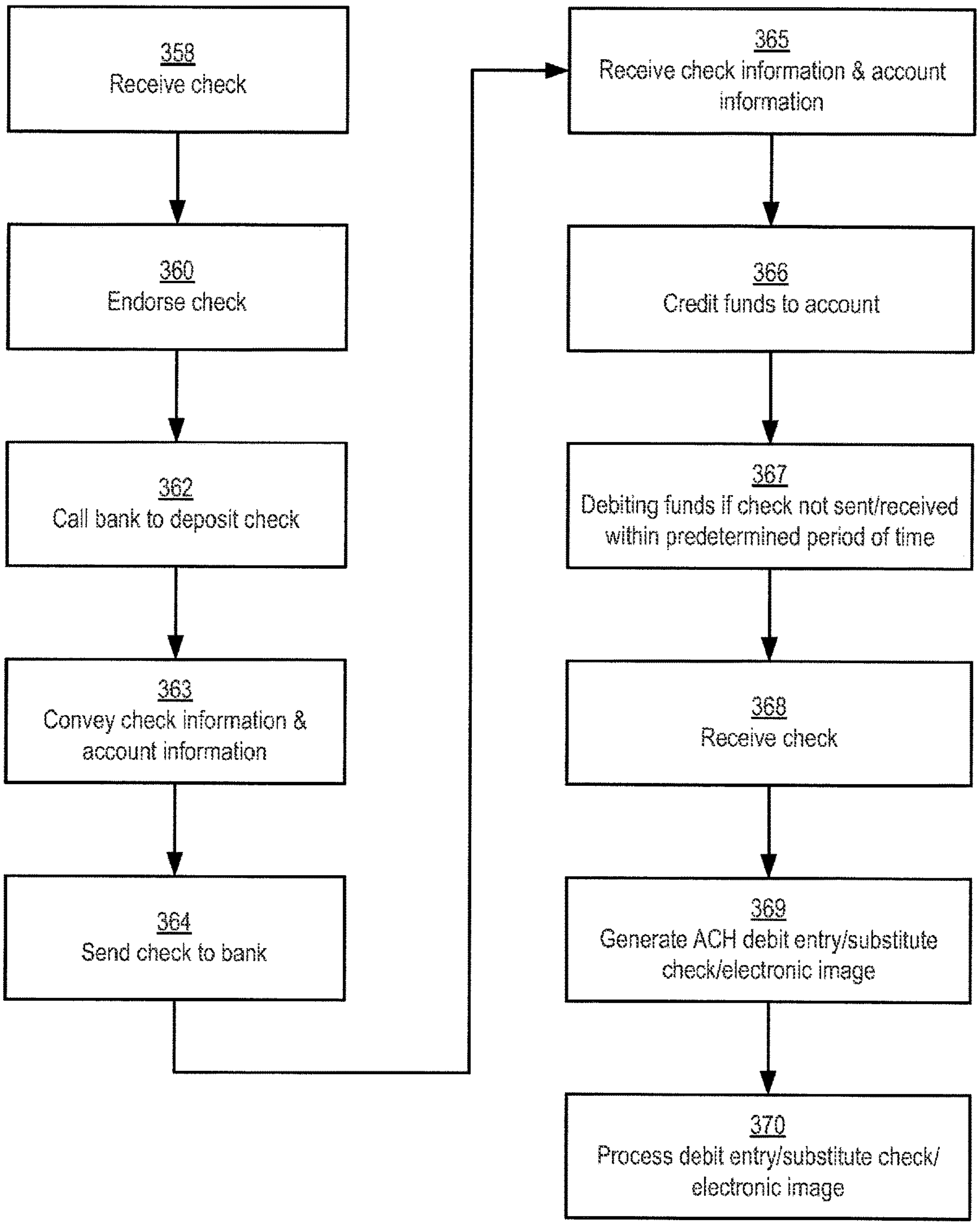

FIGS. 3C-D provide logic flow diagrams illustrating aspects of remote deposit of checks in alternative embodiments of the RDC-Detection.

FIG. 3C is a flow diagram illustrating an example method of remotely depositing checks. As shown in FIG. 3B, at 345, an account owner (i.e., the payee) may receive a check from a third party (i.e., the payer). At 346, the payee may endorse the check by signing the back of the check in the designated field. If the payee wishes to deposit the check into an account, such as a savings and/or checking account, the payee also may write an account number below the signature. At 347, the payee may convert the check into electronic data. This may be accomplished in any number of ways. For example, the payee may create a digital image of the first side of the check, the second side of the check, or both. The digital image may be created using a general purpose flatbed scanner, digital camera, photocopier, fax machine, and the like.

The payee also may convert the check into electronic data by scanning the check using a Magnetic Ink Character Recognition (MICR) device. Checks typically contain MICR information (e.g., routing number, account number and check number) on the bottom left-hand corner of the check. The MICR information usually consists of characters written in a magnetic ink. The MICR information may be read electronically by passing the check through the MICR device, which may translate the characters by magnetizing the ink.

As shown in FIG. 3C, at 348, the payee may send the electronic data to a bank that is associated with an account for depositing funds. Any means for transmitting electronic data over a communications network is consistent with an embodiment. For example, if the payee creates a digital image of the check, the image may be sent to the bank by attaching the image to an email. If the electronic data is in the form of MICR information captured by a MICR device, the device may have an output component for transmitting the electronic data to the bank over the communications network. In addition, the electronic data may include information pertaining to the account for depositing funds, such as the account number and/or the name on the account. The account number may appear on the check itself, below the signature endorsing the check. The account number and/or name on the account also may appear in an email, either with or without the digital image, for example.

At 349, the payee may void the check. For example, the payee may write and/or stamp "void" on the check. At 350, the payee may send the check to the financial institution associated with the account for depositing funds. The check may be sent via a common carrier, such as the United States Post Office, FedEx®, United Parcel Service®, and the like. The process may then proceed to 350. It will appreciated that 349 and 350 may be performed to provide additional security features. For example, by removing the check from circulation, it may be less likely that the check will be deposited more than once.

At 351, the bank may receive the electronic data representative of the check along with information pertaining to the account for depositing funds. At 352, the bank may credit funds to the account. The credit may be a provisional credit, enabling the payee to access the funds while the check is being cleared. A provisional credit may be voided if the bank determines that the transaction is erroneous and/or fraudulent.

At 353, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN). In an embodiment, a payee may receive a check in return for the sale of goods, such as a used car, for example. The payee may endorse the check and/or send electronic data representative of the check to the payee's bank, which may be referred to as the originating depository financial institution (ODFI). As noted above, the electronic data may be generated in any number of ways. For example, the payee may use a MICR device to scan and translate the MICR information (e.g., account number, routing number, check number, etc.) located on the check and transmit the data to the payee's bank along with information pertaining to the account for depositing funds. Upon receipt of the MICR information and account information, the payee's bank may credit funds to the payee's account and generate an ACH debit entry to the payer's account, which may be presented to the ACH service provider for processing.

The ACH service provider may process the debit entry by identifying the account and bank from which the check is drawn. The bank from which the check is drawn (i.e., the payer's bank) may be referred to as a receiving depository financial institution (RDFI). If the payer's bank verifies the transaction, the ACH service provider may settle the transaction by debiting the payer's bank and crediting the payee's bank. The payer's bank may then debit the payer's account.

A substitute check is typically a paper reproduction of an original check and may be the legal equivalent of the original check. Substitute checks were authorized under The Check Clearing for the 21st Century Act, commonly known as Check 21. The Act was enacted to facilitate the check clearing process by allowing banks to transmit electronic images of checks (e.g., substitute checks) to other banks rather than physically sending the original paper checks. Check 21 does not require that banks use substitute checks. In fact, many banks may have voluntary agreements to accept certain electronic images of checks even though the images may not qualify as substitute checks under Check 21. If a bank does not have a voluntary agreement and/or refuses to accept an electronic image, the financial institution is required under Check 21 to accept a substitute check in lieu of the original check.

In an embodiment, a payee may receive a check as a birthday gift, for example. The payee may endorse the check and/or send electronic data representative of the check to the payee's bank. As noted above, the electronic data may be generated in any number of ways. For example, the payee may use a general purpose flatbed scanner and/or digital camera to create a digital image of the front and back of the check. The payee may then attach the digital images to an email and send the digital image to the payee's bank along with information pertaining to the account for depositing funds. Upon receipt of the digital images and/or account information, the payee's bank may credit funds to the payee's account. If the payee's bank and the payer's bank have a voluntary agreement for accepting electronic images of checks, the payee's bank may generate an electronic image of the check and/or simply forward the digital images received from the payee to the payer's bank. If there is no agreement between the banks, the payee's bank may convert the digital images into a substitute check and present the substitute check to the payer's bank and/or a check clearing service provider (e.g., a regional branch of the Federal Reserve) to clear the check.

Returning to FIG. 3C, at 354, the bank may process the ACH debit entry, substitute check, and/or electronic image. As noted above, the bank may present the ACH debit entry to an ACH service provider (e.g., EPN), which may be responsible for settling the transaction between the payee's bank and the payer's bank. The bank also may convert the digital image into a substitute check and present the substitute check to an intermediary bank (e.g., a regional branch of the Federal Reserve) to complete the check clearing process. At 355, the bank may debit the payee's account if the original check is not received and/or sent within a predetermined period of time. For example, the bank may require that the payee send the check and have it postmarked within five business days of sending the electronic data representative of the check. If the check is not postmarked within the predetermined period of time, the financial institution may void the provisional credit (e.g., withdraw funds from the account). At 356, the financial institution may receive the check from the payee. It will appreciated that 355 and 356 may be performed to provide additional security features by removing the check from circulation.

FIG. 3D is a flow diagram illustrating an alternative embodiment of an example method of remotely depositing checks. As shown in FIG. 3C, at 358, a payee may receive a check from a third party payer. At 360, the payee may endorse the check by signing the back of the check in the designated field. If the payee wishes to deposit the check into an account, such as a savings and/or checking account, the payee also may write an account number below the signature. At 362, the payee may call a bank associated with an account for depositing funds and request that the check be deposited into the account. Any method of contacting the bank is consistent with an embodiment. For example, the payee may use a phone, email, instant messaging, and/or a fax machine to make the request.

At 363, the payee may convey the check information and/or information pertaining to the account for depositing funds. For example, the payee may convey the MICR information (e.g., account number, routing number, check number, etc.) on the check. In addition, the payee may convey the account number of the account where the funds are to be deposited. Any method of conveying the information is consistent with an embodiment. For example, as noted above, the payee may use a phone, email, instant messaging, and/or fax machine. At 364, the payee may void the check and/or send the check to the bank. The process may then proceed to 365.

It will be appreciated that 364 may be performed to provide additional security features. For example, by removing the check from circulation, it may be less likely that the check will be (willfully or accidentally) deposited more than once. In addition, by requiring the payee to produce the check, the financial institution may prevent the deposit of fraudulent checks.

At 365, the bank may receive the check information and account information. At 366, the bank may credit funds to the account. As noted above, the credit may be a provisional credit, enabling the payee to access the funds while the transaction is being processed. At 367, the bank may void the provisional credit if the original check is not sent and/or received within a predetermined period of time. At 368, the bank may receive the check. At 369, the bank may generate an ACH debit entry, substitute check, and/or electronic image. At 370, the bank may process the ACH debit entry, substitute check, and/or electronic image. It will appreciated that 369 and 370 may be performed to provide additional security features.

Other security features may be consistent with an embodiment. For example, the bank may only permit certain payees to remotely deposit checks. By way of example, and not limitation, the bank may accept electronic data representative of a check and/or accept a request to deposit a check if the payee's account is in good standing. The payee's account may be considered in good standing if the payee has a positive account balance, has a predetermined amount of funds in the account, and/or is not delinquent on any payments to the bank. The bank also may receive the electronic data and/or request but credit funds to the account if the account is in good standing as of the time the electronic data and/or request was received. In addition, the bank may impose additional requirements on a payee remotely depositing a check into an account that is not in good standing. For example, as noted above, the bank may provisionally credit the payee's account upon receipt of the electronic data and/or request but may require the payee to send the check to the bank. Thus, the account may be debited if the check is not sent and/or received within a predetermined amount of time.

In some embodiments, the RDC-Detection may impose limitations on the deposit amount and/or the availability of the deposit. For example, the RDC-Detection may place a daily, weekly, and/or other periodic limit for the total amount of remote deposits for a given period. The RDC-Detection may additionally or alternatively limit the number of periodic transactions for a given user. Depending on the implementation, such limits may be pre-specified for users (such as a default of limiting users to 3 remote deposits per day, and limiting total daily deposits to $10,000) and/or determined based on risks associated with a use and/or a transaction. For example, a user may have a pre-specified deposit limit of $10,000 per day, but if the user requests and/or attempts to deposit an amount greater than that (e.g., a check for $15,000), rather than simply rejecting the deposit, the RDC-Detection may notify the user that the amount is greater than there specified deposit limit. In some such embodiments, the RDC-Detection may allow the user to request that the deposit limit be raised for this transaction, in some embodiments for an associated fee, and the RDC-Detection may notify a pre-specified bank or financial institution administrator to approve or reject the request.

In some embodiments, the RDC-Detection may include user and/or transaction information in the notification to assist the administrator in making the decision, such information including the location of the user requesting the deposit, the bank on which the deposited information is drawn, the amount of time the user has been associated with the institution, prior deposit/banking history, etc. The RDC-Detection may additionally or alternatively limit the availability of some or all of the funds of deposit(s) that exceed the pre-specified amount.

Similarly, the RDC-Detection may limit the availability of deposited funds according to similar defaults and/or determinations. For example, if the user is depositing funds from a location (e.g., as determined by GPS metadata associated with a deposit from a mobile device) that is outside the user's normal geographic region (e.g., the user's mailing address and surrounding area), the amount of funds made immediately available may be less than if the user is making the deposit from his or her home. Similarly, the amount of the deposit, the account(s) to which the deposit is applied, user account balance(s), user tenure with the financial institution, and/or other information may be utilized by the RDC-Detection in determining the amount(s) and timeline for availability.

In one implementation, the RDC-Detection utilizes a risk matrix, with various weighted risk factors corresponding to risk information, to determine account limitations. In another implementation, the RDC-Detection may utilize risk information in a risk calculation, in which each piece of risk information is assigned a value and the amount available is determined based on the total risk value of the collected information. For example, a deposit of over $5000 may have a higher risk value than a smaller deposit amount, and, as such, may have more restrictions on availability of the full amount. Similarly, a deposit by a user that had been with a bank for 10 years may be determined to have a lower risk value than a user who had just become a member of the bank. In some implementations, the amounts available and/or the deposit limits may be determined by the RDC-Detection utilizing determined risk scores and thresholds such that a user who is determined to have a very low risk value has very few limitations imposed on his or her account, a user that has a determined risk value that exceeds a first threshold but is less than a second threshold may have moderate restrictions associated with his or her account, and a user that has a determined risk value that exceeds the second threshold may have even more restrictions applied to his or her account. In some embodiments, the RDC-Detection may utilize local and/or national regulations in determining and/or applying limitations to accounts and/or deposits.

RDC-Detection Exemplary User Interface for Deposit Limit

Figure 3E:
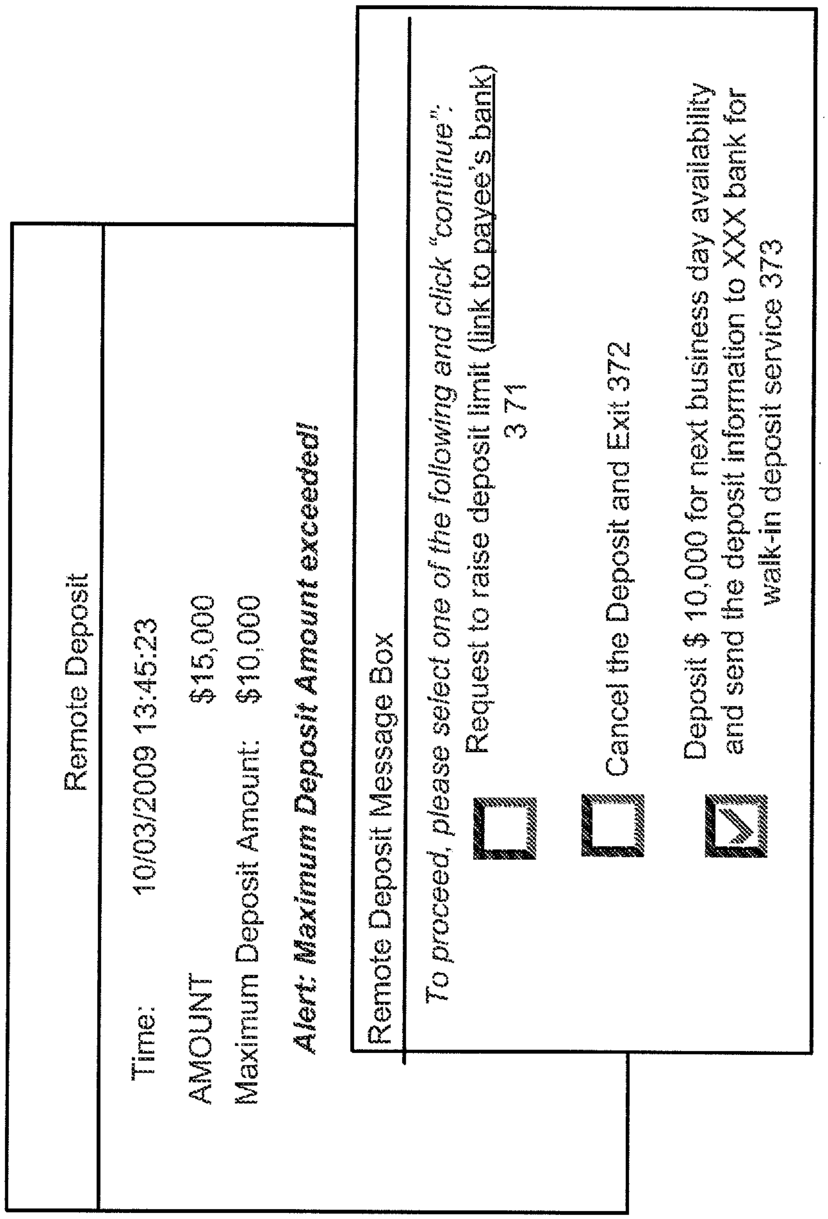

FIG. 3E shows a schematic user interface illustrating In some embodiments, the RDC-Detection may impose limitations on the deposit amount and/or the availability of the deposit. For example, the RDC-Detection may place a daily, weekly, and/or other periodic limit for the total amount of remote deposits for a given period. The RDC-Detection may additionally or alternatively limit the number of periodic transactions for a given user. Depending on the implementation, such limits may be pre-specified for users (such as a default of limiting users to 3 remote deposits per day, and limiting total daily deposits to $10,000) and/or determined based on risks associated with a use and/or a transaction. For example, a user may have a pre-specified deposit limit of $10,000 per day, but if the user requests and/or attempts to deposit an amount greater than that (e.g., a check for $15,000), rather than simply rejecting the deposit, the RDC-Detection may notify the user that the amount is greater than there specified deposit limit as shown in FIG. 3D. In some such embodiments, the RDC-Detection may allow the user to request that the deposit limit be raised for this transaction 371, in some embodiments for an associated fee, and the RDC-Detection may notify a pre-specified bank or financial institution administrator to approve or reject the request.

In some embodiments, the RDC-Detection may include user and/or transaction information in the notification to assist the administrator in making the decision, such information including the location of the user requesting the deposit, the bank on which the deposited information is drawn, the amount of time the user has been associated with the institution, prior deposit/banking history, etc. The RDC-Detection may additionally or alternatively limit the availability of some or all of the funds of deposit(s) that exceed the pre-specified amount.

Similarly, the RDC-Detection may limit the availability of deposited funds according to similar defaults and/or determinations. For example, if the user is depositing funds from a location (e.g., as determined by GPS metadata associated with a deposit from a mobile device) that is outside the user's normal geographic region (e.g., the user's mailing address and surrounding area), the amount of funds made immediately available may be less than if the user is making the deposit from his or her home. Similarly, the amount of the deposit, the account(s) to which the deposit is applied, user account balance(s), user tenure with the financial institution, and/or other information may be utilized by the RDC-Detection in determining the amount(s) and timeline for availability.

In one implementation, the RDC-Detection utilizes a risk matrix, with various weighted risk factors corresponding to risk information, to determine account limitations. In another implementation, the RDC-Detection may utilize risk information in a risk calculation, in which each piece of risk information is assigned a value and the amount available is determined based on the total risk value of the collected information. For example, a deposit of over $5000 may have a higher risk value than a smaller deposit amount, and, as such, may have more restrictions on availability of the full amount. Similarly, a deposit by a user that had been with a bank for 10 years may be determined to have a lower risk value than a user who had just become a member of the bank. In some implementations, the amounts available and/or the deposit limits may be determined by the RDC-Detection utilizing determined risk scores and thresholds such that a user who is determined to have a very low risk value has very few limitations imposed on his or her account, a user that has a determined risk value that exceeds a first threshold but is less than a second threshold may have moderate restrictions associated with his or her account, and a user that has a determined risk value that exceeds the second threshold may have even more restrictions applied to his or her account. In some embodiments, the RDC-Detection may utilize local and/or national regulations in determining and/or applying limitations to accounts and/or deposits.

In one implementation, if the RDC-Detection determines the deposit amount has exceeded a maximum one-time remote deposit amount defined by the payee's bank. If yes, the RDC-Detection may notify the user via a user interface and provide options for the user to proceed. For example, the user may select to submit q request to raise the deposit limit 371, cancel the remote deposit and exit 372, or to only deposit the maximum available amount for next business day availability and send the deposit information to a closest branch for in-person deposit service 373.

RDC-Detection Account Selection

Figure 3F:
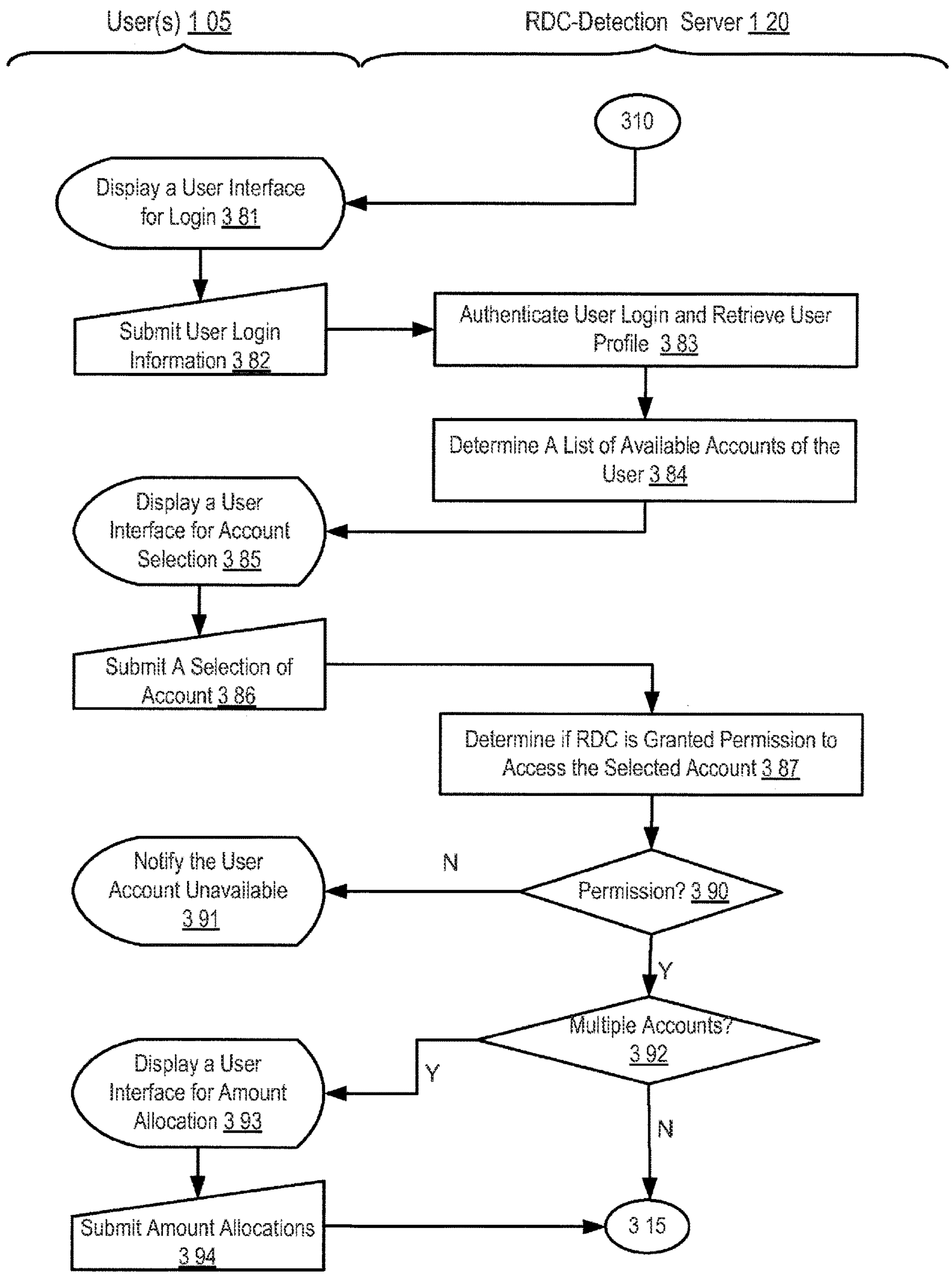

FIG. 3F provides a logic flow diagram illustrating aspects of remote deposit with account selection in one embodiment of the RDC-Detection. To reduce the processing necessary to deposit a check remotely into an account other than a primary financial account, such as a checking account, the RDC-Detection may provide the depositor the ability to select from a list of accounts an account in which to deposit the check. In one embodiment, upon initializing the RDC-Detection component 310, the RDC-Detection platform may prompt the user to login the RDC-Detection system. For example, in one implementation, the RDC-Detection may display a user interface for login 381 at the RDC website, and instruct the user to submit user login information 382, such as a username and a password etc. In another implementation, the RDC-Detection may directly recognize the user device by its hardware tag, e.g., the mobile device MAC address, and/or the like, if the user has registered the user device with the RDC-Detection.

In one embodiment, the RDC-Detection platform may authenticate the user login, and then retrieve user profile 383. In one implementation, the user profile may record information including the user name, user contact information, user credit history, user account information, and/or the like. In one implementation, to assist the depositor in determining which accounts may be available for deposit, the RDC-Detection may determine a list of available accounts associated with the user for deposit 384. For example, the RDC-Detection may retrieve a list of user authorized accounts for remote deposits. For another example, if the RDC-Detection is affiliated with a payee's bank, the RDC-Detection may only retrieve a list of user accounts associated with the payee's bank. For another example, the RDC-Detection may determine that, based upon the types of the accounts, checking, savings, and investment accounts, may be available for deposit of the negotiable instrument.

In an alternative implementation, if an indication of deposit amount is available at 384, for example, the user has submitted an amount of deposit to RDC-Detection, or the account selection 381-391 take place after the user has submitted a check image and the RDC-Detection has processed the check image to obtain deposit data, the RDC-Detection may determine a list of available accounts for deposit based on the requirement of each account. For example, the RDC-Detection may filter accounts that have a maximum allowable deposit amount lower than the deposit amount. For another example, to assist the depositor in determining which accounts may be available for deposit, a financial institution may display a list of financial accounts to the depositor. In a further implementation, if the RDC-Detection is affiliated with a financial institution, the RDC-Detection may generate a list of accounts, wherein the RDC-Detection is granted access to the account by the account owner even if the account is at a different financial institution. For example, a user may submit a remote deposit request to the RDC-Detection platform at Bank A but Bank A may provide an option for the user to directly deposit the check into his/her account at Bank B, if Bank A is authorized by the user to access his/her account at Bank B.

In one embodiment, the RDC-Detection may display a user interface for account selection 385, e.g., a dropdown list, a click-and-choose list, etc., and the user may submit a selection of account 386. The RDC-Detection may then determine whether the RDC-Detection is granted permission to access the selected account 387. For example, in one implementation, as discussed above, if the RDC-Detection is associated with a first payee's bank, but the selected account is associated with a different payee's bank, then the first bank needs to be granted permission by the account owner to access the account at the different bank in order to proceed with check deposit. For another example, if the RDC-Detection is a remote deposit service agency, then the RDC-Detection may only access an account at a payee's bank only with authorization of the account owner.

In one embodiment, if the permission is granted 390, the RDC-Detection may proceed to determine whether the submitted selection of accounts include more than one account 392; and otherwise, the RDC-Detection may notify the user that the selected account is unavailable 391. In one embodiment, if there are multiple accounts selected 392, the RDC-Detection may display a user interface for amount allocation 393 the user and request the user submit amount allocations 394 for each selected account. For example, in one implementation, if the user selected to deposit into both a checking account and a savings account, the user may then split the deposit amount and enter the portions of amount associated with each account for deposit processing.

Figure 3G:
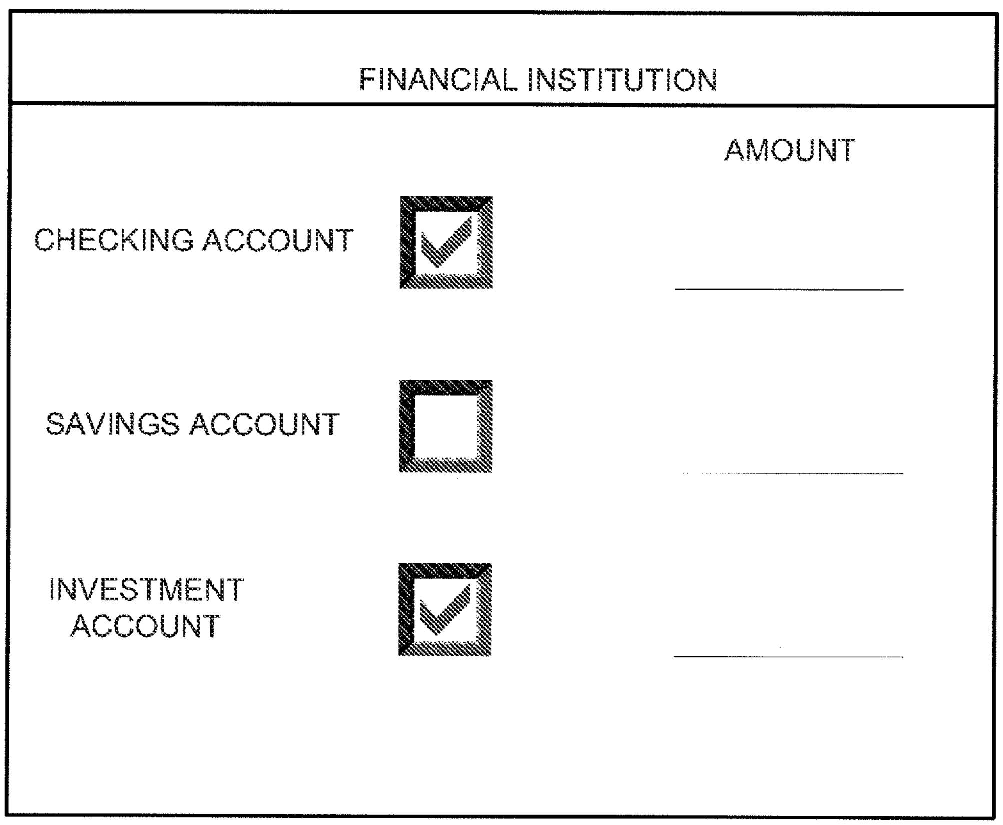

FIG. 3G provides an example of a schematic screen shot illustrating a user interface presenting a list of selectable accounts within one embodiment of RDC-Detection. A financial institution may determine that, based upon some criteria as discussed above, checking account, saving account, and investment account, may be available for deposit of the negotiable instrument. A depositor may then select from a list of selection boxes which account to deposit the negotiable instrument. As shown in FIG. 3F, the depositor has selected the checking account and the investment account. Thus, the depositor may be further requested to enter a first amount to be deposited into the checking account and a second amount to be deposited into the investment account, respectively.

RDC-Detection Image Submission

Figure 4J:
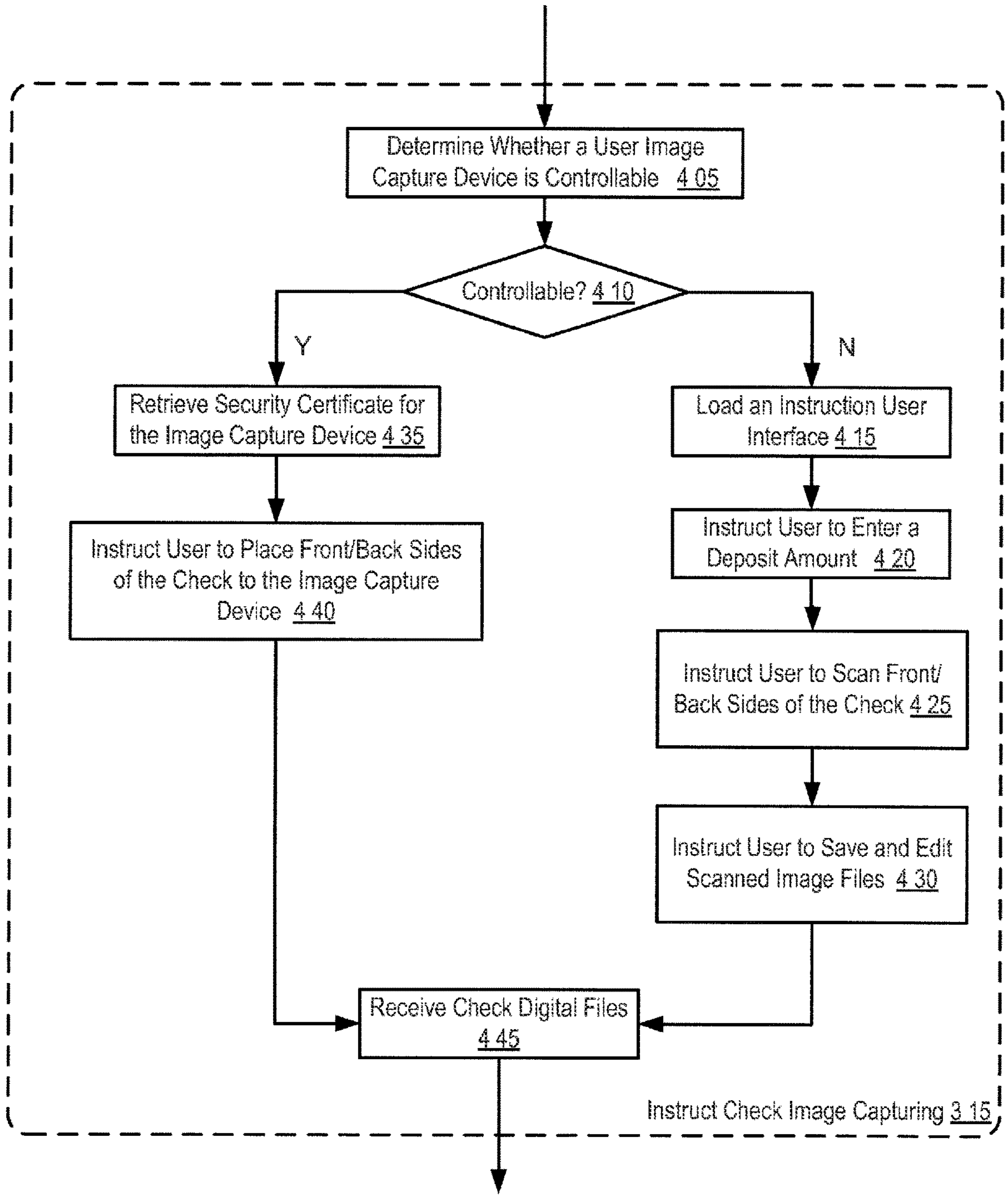

FIG. 4J provides a logic flow diagram illustrating aspects of instructing check image capturing and uploading in one embodiment of the RDC-Detection. In one embodiment, upon receiving a remote deposit request from a user, the RDC-Detection may determine whether a user image capture device is controllable 405. In one implementation, the RDC-Detection platform may remotely control a scanner connected to a home computer, a built-in camera of a mobile device, an ATM/kiosk machine, and/or the like. For example, in one implementation, if a user visits a RDC-Detection website via a home computer, a mobile device and/or the like, an embedded browser component running on the website, such as JAVA applets, Flash scripts, etc., may determine whether the RDC-Detection platform can control a user image device via the user terminal device. For another example, in one implementation, the RDC-Detection platform may establish a secure communications channel with a user mobile device, and directly control the built-in camera of the mobile device via hardware interfaces. For another example, in one implementation, the RDC-Detection platform may directly control an ATM/kiosk machine via a specialized deposit communications channel.

In one embodiment, for different devices (e.g., scanners, digital camera, mobile devices, etc.), certain permissions may be used in order to allow the browser component to remotely control the image capture device. For example, in one implementation, a user image device may require certificate authentication to allow secure remote control from the RDC-Detection platform. Such certificates may be digital signatures interfacing an image capture device driver, a Secure Socket Layer (SSL) encrypted certificate, and/or the like.

In one embodiment, if the image capture device is a scanner, the drivers of the scanner may be different for different operating environments—e.g., the same scanner may use a different driver depending on whether it is being operated from an environment based on one of the WINDOWS operating systems, an environment based on one of the operating systems used in APPLE computers, an environment based on a version of the LINUX operating system, etc. For example, a Canon imageFORMULA DR-7580 Production Scanner requires a DR-7580 ISIS/Twain Driver version 1.7 for Windows 2000 SP4, XP 32 bit SP3, XP 64 bit SP3, Vista 32 bit SP2, Vista 64 bit SP2, Windows 7 32 bit and Windows 7 64 bit, and Canon LiDE 50 drivers for Mac OS X. In that case, each driver may use different certificates, and different environments may use various different environment-specific technologies to allow the scanner to be controlled from a remote web server. In such cases, the RDC-Detection may obtain a large number of certificates, and may interface with a large number of different technologies, to support a large number of scanner-environment combinations and/or other image capture device environment, in order to allow its software to control scanners for a variety of customers.

As such, in one embodiment, if the user image capture device is remotely controllable by the RDC-Detection platform via 410, the RDC-Detection may retrieve security certificate for the corresponding image capture device 435, and control the image capture device to obtain the check images. For example, in one implementation, the browser component, which may be a security JavaScript running on the web browser application, may create a device digital certificate to enable HTTPS on the image capture device. In one implementation, the JavaScript may download a certificate from the remote RDC-Detection if available to interface with the driver of the image capture device, and create a public key for the certificate to be used in SSL encryption to establish an encrypted channel between the RDC-Detection platform and the image capture device.

In one implementation, the RDC-Detection may instruct a user to place the front/back sides of the check in front of the image capture device to create images of the check 440. For example, in one implementation, if a scanner connected to a computer is used, the browser component running on a home computer connected to a scanner may control the home scanner to start upon user request and automatically collect the images in an appropriate format and resolution, and can then upload the image for deposit. In such cases, the user may place the physical check in the scanner bed and to click “start” on the browser interface. In one implementation, the browser component may instruct the user to flip the physical check and repeat the process for both sides of the check via a web page interface, in order to obtain images of the front and the back.

For another example, in one implementation, a mobile device, such as an Apple iPhone may initiate a pre-installed program, or download and install a software package instantly from the RDC-Detection platform, which may facilitate the RDC-Detection controlling the mobile device (e.g., the iPhone) to obtain and upload check images. In such cases, a user may position the mobile device and take pictures or videos of both sides of the check, as illustrated in FIG. 11A-H. In a further implementation, if the mobile device is an Apple iPhone, the RDC-Detection may further instruct the user to configure the system settings of the built-in camera to obtain images in compliance with quality standards, such as grayscale requirement, resolution requirement, image file size requirement, and/or the like.

For another example, in one implementation, for kiosk/ATM deposit, a user may be instructed from the screen of a kiosk/ATM machine to place or insert the check into a check deposit slip for scanning, and/or the like.

In one implementation, the RDC-Detection may also instruct the user to enter an amount of the check to be deposited. For example, in one implementation, the user may enter a deposit amount on a RDC-Detection website, on a kiosk/ATM machine, or send an amount number to the RDC-Detection platform from a mobile device, and/or the like.

In an alternative implementation, the RDC-Detection may implement an “atomic deposit” without requesting the user to input deposit information in addition to the check image submission. In this case, the user device (e.g., the mobile device, the home scanner, etc.) may be decoupled from the transaction once the submission of the digital image file for deposit of the check is made. The transaction is thereafter managed by the RDC-Detection platform. In this manner, incomplete transactions are avoided by moving the transaction processing to the RDC-Detection platform side at a financial institution (e.g., payee's bank, etc.) after the user submits the digital image file. Any loss or severing of a communications connection between the user computing device and the RDC-Detection platform, such as due to browser navigation away from the RDC-Detection web page, communication failures, user logouts, etc. on the user side, will not affect the processing and the deposit of the check in the digital image file. Thus, the transaction will not be left in an orphaned state.

Figure 4K:
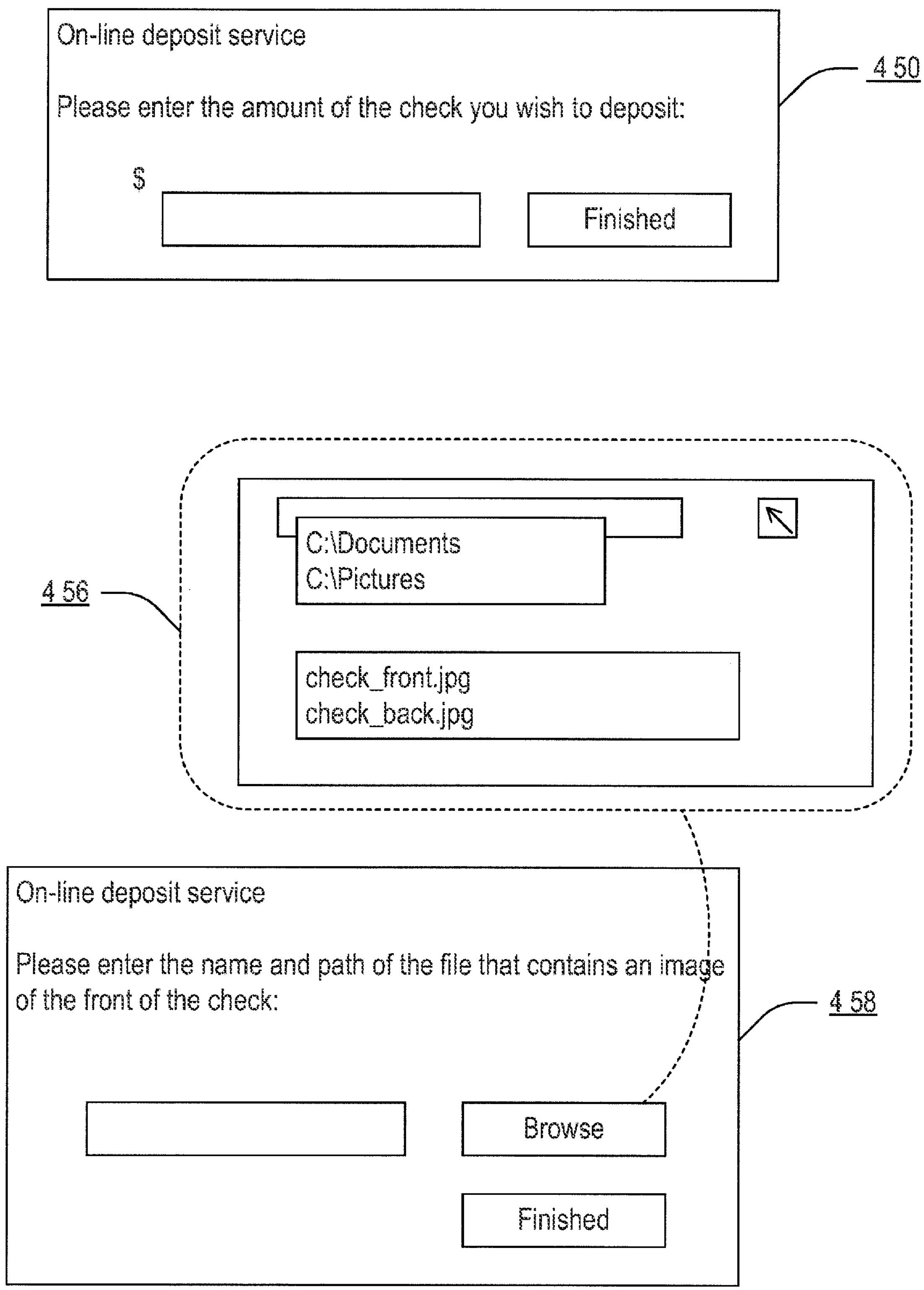
Figure 4L:
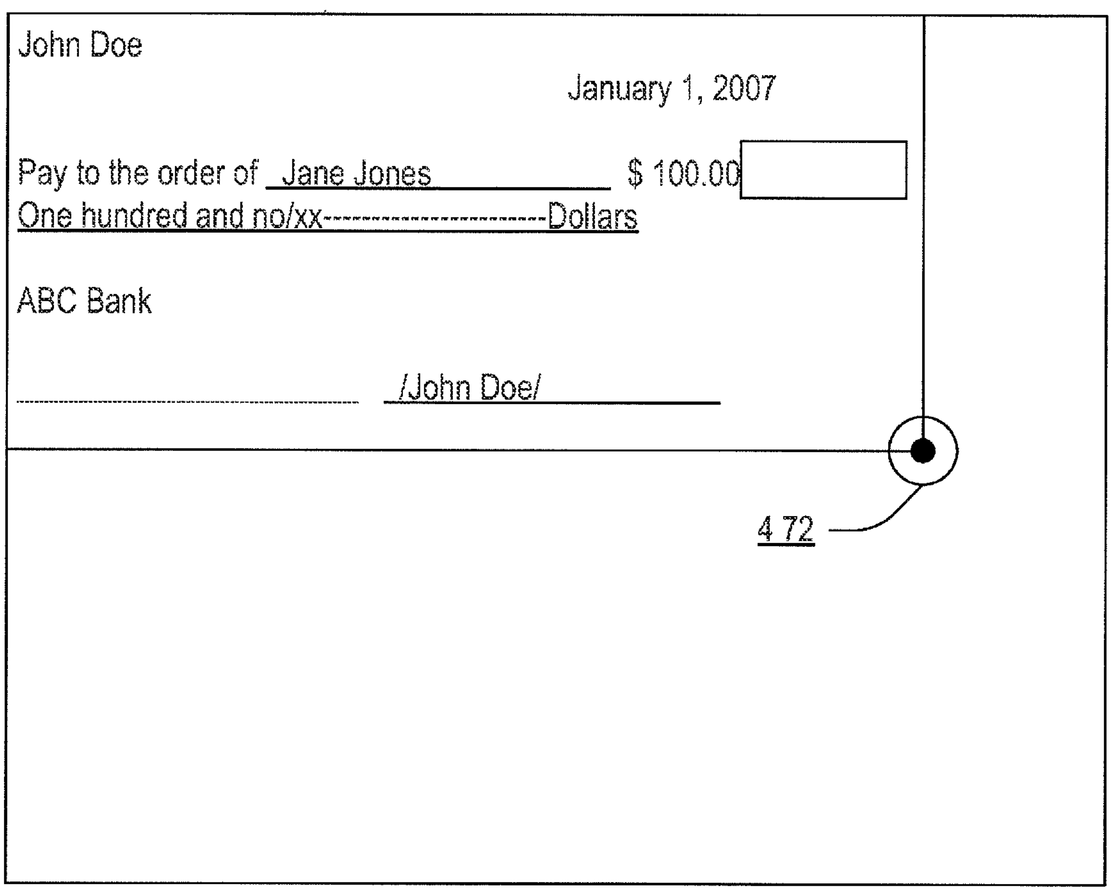

In another embodiment, if the image capture device is not controllable by the browser application component, the RDC-Detection may load an instruction user interface page 415, and instruct the user manually upload the check images. For example, in one implementation, the RDC-Detection platform may not have certificates for scanner drivers for a Macintosh computer. In one implementation, the RDC-Detection may instruct the user to enter a deposit amount 420 (as illustrated in a schematic user interface 450 shown in FIG. 4K), and to scan front/back side of the check and save the scanned image files 425. In one implementation, the RDC-Detection may instruct the user to save the scanned image files in a specified format (e.g., tiff, JPEG etc.) 430, as illustrated in the schematic user interface 456 and 458 of FIG. 4K. In one implementation, the RDC-Detection may instruct the user to edit the check image file prior to uploading 430. For example, in one implementation, as shown in FIG. 4L, the RDC-Detection may instruct the user to crop the check image via an image editing component, during which the user may submit a selection of check image corner 472 via a user interface. In a further implementation, the RDC-Detection may instruct the user to convert the obtained check image into a grayscale image prior to uploading the image file. In one implementation, the user may send the obtained check images to RDC-Detection platform via email, mobile MMS, RDC-Detection browser uploading, and/or the like.

In one embodiment, the RDC-Detection may receive check digital files 445 from the remote user device. In one implementation, the user may send the obtained check images to RDC-Detection platform via email, mobile MMS, RDC-Detection browser uploading, and/or the like. In one embodiment, if the user image capture device is video-enabled, the RDC-Detection may receive video clips of the check. In one implementation, video files may be saved in a series of compliant formats (e.g., AVI, MPEG4, RM, DIVX, etc.) and submitted to the RDC-Detection platform in similar manners with those of submitting check image files as discussed above. In one implementation, the RDC-Detection may instruct or assist the user to compress one or more video files into a package (e.g., WinZip package, etc.) and submit the pack to the RDC-Detection.

Figure 4M:
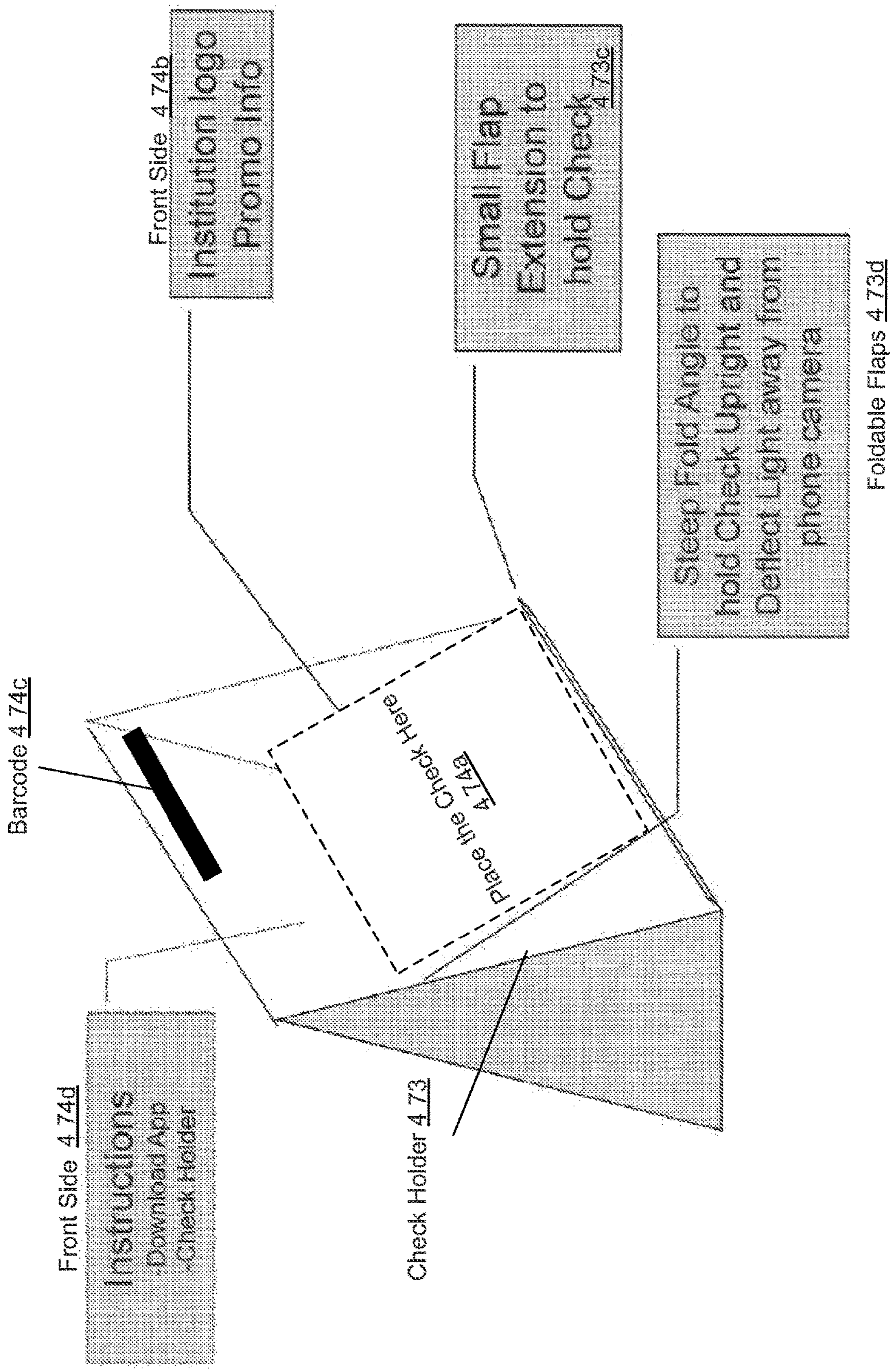

FIG. 4M shows an exemplary apparatus for obtaining an image of the check in one embodiment of RDC-Detection. In one embodiment, a check sleeve or a check holder, with space to hold one or more checks, may be used to capture an image of a check. The checks sleeve may, for example, be made of a flexible material, such as plastic, and may have mechanisms to hold one or more checks in place in one or more designated spaces. For example, the check sleeve may have a flap or corners that hold a check in place during scanning. The type of flap or corners that are used may be chosen to hold the check in place, while also allowing certain parts of the image to be captured without optical interference—e.g., by having cutouts that directly expose the check in portions that are expected to undergo optical character recognition. The mechanism may also be configured to allow optical detection of the presence or absence of a check within the sleeve.

Within various embodiments, Markings or other features may be incorporated into the check sleeve to assist in orienting an image of the check to the proper angle, or in distinguishing portions of the image that represent the check from non-check portions. For example, horizontal and vertical lines may be printed on the check whose position on an image can be detected allow the skew angle of the image to be determined and offset. Also, the background of the sleeve may be printed in a color or opacity that is expected to contrast with the checks that are to be placed in the sleeve, thereby providing contrast that can be used to distinguish check portions of the image from non-check portions. Additionally, one or more barcodes can be printed on the sleeve that can encode information such as the type of sleeve, the account number to which the checks are to be deposited, or a digital signature.

In further embodiments, a sleeve can be constructed that holds a plurality of checks—e.g., two or more checks—thereby allowing plural checks to be deposited at the same time.

As shown in FIG. 4M, a check holder may take a form similar to a foldable, self-locking stand 473, which may be made of flexible and bendable material, such as plastic, paper, and/or the like, and may have mechanisms to hold one or more checks in place in one or more designated spaces. In one embodiment, the check holder 473 may have a front side 473*a* on which the check to be scanned or taken a picture of will be placed. To reduce reflection, the front side of the check may provide dark background in contrast to the color of the paper check. The front side may be made of light absorbing materials to reduce reflection. In one implementation, the front side 473*a* may comprise a rectangular area with printed information "place the check here" 474*a* to instruct the user to place the check. In another implementation, instructions of how to position the check may be included, e.g., the user may be instructed to place the check in a horizontal or vertical position.

In another implementation, the front side of the check holder may comprise printed information with regard to instructions 474*d* of remote deposit, such as instructions as to how to initiate the remote deposit capture application, download an application package from a remote server, place the paper check in the check holder, capture an image of the check holder containing the check and send the captured image to the remote server using the downloaded application package. In another implementation, the frond side of the check holder may comprise an institution trademark logo and promotion information for the RDC-Detection.

In a further implementation, to facilitate the remote deposit, the check holder may be customized for an individual depositor. For example, in one implementation, the front side of the check holder may comprise a barcode printed thereon 474*c*, which includes information with regard to the depositor, such as, but not limited to depositor name, depositor account number, depositor bank routing number, and/or the like. In a further implementation, a user may capture an image of the check placed on the check holder, creating a visualization of the check associated with the barcode so that the RDC-Detection may process the received image and obtain depositor information from the barcode. In another implementation, other information may be printed on the front side of the check holder, such as, but not limited to, the depositor's RDC-Detection membership name, the payee's bank name, and/or the like.

For another example, the barcode 474*c* may be a code that enables a given financial institution to recognize its own check holder, and verify that the customer is using a holder provided by that particular financial institution as opposed to a holder provided by a different financial institution. In one implementation, a financial institution may provide various different check holders (e.g., check holders for different sized checks, holders with different types of line markings, holders with different luminescence properties, etc.), and the barcode may be used to assist the processing of the image that results from scanning checks positioned in the sleeve. For example, if one check holder has particular line markings or particular luminescence properties, the barcode may comprise information indicative of those properties so that the image processing techniques can be tuned for use with the particular check holder being used. As another example, each customer of a financial institution can be provide with one or more check holders that are customized for that customer, and the barcode may encode the customer's account number, customer number, or other identifying information. If the barcode encodes the customer's account number or customer number, that information may be used to determine the account to which a check is to be deposited. For another example, the barcode may also encode certain security techniques, such as digital signatures, to deter against counterfeit sleeves and/or counterfeit barcodes.

Within various implementations, the barcode 474*c* may use a variety of formats. For example, the barcode may be a line format, such as a alphanumeric code, or a two-dimensional code, such as data matrix. As another example, the barcode can be used to orient the angle of an image of the check—e.g., by detecting the skew of the lines or boundaries of the code, and correcting for the detected angle. As another example, the front side of the check holder may comprise more than one rectangular areas to place the check, and there may be multiple barcodes associated therewith, e.g., one barcode next to each area into which a check may be inserted.

In one embodiment, the check holder 473 may comprise a small flap extension 473*c* at the bottom of the front side to hold the check be placed within the area 474*a*, and the small flap may hold the check at a slight angle so as to deflect glare-light which may be incurred by a camera lens. In a further implementation, the front side of the check may comprise a transparent layer affixed thereon, so that the check may be inserted between the transparent layer and the front side of the check, wherein the transparent layer may assist to hold the check within the rectangular area 474*a* and to reduce reflection on the surface of the check.

Figure 4N:
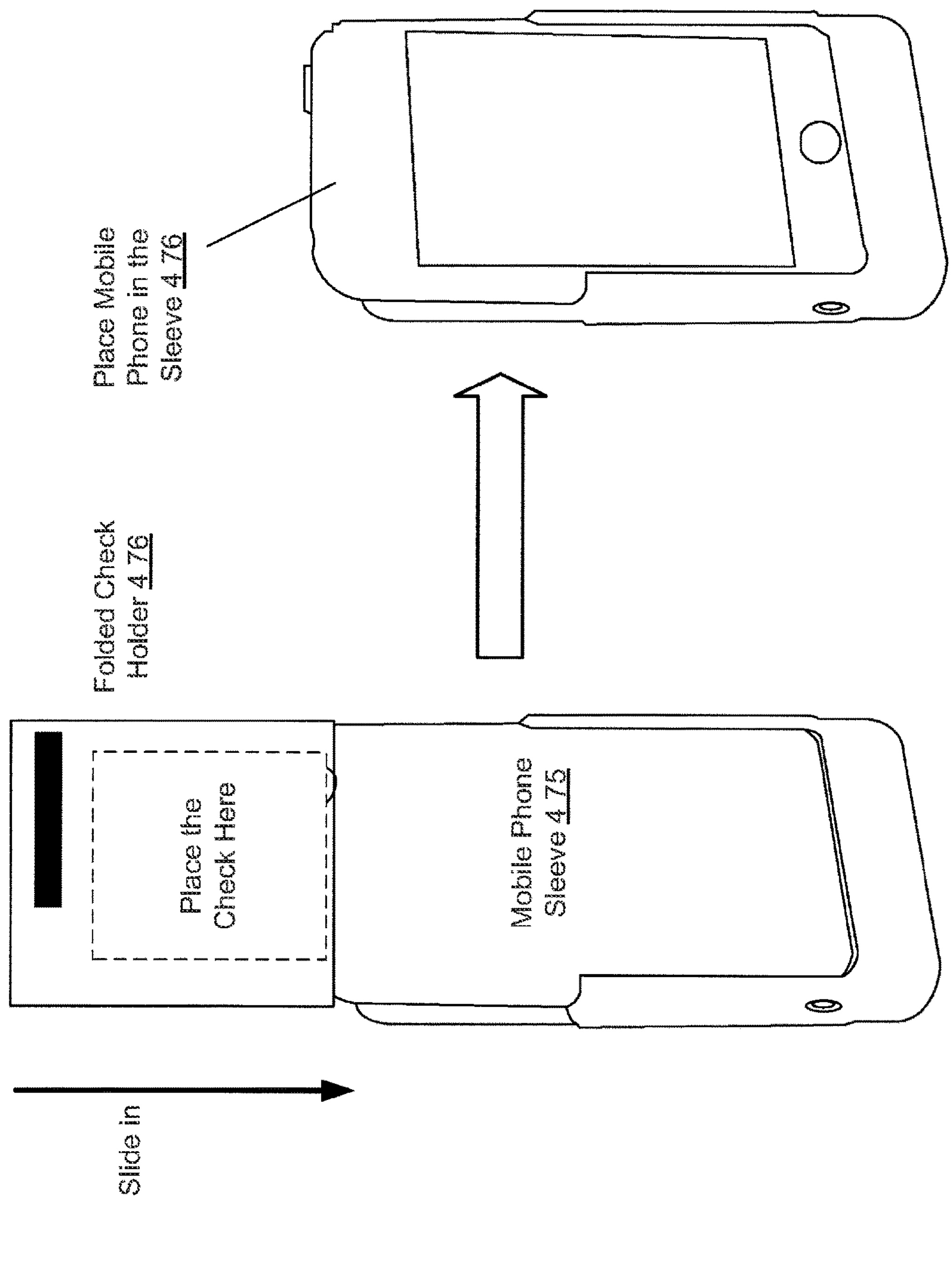

In one embodiment, the check holder is supported by foldable flaps 473*d* on the left and the right side of the front side. The foldable flaps may be adjusted to create a steep fold angle to hold the check upright and deflect light away from the camera. In an alternative embodiment, as shown in FIG. 4N, the foldable flaps may be folded to the back of the front side of the check holder, so that the folded check holder 476 may be inserted in to a mobile phone sleeve 475. A depositor may carry the folded check holder 476 which is conveniently placed in his mobile phone sleeve 475 together with the mobile phone 476, and may capture images of a check with the check holder and the camera built in the mobile phone for remote deposit conveniently.

In one implementation, the user may capture an image of the check placed on the check holder and submit the image to the RDC-Detection. In one implementation, the captured images may be processed to identify which portion(s) of the images represent the check. The process of determining which portions of the check represent the image may include image enhancement, check corner detection, dewarping, cropping and/or the like, as further illustrated in FIGS. 6A-H.

In further implementations, the RDC-Detection may process the received image of the check holder comprising the check. The RDC-Detection may detect the barcode on the received image, and obtain information embedded in the barcode. For example, a barcode reader may be adopted to obtain information encoded in the barcode, such as, but not limited to the depositor's name, depositor account number, payee's bank information, etc. In one implementation, upon performing OCR on the check image to extract deposit information, the RDC-Detection may compare the extracted deposit information with the relevant information obtained from barcode reading. If any inconsistency is detected, the RDC-Detection may send a notification to the user, e.g., by displaying a message to the smart phone or the home computer, to reject the image and request re-submission of the check image.

For example, for security concerns, a payee's bank may provide individualized check holder for a user to engage in remote deposit service, e.g., the individualized check holder may comprise a barcode with embedded information of the user's account information and the payee's bank's routing number. If the user uses the check holder, attempting to capture an image of a check belonging to his spouse, child, friends, and/or the like, the payee's bank may reject the remote deposit.

In an alternative implementation, if the RDC-Detection determines the extracted deposit information from OCR matches the barcode information, the RDC-Detection may proceed with processing the deposit with 315.

RDC-Detection Mobile Deposits Via MMS

Figure 4O:
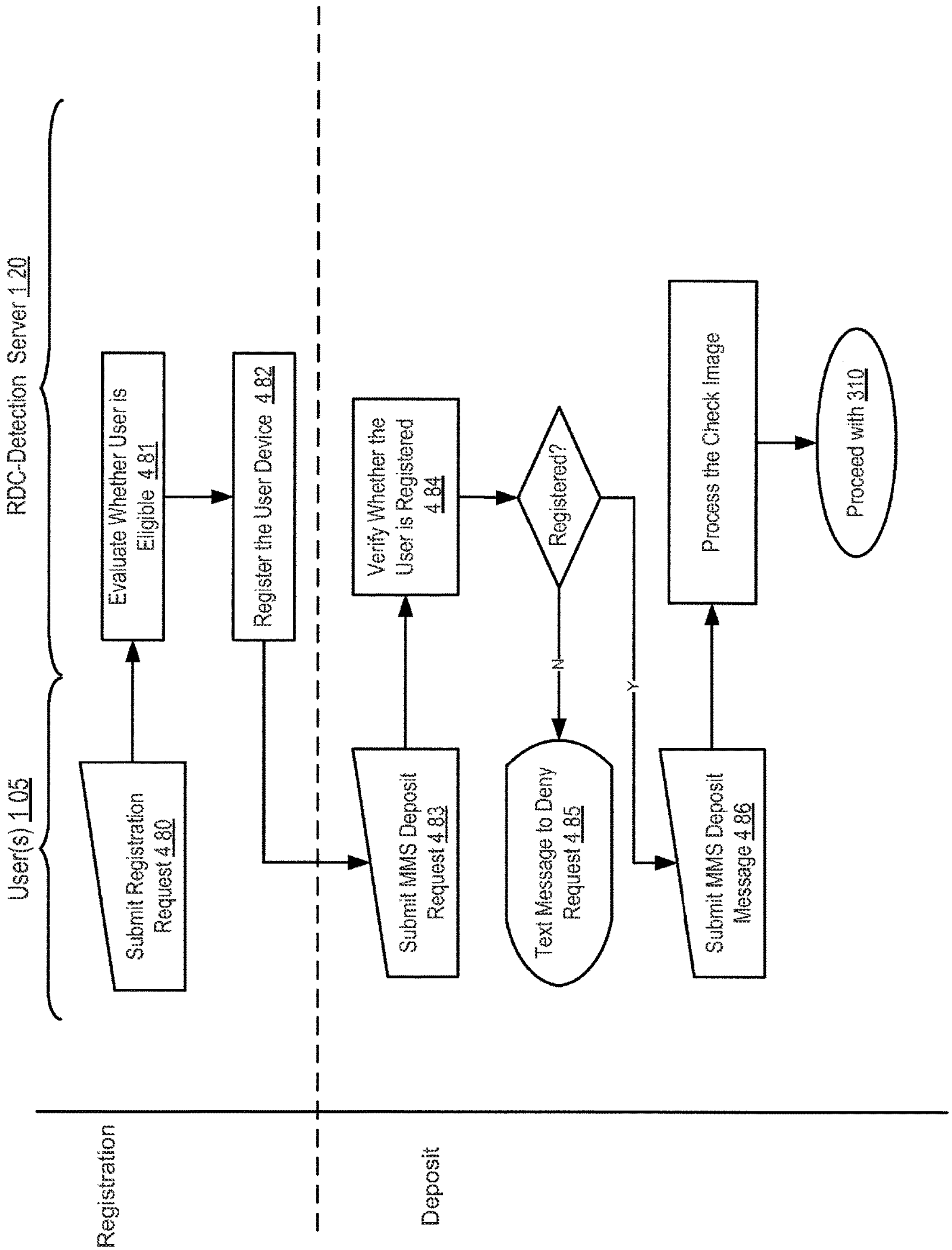

FIG. 4O shows a logic flow illustrating deposit via multimedia message service (MMS) in one embodiment of RDC-Detection. In one embodiment, a user may be requested to register for the MMS deposit service prior to deposit processing. For example, a user may submit registration request 480, via a text message, a call to customer service, mails to the RDC-Detection service/payee's bank, and/or the like. The RDC-Detection platform may then evaluate the user eligibility for the MMS deposit service 481. For example, the RDC-Detection platform may obtain information related to the user's credit history, income information, crime history, and/or the like. In another implementation, the RDC-Detection platform may also impose an automatic registration procedure, wherein a user having an amount more than a minimum required amount in his deposit account is automatically considered for MMS deposit service. The RDC-Detection platform may register the user for MMS service by recording the user submitted cellular phone number as "eligible" 482. In another implementation, the RDC-Detection platform may register the hardware identification of the user mobile device, such as the MAC address.

Figure 4P:
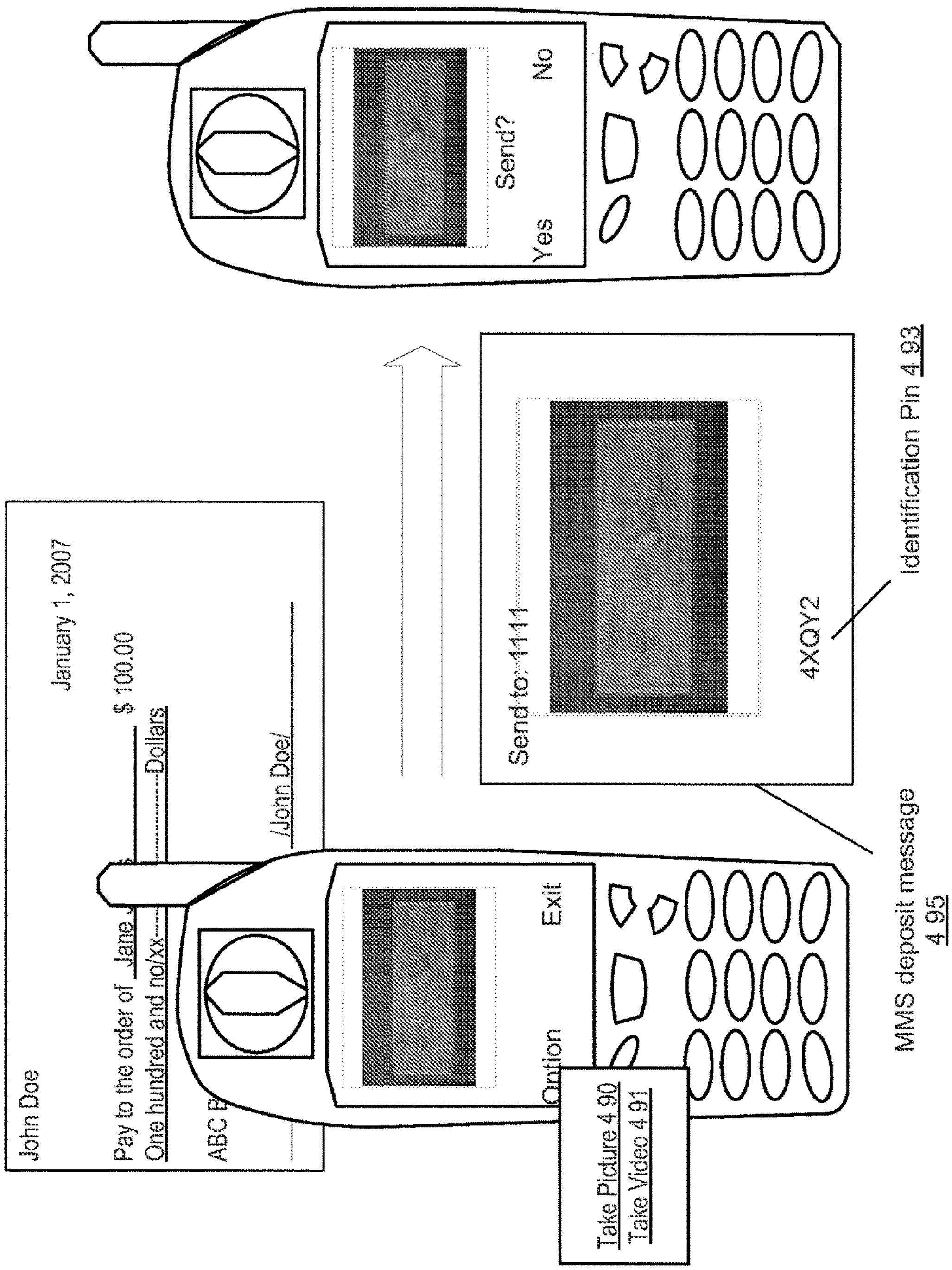

In one embodiment, a user may submit a remote deposit request 483 by sending a MMS message to the RDC-Detection platform 120. In one implementation, a cellular messaging application server may be equipped at the RDC- Detection platform associated with a MMS identification number. For example, FIG. 4P shows an exemplary diagram of RDC-Detection remote deposit via multimedia messaging service (MMS) within embodiments of the RDC-Detection, wherein the user may send a message to phone number "1111," which represents the MMS deposit service.

In one implementation, upon verification at the RDC-Detection platform 484, if the user is not registered, a text message may be sent to deny deposit request 485. Otherwise, if yes, the user may generate and send a remote deposit message, 486 by taking a picture 480 of the check and attach the captured image in a MMS message 495. For example, the MMS message may comprise an image of the front side of the check and an image of the back side of the check. In one implementation, the user may enter deposit information in the MMS body such as, deposit amount, deposit account number, and/or the like.

Within various embodiments, deposit via MMS may require registration with the RDC-Detection platform as discussed above. For example, the RDC-Detection platform may verify whether the user is a qualified member for MMS deposit service. In one implementation, the user may register his cellular phone number with the RDC-Detection platform as a member qualified for MMS service, and RDC-Detection may verify whether the cellular phone number associated with a MMS message is registered. If not, the RDC-Detection platform may send a message back to the user indicating transaction has been denied.

In another implementation, the user may include a personal identifying pin 483 in the MMS body for verification. For example, in one implementation, a qualified MMS deposit user may first send a text message to RDC-Detection (e.g., number "1111" as in FIG. 4O) to request deposit, and may receive a verification pin from the RDC-Detection platform. The user may then send the MMS deposit message including the identification pin as an authorization of the deposit.

In another implementation, as shown at 481, live video streaming of a check may be captured and transmitted to the RDC-Detection platform. For example, a user may request to establish a real-time video streaming link with the RDC-Detection platform when submitting the remote deposit request. In such cases, the user device and the RDC-Detection platform may employ streaming video streaming software packages such as Apple Quicktime Streaming Servers, Marcromedia Communication Server, and/or the like. In one implementation, the user may create a video in a common streaming media format such as MPEG4, 3GPP and/or the like, and upload an encrypted HTTP streaming video on the RDC-Detection web server. For example, in one implementation, a user may employ an Apple iPhone may establish HTTP live streaming to the RDC-Detection platform via Quicktime Software systems.

In one embodiment, upon receiving the MMS message from a user mobile phone, the RDC-Detection system may process the check image attached in the MMS message to extract deposit information, such as discussed at 310. For example, the check image may be enhanced, deskewed, dewarpped and cropped to generate a Check-21 image, as further illustrated in FIGS. 6A-H.

RDC-Detection Check Image Enhancement

Figure 5A:
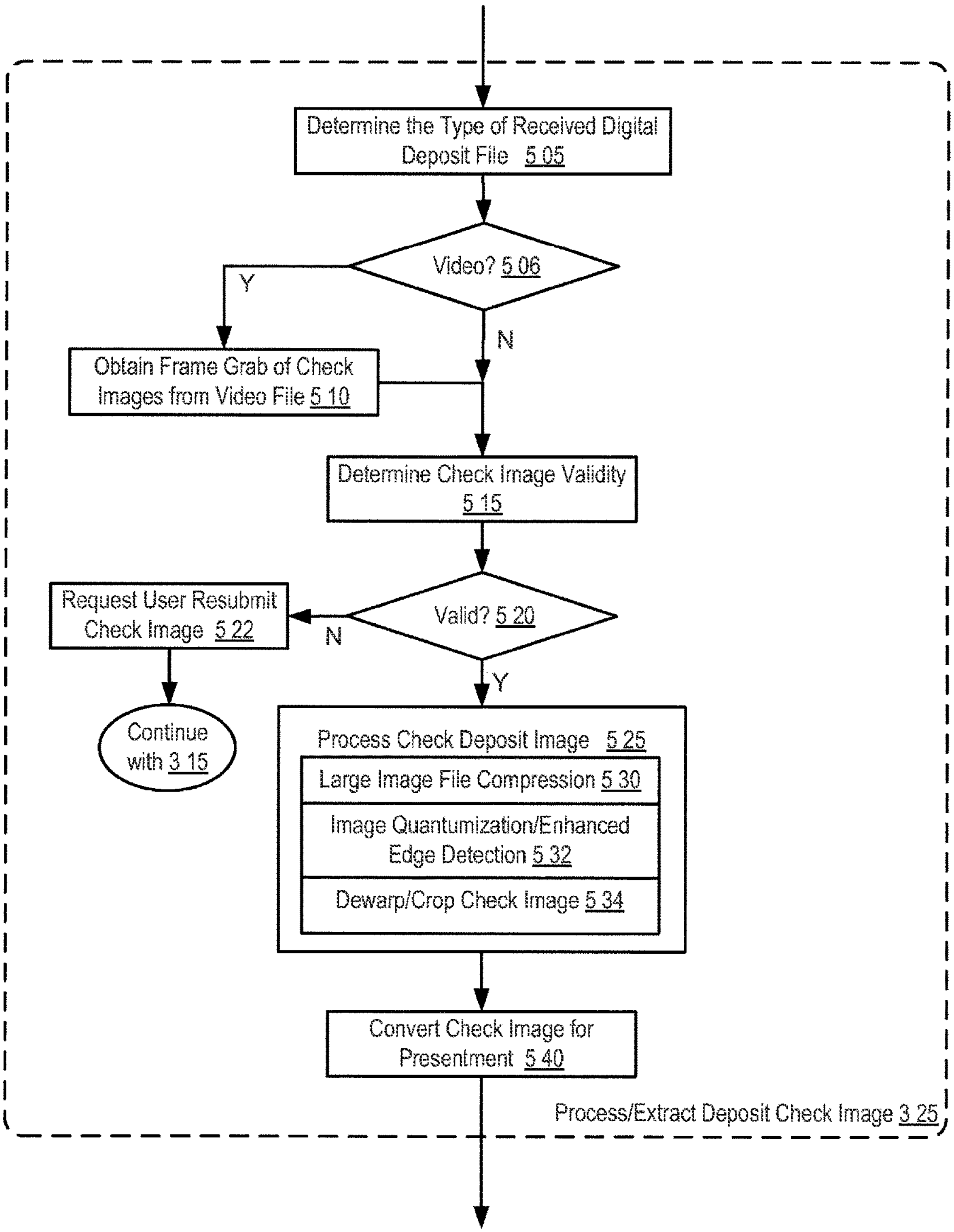
FIG. 5A-B are of logic flow diagram illustrating aspects of processing and extracting deposit check images in one embodiment of the RDC-Detection.

FIG. 5A is of a logic flow diagram illustrating aspects of processing and extracting deposit check images in one embodiment of the RDC-Detection. In one embodiment, the RDC-Detection may determine a type of the received digital deposit file 505, e.g., whether it is streaming video, a video file, or an image file. For example, in one implementation, the RDC-Detection may rely on the file extension of the received digital file to determine its type, i.e., "wmv," "avi," "rm", "3GPP" are video files, and "jpg," "tiff," "bmp" are image files.

In one embodiment, if a video file is received or live video streaming is detected 506, the RDC-Detection may generate still check images from the video streaming 510. For example, in one implementation, the RDC-Detection may utilize video screen capture software packages to generate screen frame grabs and save the grabbed image files. In one implementation, software such as Apple QuickTime, WM Capture, CamStudio, and/or the like, may be employed to obtain frame grabs of the check video streaming.

In one embodiment, if the received digital deposit file is an image file, or at least one check image file has been grabbed from the received video clip, the RDC-Detection may determine whether the check image is valid 515. In one implementation, the RDC-Detection may determine the usability and quality of the check image. For example, in one implementation, the RDC-Detection may check whether the check image is in compliance with the image format requirement, the resolution requirement (e.g., at least 200 dpi), and/or the like.

In a further implementation, the RDC-Detection may perform an Optical Character Recognition (OCR) procedure on the generated check image to determine whether the characters on the check image is legible, and/or whether an endorsement is contained on the back side image of the check. Depending upon the standards imposed by the Check 21 Act and the payee's bank's own internal image standards, the verification of the digital image may vary. For example, the Check 21 Act may require that the image be of a certain image quality. Although there are several ways in which image quality may be determined, one manner in which it may be done is to perform an OCR operation on the check to determine if at least a portion of the information in the image is determinable. The bank may first attempt to extract and recognize characters within the digital image. Any extracted characters may then be compared to previously known information or information submitted by the account owner in the deposit request. For example, the bank may attempt to find and OCR the MICR line at the bottom of the digital image. If the MICR line is unreadable or the characters identified do not correspond to known and verifiable information, the bank may reject the image.

In one implementation, if the check image fails to meet the system requirements 520, the RDC-Detection may send a request to the user for resubmission of a check image 522. In another implementation, if the check image is determined to be valid 520, the RDC-Detection may proceed to process the check deposit image 525, including large image file compression 530, image quantumization and enhanced edge/corner detection 532, and dewarping/cropping the check image 534 for presentment, as will be further illustrated in FIGS. 6B-F. For example, in one implementation, the RDC-Detection may compress the image file in order to save storage space (e.g., 2 megabytes per image).

In one embodiment, the RDC-Detection may convert the processed check image for presentment and deposit 540. For example, in one implementation, the RDC-Detection may save the check image in compliance with the requirements of the payee's bank for substitute checks, such as a Check 21 X9.37 cash letter file, and/or the like.

FIG. 6A provides a logic flow diagram illustrating aspects of an enhanced corner/edge detection using image quantumization 532 in one embodiment of the RDC-Detection. In one implementation, the image enhancement and corner detection described herein within embodiments may be performed at the RDC-Detection platform. In another implementation, the image enhancement and corner detection may be performed at the client device. For example, the RDC processing component 103*a*/103*b* delivered to and instantiated on the client device may comprise an image processing package to enhance, crop and prepare the captured check image.

As shown in FIG. 6A, the RDC-Detection may determine whether the check image is a grayscale image 602. If not, the RDC-Detection may convert the color image into a grayscale check image 605. For example, in one implementation, the RDC-Detection may turn the luminance value of every pixel of the color check image into a grayscale pixel luminance value, and a C# implementation may take a form similar to:

```
public Bitmap ConvertToGrayscale(Bitmap source)
{
  Bitmap bm=new Bitmap(source.Width,source.Height);
  for(int y=0;y<bm.Height;y++)
  {
    for(int x=0;x<bm.Width;x++)
    {
      Color c=source.GetPixel(x,y);
      int luma=(int)(c.R*0.3+c.G*0.59+c.B*0.11);
      bm.SetPixel(x,y,Color.FromArgb(luma,luma,
        luma));
    }
  }
  return bm;
}
```

In one embodiment, the RDC-Detection may determine and divide the check image into a number of tiles/subimages 608. For example, a sub-image may be parsed from the original check image at pixel (100,350) with a width of 100 pixels and height of 50 pixels. In one implementation, the number of tiles/subimages may be pre-determined by a system operator as a constant. In another implementation, the number may be determined by a formula in proportion to the size of the image. In one embodiment, for each tile/sub-image, a histogram may be generated 610. FIG. 6C shows an example histogram chart, wherein the X axis denotes the gray value and the Y axis 505 denotes the number of counts of gray.

In one embodiment, grayscale threshold values for each histogram may be determined 613, using a variety of algorithm such as, but not limited to statistical analysis (as will be further illustrated in FIG. 6D), minimum fuzziness algorithm (as will be further illustrated in FIG. 6E), Otsu algorithm, and/or the like. In one embodiment, grayscale threshold values may be determined by image binarization are then determined (309) (405) using statistical analysis of the histogram 501. In one embodiment, the grayscale check image may be quantumized 615 based the determined threshold values for each tile/sub-image. For example, in one implementation, the background of the check in a relatively dark color may be converted to black. For another example, the grayscale check image may be binarized into black and white only, i.e., if the gray value of a pixel is greater than the determined threshold value, it is determined as “white”; otherwise it is determined as “black”.

In one embodiment, the RDC-Detection may apply image filters to the quantumized image 618 to generate a virtual image for corner detection. For example, 11 in one implementation, each tiled image may be blurred by convolving the tiled grayscale thresholded image with an array of ones, which causes dilation effect to the image, whereby the dilation array may be a square matrix of ones of size 3×3 or 5×5 depending on the virtual image size.

In an alternative implementation, a convolution filter matrix may be applied, which is designed to sharpen and enhance edges of the quantumized check image. For example, in one implementation, the RDC-Detection may employ a Java Advanced Image (JAI) package for one implementation of applying a sample edge-enhancing convolution filter matrix, which may take a form similar to:

```
float data [ ]=
{0f, 0f, 0f, −1f, −1f, −1f, 0f, 0f,
  0f, 0f, −1f, −1f, −3f, −3f, −1f, −1f,
  0f, 0f, −1f, −3f, −3f, −1f, −3f, −3f,
  −1f, 0f, −1f, −3f, −3f, −6f, 20f, −6f,
  −3f, −3f, −1f, −1f, −3f, −1f, 40f, 20f,
  40f, −1f, −3f, −1f, −1f, −3f, −3f, −6f,
  20f, −6f, −3f, −3f, −1f, −f, −1f, −3f,
  3f, −1f, −3f, −3f, −1f, 0f, 0f, −1f,
  −1f, −3f, −3f, −3f, −1f, −1f, 0f, 0f,
  0f, 0f, −1f, −1f, −1f, 0f, 0f, 0f};
KernelJAI kernel=new KernelJAI (new Kernel (9, 9, data));
PlamarImage temp=JAI.create(“convolve”, img, kernel);
```

In alternative embodiment, a black and white virtual image may be obtained via a 3×3 kernel, which may take a form similar to the following:

```
float data[ ]={
  −6f, 20f, −6f,
  40f, 20f, 40f,
  6f, 20f,−6f,
};
```

In one embodiment, upon generating the virtual image, the RDC-Detection may recombine the quantumized and enhanced tiles/subimages into a single check image 620, and then proceed to detect edges/corners of the check image 622 (as will be further illustrated in FIG. 6F) based on the enhanced image.

FIGS. 6B-1 and 6B-2 provide examples of check image processing illustrating changes in the check image during the process of FIG. 6A in one embodiment of the RDC-Detection. In one implementation, after determining corners of the check image 622, the RDC-Detection may dewarp the check image 625, and recover the virtual image to a grayscale image 626, and then crop the extracted image 627, as further discussed in FIGS. 7A-C. In FIG. 6B-2, an exemplary check image captured by a mobile device (e.g., an Apple iPhone, etc.) in one implementation of the RDC-Detection. For example, a user may take a grayscale check image 6105 via the RDC-Detection application launched at his Apple iPhone, as further illustrated in FIGS. 11A-11H. In one implementation, the grayscale check image may be converted to a black and white virtual image 6108 for corner detection. After determining the corners and edges of the check, the check image may be cropped 6110 to remove the unnecessary parts from the original grayscale image.

FIG. 6D provides a logic flow diagram illustrating aspects of determining threshold values for the example histogram shown in FIG. 6B by statistical analysis in one implementation of the RDC-Detection. In one embodiment, the point having the highest Y value (counts of gray) on the histogram may be located 630. This point may be denoted as “second_high” for the example histogram shown in FIG. 6B since there are two peaks of Y values. Then the point on the histogram having the second highest Y value is located, denoted as “first_high” 633. The indexed gray value is also tracked for these Y values “first_high” and “second_high”.

In one implementation, "first_high" may be located by going from left to right on the histogram and comparing the number of counts (Y) of each indexed value (X) to the previous value until the reaching a right X limit. This may be started with a maximum value number of gray level counts being the gray level count Y at point [0][0] of the histogram. The right X limit going from left to right is set to a mode value unless the "second_high" X value is less than the mode value. In that case, the right traversing limit becomes "second_high". The "first_high" gray index X value is then obtained 635. For discrete distributions, in one implementation, the mode is the value with the greatest frequency; and for continuous distributions, it is the point where the probability density is at a maximum. It is possible for a distribution to have two or more modes.

In one embodiment, the lowest Y value traversing from left to right on the histogram may be located, denoted as "first_min" 637. Also, the lowest Y value traversing from right to left on the histogram may be located, denoted as "second_min" 638. In one implementation, the procedures for locating "first_min" and "second_min" may be similar with that of finding "first_high" and "second_high" on the histogram within the interval bounded by "first_high" and the mode value. The resulting point found is denoted as "first_min". In one implementation, "first_min" may be set to 0 by default. If nothing is found, the index gray value is at point [0][0] or the gray value count for gray value zero(black). In one implementation, the RDC-Detection may then locate "second_min" by traversing from right to left on the histogram within the interval bounded by "first_min" and "second_high." The resulting minimum value located is denoted as "second_min."

In one embodiment, "first_min" and "second_min" may be adjusted 640 in special cases. In one implementation, if "first_min" and "second_min" are the same, then the RDC-Detection may check whether "second_min" is greater than a boundary value "B1," wherein boundary values "B1" and "B2" are defined such that B1 is the upper bound of gray value encompassing significant magnitudes of order in gray value counts and B2 is the lower bound of the gray value on the histogram such that magnitudes of order in gray value counts converge to sufficiently small count value or zero from the histogram. For example, in one implementation, the image boundaries may be 0 and 255 if there exists a full gray value usage for a given image. In one implementation, if the "second_min" is greater than "B1," then "second_min" is reset to be the resulting value of "second_min" minus the standard deviation times a scaling factor "k", e.g., a suggested scaling factor in such cases is k=0.3. In that case, the adjusted "second_min" would be (second_min−(standard deviation*0.3)), the "first_min" may then be set to B1.

In another implementation, if the determined "first_min" as of 638 is greater than zero but the determined "second_min" as of 637 returns empty or by default is 0, then the "second_min" may be reset to be "first_min" subtracted by the standard deviation multiplied by a scaling constant k. In this case, a suggested scaling constant is k=1.

For example, in one implementation, a Java implementation of the algorithm of locating "first_min," "second_min" on a given histogram by statistical analysis 630~640, may take a form similar to:

```
...
private static int[ ]
findHistExtremaLows(Histogram histogram, int
numberBins)
  {
      int histoBins=histogram.getBins( );
      int max=0;
      int low=0;
      int i=0;
      int flag=0;
      int[ ] highs= new int[2];
      int[ ] lows=new int[2];
      int numb=histoBins[0] [i];
      int holder;
      int q=0;
      int first_min =
      0;
    low=numb;
    int j=−1;
      do{
          numb=histoBins[0] [i+1];
          if(numb>histoBins[0] [i]&&numb>max)
          {
            max=numb;
            j=i;
            j++;
        }
          //q=i;
while(numb==histoBins[0] [i]&&numb==max&&(i+1)<histoBin
s.length)
          {
            numb=histoBins[0] [i+1];
            i++;
            q++;
          }
          if(j>0)
          {
            j+=(q/2);
            q=0;
          }
        i++;
      }while(i<numberBins−1);
      highs[0]=j;
      int second_high=j;
      //System.out.println("\n\n second
high:"+second_high);
      numb=histoBins[0] [i];
      //System.out.print("\nMode:
"+histogram.getModeThreshold(2) [0] );
      max=histoBins[0] [0];
      j=0;
      int limit=(int)
histogram.getModeThreshold(2) [0];
if(second_high<histogram.getModeThreshold(2) [0])
      {
          limit=second_high;
      }
      for(i=0;i<limit;i++)
      {
          numb=histoBins[0] [i+1];
          if(numb>=histoBins[0] [i]&&numb>max)
          {
            max=numb;
            j=i;
            j++;
          }
          while(numb==histoBins[0] [i]&&numb==max)
          {
            numb=histoBins[0] [i+1];
            i++;
            q++;
                      }
          if(j>0)
          {
            j+=(q/2);
            q=0;
          }
        /// i++;
```

-continued

```
        }
        int first_high=j;
        //System.out.println("\n\n first
high:"+(first_high));
if(first_high>=histogram.getModeThreshold(2) [0])
        {
            first_high=(int)
histogram.getModeThreshold(2) [0];
        }
        int min=histoBins[0] [first_high];
        int empty_flag=0;
        if(second_high<0)
        {
            second_high=100;
            empty_flag=1;
        }
for(i=first_high;i<second_high&&i<numberBins−1;i++)
            {
              numb=histoBins[0] [i+1];
              if(numb<=histoBins[0] [i]&&numb<min)
              {
                min=numb;
                j=i;
                j++;
              }
while(numb==histoBins[0] [i]&&numb==min&&numb<min)
              {
                numb=histoBins[0] [i+1];
                i++;
                q++;
              }
              if(j>0)
              {
                j+=(q/2);
                q=0;
              }
            }
            if(empty_flag==1)
            {
              second_high=0;
            }
            first_min=j;
            //System.out.println("\n\n first
min:"+(first_min));
            j=0;
            min=histoBins[0] [second_high];
            for(i=second_high;i>first_min;i−−)
            {
              numb=histoBins[0] [i−1];
              if(numb<histoBins[0] [i]&&numb<min)
              {
                min=numb;
                j=i;
                j−−;
              }
while(numb==histoBins[0] [i]&&numb==min&&numb<min)
              {
                numb=histoBins[0] [i−1];
                i−−;
                q−−;
              }
              if(j>0)
              {
                j+=(q/2);
                q=0;
              }
            }
        int second_min=j;
        //System.out.println("\n\n second
min:"+(second_min));
        lows[0]=first_min;
        lows[1]=second_min;
          //i will be first boundary
      return lows;
    }
...
```

In one embodiment, threshold values may then be determined using the determined and adjusted "first_min" and "second_min" as lower and upper bounds 642. In one implementation, an image processing clamp method may be adopted which requires input parameters such as the boundary gray level values "first_min" and "second_min", and returns the threshold value. For example, in one implementation, a Java implementation of a clamp function may take a form similar to:

```
int clamp(int x, int low, int high) {
   return (x<low) ? low: ((x>high) ? high: x);
}
```

FIG. 6E is of a logic diagram illustrating aspects of determining grayscale threshold values by minimization of fuzziness in an alternative embodiment of the RDC-Detection. In one embodiment, the RDC-Detection may determine a member function 660 for, e.g., a standard S function which may be defined as:

$$S(x) = \frac{1}{2}\left[erf\left(\frac{x}{\sqrt{2}}\right) + 1\right],$$

and move the membership function pixel by pixel on the X-axis of the histogram over the range of gray values 663 (as shown in 675). At every position of the membership movement, a measure of fuzziness may be calculated 665 based on the a variety of measure definitions, such as but not limited to linear index of fuzziness, quadratic index of fuzziness, logarithmic fuzzy entropy, fuzzy correlation, fuzzy expected value, weighted fuzzy expected value, fuzzy divergence, hybrid entropy, and/or the like. For example, in one implementation, the measure of fuzziness may be calculated via the logarithmic fuzzy entropy, which may be defined as:

$$H(S) = \frac{1}{MN\ln 2}\sum_m \sum_n G_n(S_{mn}),$$

where $G_n(S_{mn}) = -S_{mn} \ln S_{mn} - (1 - S_{mn})\ln(1 - S_{mn})$, and $S_{mn}$ is the membership function value at pixel (m,n) for an image of size M×N.

In one embodiment, the RDC-Detection may determine the position with a minimum value of the calculated fuzziness measure 668, and then define the grayscale threshold as the gray value corresponding to the minimum fuzziness position 670, as shown in 680.

In one embodiment, if the grayscale check image has vague corners or edges, the enhanced quantumized image may contain reflection at the edge/corners, as shown in 693-694 of FIG. 6G. In one embodiment, a reflection detection algorithm may be implemented to avoid false corner detection.

FIG. 6F provides a logic flow diagram illustrating aspects of edge/corner detection of the check image based on reflection in one embodiment of RDC-Detection. In one embodiment, for a given check image, the RDC-Detection may divide the grayscale check image into four quadrants and calculate the histogram of each quadrant 681, or retrieve the generated histogram of four quadrants if available at 608 and 610, and calculate/retrieve the statistics and the determined threshold of each histogram 683. For example, in one implementation, statistical information such as the histogram entropy, maximum entropy threshold, mean grayscale count, maximum variance of grayscale count, mode threshold, moment, deviation, and/or the like, may be calculated.

In one embodiment, grayscale bin values N1 and N2 may be determined based on a predetermined bin count limit L 684 satisfying: (i) N1 and N2 are greater than or equal to the corresponding gray value of the bin count limit L; (ii) N1 is less than the minimum fuzziness threshold T of the histogram; and (iii) N2 is greater than the minimum fuzziness threshold T of the histogram. FIG. 6F shows an example of determining N1 and N2 on a given histogram in one embodiment of the RDC-Detection.

In one embodiment, the RDC-Detection may determine a minimum bin count value M and an average bin count value AVG within the histogram window defined by the range [N1+1, N2−1] 685 (as illustrated by the red circle 695 in FIG. 6G). The RDC-Detection may then proceed to calculate a reflection score of the histogram 686. For example, in one implementation, the reflection score may be calculated based on the following formula: Score=(AVG−M)/(AVG+M), where the score is normalized to [0,1].

In one embodiment, if the calculated reflection score is less than a predetermined minimum score P 687 (e.g., P=0.4), then it may indicate a corner sub-image without reflection. The RDC-Detection may proceed to implement corner detection algorithm of the quadrant 688. In one implementation, the corner detection may be performed on the generated virtual image of the check. For example, a JAI application of corner detection may take a form similar to the following:

```
int minSamples=(int)(1.0*150/ImageProcessingConstants. virtualImageScaleFactor);
int sampleSpace=(int)(1.0*5/ImageProcessingConstants. virtualImageScaleFactor)+1;
```

Figure 7A:
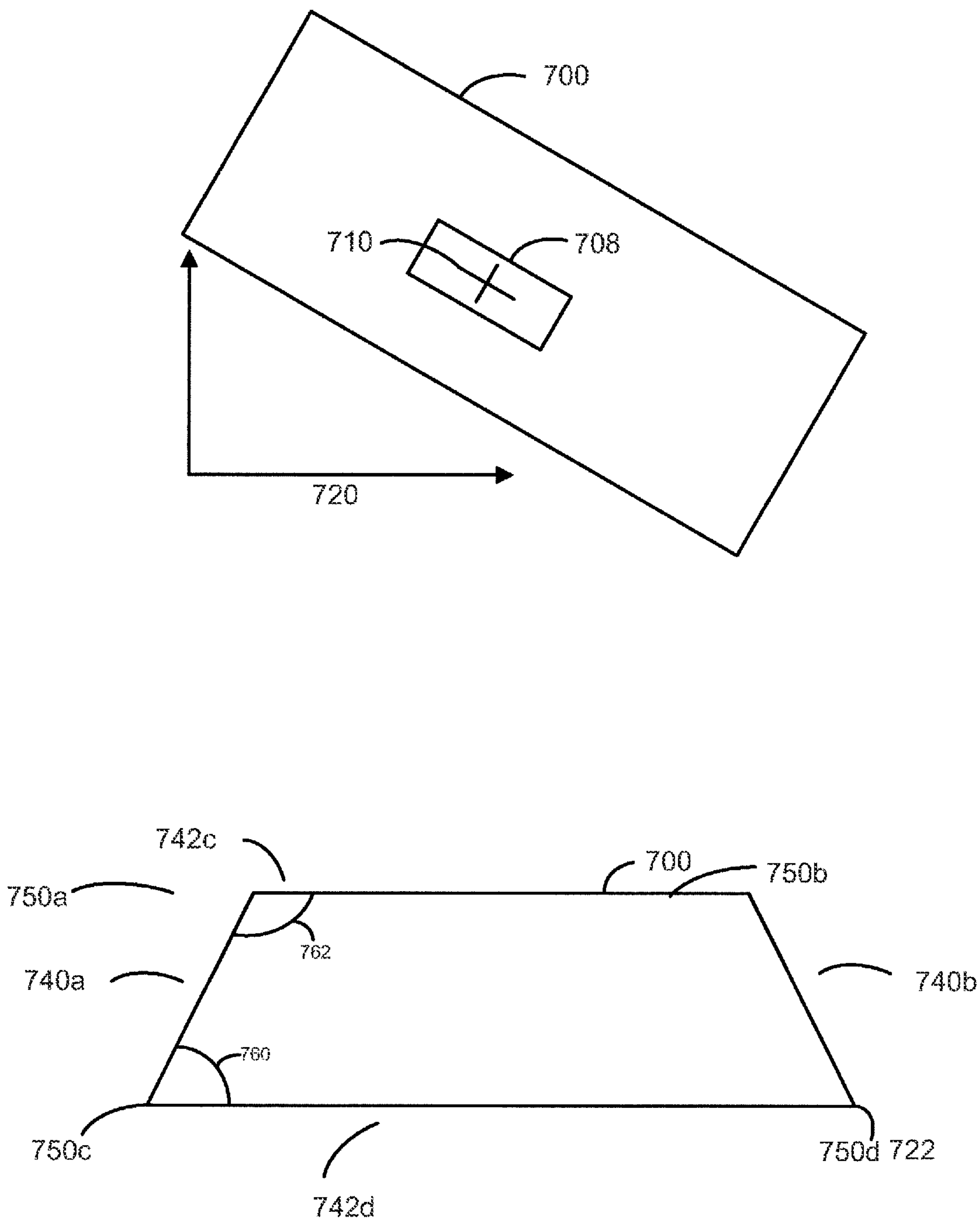
FIG. 7A-D illustrate embodiments of processing skewed, warped or distorted in one embodiment of the RDC-Detection.
Figure 7B:
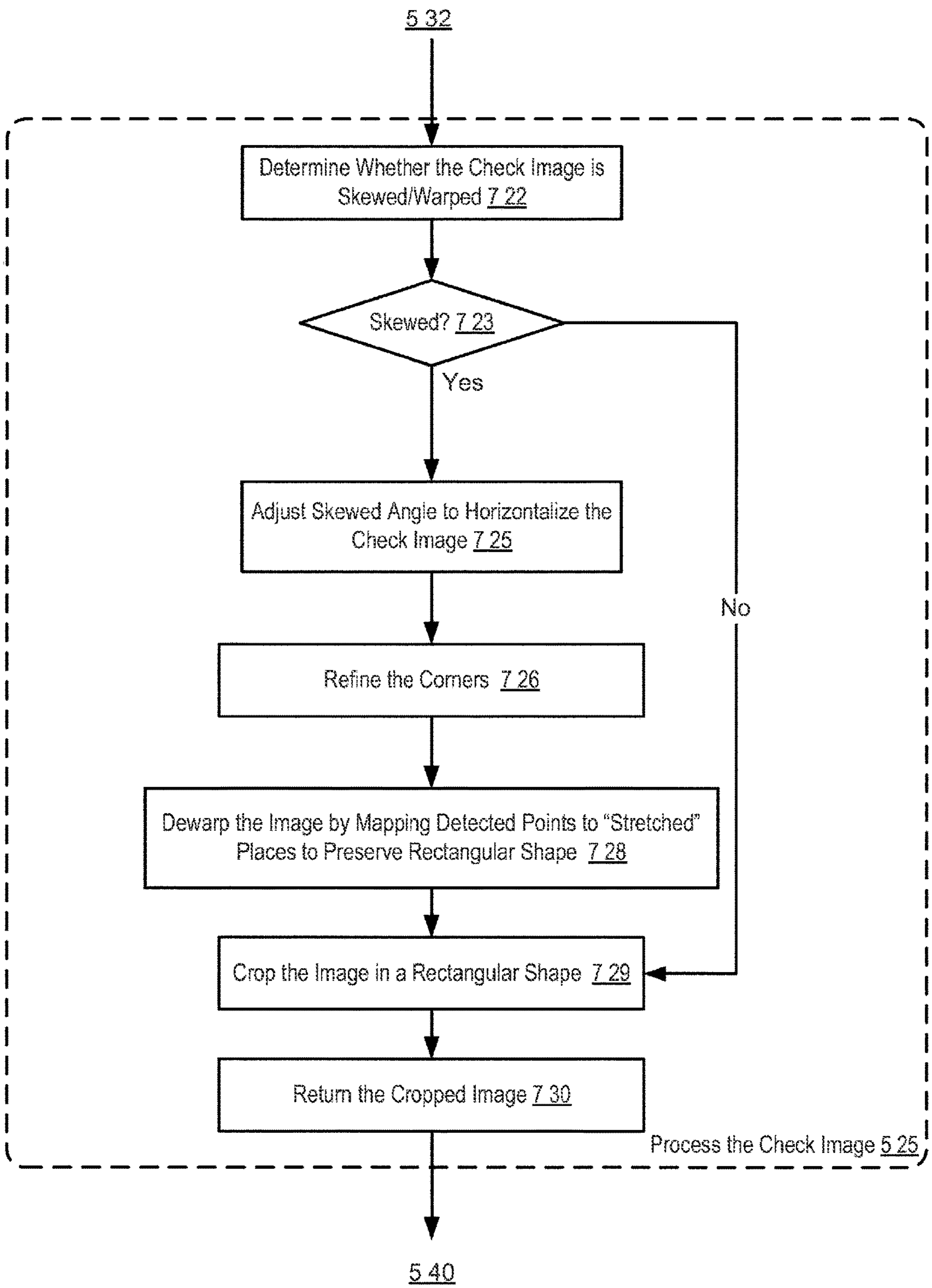
Figure 7C:
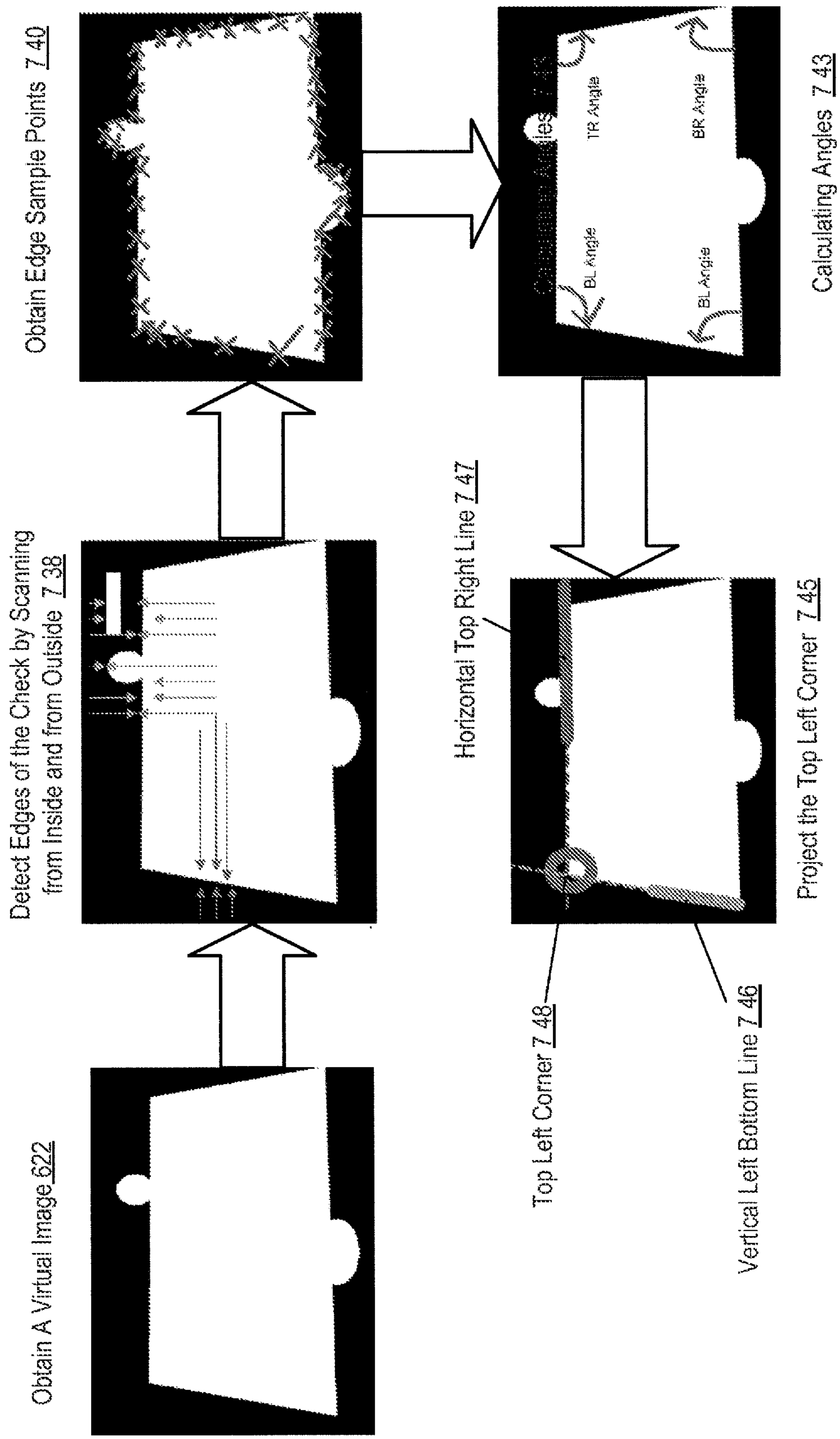
Figure 7D:
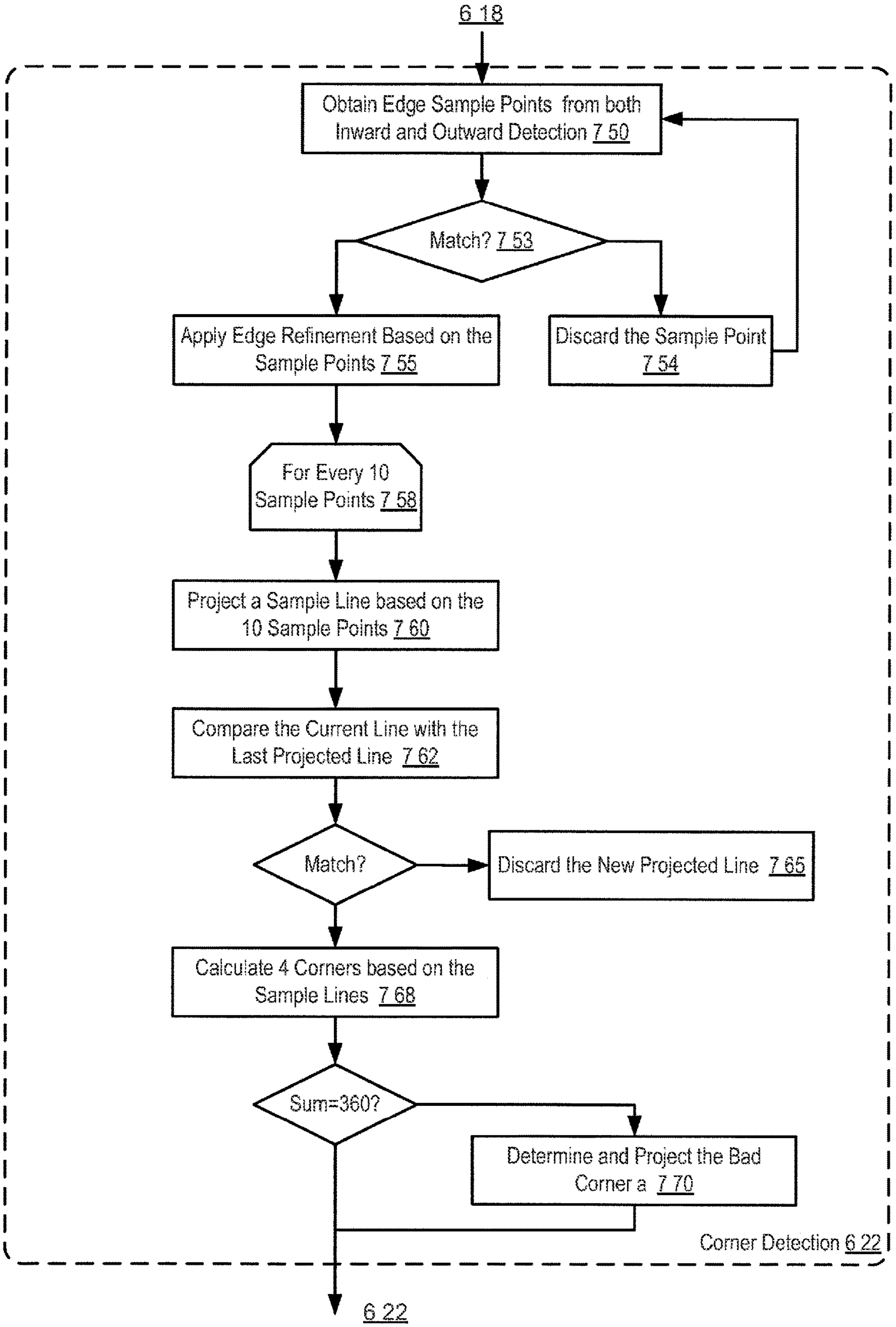

Within implementations, the RDC-Detection may detect edges of the check on the virtual image both inwardly and outwardly, and when the inward and outward edge detection for a given spot matches, the detected spot may be considered as a successfully detected point on the edge of the check image, as further illustrated in FIG. 7C-7D.

In one embodiment, if the reflection score is less than P, then the corner sub-image is considered to be with reflection, and the corner detection implementation may be skipped to avoid a false or misleading corner. In this case, the determined corners may be less than four. In one embodiment, the RDC-Detection may determine whether the determined corners are sufficient to project all four corners by symmetry 689. For example, in one implementation, if there are three corners with tolerable reflection levels and one corner with reflection, or two diagonal corners without reflections, then the position(s) of the corner(s) with reflection may be determined by symmetric projection 692. In another implementation, if there is only one corner with tolerable reflection, or two corners with tolerable reflection on a horizontal/vertical line, the RDC-Detection may determine that there is not sufficient information to project all four corners. In that case, the RDC-Detection may implement corner detection algorithm of a quadrant with reflection 690 (e.g., a corner with relatively higher reflection score), and provide additional information to determine all four corners of the check image 692.

Within alternative implementations, the corner/edges detection may also be applied to check images with other anomalies. For example, in addition to reflections, a check image may be captured under undesirable lighting conditions (e.g., with poor room light, with a dark background, etc.), interfered by reflective objects (e.g., a coffee cup placed close to the check, etc.), with other objects (e.g., miscellaneous items placed around the check, etc.), resulting in an image with shadows. In one implementation, the RDC-Detection may apply corner detection to remove such anomalies based on similar scoring procedure described in FIG. 6F.

FIG. 6H provides an example of the histogram analysis of the four quadrants of the grayscale image 693 of FIG. 6F in one embodiment of the RDC-Detection. In FIG. 6H, the histogram analysis shows that the bottom two quadrants are with no reflection, but the top two are with reflection. In that case, the determined bottom corners may not provide sufficient information to project the other two corners. In one implementation, the RDC-Detection may determine the corner of the top left quadrant with some reflection, and determine the top right corner with large reflection by symmetry.

In one embodiment a received check image may contain a skewed, distorted or warped image of a check. In such cases, the check image needs to be "dewarped" prior to information extraction. For example, skew is the difference in rotation off an axis between a feature in the digital image and the same feature in the physical embodiment of the digital image. The determination of skew of digital images captured using handheld digital cameras typically are computed in 3-dimensions. For exemplary purposes only, the following deskew process uses an x and y axis, though it should be understood that the principles and methods for determining skew in three (3) dimensions use the same principles and are considered to be incorporated into the present subject matter.

FIG. 7A illustrates examples of digital images of check 700 which are skewed, warped or distorted. In one embodiment, the original check 700 has a box 708 which has character "+" 710 within the box. As shown in the figure, if the check was not properly positioned when the check image was captured, there may be a significant skew of the check image, for Example, character "+" 710 may be interpreted as an "X" rather than a "+". In order to determine the identification of characters in check 700, the skew of the digital image may need to be determined and compensated for prior to character extraction and recognition, as described below.

In another embodiment, the digital image may be distorted to a degree so that the shape of the check image is not rectangular, but rather, trapezoidal, as shown in the figure. The image may be distorted in other manners, and thus, the present subject matter is not limited to a trapezoidal distortion. It should be appreciated that an image may be distorted in ways other than the non-limiting and exemplary trapezoidal distortion. The present disclosure is not limited to any one type of distortion.

For example, in one implementation, check 700 has sides 704*a-d* and corners 705*a-d*. The check image may have a trapezoidal shape instead of a rectangle as sides 704*a* and 704*b* do not parallel; parallel sides 704*c* and 704*d* do not have equal lengths; be equal in length; and the inner angles 706*a* and 706*b* are not 90 degrees. In such cases, the RDC-Detection may process the skewed image to recover the check image in a rectangular shape.

FIG. 7B provides a logic flow embodiment illustrating processing check images 525 with combined corner detection and check image dewarping in an alternative embodiment of the RDC-Detection. TO proceed from 520, the RDC-Detection may obtain a grayscale image 720 and divide the grayscale image into four quadrants and calculate a reflection score for each quadrant 722, as discussed in one implementation in FIGS. 6A-6F. In one implementation, if at least three quadrants have reflection scores above the minimum threshold as discussed at 687, the RDC-Detection may proceed with deskewing and dewarping. Otherwise, the RDC-Detection may reject the check image and request the user resubmit another image.

Within embodiments, the deskewing/dewarping process may be implemented for each quadrant of the check image. In an alternative embodiment, the RDC-Detection may perform dewarping/deskewing after recombining the quadrants to generate an enhanced black and white virtual image 622.

In one implementation, based on the detected four corners of the check image, the RDC-Detection may determine whether the check image is skewed, warped or distorted 722. For example, in one implementation, the slope of a line between two corners may be used to determine the amount of distortion. If the line is strictly horizontal or vertical, then the image is considered to be without distortion. Otherwise, the image may be modified to remove the distortion.

In one implementation, the RDC-Detection may adjust skewed angles of the virtual image 725. For example, to deskew the image, the RDC-Detection may determine the angle(s) of one or more reference line(s) within the check image. In one implementation, the angle of the line or lines may be determined using a coordinate system as a reference. For example, the angle of the line may be determined in reference to a set of horizontal and vertical axes 703 established within the check image, as shown in FIG. 7A. The image may then be digitally rotated towards the direction that the check image may be horizontally positioned, e.g., the angle may be zero.

In one implementation, the RDC-Detection may use reference points in the check to facilitate the proper rotation of the image. In one implementation, a check may have several horizontal lines near the bottom of the check, used by the check writer to sign the check and to note the use of the check. In such cases, the RDC-Detection may rely on the two long edges of the digital image and/or the printed lines within the check as reference points/lines. If the image is rotated so that the long lines and/or the lines within the check are horizontal (e.g., the angle between the reference line and the established horizontal axis 703 is zero), then the check image may be properly deskewed. In one implementation, after the deskewing procedure, the RDC-Detection may then perform a test OCR to determine whether proper deposit information printed on the check may be extracted, recognized and verified based on the check image.

In an alternative implementation, the RDC-Detection may take sample points from the check image to perform deskewing. For example, four points at the upper edge and four points at the lower edge may be sampled; an angle between the line connecting an upper and/or lower corner point and the sampled point may be calculated to evaluate the level of skew; and the check image within the detected edges may be rotated at the smallest angle to horizontalize the check image.

In one implementation, after adjusting the skewed angle of the check image, the RDC-Detection may refine the corners/edges 726, by repeating the corner detection procedure.

In one implementation, the RDC-Detection may dewarp the image 728. For example, the RDC-Detection may stretch, or flatten the check image if it is not in a rectangular shape based on the detected corner points. In one implementation, the RDC-Detection may implement techniques such as spatial transformation (also known as image warping) and/or the like based on the determined four corners of the check image to remove distortion and skew. For example, a Java implementation using the JAI packages of dewarping a check image may take a form similar to:

```
. . .
ParameterBlockJAI pb=new ParameterBlockJAI
  ("Warp");
pb.addSource (image);
pb.setParameter("warp", new WarpPerspective (pt));
pb.setParameter("interpolation", new InterpolationBi-
  linear( ));
RenderedOp rop=null;
rop=new RenderedOp("Warp", pb, null);
```

The RDC-Detection may then crop the check image in a rectangular shape 729 and return the cropped image 730 for further deposit processing 540.

FIGS. 7C-7D provide flow diagrams illustrating corner detection in another embodiment of the RDC-Detection. For example, based on the obtained black and white virtual image at 622 in FIG. 6B, the RDC-Detection may obtain edge sample points 750 by starting from the middle in width and height on the left side and move from outside to inside, until it hits a white blob, and repeat the procedure moving inside to outside 738. The procedure may be repeated on the left, right, upper and lower edges of the check image to obtain samples points on the edge, as shown in one example by the red "X" at 740 in FIG. 7C. In one implementation, the RDC-Detection may filter the sample points to keep those where both the inner detection and outer detection match 753 by a minimal distance constraint, and points that do not satisfy the minimal distance constraint may be discarded 754. For example, the minimal distance constraint may be dynamically configured based on a variety of parameters of the image, such as the image size, image resolution, and/or the like. In one example, the minimal distance constraint may be configured as, but not limited to 3 pixels.

In one embodiment, the RDC PLATFOR may apply edge refinement 755 based on the sample points. In one implementation, the RDC-Detection may take the "X mode," e.g. finding the most recurrent X-coordinate value of the vertical top left samples, vertical top right samples, vertical bottom left samples, vertical bottom right samples, and the "Y Mode" to find the most recurrent Y-coordinate value the horizontal top left, horizontal top right, horizontal bottom left, horizontal bottom right samples. Differences between the X-coordinate and Y-coordinate values to determine whether the upper or lower edges are horizontal, or the left or right edges are vertical. For example, if the difference between the Y-coordinate values between horizontal bottom left samples and the horizontal bottom right samples is smaller than an acceptable constraint, such as, but not limited to 3 pixels, then the horizontal bottom edge is considered to be strictly horizontal without skew.

In one implementation, false samples due to noise or other unnecessary samples may be removed. For example, vertical bottom samples whose Y-coordinate values exceed the Y-coordinate range defined by the horizontal samples as discussed above, may be discarded.

In one implementation, the RDC-Detection may apply similar procedures on the top samples of the horizontal top left and right and see if the difference is smaller than the minimum constraint. If yes, the vertical top left and right samples that exceeds the range defined by the horizontal Top Left and Top right may be discarded. In this way, the RDC-Detection may eliminate points that have reflection that hugged the top and bottom edges.

In one embodiment, line projections may be performed based on the sample points in a progressive manner. For example, in one implementation, for every sample points 758, the RDC-Detection may apply least squares to project a line 760; and for every projected line base on the 10 sample points, the angle of the current line with the last projected line 762. For another example, the RDC-Detection may project the sample line based on a different number of sample points, e.g., determined based on the quality of the check image, and/or the like. If the angle is greater than a predetermined constraint, denoted by "AngleMax," the current line may be discarded 765, but may be kept track in place of the newly detected line. In one embodiment, the entire array of sample points may be exhausted to search for the best line, which may be the last available line that is within the constraint of AngleMax.

In one implementation, if the Y-coordinate values of sample points for detecting a horizontal line have a maximum variance less than the minimal distance constraint, e.g., 3 pixels, the average Y-coordinate values of these samples may be calculated as the Y-coordinate value of the horizontal line applying. Similarly, for vertical line projections, such average line calculation may be adopted if the X-coordinate values of the sample points are sufficiently close.

In an alternative implementation, for projected horizontal lines, a Y-coordinate value may be extracted from the currently projected line and the old projected line at the same X-coordinate value. If the difference in the Y-coordinate values is significantly large, the currently projected line may be discarded, to counter noise and reflection around the check image that may not be filtered out.

After detecting projected lines, the RDC-Detection may locate the four corners by calculating intersections of the four lines 768. For example, in one implementation, the Kramers Rule may be applied to use determinants to calculate the intersections for each line. In one implementation, the RDC-Detection may keep four lines (two horizontal and two vertical) to calculate the corners. In alternative implementations, the RDC-Detection may obtain at eight lines: vertical left top, vertical left bottom, vertical right top, vertical right bottom, horizontal top left, horizontal top right, horizontal bottom left, and horizontal bottom right, to locate the corners. For example, the intersection of the vertical top left line and horizontal top left line may be located as the top left corner.

In one implementation, the RDC-Detection may determine whether an intersection is a good corner by calculating the inner angles 743. For example, in one implementation, the four inner angles may be calculated and summed up. If the sum is equal to, or within a sufficiently small difference to 360 degrees, the corners are considered to be good. Otherwise, in one implementation, the RDC-Detection may assume three out of the four corners are good, and may detect the bad corner 770.

In one implementation, the RDC-Detection may calculate the differences between the angles to detect the bad corner. For example, if the difference between the bottom left and bottom right angles, the difference between the top right and bottom right angles are sufficiently small, but the difference between the top left and top right angles is greater than a maximum tolerance level, e.g., AngleMax, the RDC-Detection may determine the top left corner is a bad corner. In such cases, the RDC-Detection may re-calculate the top left corner by rectangular projection based on the other three corners.

In an alternative implementation, the RDC-Detection may utilize the projected lines to re-calculate the detected bad corner 745. In the above example, if the top left corner is detected as bad, which may imply the projected vertical left top line and the horizontal top left line are not accurate, then the last available vertical left bottom sample line 746 and the last available horizontal top right sample line 747 may be extended so that there intersection may be re-calculate as the top left corner 748.

In one implementation, in the dewarping and cropping 728-729. the virtual images may be oriented to make the bottom horizontal based on the lines from the horizontal bottom projections. In one implementation, if multiple bad corners exist, the RDC-Detection may apply a large median filter to the virtual image to remove noise, and reapply the line projection to refine corners 726.

In another example, the RDC-Detection may implement detection algorithm such as the Moravec corner detection algorithm, the multi-scale Harris operator, the Shi and Tomasi corner detection algorithm, the level curve curvature approach, LoG, DoG, and DoH feature detection, the Wang and Brady corner detection algorithm, the SUSAN corner detector, the Trajkovic and Hedley corner detector, the FAST feature detector, automatic synthesis of point detectors with Genetic Programming, affine-adapted interest point operators, and/or the like . . .

RDC-Detection Video Deposit

Figure 5B:
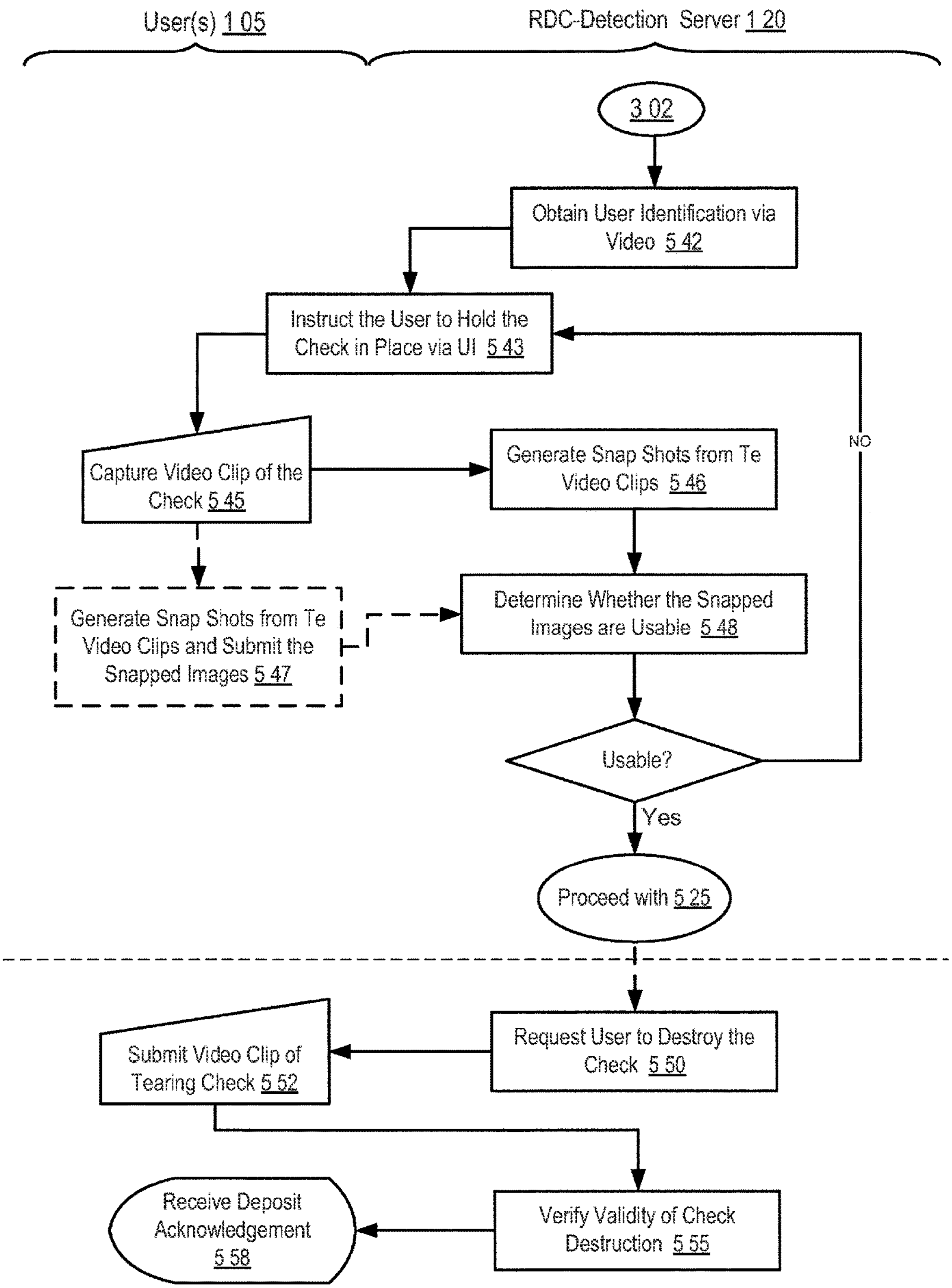

FIG. 5B provides a logic flow diagram illustrating video deposit within embodiments of the RDC-Detection system. In one embodiment, a user operating a personal computer (e.g., a desktop, a laptop, etc.) connected with a web camera, a cellular phone with built-in camera, a smartphone with built-in camera, and/or the like, may use the camera to capture video of the check for remote deposit.

Within various embodiments, upon receiving a deposit request from a user, the RDC-Detection platform may deliver a remote deposit processing component to the user device as discussed in FIGS. 1A-1, 1A-2, and 3B. In a further implementation, the user may select to submit identification information 542 for the deposit via the camera. For example, the RDC-Detection platform may receive and process biometrics data from the user 105, e.g., a payee may be instructed to submit an image or video clip of himself by posing his face in front of the web camera, or the cellular phone camera. In one implementation, the remote deposit processing component running on the user's device may provide a user interface which instructs the user to position his face within a specified area in order to produce a quality front side view.

In one implementation, the RDC-Detection platform may take a snap picture of the video of the user to perform face recognition procedures for user authentication, obtaining payee information for check clearance, and/or the like. In one implementation, in order to obtain quality images of the user, the RDC-Detection platform may automatically take multiple snap images from the video. If none of the obtained photos is qualified during the facial recognition, for example, the photo is too blurred, the user submitting a profile view of his face, and/or the like, the RDC-Detection platform may request the user to re-submit identifying information. In one implementation, the user may select re-producing facial recognition video, or switch to other identifying methods, such as submitting login information, and/or the like.

Upon identifying the user, the RDC-Detection platform may instruct the user to hold the check in front of the camera to produce video capture 545. For example, the RDC-Detection platform may display a message "please hold your check up to your web camera" via the user interface of the remote deposit application running on the user's computer, and display another message "you may remove the check now" after a short period of time (e.g., 3 seconds, etc.), during which the remote deposit application has captured a video clip of the check holding in front of the camera.

In one implementation, the user may send the whole video clip file to the RDC-Detection platform to generate snap images from the video clips 546. In an alternative implementation, as a video file is usually large, to achieve efficiency, the remote processing component may generate images from the video clip 547. For example, in one implementation, the RDC-Detection system may utilize video screen capture software packages to generate screen frame grabs and save the grabbed image files. In one implementation, software such as Apple QuickTime, WM Capture, CamStudio, and/or the like, may be employed to obtain frame grabs of the check video streaming.

In another implementation, the remote deposit application at the user's computer may automatically take consecutive snap pictures of the check when the user holds the check in front of the camera. For example, the user may be requested to hold the check in position for 3 seconds, during which the remote deposit application may capture snap pictures every 100 ms to generate 30 frames of the check, and submit the 10 images to the RDC-Detection platform.

In one implementation, the RDC-Detection system may determine whether the snapped images are usable 548. For example, the resolution and file format of the check images may be checked. For another example, the RDC-Detection system may perform an initial OCR on the images to examine whether the texts in the image are legible. If the RDC-Detection system obtains multiple images of the check, then the image with the best quality may be used to optimize performance. For example, the RDC-Detection system may select the image with the highest solution, with the least corner reflection as discussed in FIGS. 6E-6H, with the least skewness or distortion as discussed in FIGS. 7A-7D, and/or the like. In one embodiment, if none of the images is qualified, the RDC-Detection may request the user to re-produce check images via the camera at 543. In one implementation, the user device may transmit the grabbed frames of check to the RDC-Detection platform in real-time, so that the RDC-Detection may examine the received images in real-time to select an optimal shot, and/or notify the user whether re-capture is required due to poor image quality.

In one embodiment, upon obtaining check images, the RDC-Detection system may proceed 525 to extract deposit information and complete the deposit. The RDC-Detection may further utilize the user camera for check destruction. In one implementation, the RDC-Detection may request the user to destroy the physical check 550 after successful deposit. For example, in one implementation, the RDC-Detection system may display a message "Please tear the check to your camera." The user may then submit a video clip of tearing the check 552, while the deposit application may take snap shots. In one implementation, the RDC-Detection system may verify validity of the check destruction 555, e.g., verifying the check shown in the received snap pictures is the same as the deposited one, and then send a deposit acknowledgement message to the user to confirm the deposit 558.

In one implementation, the RDC-Detection system may implement user face recognition, capturing snap pictures of the check and capturing destruction of the check in real-time. In another implementation, the RDC-Detection system may process the video deposits in a batch. For example, the RDC-Detection system may request the user to submit snap shots of the check, and then soft posts the fund. The RDC-Detection system may then request the user to destroy the check after check clearance in batch time as discussed in FIGS. 8B-8C.

RDC-Detection Representment Detection/Clearance

FIG. 8A provides a logic flow diagram illustrating aspects of check representment detection in one embodiment of the RDC-Detection. In one embodiment, based on the extracted information of the check image, the RDC-Detection may determine whether the extracted information contains a "void" check indication 805. For example, in one implementation, the check may have been voided by a punched hole and/or a written "VOID" on the physical check, or have a modified section, such as a modified RFID tag, and/or the like. In one embodiment, if the check is a void check 808, the RDC-Detection may reject deposit.

In another embodiment, if no such "void check" indication is found, the RDC-Detection may compare check identification data with the check identification data within a limited subset of previously deposited checks 810, e.g., checks deposited to the same payee's account within the past ten months, the last one hundred deposits to the same payee's account, etc. For example, in one implementation, check identification data may comprise Check identification data is any data that identifies the financial instrument in a relatively unique fashion. For example, check identification data may comprise MICR data such as payer account number, payer bank routing number, and check number, payer information such as payer name and address, the deposit amount of the check and or the like. In one implementation, check image characteristics such as a combination of characteristics from a payer signature line may also be used as check identification data. In one implementation, log files containing check identification data may be kept for all deposits. Transaction logs may be maintained for customer accounts, or for the financial institution as a whole.

In one implementation, if there is a match 815 with any previously deposited check, the RDC-Detection may flag, delay or terminate the deposit transaction 820. For example, in one implementation, flagging the transaction may indicate to setting a flag that will cause some further scrutiny 832 of the transaction at a later time. The subsequent transaction analysis 832 may automatically analyze further aspects of the check and comparing it to a suspected duplicate check, or may report to a system operator (e.g., bank clerks, etc.). For another example, the RDC-Detection may delay transaction by causing the transaction to be delayed and processed at a later time. In one implementation, delaying and flagging may be used together to provide adequate time for additional scrutiny required by the flag. In a further implementation, the RDC-Detection may terminate and abort the transaction.

In one embodiment, when the transaction is flagged, delayed, or terminated, a notification may be sent to a customer advising them of the action and optionally of the reason for the action as well. In one embodiment, the customer may be notified that the check has been identified as a possible duplicate and may be instructed to provide additional check identification data, such as re-capturing and submission of a new check image.

In one embodiment, if there is no match detected in the comparison of 810, the RDC-Detection may determine whether to enlarge the comparison range of previously deposited checks 825. If so 827, the RDC-Detection may enlarge the comparison range to compare check identification data within a full set of previously deposited checks 830. For example, in one implementation, the RDC-Detection may further search and compare the check identification data with all the stored deposit information in the database.

In one implementation, the limited subset comparison may be performed in real time, and the remainder of the comparison may be conducted at a later time. For example, in one implementation, the RDC-Detection may perform a multiple representment check within a 6-month database in real time on all RDC-Detection channels and records. In another implementation, the RDC-Detection may call a service to handle bulk transactions at batch time and to obtain a consolidated re-presentment report response, as will be further illustrated in FIG. 8B.

After a full set comparison, if a match is located 833, the RDC-Detection may perform subsequent transaction analysis 832 of the check deposit. Otherwise, the check is considered to be valid 835, and the RDC-Detection may proceed to deposit funds to the payee's account.

In one embodiment, the representment detection in one embodiment of the RDC-Detection as shown in FIG. 8A may be implemented in a real-time manner at the RDC-Detection platform and/or the payee's bank prior to soft posting. In another embodiment, the RDC-Detection and/or the payee's bank may send deposit data to a centralized warning system, such as an external agency, a clearinghouse bank, and/or the like, to detect check representment. In one implementation, the centralized warning system may inspect deposit data with financial institutions other than the payee's bank to identify checks that have already been presented. In a further embodiment, the centralized warning system may provide representment service both in real time and at batch time and subscribe a payee's bank for check presentment notification. FIG. 8B provides a combined logic and block diagram illustrating an example implementation of representment service at a centralized warning system in one embodiment of the RDC-Detection.

In one embodiment, when the RDC-Detection receives a check presentment to a payee's bank 836, the RDC-Detection may process the request and send extracted deposit information and check images to a centralized warning system for presentment services 840. In one embodiment, the presentment services 840 may include registration service 841, real-time detection service 842 and batch detection service 843. In one implementation, the payee's bank may subscribe via the registration service 841 in order to receive presentment notification published by the warning system. In one implementation, attributes associated with the payee's bank may be maintained in a registration repository, such as a list of the transit routing numbers the payee's bank owns, callback service URL for presentment notification, callback credentials, and/or the like. For example, in one implementation, when a payee's bank sent check information and check images to the centralized warning system for representment check, the system may send check presentment notifications to a variety of subscribed banks 838.

In one embodiment, the real-time detection service 842 may implement a representment search within a centralized repository 845 of previously deposits. In one implementation, the real-time detection service may take a form similar to the process shown in FIG. 8A.

In one embodiment, the batch detection service 843 may process representment detection for bulk transactions in an "off-line" manner. For example, in one implementation, a payee's bank may use this service to send all remote-deposit transactions at the end of each day for re-presentment validation and expects a next-22 day response. In one implementation, an X9.37 image cash letter containing the remote deposit transactions may be submitted to the centralized warning system and a response report containing presentment/re-presentment information may be published to the payee's bank.

Figure 8C:
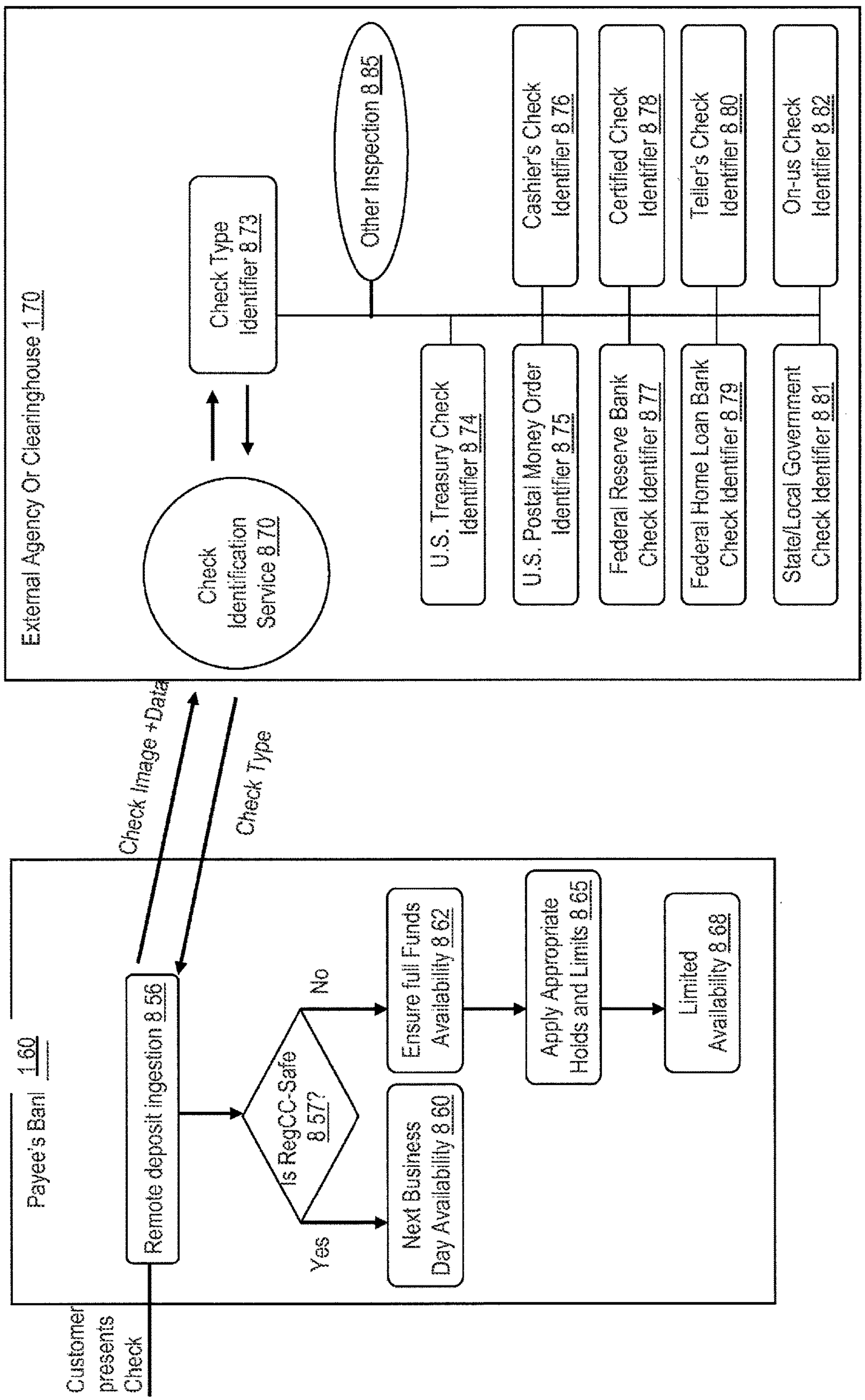

FIG. 8C provides a combined logic and block diagram illustrating check clearance and fraudulent control in one embodiment of the RDC-Detection. In FIG. 8B, in one embodiment, the payee's bank may ingest and process remote deposit data 856. For example, as discussed in FIG. 1, a RDC-Detection platform may be housed at the payee's bank to receive and process remote deposit. In one embodiment, the payee's bank may establish a secure communications connection with an external agency or clearinghouse bank (e.g., a local branch of the Federal Reserve Bank, etc.), for example, via encrypted FTP, and/or the like. In one implementation, the payee's bank 160 may send deposit data, such as a Check 21 X9.37 check image file, and the extracted check identification data, to the external agency to perform a clearinghouse check.

In one embodiment, the clearinghouse bank may provide check identification service 870 to identity a type of the check 873. For example, in one implementation, a check type identifier 873 at the clearinghouse bank may determine whether the deposited check is s U.S. Treasury check 874, a U.S. Postal money order 875, a cashier's check 876, a Federal Reserve Bank check 877, a certified check 878, a Federal Home Loan Bank check 879, a teller's check 880, a state/local government check 881, an on-us check 882, and/or the like, based on the received check information. In one implementation, the check type identifier 873 may inspect the MICR information on the check to determine its type. In one embodiment, if the check type identifier 873 is unable to determine the type of the check, the identification service 870 may proceed to other inspection procedures 885 to determine whether the deposited check is a fraudulent. For example, in one implementation, the identification service 870 may send alerts and present the check data to fraudulence experts.

In one embodiment, the external agency or clearinghouse bank may return an indication of the check type to the payee's bank. In one implementation, the payee's bank may determine whether the check is a Regulation CC compliant based on the received check deposit data and the check type indication from the clearinghouse. For example, in one implementation, U.S. treasury checks, certified checks and/or the like, may be considered as Regulation CC safe and eligible for next business day availability of deposit confirmation 860. In another implementation, if the check is not Regulation CC safe, the payee's bank may inspect the payee's account to ensure ensures full funds availability in account to cover the deposited amount upon fraud 862, and apply appropriate holds and limits on the deposit amount 865. The deposit may render limited fund availability 868 from the payee's bank.

For example, in one implementation, a user may request to deposit a $1000.00 non-Regulation CC safe check, but only has $500.00 existing amount in the account. In such cases, the RDC-Detection may receive and verify remote deposit data from the user and the payee's bank may provisionally credit $1000.00 to the user's account. In one implementation, the payee's bank may generate a substitute check and send the substitute check for clearinghouse check. In one implementation, if the payee's bank receives a clearinghouse result indicating that the deposited check is not Regulation CC compliant, the payee's bank/RDC-Detection may notify the user via a user interface to provide a variety of options of deposit, e.g., display messages on the RDC Deposit website, send emails/instant messages to the user device, and/or the like. For example, the user may choose to deposit the maximum allowable funds at the moment, or to cancel the deposit, or to provisionally post the check but mail the physical check to the bank for clearance, and/or the like.

Alternative Embodiments of RDC-Detection Representment Detection

In an alternative embodiment, a dead-check repository may be employed to store records of negotiable instruments, such as checks, that have been processed by a network of financial institutions. The records, accessible when preparing to deposit, either remotely or physically, a negotiable instrument, serve as an indication to a financial institution as to whether the negotiable instrument has been previously presented. Thus, accessing the record before confirming the deposit secures deposits by preventing re-presentment of negotiable instruments.

Figure 9A:
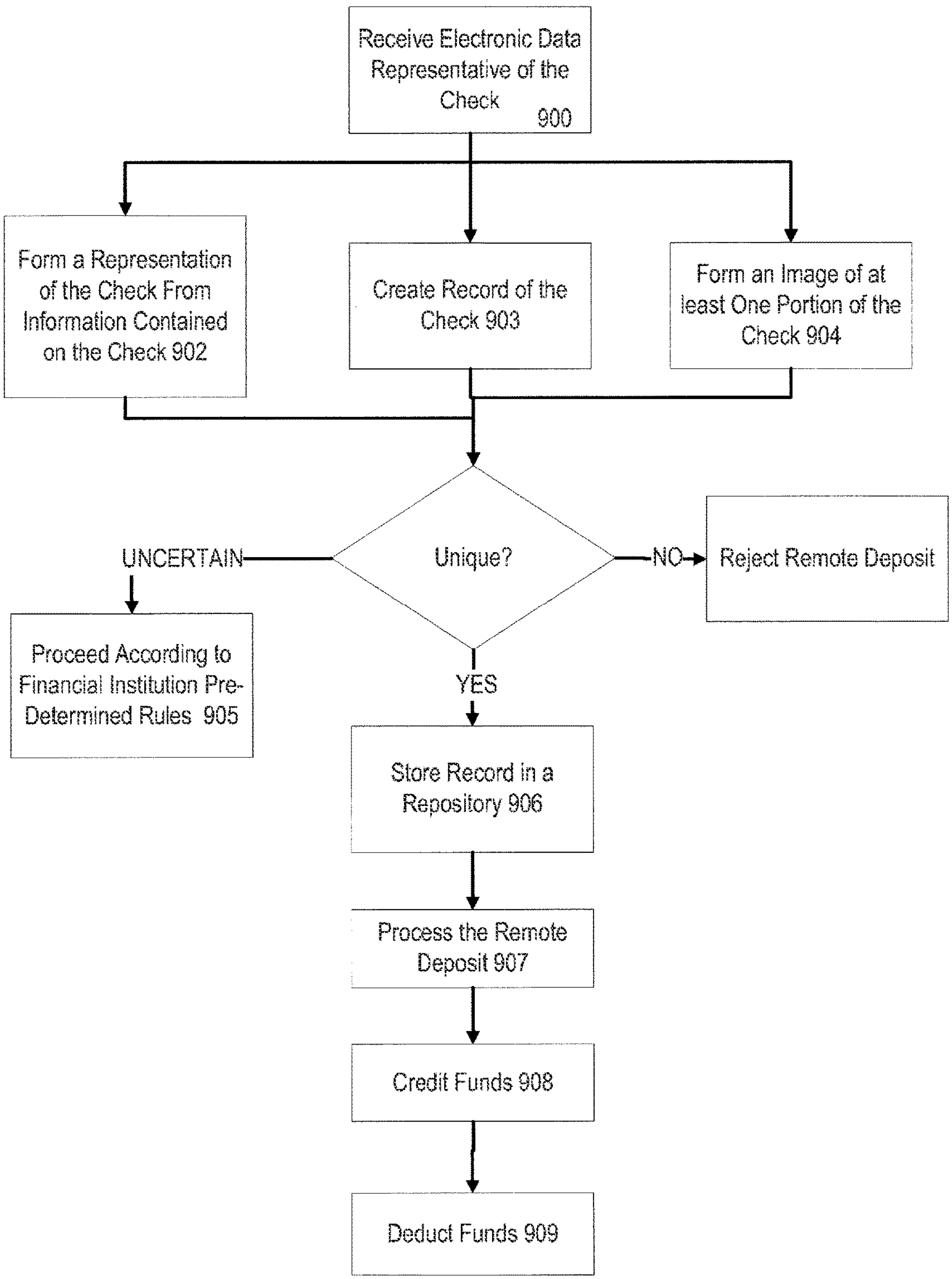
FIGS. 9A, 9B, and 9C provide logic flow diagrams illustrating aspects of alternative embodiments of the RDC-Detection.

FIG. 9A is a flow chart illustrating an example method of securing a deposit of a negotiable instrument, such as, for example, a check from payer to payee. At 900, electronic data representative of the check to be deposited, remotely or physically, is received at a financial institution. At 903, a record of the check may be created to, for example, assist in securing the remote deposit of the check by preventing re-presentment of the check. The unique front portion of the check, containing information unique to the check and available through the electronic data representative of the check, may be used to create the record.

Alternately, at 904, the record of the check may be created by financial institution and may include forming a representation of the check from information contained on the check. The representation may be an image. For example, if the electronic data representative of the check is in the form of a digital image, the digital image may be used as the record of the check. Alternatively, the representation may be a data string including one or more identifying characteristics of the check organized in a predefined order.

Alternate to 903 or 904, at 902, if the electronic data representative of the check is a digital image of the check, the record of the check may be created by financial institution and may include forming an image of one or more portions of the electronic data representative of the check. In this manner, one or more portions of the check deemed to include identifying characteristics may be used as the record of the check. If more than one portion is used to create the record, the portions may be subsequent portions, with each portion containing one or more identifying characteristics. Or the image may comprise non-subsequent portions of the check. For example, the portion of the check containing the date and check number may be placed next to the portion of the check containing the signature of the payer to form the record of the check.

Other means of creating a record of the check may be employed. Furthermore, financial institution may not be responsible for creating the record of the check and may instead provide, by way of network for example, the electronic data representative of the check to an outside source (not shown) or to another financial institution capable of creating the record. The outside source or other financial institution may create the record by forming a representation of the check from information contained on the check, by forming an image of one or more portions of the check, or by other means. The record may then be sent to financial institution through network for example.

An analysis may be performed to determine whether the record of the check, created by one of financial institution or an outside source, is unique or has already been created and stored in the repository. The analysis may include comparing the created record to a plurality of records stored in dead-check repository.

If the record of the check has not already been stored in the repository, the record may serve as an indication that the check attempted to be deposited by payee has not previously been deposited. Accordingly, financial institution may proceed with the remote deposit as desired by payee. Additionally, financial institution may perform actions to assist in subsequent record assessments used to determine if subsequent remote and/or physical deposits may be processed.

At 888, the unique record of the check is stored in dead-check repository. At 907, following the storing of the check in a dead-check repository 906, the remote deposit is processed. At 908, funds associated with the check are credited to account held with financial institution. At 909 the funds identified by the check are deducted from the account of payer, for example, account associated with the check.

If it is determined that the record of the check already exists in dead-check repository, then the remote deposit is desirably rejected and/or other predetermined actions may be taken (e.g., notify the payer, the payee, the financial institution, other financial institutions). Alternatively, the dead-check repository may detect similarities but not an exact match between the record being verified and a record stored in dead-check repository. For example, one inconsistency between the record being verified and a stored record may exist, while multiple portions of the record being verified may match the stored record. If such an inconsistency leads to an uncertainty in the unique record determination, at 905, financial institution may proceed depending upon predetermined rules developed by financial institution.

Figure 9B:
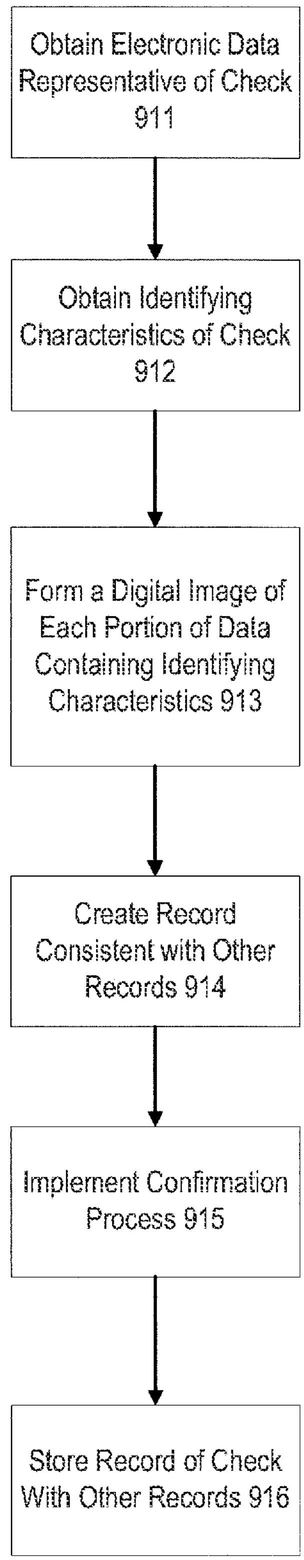

FIG. 9B is a flow chart illustrating an example method of verifying a negotiable instrument, such as, for example, a check. At 911, electronic data representative of the check is received at, for example, one of financial institutions, for example, financial institution. The electronic data representative of the check may be received as a digital image of the check from payee or from one of financial institutions.

At 912, financial institution, upon receipt of the check, obtains identifying characteristics of the check. Several identifying characteristics may include, but are not limited to, the signature of payer, the date as indicated by payer, and the account number associated with account from which the funds identified on the check will be deducted. At 913, a digital image comprising some or all the portions of the electronic data representative of the check and/or the identifying characteristics may be formed. The digital image may be a smaller sized image than the electronic data representation of the check, for example.

At 914, a record of the check in a format consistent with the format of the records stored in dead-check repository is created. The creation of the record in a format consistent with the stored records may include, for example, forming a composite digital image comprising each digital image of each portion. Each digital image may be arranged in a predefined manner to form the composite digital image consistent with the plurality of records stored in the dead-check repository.

At 916, a confirmation process is implemented to determine if the record of the check is unique or has already been stored in the repository. As the record has been formed to be consistent with the format of the other records stored in dead-check repository, the confirmation process may include a direct comparison between the created record and the stored records. Optionally at 916, the record of the check is stored with the plurality of records currently stored in the database. If the record matches a record already stored in the repository, the record may be stored with the previously stored record to serve as an indication that the check associated with the record was presented for re-presentment, for example.

Figure 9C:
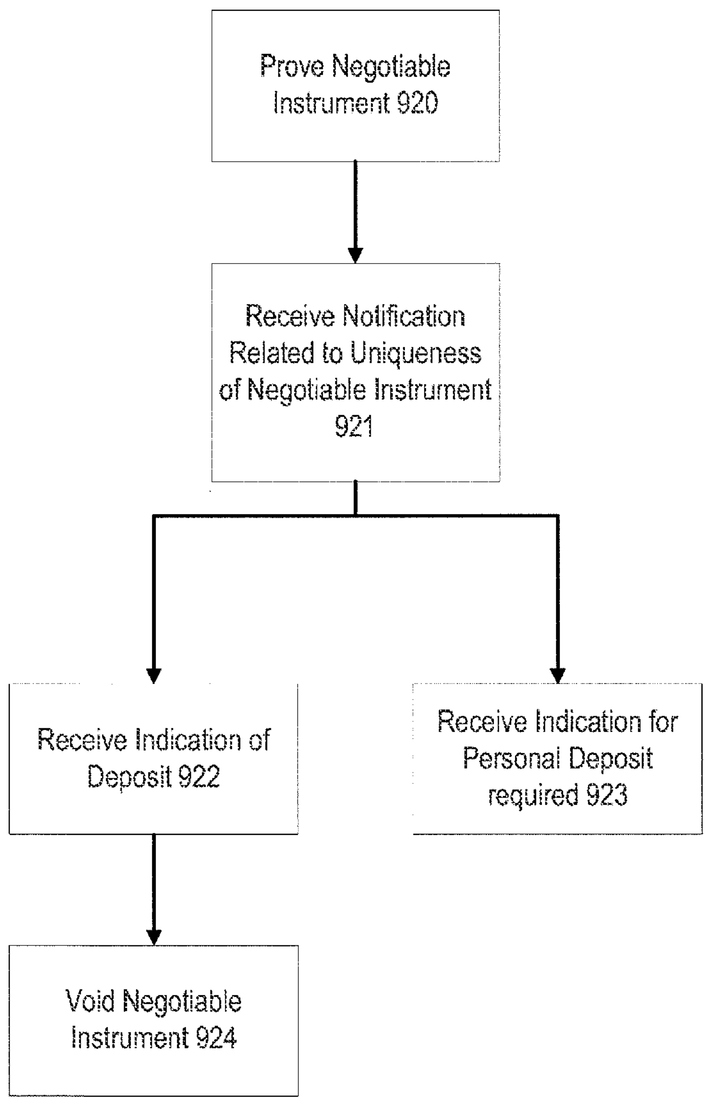

FIG. 9C is a flow chart illustrating a method of remotely depositing a negotiable instrument. At 920, a negotiable instrument is provided by, for example, payee, to, for example, financial institution for providing funds indicated by the negotiable instrument into account. Providing the negotiable instrument may include creating a digital image of the negotiable instrument by, for example, scanning the negotiable instrument with a scanner or copy machine. The digital image may then be sent in an email attachment, for example, from the payee's or other user's remote location to financial institution.

At 921, payee is provided with a notification related to the uniqueness or verification of the negotiable instrument, based on a comparison of a record created based on the negotiable instrument and previously generated records stored in a repository, for example. The notification may be provided electronically though email or text message over network, for example. If the notification is that the negotiable instrument is unique or does not already exist in the repository, then at 922, payee receives indication that the appropriate funds have been deposited into account owned by payee. If, on the other hand, the notification indicates that the negotiable instrument is not unique or already exists in the repository, at 923 payee receives an indication and e.g., a notification to visit or otherwise contact financial institution 120*a* in order to attempt to deposit the negotiable instrument.

At 924, payee maybe required by, for example financial institution, to void the negotiable instrument. This may include sending a copy of the negotiable instrument to financial institution or to an entity as indicated by financial institution. Payee may be required to perform the void process within a predetermined period of time.

Alternative Embodiments of RDC-Detection: Voiding a Check

When a negotiable instrument is deposited using electronic means, there may arise the situation when the physical negotiable instrument "transforms" to exist in essentially two forms: the original physical negotiable instrument and the newly generated digital form. While the newly generated digital form may undergo processing through the federal check clearinghouse, the physical form is typically left in possession of the bearer of the negotiable instrument, e.g. the person that deposited the check. Although a financial institution may send instructions to the depositor to destroy or transfer possession of the physical negotiable instrument upon transmission of the digital form, the financial institution may have little to no way to force the depositor to actually destroy the negotiable instrument without limiting access to the funds. Unless the depositor destroys the negotiable instrument, the duality described above may continue to propagate, i.e. both the physical negotiable instrument and the digital form may continue to exist contemporaneously.

Thus, a financial institution may wish to cause the alteration of the physical negotiable instrument with or without the assistance of the depositor to render the physical form of the negotiable instrument non-negotiable. In other words, the financial institution may cause the alteration of the appearance of the physical negotiable instrument to a point that makes it difficult or impossible to present the physical negotiable instrument in another transaction, thus effectively destroying the negotiable instrument, with or without the participation of the depositor. For example, the appearance of the negotiable instrument may be changed to show the term, "VOID". Thus, if the negotiable instrument is presented again, the term may indicate that the holder negotiable instrument has previously deposited or attempted to deposit the negotiable instrument. The negotiable instrument may be altered in other ways and is not limited to the term used above.

Figure 10A:
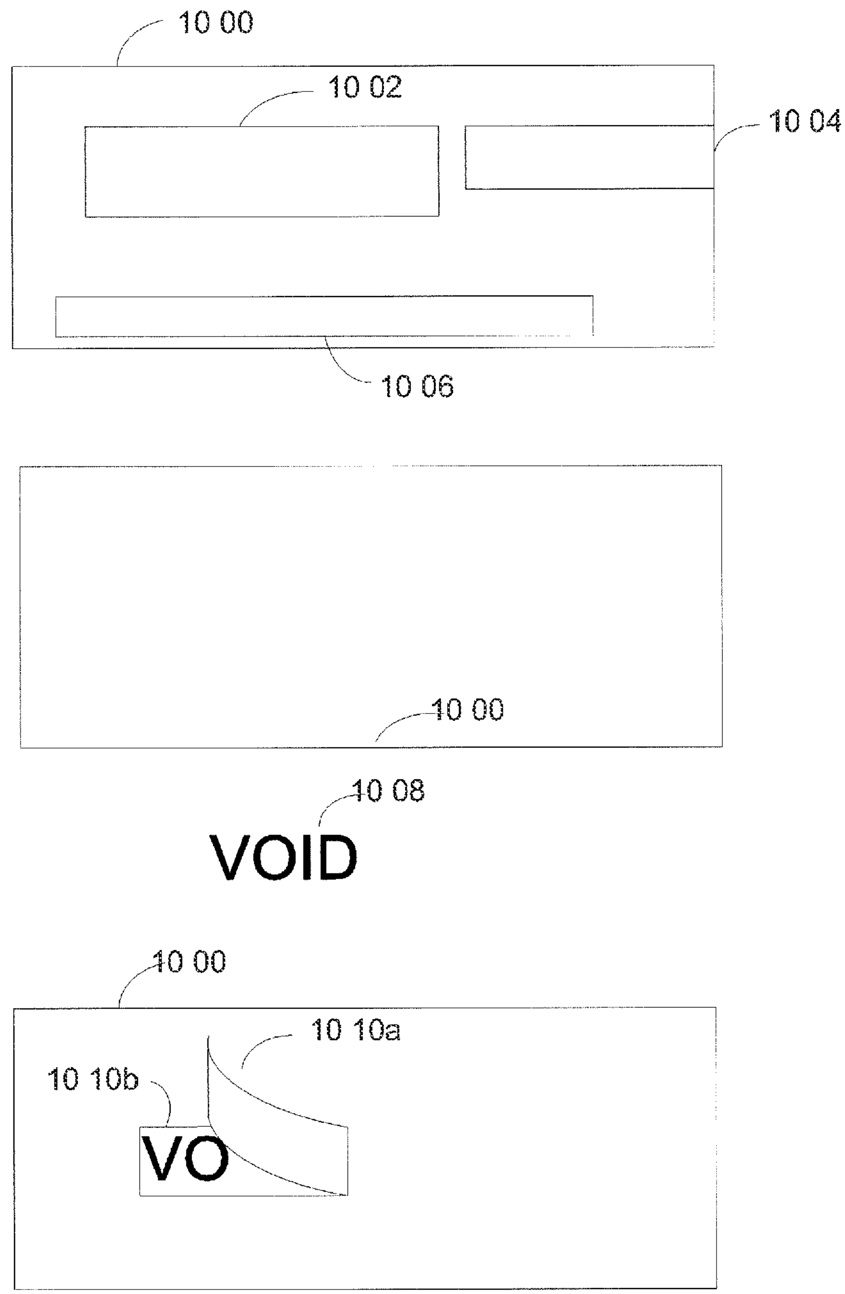
FIGS. 10A-C provide diagrams illustrating aspects of alternative embodiments of voiding a check of the RDC-Detection.

FIG. 10A is illustrative of the modification of a negotiable instrument. Shown in FIG. 10A is check 1000 having redemption amount section 1004, which indicates the amount of funds to be deposited into an account, and magnetic ink character recognition (MICR) section 1006. The MICR section typically includes account information of the negotiable instrument, namely the routing number of the bank that holds the account and the account number the negotiable instrument is to be drawn against, e.g. the bank and the account from which the funds are to be withdrawn. The MICR information is typically printed using a magnetic ink or toner containing iron oxide. In a deposit process, the image of check 1000 may be a first electronic data of the check as well as other information, such as sections 1006 or 1004, which may be second electronic data.

In one embodiment, check 1000 also has unmodified modifiable section 1002. Unmodified modifiable section 1002 may use various types of modifiable inks or other mechanisms so that when a stimulus is applied to unmodified modifiable section 1002, the ink or mechanism changes in appearance or structure to indicate a deposit process may have occurred. The change may be permanent or temporary. There are various types of ink that may be used, the present disclosure not being limited to any one particular type. Some examples of modifiable inks are inks sensitive to light, heat or sound. An ink that is sensitive to light may be configured to modify based upon exposure to a certain magnitude of light for a certain period of time. For example, a light sensitive ink may change its appearance based upon a bright light, such as a light from a scanner, being applied for a long period of time. The time may be determined based upon various scan speeds of a typical scanner. For example, the scan speed of a scanner at a high resolution may be slower than the scan speed of a scanner at a low resolution.

If the ink is sensitive to heat, the ink may be configured to modify its appearance based upon the heat generated by the application of a bright light source, such as one that may be found in a scanner. If the light source is applied for a long period of time, the ink may be configured such that the heat generated by the absorption of the light by the ink will create a certain amount of heat within the ink, thus causing the change in the ink. Unmodified modifiable section 1002 may also have a mechanism sensitive to other types of stimuli, such as a radio frequency identification (RFID) tag. When the RFID tag receives a particular radio signal, the RFID tag may be modified. When the RFID tag is read at a later time, the modification may indicate that the deposit of the negotiable instrument may have occurred. The RFID tag may also, among other uses, be used to track the location of check 1000.

In an alternative embodiment, check 1000 has modified modifiable section 1008, which was unmodified modifiable section 1002. After the application of a stimulus to unmodified modifiable section 1002, the ink or mechanism within unmodified modifiable section 1002 may be changed to show modified modifiable section 1008. Check 1000 now shows the term, "VOID" within modified modifiable section 1008. The change may be used to provide information to prevent a second or subsequent presentment of check 1000 for deposit.

In an alternative embodiment, an ink sensitive to various stimuli that modifies after removal of a protective cover may be employed. Check 1000 has removable coating 1010*a* which seals modifiable ink section 1010*b* from exposure to stimuli. The stimuli may be of various types, including, but not limited to, air or light. For example, prior to deposit of the negotiable instrument, there may be a requirement to remove coating 1010*a* to indicate the underlying code, which is shown as "VO". Upon removal of coating 1010*a*, ink section 1010*b* is exposed to light, causing the ink to modify to show "VO". Thus, coating 1010*a* may be of a range of materials that blocks the exposure of section 1010*b* to a stimulus.

Once exposed, ink section 1010*b* may be permanently or temporarily modified. Ink section 1010*b* indicia may also be encoded to increase the difficulty of defeating the void process. For example, ink section 1010*b* may be a bar code unique to check 1000 itself and may be designed in a manner that is difficult to determine what the bar code will be. In order to deposit check 1000, coating 1000*a* may be removed to show the encoded indicia. If the indicia is encoded, the user may be forced to remove coating 1010*a* because of the difficulty of determining the code without exposing the indicia by removing coating 1010*a*.

Figure 10B:
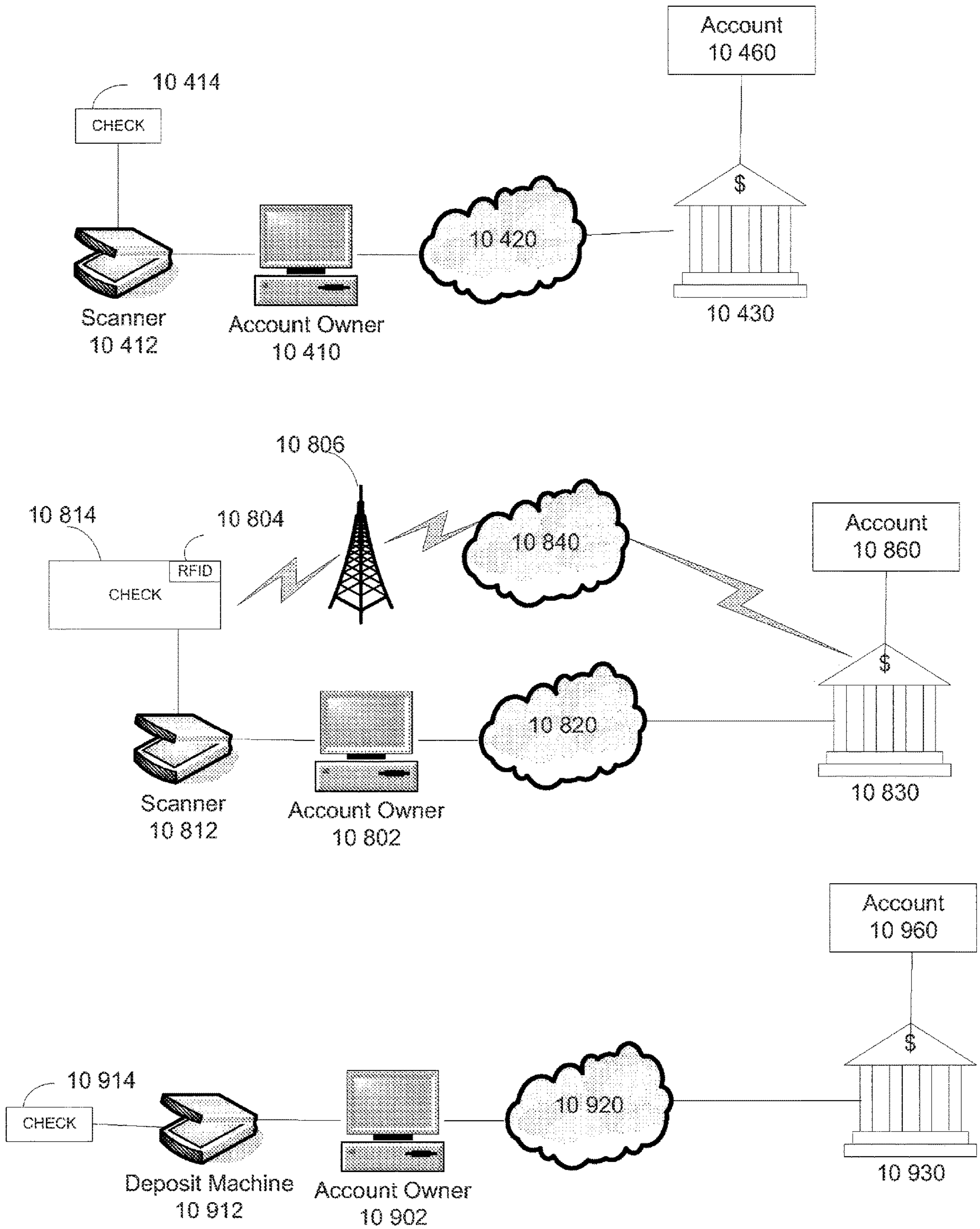
Figure 10C:
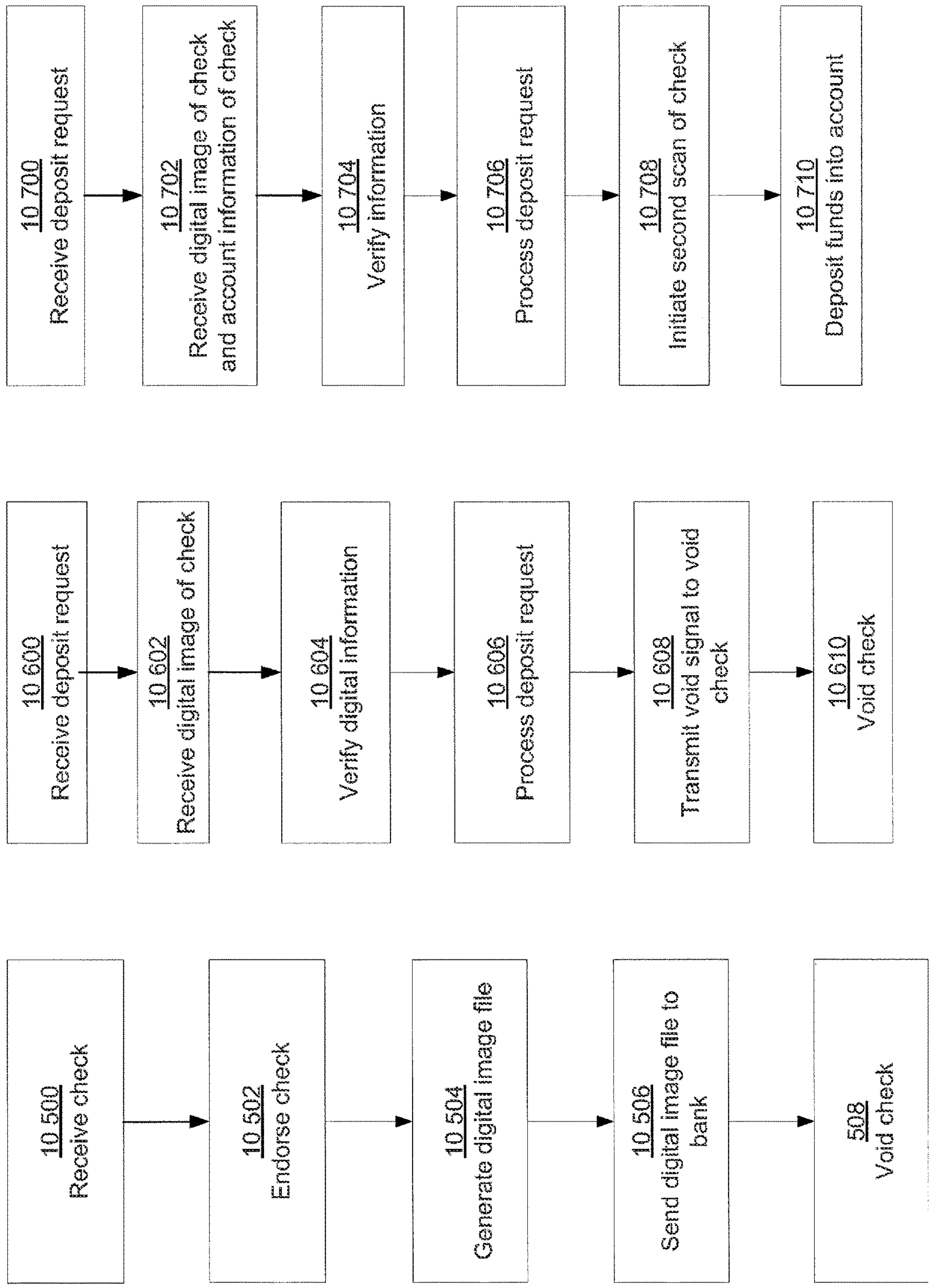

FIG. 10B illustrate example systems to deposit a check into an account within embodiments of RDC-Detection. In one exemplary and non-limiting embodiment, account owner 10410 has account 10460 with bank 10430. Account owner 10410 opens a communication pathway with bank 10430 via Internet connection 10420 to send a deposit request to deposit check 10414 into account 10460. Account owner 10410 scans at least one surface of check 10414 using scanner 10412. Scanner 10412 creates a digital image of the surface of check 10414 that was scanned and saves that digital image as a digital image file. The digital image file may also contain other information about check 10414, including MICR information, account information, or deposit amount. Account owner 10410 transmits the digital image file to bank 10430, which processes the deposit.

After the deposit is processed, bank 10430 may wish to prevent the use of check 10414 in another deposit operation. In one exemplary and non-limiting embodiment, bank 10430 may cause the modification of check 10414 to prevent a subsequent presentment of check 10414. Bank 10430 may send a communication to account owner 10410 to void the check. The communication may be directed at scanner 10412 with or without the knowledge of account owner 10410. In other words, bank 10430 may not complete the deposit operation if account owner 10410 intercedes in the void operation. Bank 10430 may send a signal to scanner 10412 to scan a surface of check 10414 at a speed to cause the modification of an ink section on check 10414, as described above. Once the scan operation is completed, bank 10430 may wait to complete the deposit operation until a communication or notice is received that check 10414 was voided. The notice may include the slow scanned image showing the modification of check 10414.

In an alternative embodiment, a user receives 10500 a check from another individual, for example, if the user is owed money or the check is used as payment for a good or service. The user endorses 10502 the check by signing the check, thus indicating the intent to deposit the check into an account. The user generates 10504 a digital image file by scanning at least one surface of the check using a scanner. The user sends 10506 the digital image file to the bank which controls the user's account. After processing the deposit request, a communication is generated and transmitted to void 10508 the check. The communication may be directed to the user and/or may be directed to another mechanism. For example, the communication may be directed to the user's scanner with or without the knowledge of the user. The communication may contain instructions to re-scan the check at a certain speed to cause the application of a stimulus to modify the check.

In an alternative embodiment, the bank receives 10600 a deposit request from a user. After acknowledging the deposit request, the bank then receives 10602 a digital image of the check. The digital image may be used by the bank to process the deposit request. The digital image may be used alone or in conjunction with additional information such as MICR information. After verifying 10604 the digital information, the bank processes 10606 the deposit request. The verification may include, but is not limited to, the verification of the quality of the digital image, the verification of any data retrieved from the digital image, the verification of additional information received along with the digital image, and/or the verification that the check has not been deposited before. After the bank verifies 10604 the digital information received and processes 10606 the deposit request, the bank then may transmit 10608 a void signal to void the check. As described earlier, there may be various manners in which to void the check, including, but not limited to, the application of a stimulus such as light, heat or sound. Upon application of the stimulus, the check is voided 10610.

In an alternative embodiment, a scanner is used to apply the stimulus. A bank receives 10700 a deposit request. The bank then receives 10702 a digital image of the check and account information. The bank verifies 704 the information and processes 10706 the deposit request. After the deposit is in process, to complete the process, the bank transmits 10708 a void signal to the user's scanner. The void signal may contain instructions to rescan a surface of the check at a certain speed to cause the application of a stimulus. The ink may be modified based upon the application of a certain magnitude or brightness of light, or heat may be generated by that brightness of light, for a certain amount of time, which may correspond to a scan speed. After the stimulus is applied, the bank deposits 10710 the funds into the user's account.

The present disclosure may incorporate a check modifiable by various stimuli. In an alternative embodiment, a system may use radio waves to modify a check. Check 10814 has embedded RFID tag 10804. RFID tag 10804 is an object that is sensitive to radio signals and can be incorporated into check 10814. RFID tag 10804 can be read and modified at various distances. Typically, an RFID tag, such as RFID tag 10804, has two parts: an integrated circuit for storing and processing information as well as receiving instructions via radio waves and an antenna for receiving and transmitting a signal. Some RFID tags do not have the integrated circuit, thus reducing cost and bulk of using an RFID tag.

The RFID tag may be programmed to initially indicate that check 10814 has not been deposited. Account owner 10802 may use scanner 10812 to deposit check into account 10860 of bank 10830 using communication pathway 10820. After check 10814 is deposited into account 10860, bank 10830 may wish to modify RFID tag 10804 to indicate that check 10814 has been deposited. Thus, when the information contained by RFID tag 10804 is subsequently read, RFID tag 10804 may indicate that check 10814 has previously been deposited. Bank 10830 may cause radio transmitter to transmit a radio communication, through communication connection 10840, to RFID tag 10804 of check 10814. The radio signal may cause RFID tag 10804 to modify its information to indicate that check 10814 has been previously deposited. Communication connection 10840 may be of various types, including, but not limited to, a wireless cellular connection or an internet connection. Additionally, radio transmitter 10806 may be of various types, including, but not limited to, a local internet access point and a cellular transceiver.

The type of scanner used may also be of various types. In an alternative embodiment, a scanner designed for the deposit and voiding of checks through remote means may be employed. Deposit machine 10912 is configured to provide deposit services. Deposit machine 10912 may be an integrated machine or a system having various parts, including a scanner to create a digital image of a check, such as check 10914 and a stimulus generator to cause the application of a stimulus to check 10914. Account owner 10902 initiates deposit machine 10912 to generate a digital image of check 10914, the image being transmitted to bank 10930 via communication connection 10920 for deposit into account 10960. After the bank processes the deposit of check 10914, bank 10930 may transmit a void signal to deposit machine 10912 to initiate a void process.

The void signal may be transmitted using various communication methods, including, but not limited to, an internet connection, a telephone connection such as a wireless telephone, or a facsimile transmission if deposit machine 10912 is configured to receive facsimile messages. Deposit machine 10912 may void check 10914 according to the configuration of deposit machine 10912 and/or the void message received. For example, deposit machine 10912 may be configured to apply an ultraviolet light in response to a void signal. Deposit machine 10912 may also be configured to rescan check 10914 and send the rescanned digital image to bank 10930 to show that the void stimulus has been applied and that check 10914 has been voided.

RDC-Detection Example User Interfaces

Figure 11A:
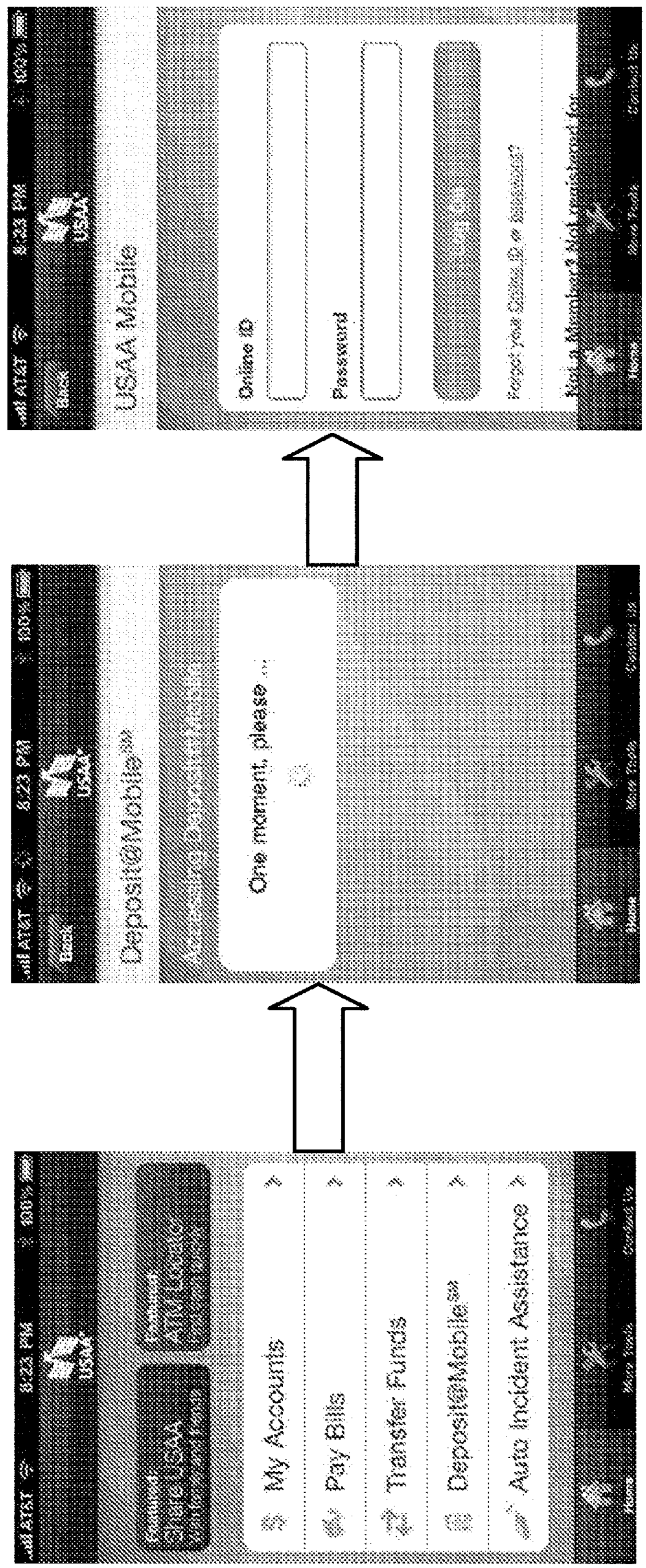
FIGS. 11A-H provide a flow diagram of example screen shots of user interfaces illustrating aspects of remote deposit via a mobile device within one embodiment of the RDC-Detection.
Figure 11B:
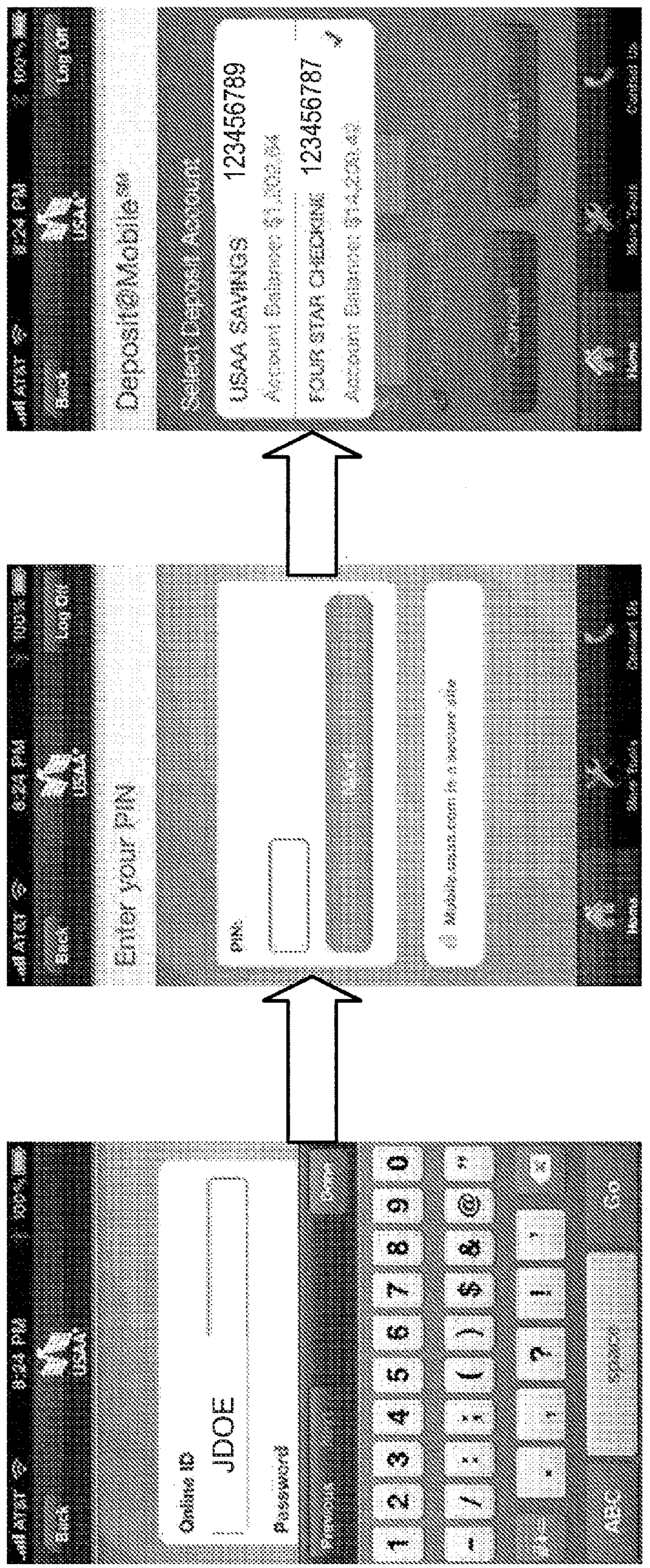
Figure 11C:
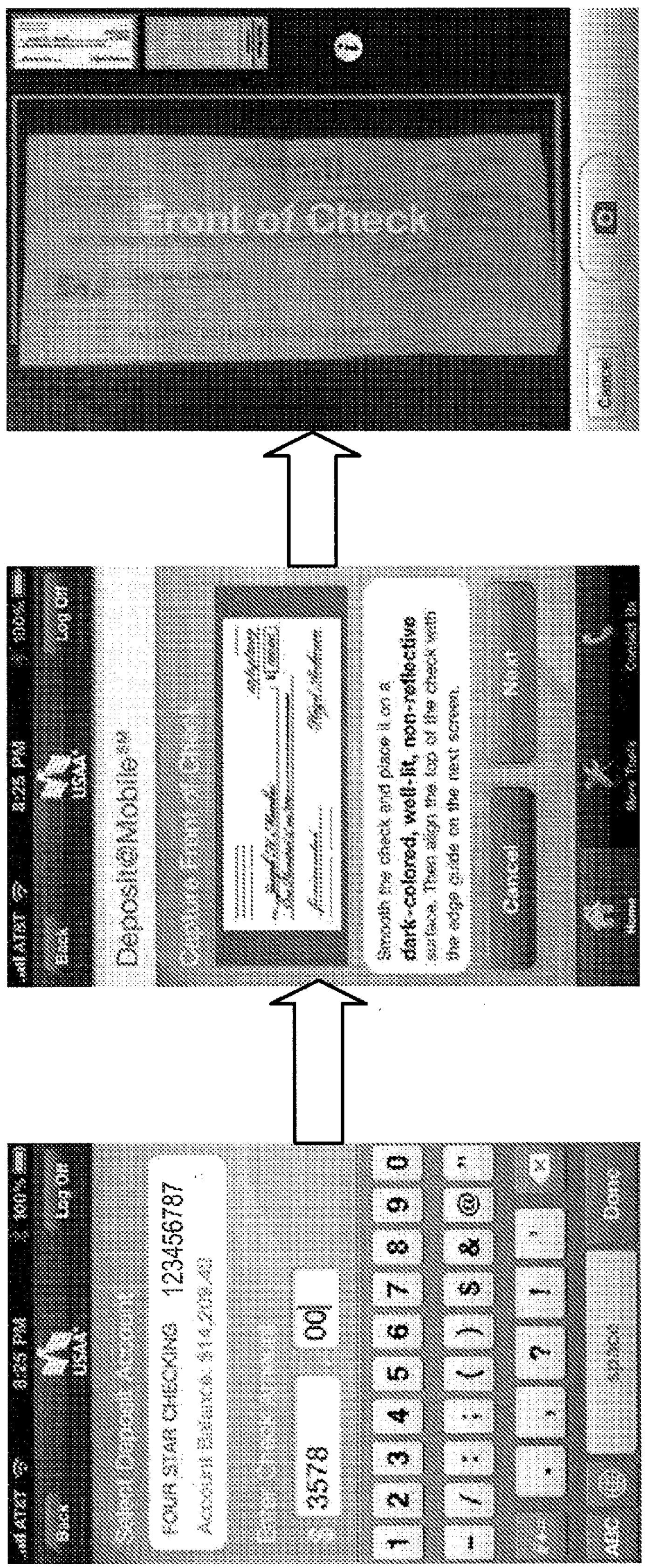
Figure 11D:
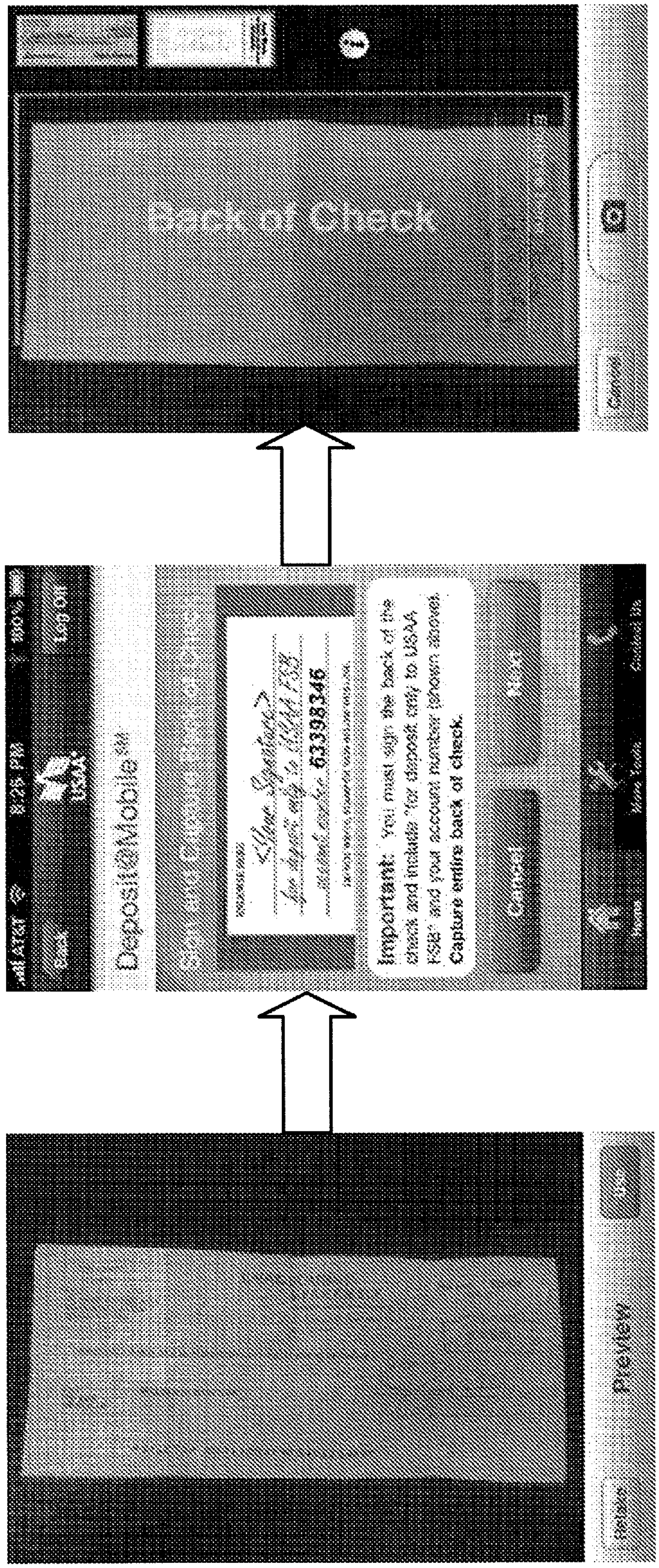
Figure 11E:
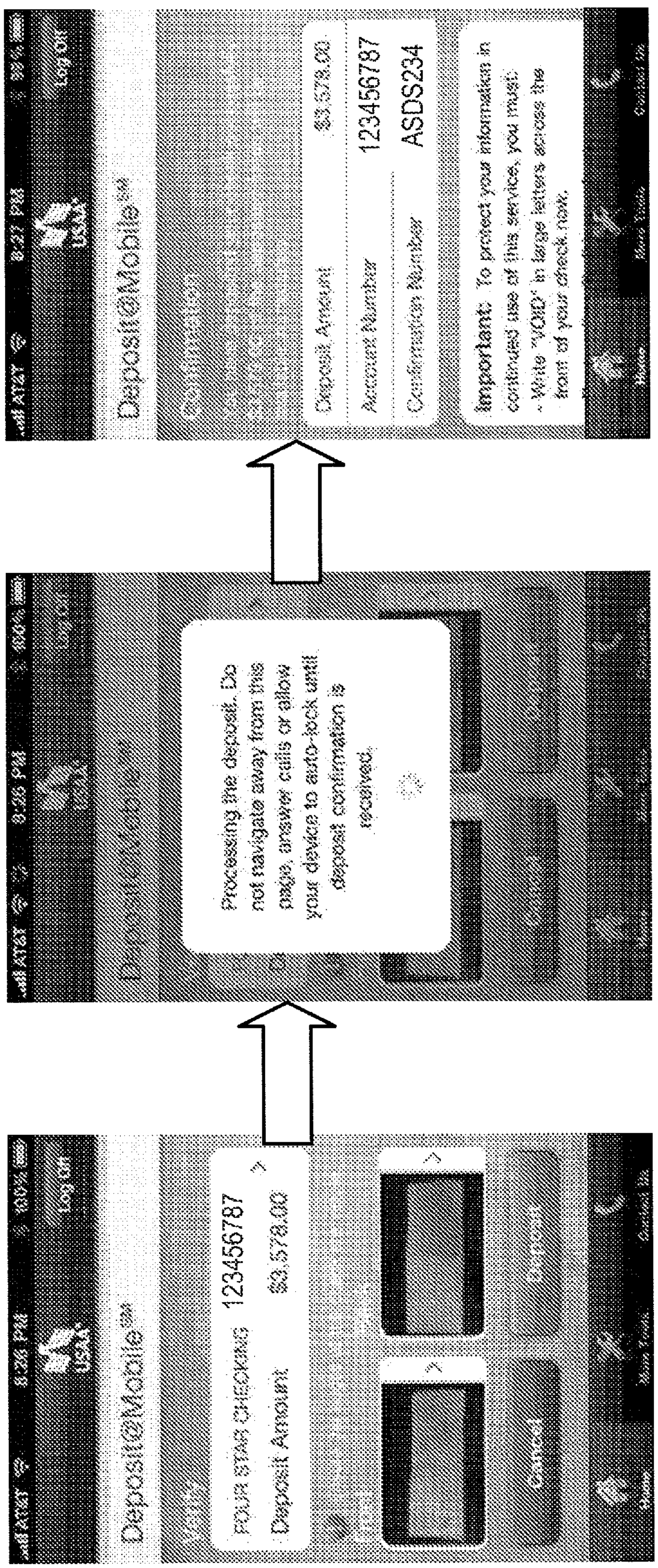
Figure 11F:
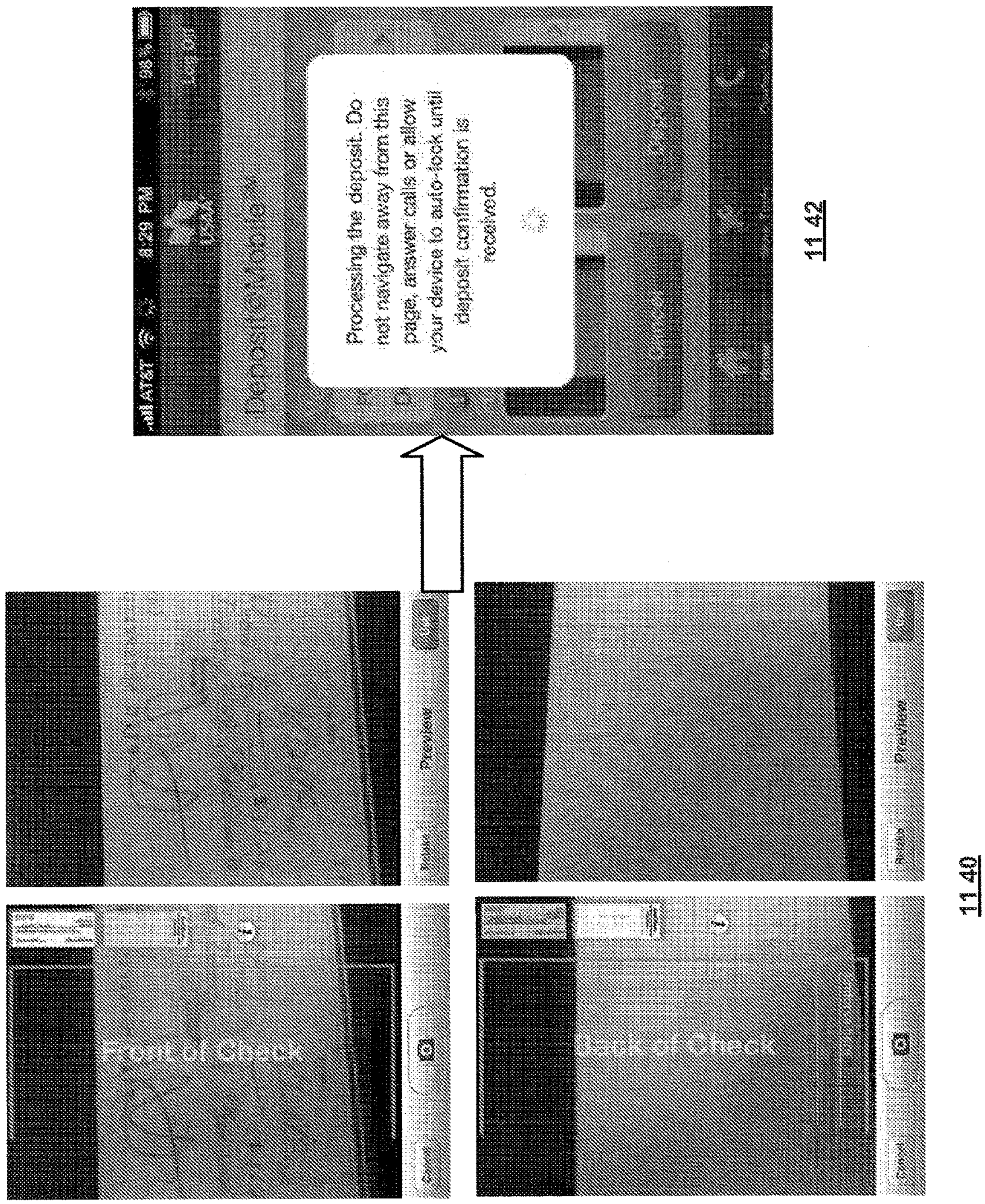
Figure 11G:
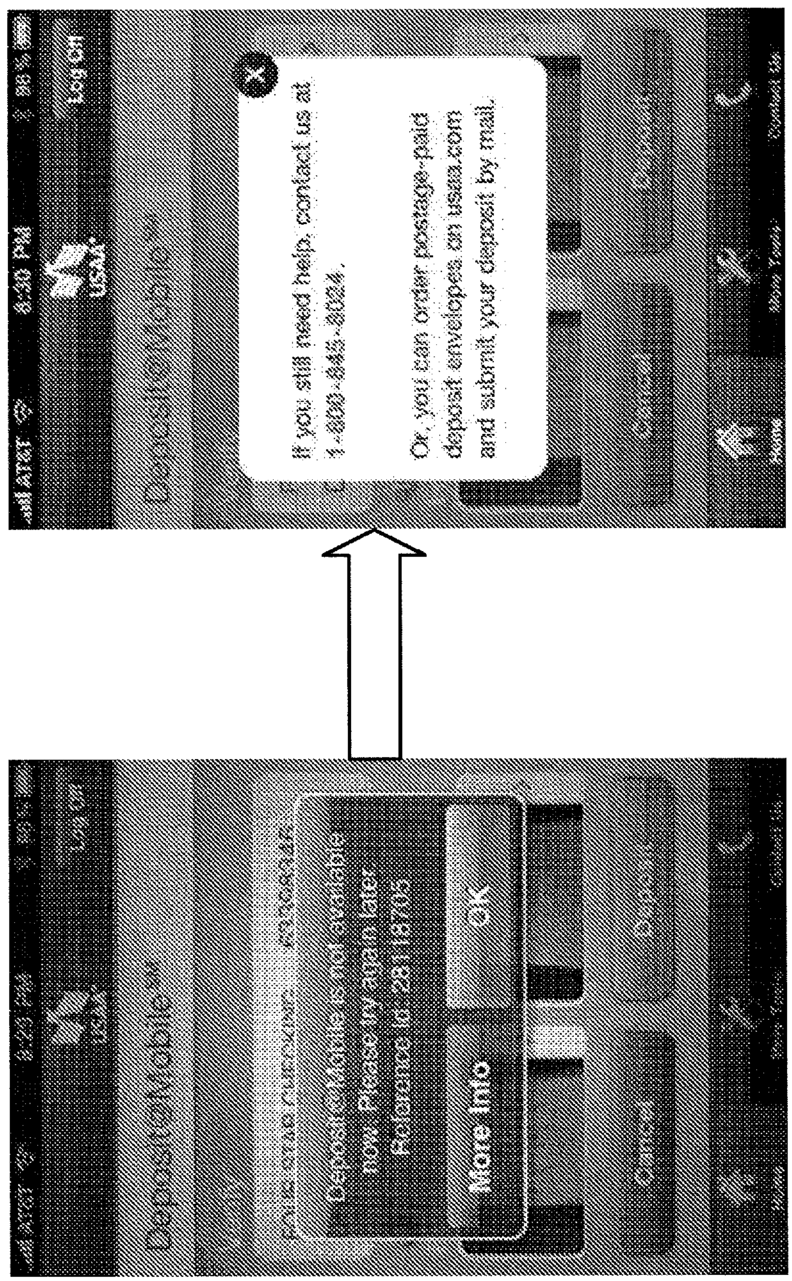
Figure 11H:
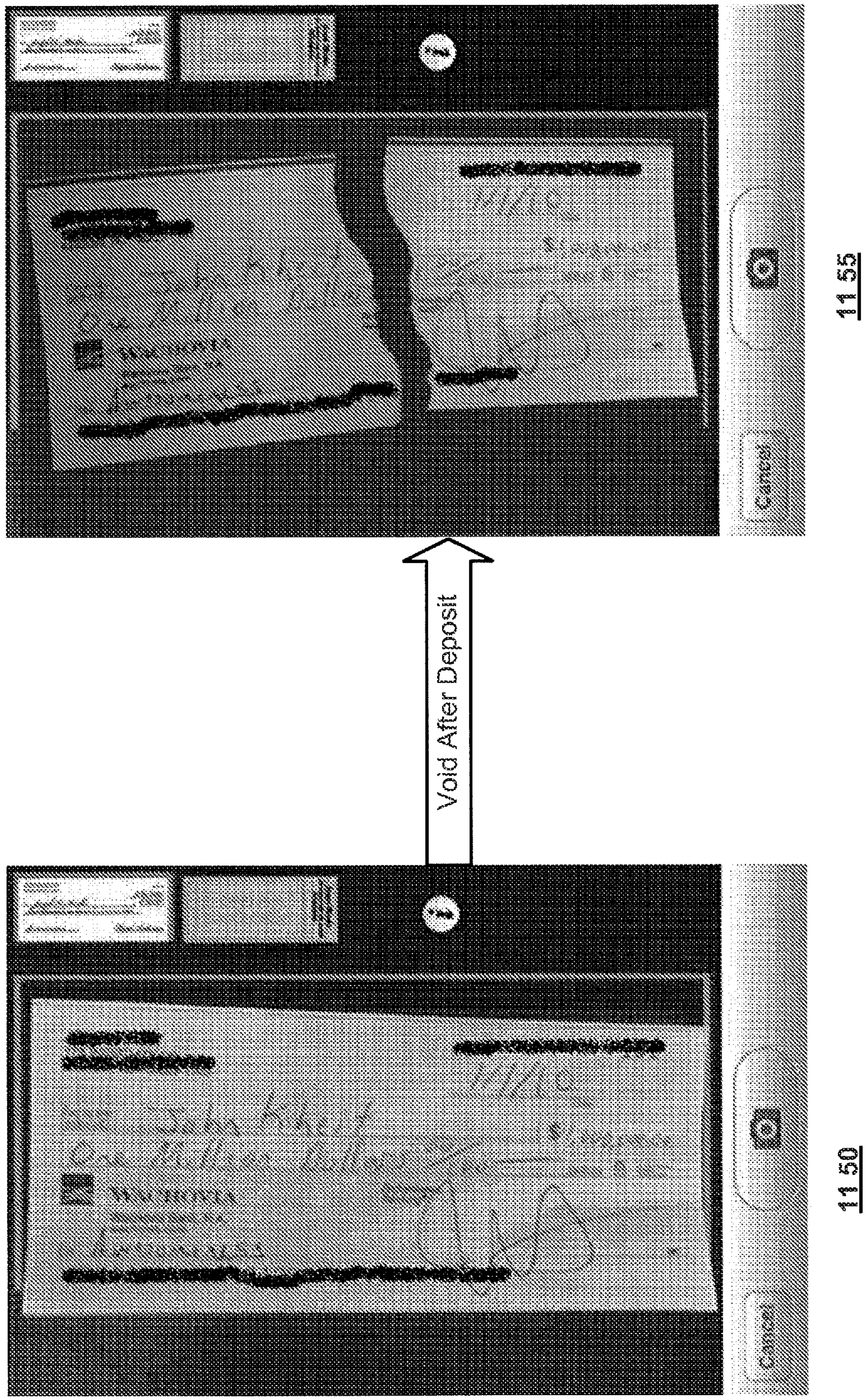

FIGS. 11A-H provide a flow diagram of example screen shots of user interfaces illustrating aspects of remote deposit via a mobile device within one embodiment of the RDC-Detection. As shown in FIG. 11A, in one embodiment, a user operating a mobile device (e.g., an Apple iPhone, etc.), may select to access RDC-Detection feature from the mobile device menu 1101, and the mobile device may then send to deposit request to a remote RDC-Detection platform to establish a secured communications connection between the user device and the server 1102. Upon establishing the connection, the RDC-Detection may prompt the user to login to the RDC-Detection system via a login page 1103.

In one embodiment, as shown in FIG. 11B, the user may type the "Online ID" 1105 and the "PIN" 1107 via the user interface. Upon authentication, the RDC-Detection may display a list of available accounts associated with the user 1109, and the user may select to deposit into the account "Four Star Checking" 1115. As shown in FIG. 11C, upon selection, the user may enter a deposit amount $3578.00. In one implementation, the RDC-Detection may request the user "capture front of check" and provide specific instructions 1118. For example, in one implementation, the RDC-Detection may request the user to smooth the check and place it on a dark-colored, well-lit and non-reflective surface. 1120 shows the user may place the check in front of the built-in camera of the mobile device to fit in the indicated area displayed on screen. Upon taking a picture of front side of the check 1122, the RDC-Detection may instruct the user to sign and capture back of the check in a similar manner 1123-1124.

In one embodiment, as shown in FIG. 11E, the RDC-Detection may present the captured images of the check (both front and back sides) to the user for confirmation 1127, and then process the deposit 1130. In one implementation, the RDC-Detection may send a notice of successful deposit to the user 1132 showing deposit amount, account number and a confirmation number.

In one embodiment, as shown in FIGS. 11F-G, if the images of the checks are not properly taken, e.g., the check is misaligned and the resulting images are incomplete 1140, submission of such unusable check images 1142 may lead to error messages. In one implementation, as shown in FIG. 11G, the RDC-Detection may inform the user the deposit can not be performed 1145 and provide additional information 1148 such as a customer assistance phone number. In an alternative implementation, the RDC-Detection may request the user to re-take and re-submit images of the check.

FIG. 11H illustrates aspects of submitting a ripped paper check for verification after deposit in one embodiment of the RDC-Detection. As shown in FIG. 11H, a depositor may capture and submit an image of a check 1150, and after deposit the depositor may submit an image of ripped check to verify that the check has been voided 1155.

Figure 12A:
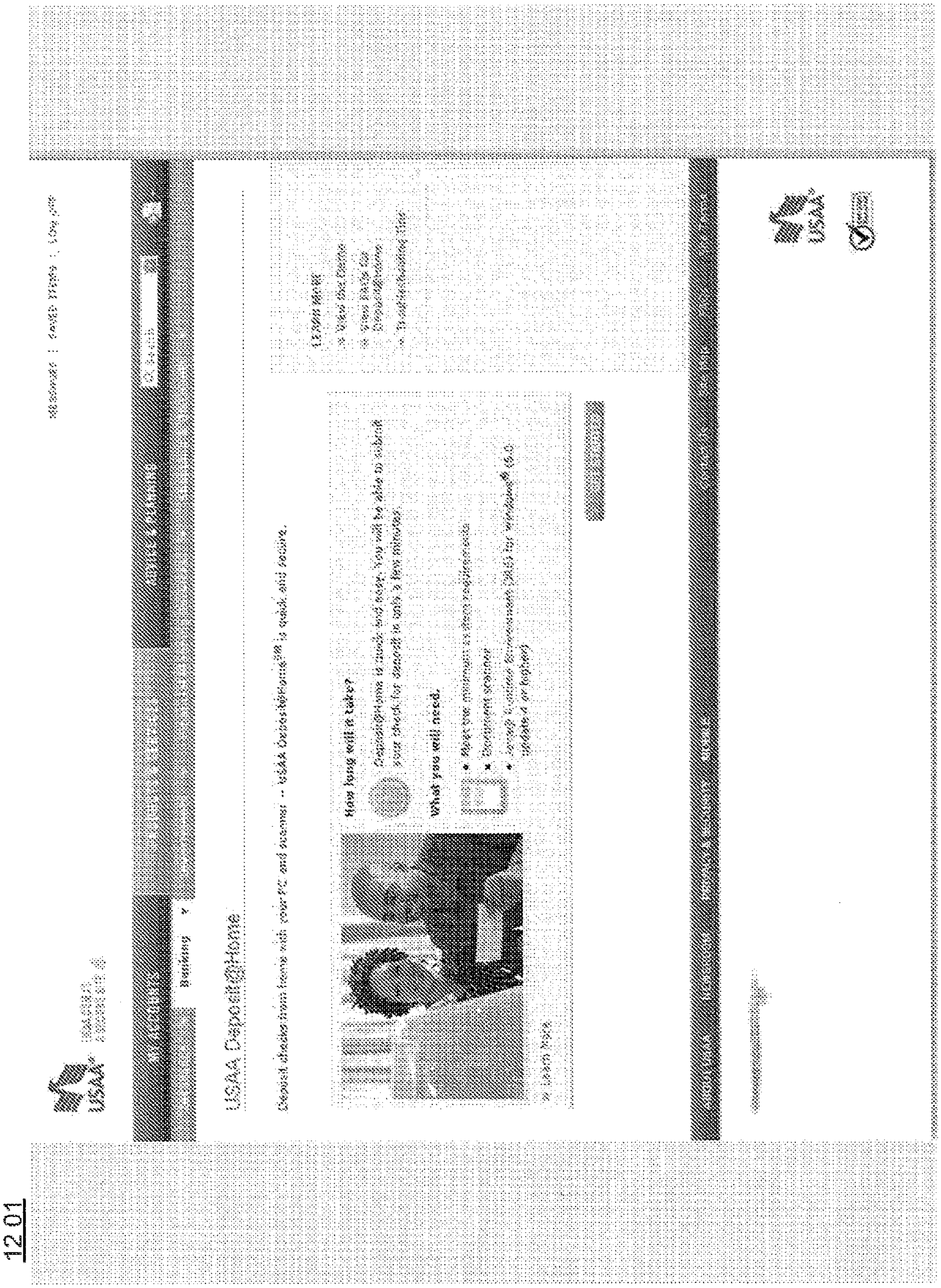
FIGS. 12A-O provide example screen shots of user interfaces illustrating aspects of remote deposit via a personal computer within one embodiment of the RDC-Detection.
Figure 12B:
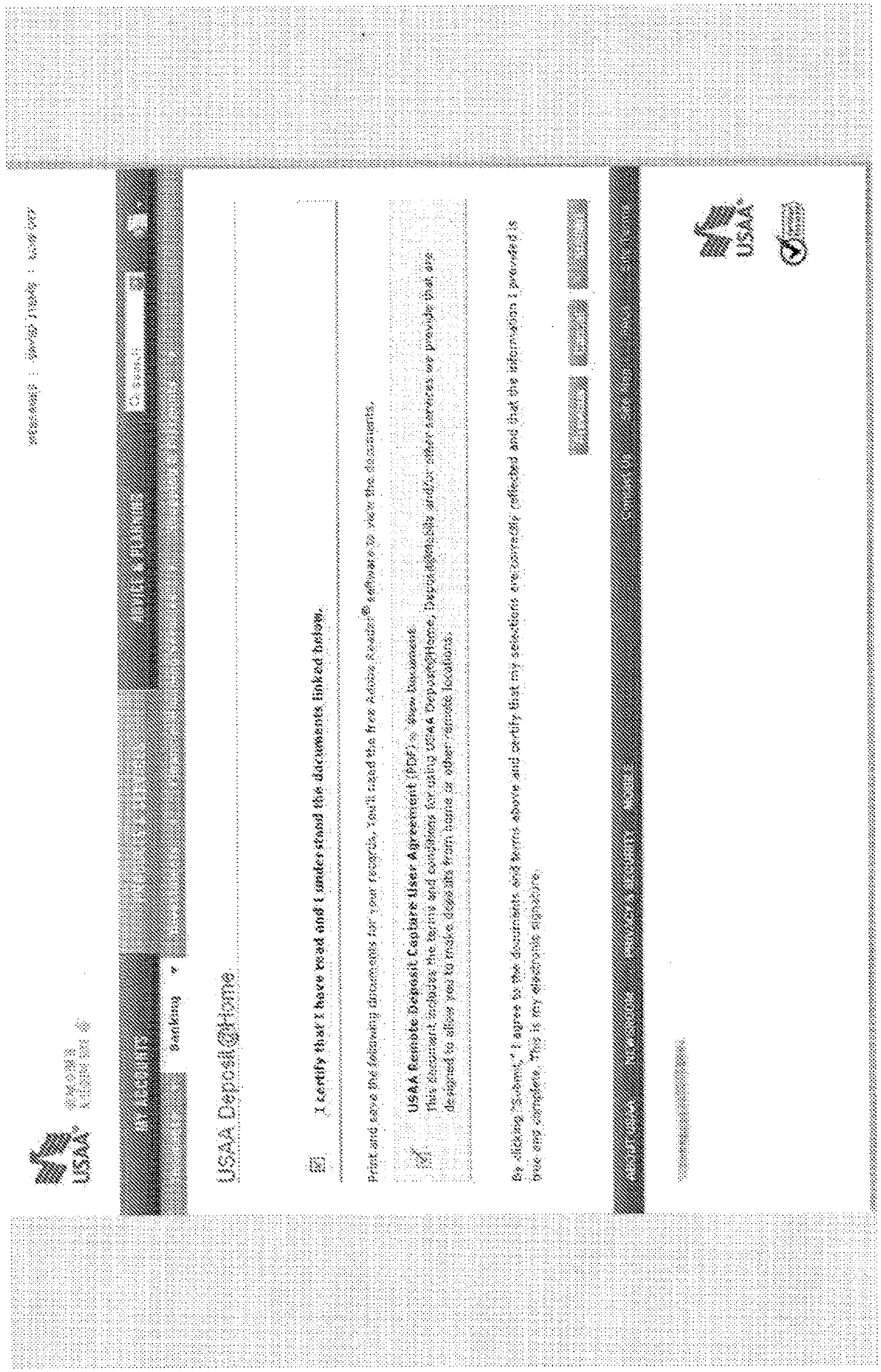
Figure 12C:
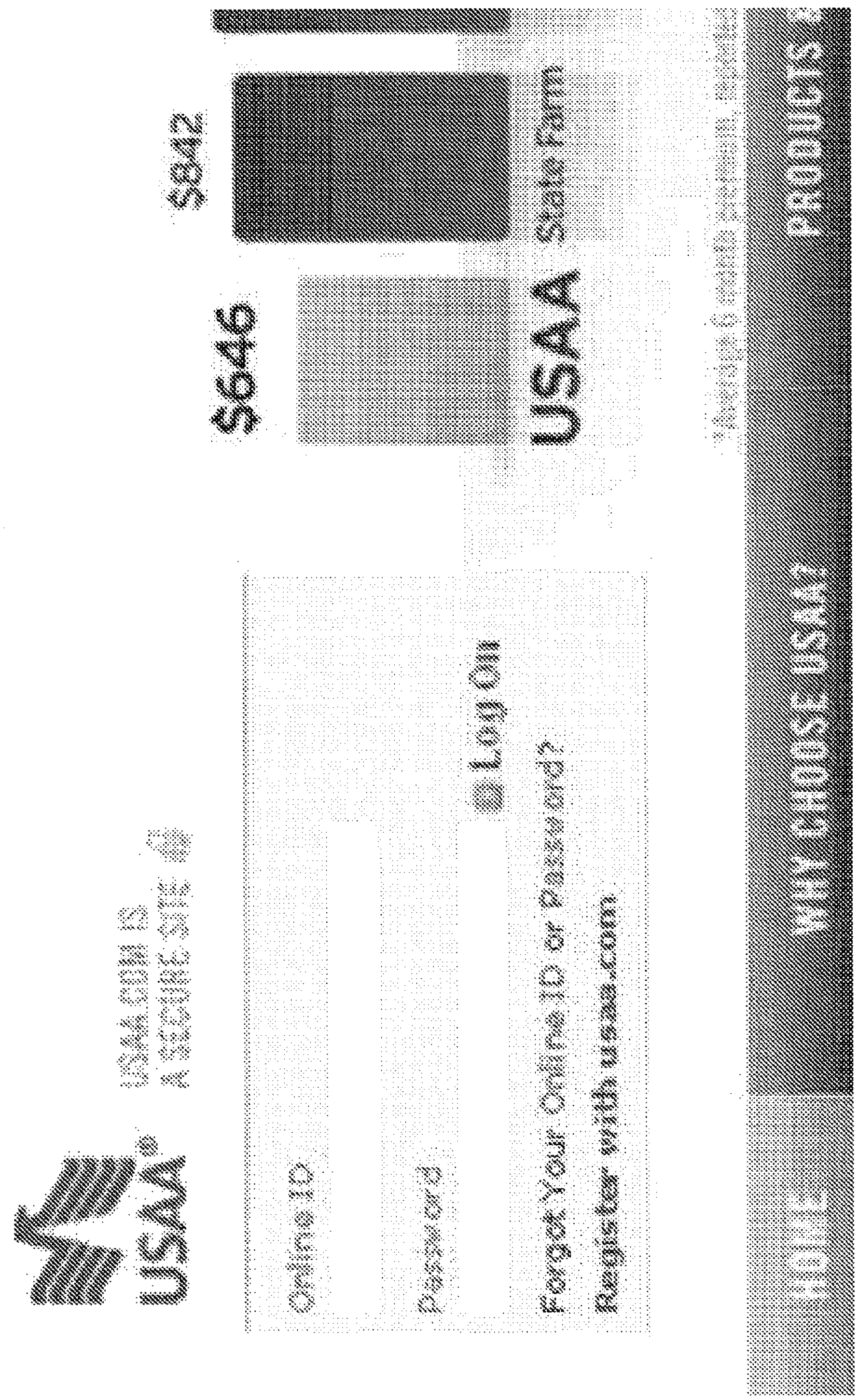
Figure 12D:
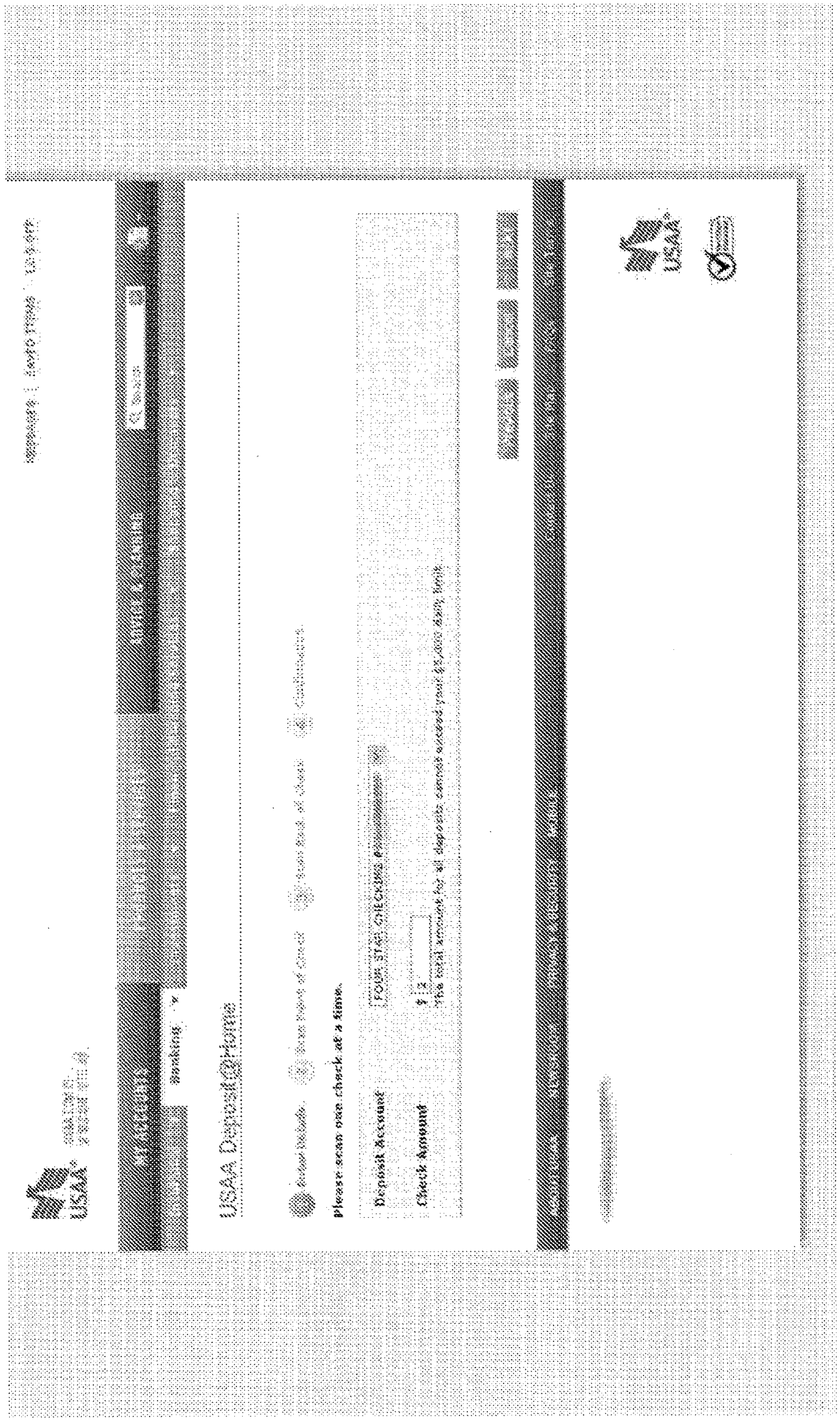
Figure 12E:
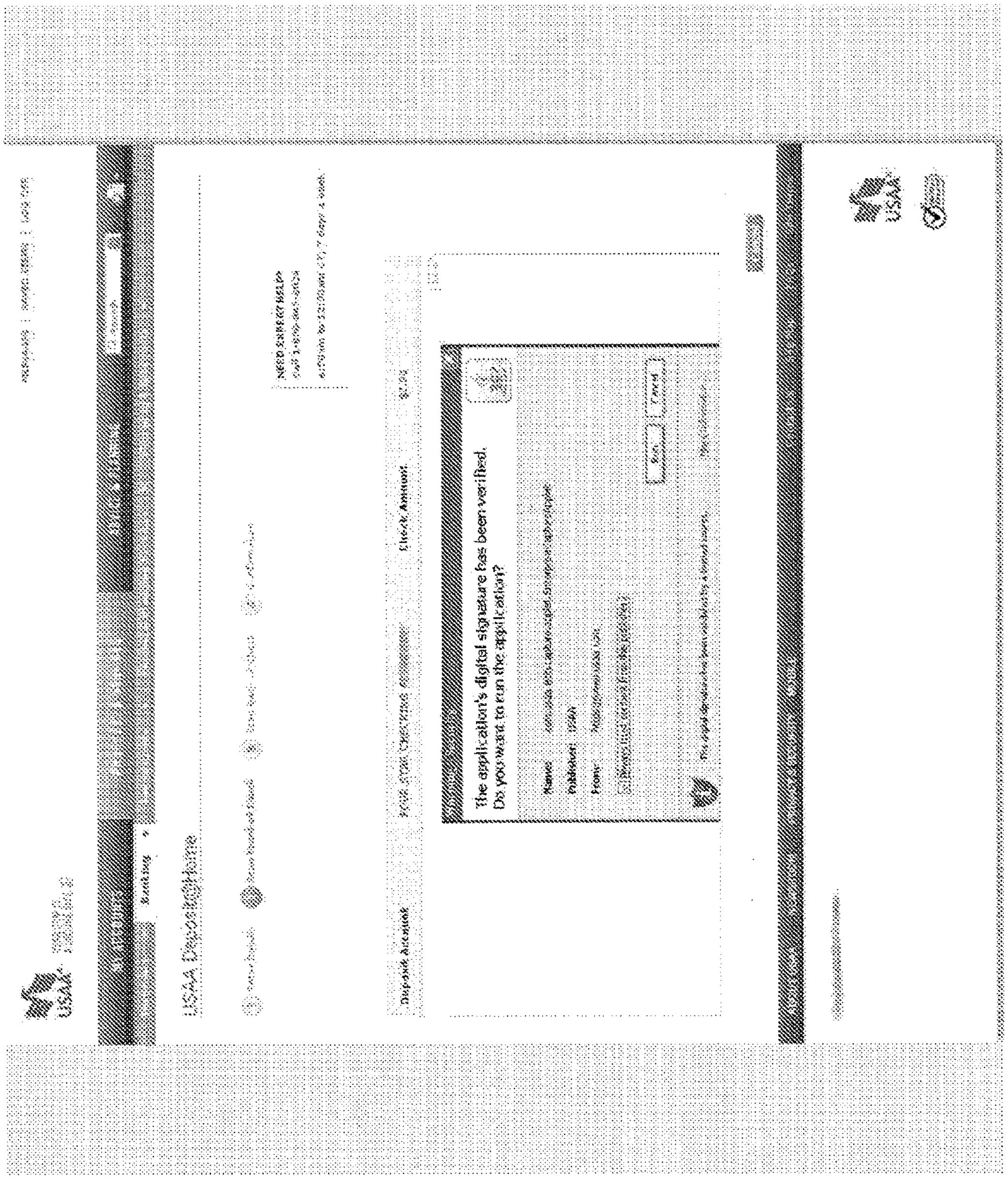
Figure 12F:
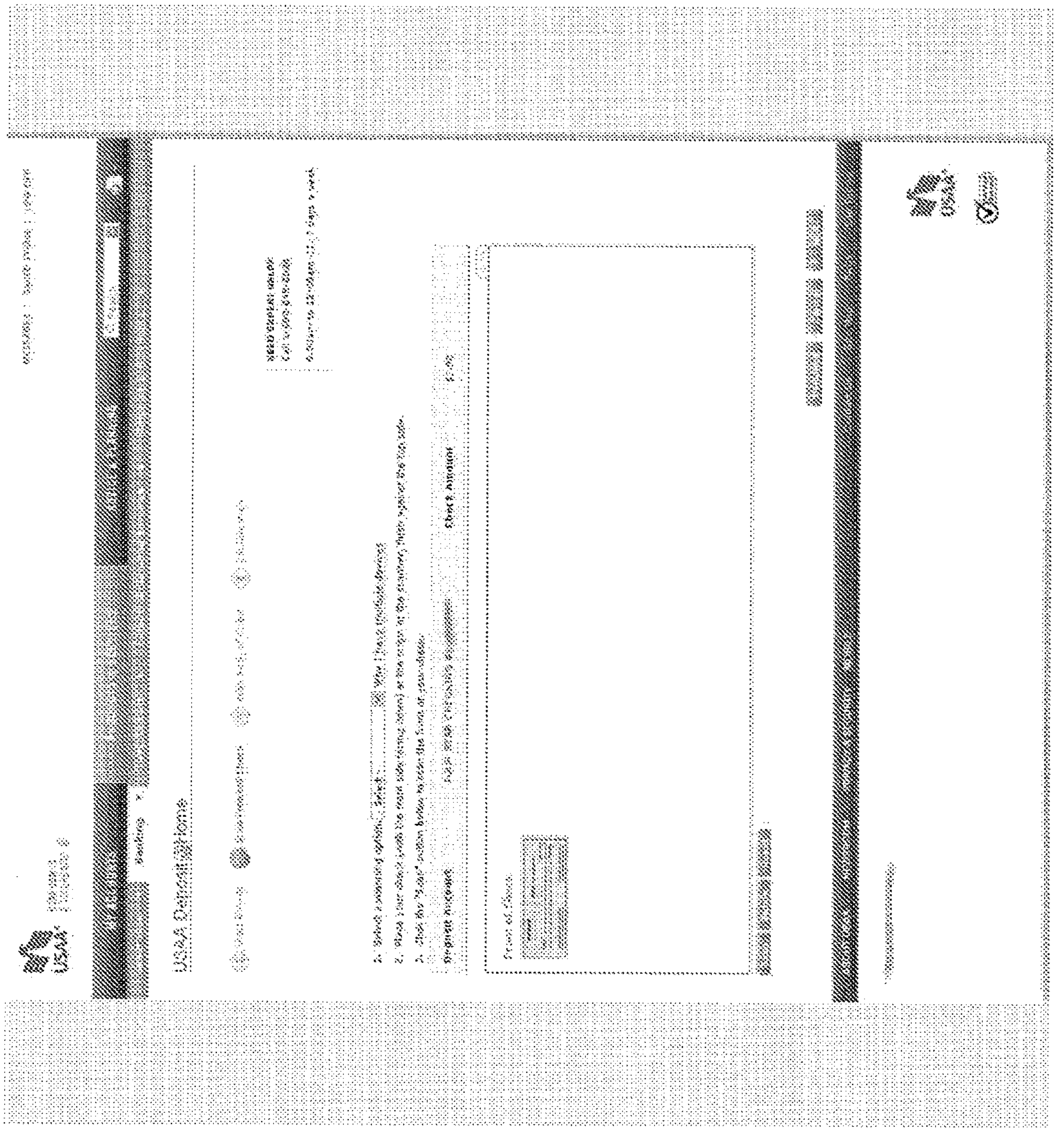
Figure 12G:
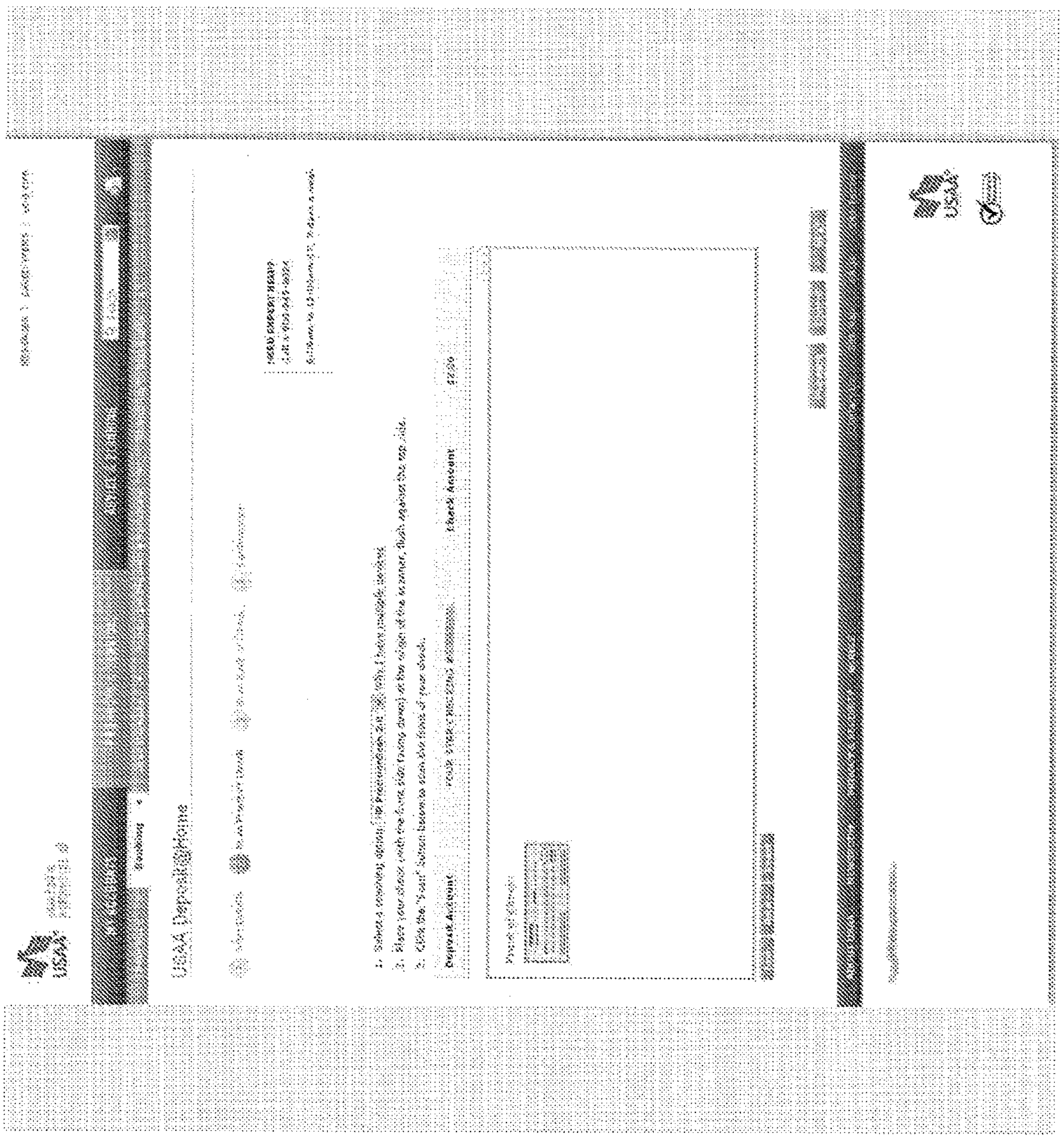
Figure 12H:
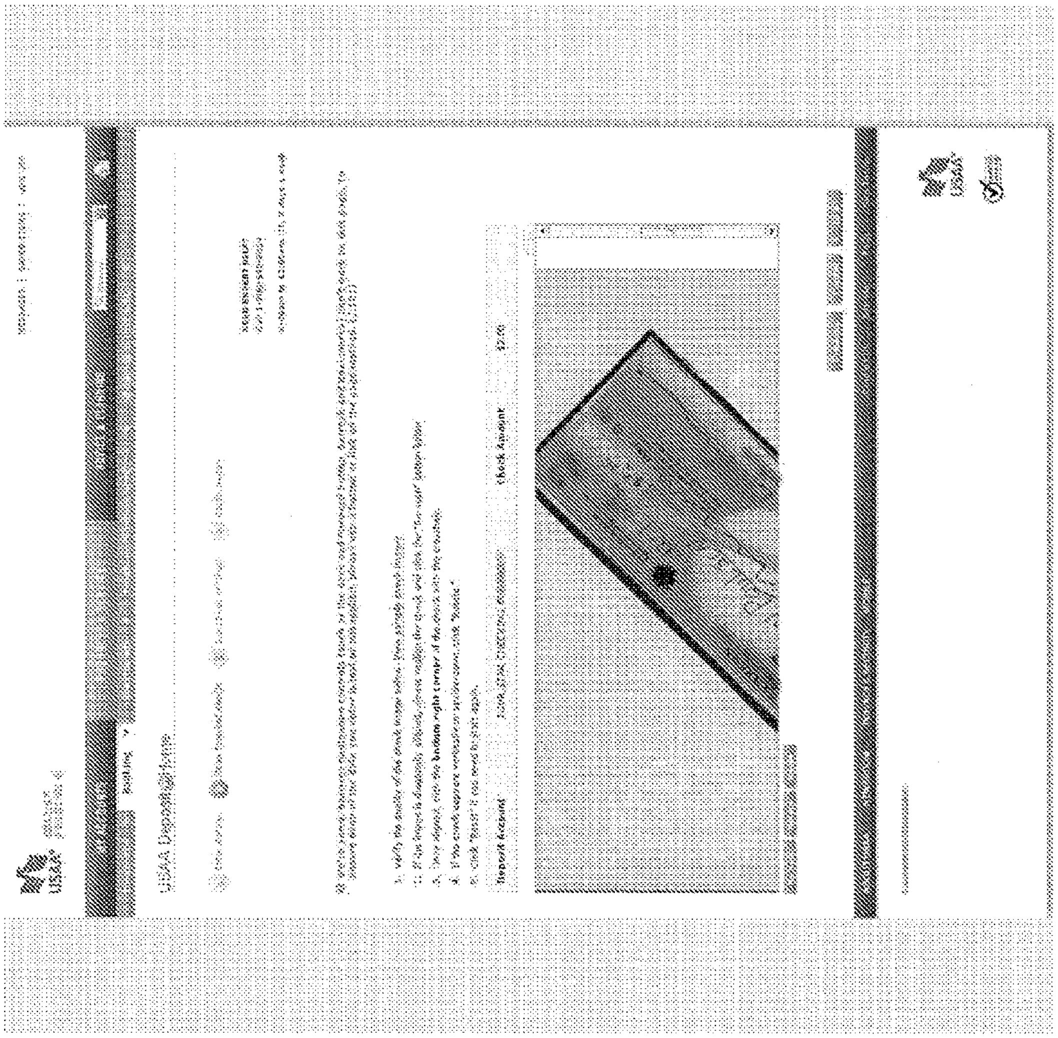
Figure 12I:
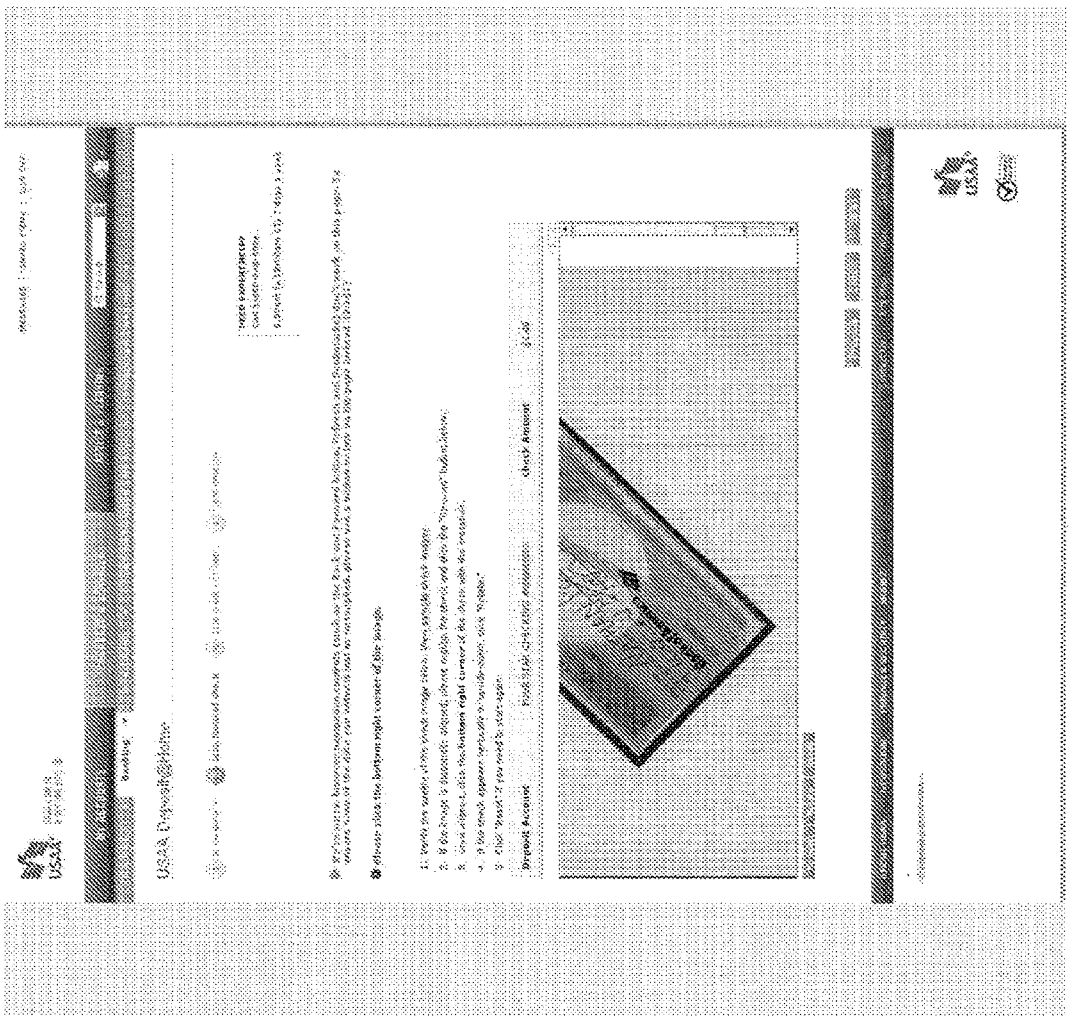
Figure 12J:
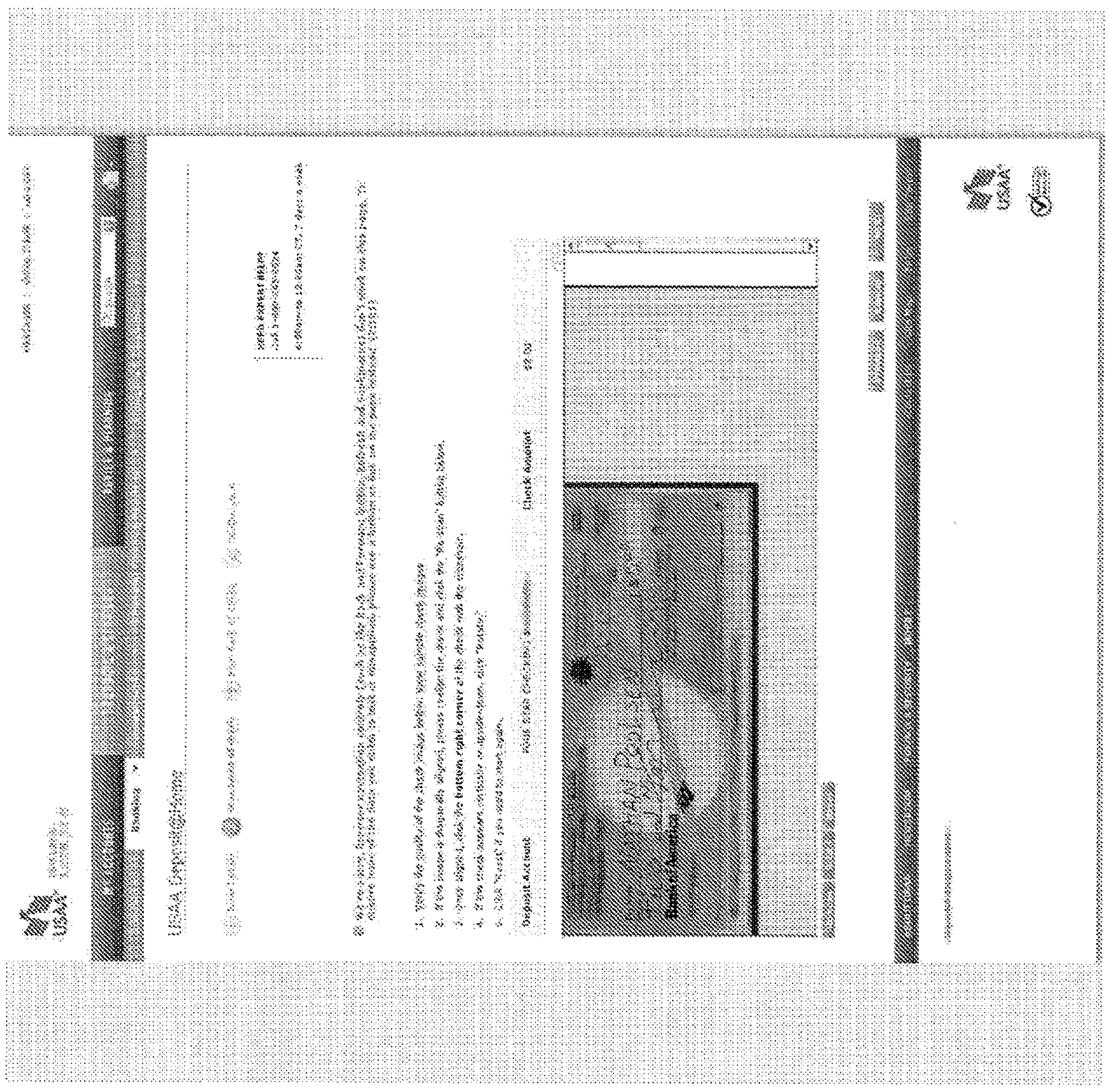
Figure 12K:
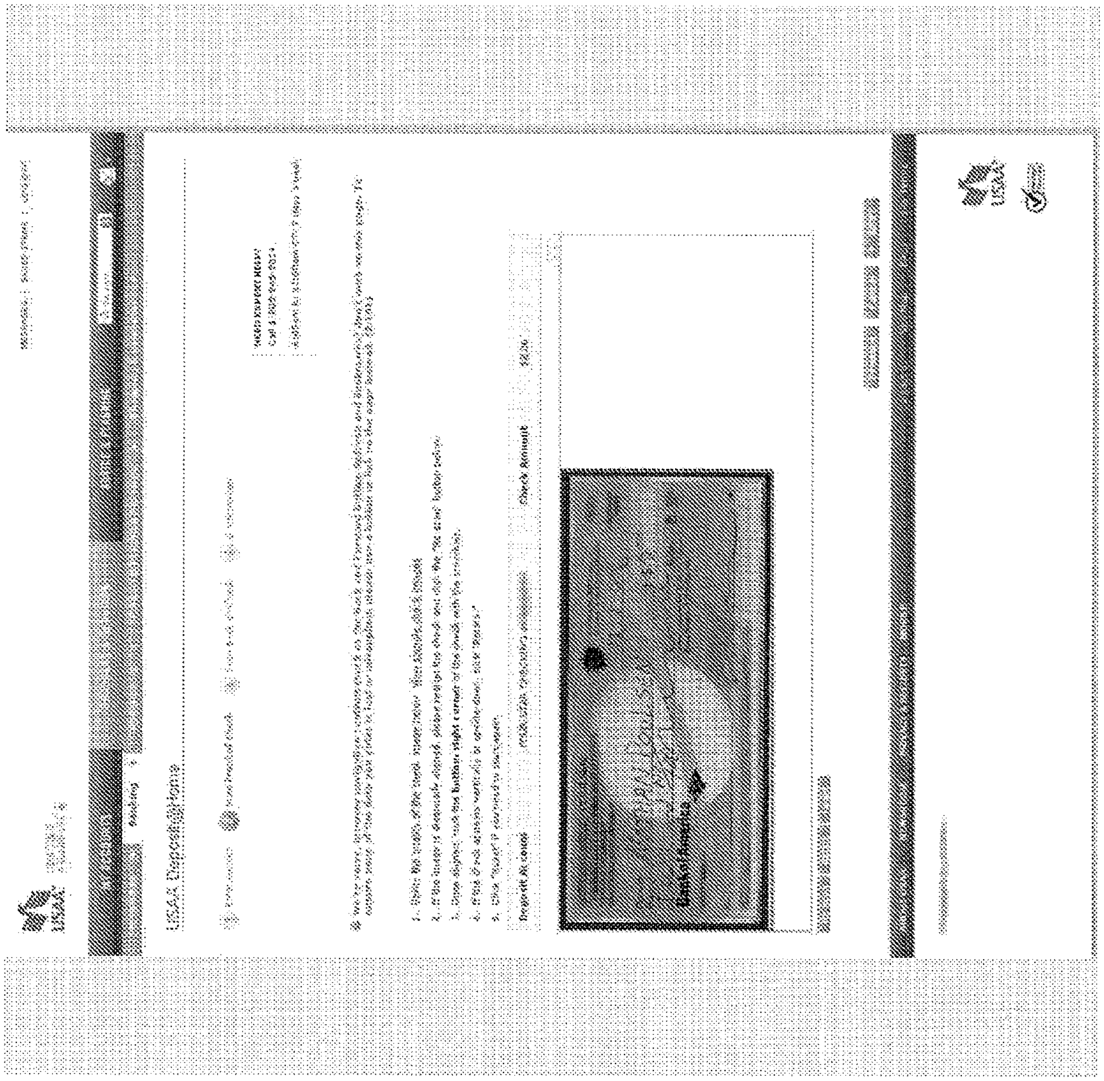
Figure 12L:
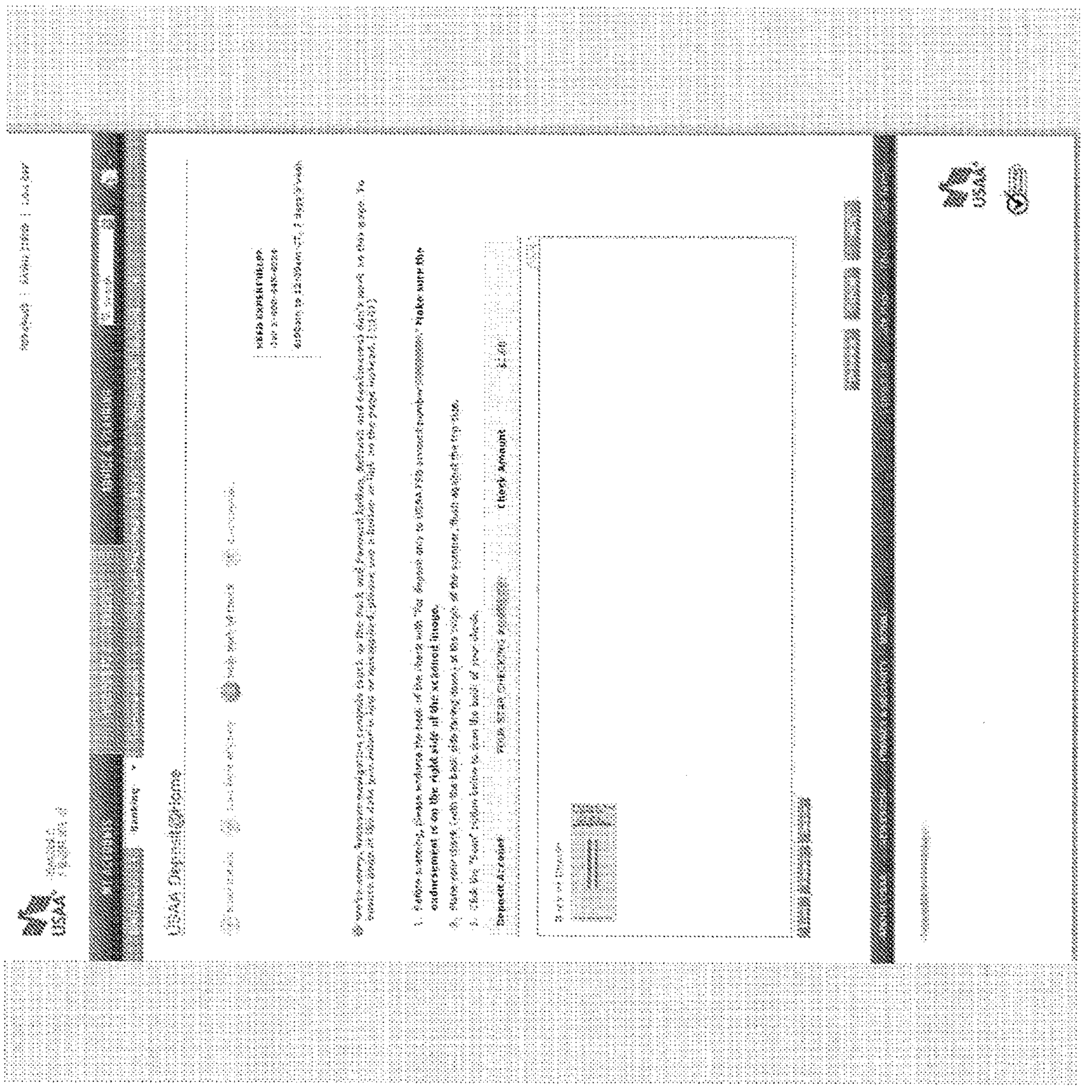
Figure 12M:
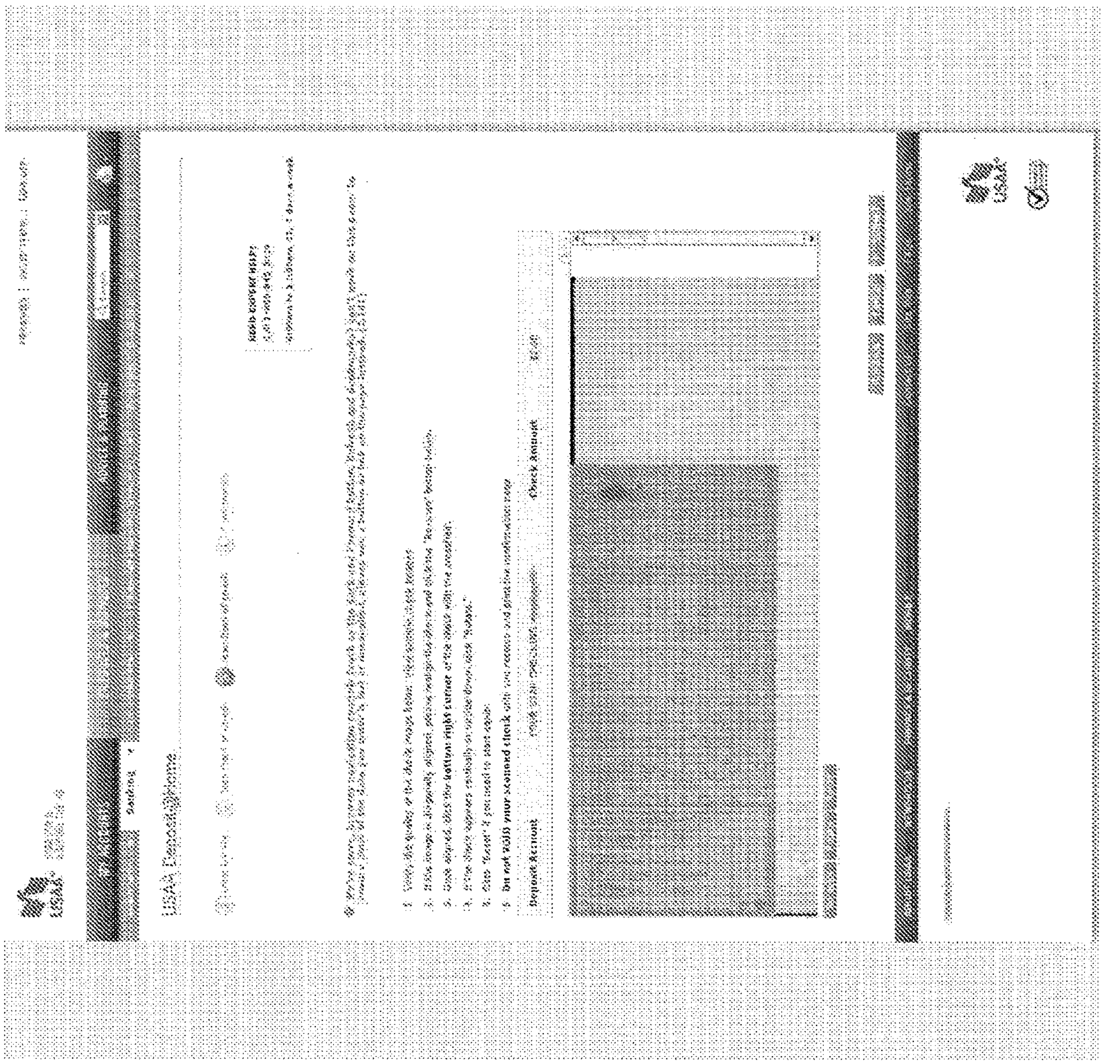
Figure 12N:
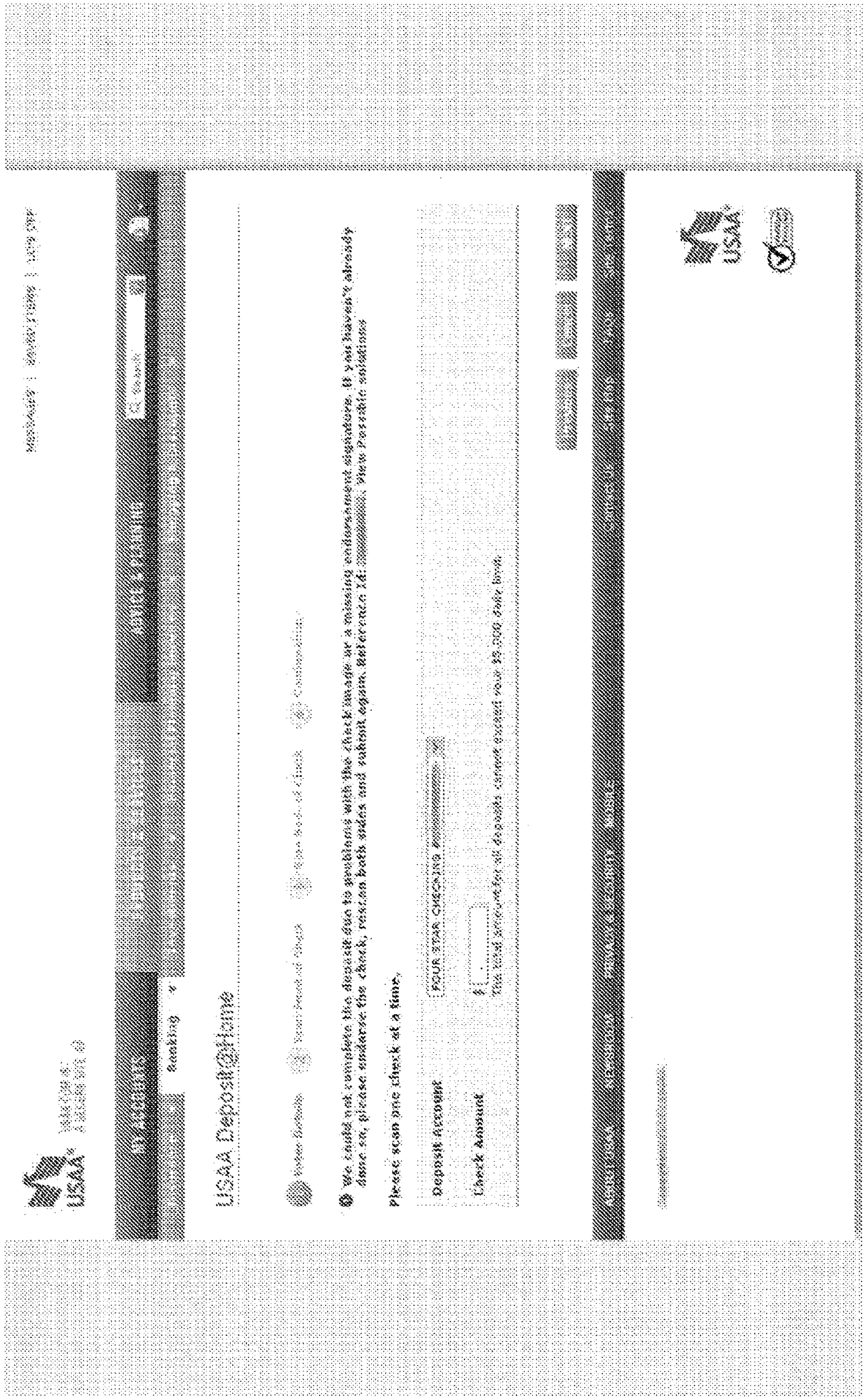
Figure 12O:
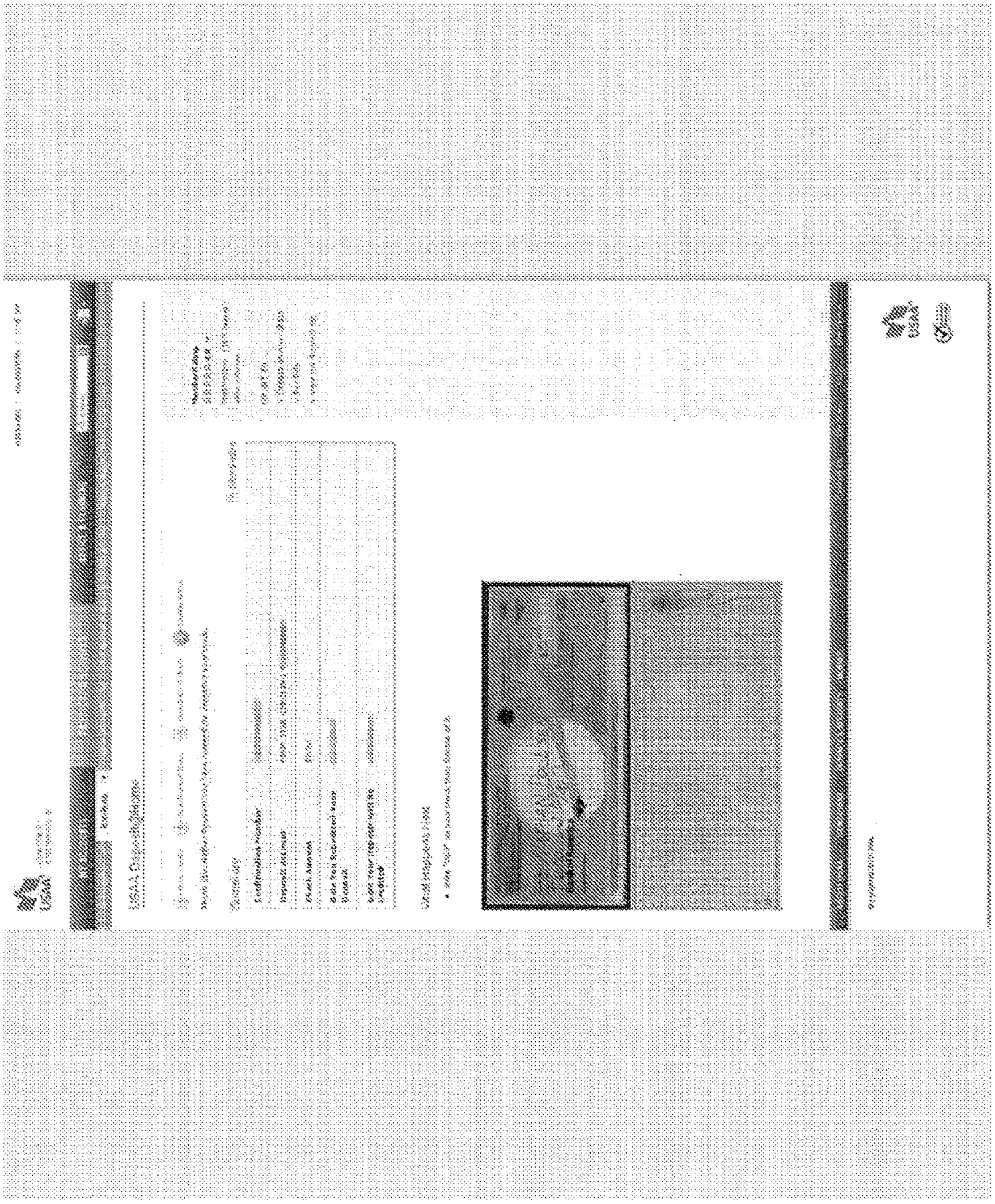

FIGS. 12A-O provide example screen shots of user interfaces illustrating aspects of remote deposit via a website within one embodiment of the RDC-Detection. In one embodiment, a user may access a RDC-Detection website at a personal computer 1201, and the RDC-Detection may provide a user interface for user certification 1202. For example, a user has to review and agree with terms and conditions of RDC-Detection in order to proceed with remote deposit.

In one embodiment, the RDC-Detection may prompt the user to login with an online ID and password 1204. Upon successful login, the RDC-Detection may provide deposit account information to the user, and allow the user to input a deposit amount 1205. In one embodiment, the RDC-Detection may provide details for the user on digital signature verification of the website 1208, and instruct the user to scan a paper check 1210. In one implementation, the RDC-Detection may remotely control a scanner connected to the personal computer of the user, and let the user choose the scanner from a drop-down list 1212.

In one embodiment, the RDC-Detection may then instruct the user to place the paper check in the scanner bed. If the paper check is not properly positioned as shown, the RDC-Detection may display an incomplete, skewed or improperly positioned check image to the user 1215 and 1218 such that the user may choose to rescan. In one implementation, if the user has properly positioned the paper check in a rectangle area as instructed via the RDC-Detection interface 1220, the RDC-Detection may request the user to select a bottom right corner of the scanned check image and then detect an area of the image of the check from its background 1222. In one embodiment, the RDC-Detection system may instruct the user to endorse the check and scan the back side of the check 1225. If the RDC-Detection system detects that the check is not endorsed 1228, the image may be denied and an error message may be displayed 1230.

In one embodiment, if both sides of the check have been successfully scanned and the RDC-Detection system verifies the uploaded images, the RDC-Detection may deposit the funds into the user account and provide deposit details to the user including the scanned check images. In one implementation, the RDC-Detection system may instruct the user to void and dispose the deposited paper check 1235.

In one embodiment, an image of ripped check may be submitted to verify the check has been voided in a similar manner as shown in FIG. 11H.

RDC-Detection Controller

Figure 13:
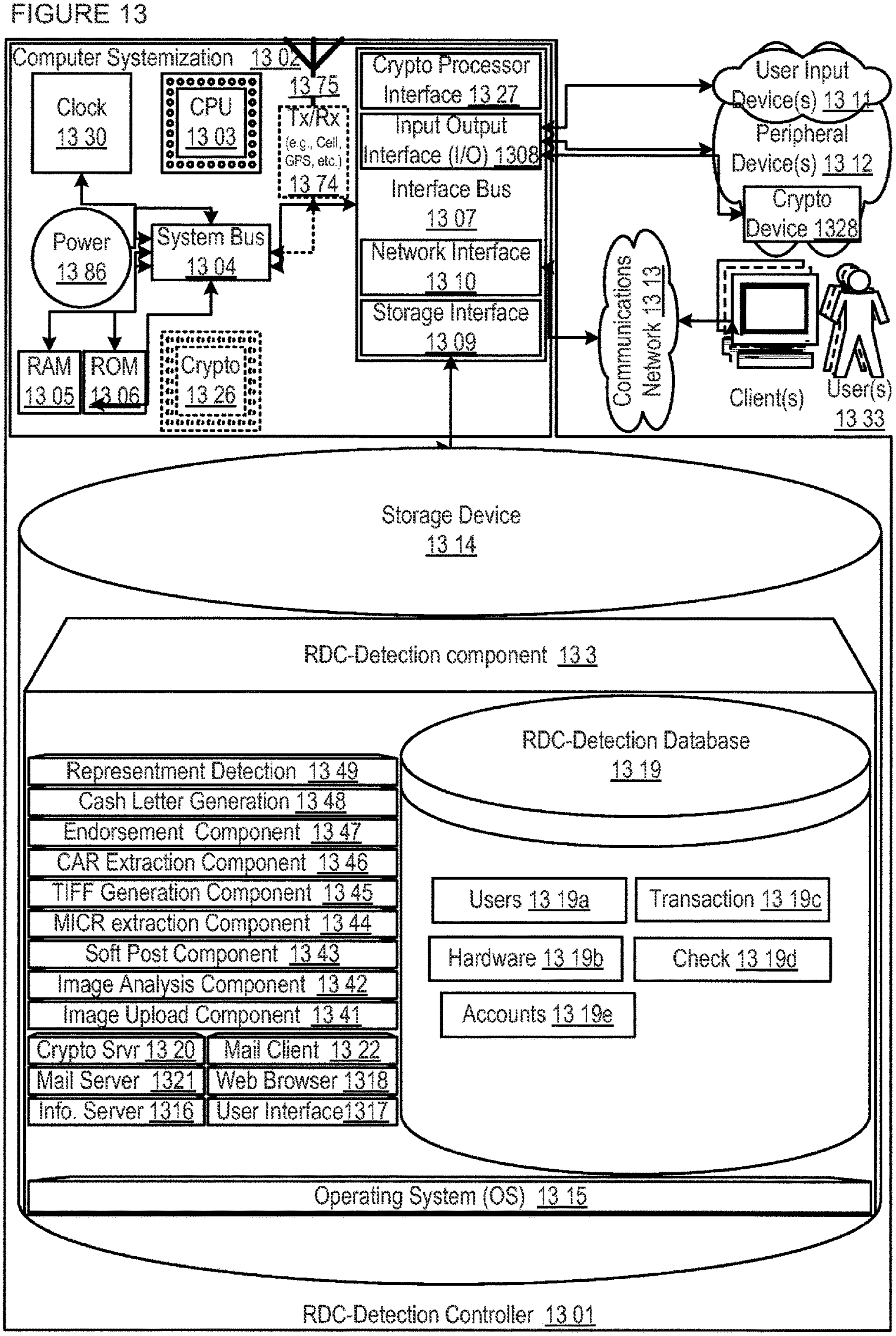
FIG. 13 is of a block diagram illustrating embodiments of the RDC-Detection controller.

FIG. 13 shows a block diagram illustrating embodiments of a RDC-Detection controller. In this embodiment, the RDC-Detection controller 1301 may serve to aggregate, process, store, search, serve, identify, instruct, generate, match, and/or facilitate interactions with a computer through secured data transmission and image analysis technologies, and/or other related data technologies, and/or other related data.

Typically, users, which may be people and/or other systems, may engage information technology systems (e.g., computers) to facilitate information processing. In turn, computers employ processors to process information; such processors 1303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the RDC-Detection controller 1301 may be connected to and/or communicate with entities such as, but not limited to: one or more users from user input devices 1311; peripheral devices 1312; an optional cryptographic processor device 1328; and/or a communications network 1313.

Networks are commonly thought to comprise the interconnection and interoperation of clients, servers, and intermediary nodes in a graph topology. It should be noted that the term “server” as used throughout this application refers generally to a computer, other device, program, or combination thereof that processes and responds to the requests of remote users across a communications network. Servers serve their information to requesting “clients.” The term “client” as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a “node.” Networks are generally thought to facilitate the transfer of information from source points to destinations. A node specifically tasked with furthering the passage of information from a source to a destination is commonly called a “router.” There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The RDC-Detection controller 1301 may be based on computer systems that may comprise, but are not limited to, components such as: a computer systemization 1302 connected to memory 1329.

Computer Systemization

A computer systemization 1302 may comprise a clock 1330, central processing unit (“CPU(s)” and/or “processor(s)” (these terms are used interchangeable throughout the disclosure unless noted to the contrary)) 1303, a memory 1329 (e.g., a read only memory (ROM) 1306, a random access memory (RAM) 1305, etc.), and/or an interface bus 1307, and most frequently, although not necessarily, are all interconnected and/or communicating through a system bus 1304 on one or more (mother)board(s) 1302 having conductive and/or otherwise transportive circuit pathways through which instructions (e.g., binary encoded signals) may travel to effectuate communications, operations, storage, etc. The computer systemization may be connected to a power source 1386; e.g., optionally the power source may be internal. Optionally, a cryptographic processor 1326 and/or transceivers (e.g., ICs) 1374 may be connected to the system bus. In another embodiment, the cryptographic processor and/or transceivers may be connected as either internal and/or external peripheral devices 1312 via the interface bus I/O. In turn, the transceivers may be connected to antenna(s) 1375, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing RDC-Detection controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization’s circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the RDC-Detection controller and beyond through various interfaces. Should processing requirements dictate a greater amount speed and/or capacity, distributed processors (e.g., Distributed RDC-Detection), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the RDC-Detection may be achieved by implementing a microcontroller such as CAST's R8051XC2 microcontroller; Intel's MCS 51 (i.e., 8051 microcontroller); and/or the like. Also, to implement certain features of the RDC-Detection, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the RDC-Detection component collection (distributed or otherwise) and/or features may be implemented via the microprocessor and/or via embedded components; e.g., via ASIC, coprocessor, DSP, FPGA, and/or the like. Alternately, some implementations of the RDC-Detection may be implemented with embedded components that are configured and used to achieve a variety of features or signal processing.

Depending on the particular implementation, the embedded components may include software solutions, hardware solutions, and/or some combination of both hardware/software solutions. For example, RDC-Detection features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the RDC-Detection features. A hierarchy of programmable interconnects allow logic blocks to be interconnected as needed by the RDC-Detection system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the RDC-Detection may be developed on regular FPGAs and then migrated into a fixed version that more resembles ASIC implementations. Alternate or coordinating implementations may migrate RDC-Detection controller features to a final ASIC instead of or in addition to FPGAs. Depending on the implementation all of the aforementioned embedded components and microprocessors may be considered the "CPU" and/or "processor" for the RDC-Detection.

Power Source

The power source 1386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1386 is connected to at least one of the interconnected subsequent components of the RDC-Detection thereby providing an electric current to all subsequent components. In one example, the power source 1386 is connected to the system bus component 1304. In an alternative embodiment, an outside power source 1386 is provided through a connection across the I/O 1308 interface. For example, a USB and/or IEEE 1394 connection carries both data and power across the connection and is therefore a suitable source of power.

Interface Adapters

Interface bus(ses) 1307 may accept, connect, and/or communicate to a number of interface adapters, conventionally although not necessarily in the form of adapter cards, such as but not limited to: input output interfaces (I/O) 1308, storage interfaces 1309, network interfaces 1310, and/or the like. Optionally, cryptographic processor interfaces 1327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1309 may accept, communicate, and/or connect to a number of storage devices such as, but not limited to: storage devices 1314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1310 may accept, communicate, and/or connect to a communications network 1313. Through a communications network 1313, the RDC-Detection controller is accessible through remote clients 1333*b* (e.g., computers with web browsers) by users 1333*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed RDC-Detection), architectures may similarly be employed to pool, load balance, and/or otherwise increase the communicative bandwidth required by the RDC-Detection controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1310 may be used to engage with various communications network types 1313. For example, multiple network interfaces may be employed to allow for the communication over broadcast, multicast, and/or unicast networks.

Input Output interfaces (I/O) 1308 may accept, communicate, and/or connect to user input devices 1311, peripheral devices 1312, cryptographic processor devices 1328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1311 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1312 may be connected and/or communicate to I/O and/or other facilities of the like such as network interfaces, storage interfaces, directly to the interface bus, system bus, the CPU, and/or the like. Peripheral devices may be external, internal and/or part of the RDC-Detection controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the RDC-Detection controller may be embodied as an embedded, dedicated, and/or monitor-less (i.e., headless) device, wherein access would be provided over a network interface connection.

Cryptographic units such as, but not limited to, microcontrollers, processors 1326, interfaces 1327, and/or devices 1328 may be attached, and/or communicate with the RDC-Detection controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1329. However, memory is a fungible technology and resource, thus, any number of memory embodiments may be employed in lieu of or in concert with one another. It is to be understood that the RDC-Detection controller and/or a computer systemization may employ various forms of memory 1329. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1329 will include ROM 1306, RAM 1305, and a storage device 1314. A storage device 1314 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1329 may contain a collection of program and/or database components and/or data such as, but not limited to: operating system component(s) 1315 (operating system); information server component(s) 1316 (information server); user interface component(s) 1317 (user interface); Web browser component(s) 1318 (Web browser); database(s) 1319; mail server component(s) 1321; mail client component(s) 1322; cryptographic server component(s) 1320 (cryptographic server); the RDC-Detection component(s) 1335; and/or the like (i.e., collectively a component collection). These components may be stored and accessed from the storage devices and/or from storage devices accessible through an interface bus. Although non-conventional program components such as those in the component collection, typically, are stored in a local storage device 1314, they may also be loaded and/or stored in memory such as: peripheral devices, RAM, remote storage facilities through a communications network, ROM, various forms of memory, and/or the like.

Operating System

The operating system component 1315 is an executable program component facilitating the operation of the RDC-Detection controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the RDC-Detection controller to communicate with other entities through a communications network 1313. Various communication protocols may be used by the RDC-Detection controller as a subcarrier transport mechanism for interaction, such as, but not limited to: multicast, TCP/IP, UDP, unicast, and/or the like.

Information Server

An information server component 1316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the RDC-Detection controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the RDC-Detection database 1319, operating systems, other program components, user interfaces, Web browsers, and/or the like.

Access to the RDC-Detection database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the RDC-Detection. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the RDC-Detection as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the RDC-Detection enabled nodes. The combined application may be nugatory on systems employing standard Web browsers.

Mail Server

A mail server component 1321 is a stored program component that is executed by a CPU 1303. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the RDC-Detection.

Access to the RDC-Detection mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1322 is a stored program component that is executed by a CPU 1303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1320 is a stored program component that is executed by a CPU 1303, cryptographic processor 1326, cryptographic processor interface 1327, cryptographic processor device 1328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the RDC-Detection may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the RDC-Detection component to engage in secure transactions if so desired. The cryptographic component facilitates the secure accessing of resources on the RDC-Detection and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The RDC-Detection Database

The RDC-Detection database component 1319 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the RDC-Detection database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the RDC-Detection database is implemented as a data-structure, the use of the RDC-Detection database 1319 may be integrated into another component such as the RDC-Detection component 1335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1319 includes several tables 1319*a-e*. A users table 1319*a* includes fields such as, but not limited to: a user_ID, user_name, user_password, user_bank_ID, account_ID, transaction_ID, user_accountNo, user_transaction, user_hardware, and/or the like. The user table may support and/or track multiple entity accounts on a RDC-Detection. A hardware table 1019*b* includes fields such as, but not limited to: hardware_ID, hardware_type, hardware_name, data_formatting_requirements, bank_ID, protocols, addressing_info, usage_history, hardware_requirements, user_ID, and/or the like. A transaction table 1019*c* includes fields such as, but not limited to transaction_ID, transaction_time, transaction_account, transaction_payee, transaction_bank, transaction_payer, transaction_status, transaction_clearance, and/or the like. A check table 1019*d* includes fields such as check_ID, account_ID, transaction_ID, image_timestamp, image_MICR, image_status, image_user, image_device, image_account and/or the like. An accounts table 1019*e* includes fields such as, but not limited to account_ID, user_ID, bank_ID, account_number, routing_number, account_type, account_amount, account_limit, and/or the like.

In one embodiment, the RDC-Detection database may interact with other database systems. For example, employing a distributed database system, queries and data access by search RDC-Detection component may treat the combination of the RDC-Detection database, an integrated data security layer database as a single database entity.

In one embodiment, user programs may contain various user interface primitives, which may serve to update the RDC-Detection. Also, various accounts may require custom database tables depending upon the environments and the types of clients the RDC-Detection may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1319*a-e*. The RDC-Detection may be configured to keep track of various settings, inputs, and parameters via database controllers.

The RDC-Detection database may communicate to and/or with other components in a component collection, including itself, and/or facilities of the like. Most frequently, the RDC-Detection database communicates with the RDC-Detection component, other program components, and/or the like. The database may contain, retain, and provide information regarding other nodes and data.

The RDC-Detections

The RDC-Detection component 1335 is a stored program component that is executed by a CPU. In one embodiment, the RDC-Detection component incorporates any and/or all combinations of the aspects of the RDC-Detection that was discussed in the previous figures. As such, the RDC-Detection affects accessing, obtaining and the provision of information, services, transactions, and/or the like across various communications networks.

The RDC-Detection transforms uploaded check images and check deposit information inputs via RDC-Detection components image upload component 1341, image analysis component 1342, MICR extraction component 1344, TIFF generation component 1345, CAR Extraction component 1346, cash letter generation component 1348, soft post component 1343, endorsement detection component 1347 and, representment detection component 1349 into deposit confirmation outputs.

The RDC-Detection component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the RDC-Detection server employs a cryptographic server to encrypt and decrypt communications. The RDC-Detection component may communicate to and/or with other components in a component collection, including itself, and/or facilities of the like. Most frequently, the RDC-Detection component communicates with the RDC-Detection database, operating systems, other program components, and/or the like. The RDC-Detection may contain, communicate, generate, obtain, and/or provide program component, system, user, and/or data communications, requests, and/or responses.

Distributed RDC-Detections

The structure and/or operation of any of the RDC-Detection node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the RDC-Detection controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the RDC-Detection controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket listen($sock);
$client=socket_accept($sock);
// read input data from client device in 1024 byte blocks until end of message
do {
    $input=" ";
    $input=socket_read($client, 1024);
    $data.=$input;
} while($input
// parse data to extract variables
$obj=json decode($data, true);
// store input data in a database
mysql_connect("201.408.185.132",$DBserver,$password); // access database server
mysql_select("CLIENT DB.SQL"); // select database to append
mysql_query("INSERT INTO UserTable (transmission)
VALUES ($data)"); // add data to UserTable table in a CLIENT database
mysql_close("CLIENT DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments of the RDC-Detection may comprise the following:

1 A processor-implemented financial instrument image enhancement method for remote deposit, comprising:

receiving a request to remotely deposit a financial instrument from a depositor device;

establishing a secure communications channel to the depositor device;

providing a remote deposit component to the depositor device via the secure communications channel;

receiving an image of a financial instrument from a depositor device via the secure communications channel;

detecting four corners of the image of the financial instrument;

dewarping the image of the financial instrument based on the detected corners;

extracting deposit information from the dewarped image of the negotiable instrument; and deposit funds of the negotiable instrument based on the extracted deposit information.

2 The method of claim 1, further comprising:

determining whether the obtained image satisfies usability and quality requirements, wherein the usability and quality requirements comprise a resolution requirement and an image format requirement.

3 The method of claim 1, wherein providing a remote deposit component to the depositor device comprises:

providing an image capture component to a depositor's device, wherein the depositor's device is disposed in communication with an image capture device, wherein the image capture component is configured to:

control the image capture device, establish a secure communications channel between the image capture device and a receiving institution using depositor identifying information, allow the depositor to capture an image of a financial instrument, and send the image of the financial instrument across a secure communications channel.

4. The method of claim 3, further comprising:

determining if the image capture device is controllable by the remote deposit component;

if the image capture device is not controllable by the remote deposit component, instructing the depositor via a user interface to:

obtain and save at least one image of the financial instrument from the image capture device via a user interface, and send the image to the financial institution; and if the image capture device is controllable by the remote deposit component, controlling the image capture device to capture an image of the financial instrument.

5 The method of claim 3, wherein the image capture device may be any of a scanner, a digital camera, a video camera, a facsimile machine, and a mobile device with built-in camera.

6 The method of claim 1, further comprising:

determining whether the obtained image satisfies usability and quality requirements, wherein the usability and quality requirements comprise a resolution requirement and an image format requirement.

7 The method of claim 6, further comprising:

compressing the received image file if a size of the image file exceeds an image size limit.

8 The method of claim 7, wherein the image size limit is two megabytes.

9 The method of claim 1, further comprising:

converting via a processor the image of the financial instrument to a grayscale image if the obtained image of the financial instrument is a color image.

10 The method of claim 1, wherein detecting four corners of the grayscale image of the financial instrument comprises:

generating an enhanced black-white image of the financial instrument;

determining likelihood of corner reflection of each corner of the enhanced black-white image of the financial instrument;

determining at least one corner; and determining another corner with reflection by symmetric projection based on the determined corner.

11 The method of claim 10, wherein generating an enhanced black-white image of the financial instrument comprises:

determining a number of sub-images of the image of the financial instrument;

generating a histogram for each determined sub-image;

determining a grayscale threshold value for the generated histogram for each sub-image;

converting each determined sub-image into a black-white only image based on the determined grayscale threshold value associated with each sub-image; and applying a convolution filter matrix to each black-white sub-image.

12 The method of claim 11, wherein the determined grayscale threshold for each sub-image is a minimum fuzziness threshold.

13 The method of claim 11, wherein the determined grayscale threshold for a sub-image is based at least in part on statistical analysis of the histogram for the sub-image.

14 The method of claim 11, wherein the convolution filter matrix is an edge-enhancing convolution filter matrix.

15 The method of claim 10, wherein determining likelihood of corner reflection of each corner of the enhanced black-white image of the financial instrument comprises:

dividing the enhanced black-white image into four quadrants;

calculating a reflection score for each corner associated with each quadrant; and determining whether a corner associated with a quadrant has a tolerable reflection level by comparing the reflection score associated with the corner with a predetermined reflection threshold.

16 The method of claim 15, wherein calculating a reflection score for each corner associated with each quadrant comprises:

generating a histogram for each quadrant;

determining grayscale bin values N1 and N2 based on a predetermined bin count limit;

determining a minimum bin count vale M and an average bin count value AVG within a grayscale bin value range N1+1 to N2−1; and calculating the reflection score based on reflection score=(AVG−M)/(AVG+M).

17 The method of claim 10, wherein determining the at least one corner comprises performing a detection algorithm, wherein the detection algorithm may be any of Moravec corner detection algorithm, multi-scale Harris operator, Shi and Tomasi corner detection algorithm, level curve curvature approach, LoG, DoG, and DoH feature detection, Wang and Brady corner detection algorithm, SUSAN corner detector, Trajkovic and Hedley corner detector, FAST feature detector, automatic synthesis of point detectors with Genetic Programming, and affine-adapted interest point operators.

18 The method of claim 10, wherein determining a corner with reflection by symmetric projection based on the determined corner comprises:

determining whether the determined corner is sufficient to project all four corners; and if not, determining a corner with the lowest reflection by performing a corner detection procedure.

19 The method of claim 1, wherein dewarping the grayscale image of the financial instrument based on the detected corners comprises:

determining whether an edge of the image of the financial instrument is skewed; and performing dewarping techniques to the edge if the edge is skewed.

20 The method of claim 19, wherein the dewarping techniques includes spatial transformation.

21 The method of claim 1, wherein extracting deposit information from the dewarped image of the negotiable instrument includes:

performing an optical character recognition procedure on the dewarped image of the financial instrument.

22 The method of claim 1, further comprising:

analyzing metadata associated with the received image of the financial instrument.

23 The method of claim 22, wherein the metadata comprises: GPS information of the depositor device, a timestamp of the image capturing and characteristics of the depositor device.

24 The method of claim 1, further comprising:

receiving video streaming from the depositor device across the secure communications channel.

25 The method of claim 24, further comprising:

generating frame grab images of the financial instrument from the video streaming.

26 A financial instrument image enhancement system for remote deposit, comprising:

means for receiving a request to remotely deposit a financial instrument from a depositor device;

means for establishing a secure communications channel to the depositor device;

means for providing a remote deposit component to the depositor device via the secure communications channel;

means for receiving an image of a financial instrument from a depositor device via the secure communications channel;

means for detecting four corners of the image of the financial instrument;

means for dewarping the image of the financial instrument based on the detected corners;

means for extracting deposit information from the dewarped image of the negotiable instrument; and means for deposit funds of the negotiable instrument based on the extracted deposit information.

27 A financial instrument image enhancement apparatus for remote deposit, comprising:

a memory;

a processor disposed in communication with said memory, and configured to issue a plurality of processing instructions stored in the memory, wherein the processor issues instructions to:

receive a request to remotely deposit a financial instrument from a depositor device;

establish a secure communications channel to the depositor device;

provide a remote deposit component to the depositor device via the secure communications channel;

receive an image of a financial instrument from a depositor device via the secure communications channel;

detect four corners of the image of the financial instrument;

dewarp the image of the financial instrument based on the detected corners;

extract deposit information from the dewarped image of the negotiable instrument; and deposit funds of the negotiable instrument based on the extracted deposit information.

28 A financial instrument image enhancement processor-readable medium for remote deposit, storing a plurality of processing instructions, comprising issuable instructions by a processor to:

receive a request to remotely deposit a financial instrument from a depositor device;

establish a secure communications channel to the depositor device;

provide a remote deposit component to the depositor device via the secure communications channel;

receive an image of a financial instrument from a depositor device via the secure communications channel;

detect four corners of the image of the financial instrument;

dewarp the image of the financial instrument based on the detected corners;

extract deposit information from the dewarped image of the negotiable instrument; and deposit funds of the negotiable instrument based on the extracted deposit information.

1 A processor-implemented financial instrument deposit method for remote deposit, comprising:

receiving a request to remotely deposit a financial instrument from a depositor device communicatively coupled to an image capture component;

verifying the depositor device is qualified for remote deposit service;

receiving a multimedia message comprising an image of the financial instrument from the depositor device;

processing the image of the financial instrument to extract deposit information; and depositing funds of the financial instrument based on the extracted deposit information.

2. The method of claim 1, wherein the request to remotely deposit the financial instrument is sent together with the multimedia message.

3. The method of claim 1, wherein the request to remotely deposit the financial instrument is sent via a text message.

4. The method of claim 1, wherein the remote deposit service is associated with a multimedia messaging number.

5. The method of claim 1, wherein the depositor device is a networking device.

6. The method of claim 5, wherein the verification of the depositor device comprises verifying whether the associated number of the cellular phone is registered fro the remote deposit service.

7. The method of claim 1, further comprising sending a text message including an identification pin number to the depositor device.

8. The method of claim 7, wherein the verification of the depositor device comprises verifying whether the received multimedia message comprises the identification pin number.

9. The method of claim 1, wherein the multimedia message comprises an image of the front side of the financial instrument and an image of the back side of the financial instrument.

10. The method of claim 1, wherein the multimedia message comprises user entered deposit information.

11. The method of claim 1, further comprising:

determining whether the obtained image satisfies usability and quality requirements, wherein the usability and quality requirements comprise a resolution requirement and an image format requirement.

12. The method of claim 1, wherein the image of the financial instrument is captured by the depositor device.

13. The method of claim 12, wherein the captured image of the financial instrument is converted to a gray-scale format by the depositor device.

14. The method of claim 1, further comprising sending a deposit status message to the depositor device.

15. The method of claim 1, further comprising deskewing, dewarping and cropping the image of the financial instrument.

16. The method of claim 15, further comprising performing OCR/ICR on the cropped image of the financial instrument to extract deposit information.

17. The method of claim 16, further comprising generating an image cash latter based on the cropped image of the financial instrument and the extracted deposit information.

18. A financial instrument deposit processor-readable medium storing a plurality of processing instructions, comprising issuable instructions by a processor to:

receive a request to remotely deposit a financial instrument from a depositor device;

verify the depositor device is qualified for remote deposit service;

receive a multimedia message comprising an image of the financial instrument from the depositor device;

process the image of the financial instrument to extract deposit information; and deposit funds of the financial instrument based on the extracted deposit information.

19. A financial instrument deposit apparatus, comprising:

a memory;

a processor disposed in communication with said memory, and configured to issue a plurality of processing instructions stored in the memory, wherein the processor issues instructions to:

receive a request to remotely deposit a financial instrument from a depositor device;

verify the depositor device is qualified for remote deposit service;

receive a multimedia message comprising an image of the financial instrument from the depositor device;

process the image of the financial instrument to extract deposit information; and deposit funds of the financial instrument based on the extracted deposit information.

20. A financial instrument deposit system, comprising:

means to receive a request to remotely deposit a financial instrument from a depositor device;

means to verify the depositor device is qualified for remote deposit service;

means to receive a multimedia message comprising an image of the financial instrument from the depositor device;

means to process the image of the financial instrument to extract deposit information; and means to deposit funds of the financial instrument based on the extracted deposit information.

1. A processor-implemented financial instrument deposit method, comprising:

receiving a request to remotely deposit a financial instrument from a depositor device communicatively coupled to an image capture component;

delivering a remote deposit processing component for instantiation on the depositor device;

obtaining depositor identification information from the remote deposit processing component;

instructing, via the remote deposit processing component, a depositor to hold the financial instrument in front of the image capture component;

receiving a snap capture image of the financial instrument from the remote deposit processing component;

processing the snap capture image of the financial instrument to extract deposit information; and depositing funds of the financial instrument based on the extracted deposit information.

2. The method of claim 1, wherein the depositor device includes one of a personal computer and a mobile phone.

3. The method of claim 1, wherein the image capture device is one of a camera, a web camera and a built-in camera associated with a mobile phone.

4. The method of claim 1, wherein the remote deposit processing component provides an area indicating the user to place the financial instrument via a user interface.

5. The method of claim 1, wherein the remote deposit application captures a plurality of consecutive captures of the financial instrument.

6. The method of claim 5, wherein the remote deposit application captures a snap image of the financial instrument periodically for a pre-determined time interval.

7. The method of claim 1, further comprising: receiving streaming video of the financial instrument from the user depositor device; and generating frames of images of the financial instrument from the received streaming video.

8. The method of claim 1, further comprising: determining whether the received snap capture image of the financial instrument is usable.

9. The method of claim 8, wherein the determination comprises inspecting whether the resolution and file format of the snap capture image satisfy usability requirements.

10. The method of claim 8, further comprising:

performing an OCR on the snap capture image to determine whether texts on the image are legible.

11. The method of claim 1, further comprising:

obtaining a plurality of snap capture images of the financial instruments; and selecting an optimal snap capture image from the plurality of snap capture images.

12. The method of claim 11, wherein the selection is based at least in part on the skewness, distortion, corner reflection score, image quality, blurriness, and resolution of the snap capture image.

13. The method of claim 1, further comprising requesting a depositor to destroy the financial instrument upon successful deposit.

14. The method of claim 13, further comprising instructing the depositor to tear the financial instrument to the image capture device.

15. The method of claim 14, further comprising receiving snap capture images of tearing the financial instrument from the remote deposit processing component.

16. The method of claim 1, wherein the depositor identification information comprises facial recognition information.

17. The method of claim 16, further comprising:

instructing a depositor to pose to the image capture device; and receiving snap pictures of the depositor from the remote deposit processing component.

18. A financial instrument deposit processor-readable medium storing a plurality of processing instructions, comprising issuable instructions by a processor to:

receive a request to remotely deposit a financial instrument from a depositor device communicatively coupled to an image capture component;

deliver a remote deposit processing component for instantiation on the depositor device;

obtain depositor identification information from the remote deposit processing component;

instruct, via the remote deposit processing component, a depositor to hold the financial instrument in front of the image capture component;

receive a snap capture image of the financial instrument from the remote deposit processing component;

process the snap capture image of the financial instrument to extract deposit information; and deposit funds of the financial instrument based on the extracted deposit information.

19. A financial instrument deposit apparatus, comprising:

a memory;

a processor disposed in communication with said memory, and configured to issue a plurality of processing instructions stored in the memory, wherein the processor issues instructions to:

receive a request to remotely deposit a financial instrument from a depositor device communicatively coupled to an image capture component;

deliver a remote deposit processing component for instantiation on the depositor device;

obtain depositor identification information from the remote deposit processing component;

instruct, via the remote deposit processing component, a depositor to hold the financial instrument in front of the image capture component;

receive a snap capture image of the financial instrument from the remote deposit processing component;

process the snap capture image of the financial instrument to extract deposit information; and deposit funds of the financial instrument based on the extracted deposit information.

20. A financial instrument deposit system, comprising:

means to receive a request to remotely deposit a financial instrument from a depositor device communicatively coupled to an image capture component;

means to deliver a remote deposit processing component for instantiation on the depositor device;

means to obtain depositor identification information from the remote deposit processing component;

means to instruct, via the remote deposit processing component, a depositor to hold the financial instrument in front of the image capture component;

means to receive a snap capture image of the financial instrument from the remote deposit processing component;

means to process the snap capture image of the financial instrument to extract deposit information; and means to deposit funds of the financial instrument based on the extracted deposit information.

1. A processor-implemented financial instrument deposit method, comprising:

receiving a request to remotely deposit a financial instrument from a depositor device communicatively coupled to an image capture component;

delivering a remote deposit processing component for instantiation on the depositor device;

receiving an image visualizing the financial instrument held by a financial instrument holder, from the remote deposit processing component;

processing the snap capture image of the financial instrument to extract deposit information; and depositing funds of the financial instrument based on the extracted deposit information.

2. The method of claim 1, wherein the depositor device communicatively coupled to an image capture component is a smart phone with a built-in camera 3. The method of claim 1, wherein the financial instrument holder holds the financial instrument upright for image capturing.

4. The method of claim 1, wherein the financial instrument holder comprises a front side and two foldable flaps on left and right sides of the front side, wherein the foldable flaps are configured to hold the financial instrument holder stand upright.

5. The method of claim 4, wherein the front side of the financial instrument holder comprises a dark background color in contrast with the financial instrument.

6. The method of claim 1, wherein the received image comprises a visualization of information printed on the front side of the financial instrument holder.

7. The method of claim 6, wherein the information printed on the front side comprises a barcode.

8. The method of claim 7, wherein the barcode comprises embedded depositor account information.

9. The method of claim 7, wherein the barcode comprises embedded payee's bank information.

10. The method of claim 7, further comprising detecting a rectangular portion of the check on the received image.

11. The method of claim 10, further comprising performing OCR and ICR on the detected rectangular portion to obtain deposit information.

12. The method of claim 11, further comprising obtaining information embedded in the barcode by employing a barcode reader.

13. The method of claim 12, further comprising comparing the obtained information embedded in the barcode with the obtained deposit information from OCR to ensure consistency.

14. A financial instrument deposit system, comprising:

means for receiving a request to remotely deposit a financial instrument from a depositor device communicatively coupled to an image capture component;

means for delivering a remote deposit processing component for instantiation on the depositor device;

means for receiving an image visualizing the financial instrument held by a financial instrument holder, from the remote deposit processing component;

means for processing the snap capture image of the financial instrument to extract deposit information; and means for depositing funds of the financial instrument based on the extracted deposit information.

15. A financial instrument image capture apparatus, comprising:

a front surface;

a small flap extension at a bottom of the front surface, wherein the small flap extension is configured to form a notch between the front surface and the small flap extension, wherein a financial instrument is held in the notch;

a first foldable flap connected to the left of the front surface; and a second foldable flap connected to the right of the front surface, wherein the first and the second foldable flaps are configured to hold the front side upright.

16. The apparatus of claim 15, wherein the front surface comprises printed information.

17. The apparatus of claim 16, wherein the printed information comprises instructions guiding a depositor to download a remote deposit processing component and transmit an image of the financial instrument.

17. The apparatus of claim 16, wherein the printed information comprises a rectangular area guiding a depositor to place the financial instrument.

18. The apparatus of claim 15, wherein the front surface has a background color in contrast to the financial instrument.

19. The apparatus of claim 15, wherein the first and the second foldable flaps are configured to be foldable behind the front surface.

20. The apparatus of claim 15, wherein the front surface comprises a barcode with encoded deposit information.

1 A processor-implemented selective deposit method, comprising:

obtaining electronic data pertaining to depositing a financial instrument from a depositor device;

determining deposit information based on the obtained electronic data;

retrieving a depositor profile based on the determined deposit information;

obtaining deposit constraint information associated with the depositor profile;

determining whether the deposit information is compliant with the deposit constraint information associated with the depositor;

if not compliant, providing selective deposit options to the depositor device via a user interface, receiving a selection of deposit option from the depositor device via the user interface, and performing the selected deposit option; and if compliant, depositing funds of the financial instrument.

2 The method of claim 1, further comprising: providing a remote deposit component to the depositor device.

3 The method of claim 1, further comprising:

establishing a secure communications channel between the depositor device and a receiving institution via the remote deposit component, wherein establishment includes:

obtaining depositor identifying information, and verifying the depositor identifying information.

4 The method of claim 3, wherein the depositor identifying information comprises depositor submitted login information.

5 The method of claim 3, wherein the depositor identifying information comprises hardware identification of the depositor device.

6 The method of claim 1, wherein the obtained electronic data comprises a digital image of the financial instrument.

7 The method of claim 1, wherein the obtained electronic data comprises a depositor submitted deposit amount of the financial instrument.

8 The method of claim 1, wherein determining deposit information based on the obtained electronic data comprises:

performing optical character recognition procedure on a digital image of the financial instrument to extract deposit information.

9 The method of claim 1, wherein the determined deposit information comprises a payee's name, a payee's bank name, a payee's account number, a payee's bank routing number, a deposit amount.

10 The method of claim 1, further comprising verifying the determined deposit information with the retrieved depositor profile.

11 The method of claim 1, wherein the retrieved depositor profile comprises a depositor name, at least one depositor account, deposit history, and deposit constraint information.

12 The method of claim 1, further comprising:

providing a list of available deposit accounts from the depositor profile to the depositor device via a user interface; and receiving a selection from the list of available deposit accounts from the depositor device.

13 The method of claim 1, wherein the deposit constraint information is a maximum deposit value for immediate accessible funds.

14 The method of claim 13, wherein the maximum deposit value for immediate accessible funds may be any of a maximum deposit value for a single deposit, and a maximum deposit value for deposits made within a predetermined period of time.

15 The method of claim 1, wherein the deposit constraint information is a maximum number of deposits made within a predetermined period of time.

16 The method of claim 1, wherein the deposit constraint information is associated with a depositor account.

17 The method of claim 1, wherein the selective deposit options comprises:

depositing a maximum allowable amount for immediate access;

requesting to reduce the deposit constraint; and canceling the deposit.

18 The method of claim 17, wherein the option of requesting to reduce the deposit constraint comprises directing a depositor to communicate with a financial institution.

19 The method of claim 17, wherein the option of depositing a maximum allowable amount for immediate access comprises instructing a depositor to submit a physical financial instrument to a financial institution to complete the deposit.

20 The method of claim 17, further comprising:

if a selection of the option of depositing a maximum allowable amount for immediate access is received, depositing the maximum allowable amount for immediate access, and determining and storing a remaining amount associated with deposit information of the financial instrument.

21 The method of claim 20, further comprising:

verifying the remaining amount associated with deposit information of the financial instrument with a financial institution.

22 A selective deposit system, comprising:

means for obtaining electronic data pertaining to depositing a financial instrument from a depositor device;

means for determining deposit information based on the obtained electronic data;

means for retrieving a depositor profile based on the determined deposit information;

means for obtaining deposit constraint information associated with the depositor profile;

means for determining whether the deposit information is compliant with the deposit constraint information associated with the depositor;

means for if not compliant, providing selective deposit options to the depositor device via a user interface, receiving a selection of deposit option from the depositor device via the user interface, and performing the selected deposit option; and means for if compliant, depositing funds of the financial instrument.

23 A selective deposit apparatus, comprising:

a memory;

a processor disposed in communication with said memory, and configured to issue a plurality of processing instructions stored in the memory, wherein the processor issues instructions to:

obtain electronic data pertaining to depositing a financial instrument from a depositor device;

determine deposit information based on the obtained electronic data;

receive a depositor profile based on the determined deposit information;

obtain deposit constraint information associated with the depositor profile;

determine whether the deposit information is compliant with the deposit constraint information associated with the depositor;

if not compliant, provide selective deposit options to the depositor device via a user interface, receiving a selection of deposit option from the depositor device via the user interface, and performing the selected deposit option; and deposit funds of the financial instrument.

24. A selective deposit processor-readable medium storing a plurality of processing instructions, comprising issuable instructions by a processor to:

obtain electronic data pertaining to depositing a financial instrument from a depositor device;

determine deposit information based on the obtained electronic data;

receive a depositor profile based on the determined deposit information;

obtain deposit constraint information associated with the depositor profile;

determine whether the deposit information is compliant with the deposit constraint information associated with the depositor;

if not compliant, provide selective deposit options to the depositor device via a user interface, receiving a selection of deposit option from the depositor device via the user interface, and performing the selected deposit option; and deposit funds of the financial instrument.

1 A processor-implemented risk-diminishing remote deposit method, comprising:

receiving electronic data pertaining to depositing a financial instrument from a depositor device;

provisionally depositing funds of the financial instrument into a depositor account;

generating financial instrument clearing data based on the electronic data;

providing the generated financial instrument clearing data to an external agency;

receiving an indication of a type of the financial instrument from the external agency;

confirming the provisionally deposited funds with expedited availability if the type of the financial instrument satisfies a predetermined regulatory requirement; and applying deposit constraints to the provisionally deposited funds if the type of the financial instrument does not satisfy the predetermined regulatory requirement.

2 The method of claim 1, further comprising:

establishing a secure communications channel between the depositor device and a receiving institution via the remote deposit component, wherein establishment includes:

obtaining depositor identifying information, and verifying the depositor identifying information.

3 The method of claim 2, wherein the depositor identifying information comprises depositor submitted login information.

4 The method of claim 2, wherein the depositor identifying information comprises hardware identification of the depositor device.

5 The method of claim 1, wherein the obtained electronic data comprises a digital image of the financial instrument.

6 The method of claim 1, wherein the obtained electronic data comprises a depositor submitted deposit amount of the financial instrument.

7 The method of claim 1, wherein the generated financial instrument clearing data comprises X9.37 cash letter files.

8 The method of claim 1, wherein the generated financial instrument clearing data comprises metadata associated with the obtained electronic data of the financial instrument, 9 The method of claim 8, wherein the metadata comprises GPS information of the depositor device, a deposit timestamp, deposit data and characteristics of the depositor device.

10 The method of claim 1, further comprising:

determining whether the obtained electronic data of the financial instrument is a representment.

11 The method of claim 10, wherein determining whether the obtained electronic data of the financial instrument is a representment comprises comparing the obtained electronic data with a pre-defined set of previous deposits.

12 The method of claim 11, wherein the pre-defined set of previous deposits includes digital images and deposit information of deposited financial instruments within a predetermined period of time.

13 The method of claim 1, further comprising:

subscribing to presentment services at an external agency, wherein the presentment services provides check presentment notification whenever a check is presented.

14 The method of claim 13, further comprising:

submitting bulk transaction data in batch time to the external agency; and receiving a representment report related to the bulk transaction from the external agency.

15 The method of claim 1, wherein the expedited availability is next business day availability.

16 The method of claim 1, wherein the predetermined regulatory requirement is Regulation-CC safety.

17 The method of claim 1, wherein the deposit constraints comprises a maximum allowable cap on the deposit amount.

18 The method of claim 1, wherein applying deposit constraints to the provisionally deposited funds further comprises providing selective deposit options to the depositor device.

19 The method of claim 18, wherein the selective deposit options comprises:

depositing a maximum allowable amount for next business day access;

requesting to reduce the deposit constraint; and canceling the deposit.

20 The method of claim 1, further comprising:

instructing a depositor to submit a physical financial instrument for verification if the type of the financial instrument does not satisfy the predetermined regulatory requirement.

21 A risk-diminishing remote deposit system, comprising:

means for receiving electronic data pertaining to depositing a financial instrument from a depositor device;

means for provisionally depositing funds of the financial instrument into a depositor account;

means for generating financial instrument clearing data based on the electronic data;

means for providing the generated financial instrument clearing data to an external agency;

means for receiving an indication of a type of the financial instrument from the external agency;

means for confirming the provisionally deposited funds with expedited availability if the type of the financial instrument satisfies a predetermined regulatory requirement; and means for applying deposit constraints to the provisionally deposited funds if the type of the financial instrument does not satisfy the predetermined regulatory requirement.

22 A risk-diminishing remote deposit apparatus, comprising:

a memory;

a processor disposed in communication with said memory, and configured to issue a plurality of processing instructions stored in the memory, wherein the processor issues instructions to:

receive electronic data pertaining to depositing a financial instrument from a depositor device;

provisionally deposit funds of the financial instrument into a depositor account;

generate financial instrument clearing data based on the electronic data;

provide the generated financial instrument clearing data to an external agency;

receive an indication of a type of the financial instrument from the external agency;

confirm the provisionally deposited funds with expedited availability if the type of the financial instrument satisfies a predetermined regulatory requirement; and apply deposit constraints to the provisionally deposited funds if the type of the financial instrument does not satisfy the predetermined regulatory requirement.

23. A risk-diminishing remote deposit processor-readable medium storing a plurality of processing instructions, comprising issuable instructions by a processor to:

receive electronic data pertaining to depositing a financial instrument from a depositor device;

provisionally deposit funds of the financial instrument into a depositor account;

generate financial instrument clearing data based on the electronic data;

provide the generated financial instrument clearing data to an external agency;

receive an indication of a type of the financial instrument from the external agency;

confirm the provisionally deposited funds with expedited availability if the type of the financial instrument satisfies a predetermined regulatory requirement; and apply deposit constraints to the provisionally deposited funds if the type of the financial instrument does not satisfy the predetermined regulatory requirement.

In order to address various issues and advance the art, the entirety of this application for APPARATUSES, METHODS AND SYSTEMS FOR REMOTE DEPOSIT CAPTURE WITH ENHANCED IMAGE DETECTION (including the Cover Page, Title, Headings, Field, Background, Summary, Brief Description of the Drawings, Detailed Description, Claims, Abstract, FIGURES, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a RDC-Detection individual and/or enterprise user, database configuration and/or relational model, data type, data transmission and/or network framework, syntax structure, and/or the like, various embodiments of the RDC-Detection, may be implemented that enable a great deal of flexibility and customization. For example, aspects of the RDC-Detection may be adapted for electronic billing and payment. While various embodiments and discussions of the RDC-Detection have been directed to remote deposit of financial instrument, however, it is to be understood that the embodiments described herein may be readily configured and/or customized for a wide variety of other applications and/or implementations.

The invention claimed is:

1. A system comprising:

a memory; and a processor in communication with the memory, the processor configured to:

extract an instrument image from an image that is associated with an account, where the instrument image is extracted by determining at least one corner of a plurality of corners of an instrument in the image, wherein in determining the at least one corner of the plurality of corners of the instrument in the image, the processor is further configured to:

perform an outer edge sampling that moves from an outside of the image to an inside of the image;

perform an inner edge sampling that moves from the inside of the image to the outside of the image; and determine the at least one corner of the plurality of corners based upon a plurality of edge sample points obtained from the outer edge sampling and the inner edge sampling; and transmit the instrument image to a financial institution server to transfer funds between financial institution accounts.

2. The system of claim 1, wherein in determining the at least one corner of the plurality of corners based upon the plurality of edge sample points, the processor is further configured to:

obtain filtered edge sample points by selecting, from the plurality of edge sample points, matching edge sample points for which the outer edge sampling matches the inner edge sampling.

3. The system of claim 2, wherein in obtaining the filtered edge sample points by selecting, from the plurality of edge sample points, matching edge sample points for which the outer edge sampling matches the inner edge sampling, the processor is further configured to:

determine that the outer edge sampling and the inner edge sampling match when the plurality of edge sample points satisfy a minimal distance constraint.

4. The system of claim 1, wherein in determining the at least one corner of the plurality of corners based upon the plurality of edge sample points, the processor is further configured to:

perform line projections on the plurality of edge sample points to obtain a plurality of lines.

5. The system of claim 4, wherein in performing the line projections on the plurality of edge sample points, the processor is further configured to:

apply least squares on the plurality of edge sample points to project a line of the plurality of lines.

6. The system of claim 4, wherein in determining the at least one corner of the plurality of corners based upon the plurality of edge sample points, the processor is further configured to:

determine an angle between a current line of the plurality of lines and a previously determined line of the plurality of lines and select a first detected line based upon the angle.

7. The system of claim 1, wherein in determining the at least one corner of the plurality of corners based upon the plurality of edge sample points, the processor is further configured to: locate a first corner by calculating an intersection of a first detected line with a second detected line.

8. The system of claim 7, wherein in determining the at least one corner of the plurality of corners based upon the plurality of edge sample points, the processor is further configured to:

determine whether the located first corner is a good corner or a bad corner based upon an inner angle of the located first corner and an inner angle of a located second corner.

9. The system of claim 8, wherein in determining the at least one corner of the plurality of corners based upon the plurality of edge sample points, the processor is further configured to:

when the located first corner is determined to be a bad corner, re-calculate the located first corner.

10. The system of claim 8, wherein in determining the at least one corner of the plurality of corners based upon the plurality of edge sample points, the processor is further configured to:

when the located first corner is determined to be a good corner, determine the located first corner to be the at least one corner of the plurality of corners.

11. A method comprising:

extracting, by a processor, an instrument image from an image that is associated with an account, wherein the instrument image is extracted by determining at least one corner of a plurality of corners of the instrument in the image, wherein determining the at least one corner of the plurality of corners of the instrument in the captured image comprises:

performing an outer edge sampling that moves from an outside of the image to an inside of the image;

perform an inner edge sampling that moves from the inside of the image to the outside of the image; and determining the at least one corner of the plurality of corners based upon a plurality of edge sample points obtained from the outer edge sampling and the inner edge sampling; and transmitting, by the processor, the instrument image to a financial institution server to transfer funds between financial institution accounts.

12. The method of claim 11, wherein the determining of the at least one corner of the plurality of corners based upon the plurality of edge sample points further comprises:

obtaining filtered edge sample points by selecting, from the plurality of edge sample points, matching edge sample points for which the outer edge sampling matches the inner edge sampling.

13. The method of claim 12, wherein the obtaining of the filtered edge sample points by selecting, from the plurality of edge sample points, matching edge sample points for which the outer edge sampling matches the inner edge sampling, further comprises:

determining that the outer edge sampling and the inner edge sampling match when the plurality of edge sample points satisfy a minimal distance constraint.

14. The method of claim 11, wherein the determining of the at least one corner of the plurality of corners based upon the plurality of edge sample points further comprises:

performing line projections on the plurality of edge sample points to obtain a plurality of lines.

15. The method of claim 14, wherein the performing of the line projections on the plurality of edge sample points further comprises:

applying least squares on the plurality of edge sample points to project a line of the plurality of lines.

16. The method of claim 14, wherein the determining of the at least one corner of the plurality of corners based upon the plurality of edge sample points further comprises:

determining an angle between a current line of the plurality of lines and a previously determined line of the plurality of lines and selecting a first detected line based upon the angle.

17. The method of claim 11, wherein the determining of the at least one corner of the plurality of corners based upon the plurality of edge sample points further comprises:

locating a first corner by calculating an intersection of a first detected line with a second detected line.

18. The method of claim 17, wherein the determining of the at least one corner of the plurality of corners based upon the plurality of edge sample points further comprises:

determining whether the located first corner is a good corner or a bad corner based upon an inner angle of the located first corner and an inner angle of a located second corner.

19. The method of claim 18, wherein the determining of the at least one corner of the plurality of corners based upon the plurality of edge sample points further comprises:

when the located first corner is determined to be a bad corner, re-calculating the located first corner.

20. The method of claim 18, wherein the determining of the at least one corner of the plurality of corners based upon the plurality of edge sample points further comprises:

when the located first corner is determined to be a good corner, determining the located first corner to be the at least one corner of the plurality of corners.

* * * * *